(12) United States Patent
Schowengerdt et al.

(10) Patent No.: US 11,651,566 B2
(45) Date of Patent: May 16, 2023

(54) SYSTEMS AND METHODS FOR MIXED REALITY

(71) Applicant: Magic Leap, Inc., Plantation, FL (US)

(72) Inventors: Brian T. Schowengerdt, Seattle, WA (US); Mathew D. Watson, Bellevue, WA (US); David Tinch, Laramie, WY (US); Ivan Li Chuen Yeoh, Tampa, FL (US); John Graham Macnamara, Plantation, FL (US); Lionel Ernest Edwin, Plantation, FL (US); Michael Anthony Klug, Austin, TX (US); William Hudson Welch, Fort Lauderdale, FL (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/389,684

(22) Filed: Jul. 30, 2021

(65) Prior Publication Data

US 2021/0358224 A1 Nov. 18, 2021

Related U.S. Application Data

(63) Continuation of application No. 16/903,279, filed on Jun. 16, 2020, now Pat. No. 11,107,288, which is a
(Continued)

(51) Int. Cl.
*G06T 19/00* (2011.01)
*G02B 27/10* (2006.01)
(Continued)

(52) U.S. Cl.
CPC .............. *G06T 19/006* (2013.01); *G02B 5/18* (2013.01); *G02B 26/08* (2013.01);
(Continued)

(58) Field of Classification Search
None
See application file for complete search history.

(56) References Cited

U.S. PATENT DOCUMENTS

| 6,897,992 B2 | 5/2005 | Kikuchi |
| 9,417,452 B2 | 8/2016 | Schowengerdt et al. |
| (Continued) | | |

FOREIGN PATENT DOCUMENTS

| CN | 106537219 | 3/2017 |
| JP | 2014-132328 | 7/2014 |
| (Continued) | | |

OTHER PUBLICATIONS

Foreign Response for CN Patent Appln. No. 201880034011.8 dated Aug. 9, 2021.
(Continued)

*Primary Examiner* — James A Thompson
(74) *Attorney, Agent, or Firm* — Vista IP Law Group, LLP

(57) ABSTRACT

A virtual image generation system comprises a planar optical waveguide having opposing first and second faces, an in-coupling (IC) element configured for optically coupling a collimated light beam from an image projection assembly into the planar optical waveguide as an in-coupled light beam, a first orthogonal pupil expansion (OPE) element associated with the first face of the planar optical waveguide for splitting the in-coupled light beam into a first set of orthogonal light beamlets, a second orthogonal pupil expansion (OPE) element associated with the second face of the planar optical waveguide for splitting the in-coupled light beam into a second set of orthogonal light beamlets, and an exit pupil expansion (EPE) element associated with the planar optical waveguide for splitting the first and second sets of orthogonal light beamlets into an array of out-
(Continued)

coupled light beamlets that exit the planar optical waveguide.

31 Claims, 102 Drawing Sheets

Related U.S. Application Data continuation of application No. 15/980,947, filed on May 16, 2018, now Pat. No. 10,755,481.

(60) Provisional application No. 62/506,841, filed on May 16, 2017, provisional application No. 62/509,499, filed on May 22, 2017.

(51) Int. Cl.
  *G02B 27/30* (2006.01)
  *G02B 27/01* (2006.01)
  *G02B 26/08* (2006.01)
  *G02B 27/09* (2006.01)
  *G02B 5/18* (2006.01)
  *G02B 27/42* (2006.01)
  *G02B 6/12* (2006.01)

(52) U.S. Cl.
  CPC ..... *G02B 27/0172* (2013.01); *G02B 27/0944* (2013.01); *G02B 27/0955* (2013.01); *G02B 27/0972* (2013.01); *G02B 27/10* (2013.01); *G02B 27/106* (2013.01); *G02B 27/30* (2013.01); *G02B 27/42* (2013.01); *G02B 2006/1215* (2013.01); *G02B 2027/0123* (2013.01); *G02B 2027/0178* (2013.01)

(56) References Cited

U.S. PATENT DOCUMENTS

| | | | |
|---|---|---|---|
| 9,612,403 | B2 | 4/2017 | Abovitz et al. |
| 9,671,566 | B2 | 6/2017 | Abovitz et al. |
| 9,791,700 | B2 | 10/2017 | Schowengerdt |
| 9,857,591 | B2 | 1/2018 | Welch et al. |
| 2004/0257664 | A1 | 12/2004 | Hashimoto et al. |
| 2011/0026128 | A1 | 2/2011 | Baker et al. |
| 2012/0062998 | A1 | 3/2012 | Schultz et al. |
| 2012/0176682 | A1 | 7/2012 | Dejong |
| 2013/0329301 | A1 | 12/2013 | Travis |
| 2014/0334777 | A1 | 11/2014 | Dubroca et al. |
| 2015/0235471 | A1 | 8/2015 | Schowengerdt |
| 2015/0241844 | A1 | 8/2015 | Horikawa |
| 2015/0309264 | A1 | 10/2015 | Abovitz et al. |
| 2015/0346490 | A1 | 12/2015 | Tekolste et al. |
| 2016/0011419 | A1 | 1/2016 | Gao et al. |
| 2016/0077338 | A1 | 3/2016 | Robbins et al. |
| 2016/0124228 | A1 | 5/2016 | Bahmandar et al. |
| 2016/0178910 | A1 | 6/2016 | Giudicelli et al. |
| 2017/0010466 | A1 | 1/2017 | Klug et al. |
| 2017/0038579 | A1 | 2/2017 | Yeoh et al. |
| 2017/0097506 | A1 | 4/2017 | Schowengerdt et al. |
| 2017/0131545 | A1 | 5/2017 | Wall et al. |
| 2017/0293141 | A1 | 10/2017 | Schowengerdt et al. |
| 2017/0299860 | A1 | 10/2017 | Wall et al. |
| 2018/0149873 | A1 | 5/2018 | Edwin et al. |

FOREIGN PATENT DOCUMENTS

| | | |
|---|---|---|
| JP | 2015-191032 | 11/2015 |
| WO | WO 2016105285 | 6/2016 |

OTHER PUBLICATIONS

Foreign OA for JP Patent Appln. No. 2019-563122 dated Aug. 24, 2021.
Foreign NOA for CN Patent Appln. No. 201880034011.8 dated Aug. 31, 2021.
Foreign Response for KR Patent Appln. No. 10-2019-7036766 dated Sep. 8, 2021.
Foreign Response for JP Patent Appln. No. 2019-563122 dated Nov. 16, 2021.
Foreign FOA for JP Patent Appln. No. 2019-563122 dated Jan. 6, 2022.
Foreign NOA for JP Patent Appln. No. 2019-563122 dated Jun. 10, 2022.
Foreign OA for CN Patent Appln. No. 202111339558.9 dated Jun. 10, 2022.
Foreign Exam Report for IN Patent Appln. No. 201947049345 dated Apr. 11, 2022.
PCT Invitation to Pay Additional Fees and partial search report dated Jul. 11, 2018 for PCT application No. PCT/US2018/032883, Applicant Magic Leap, Inc., 2 pages.
PCT International Search Report and Written Opinion for PCT Application No. PCT/US2018/032883, Applicant Magic Leap, Inc., dated Sep. 25, 2018 (41 pages).
Non-Final Office Action for U.S. Appl. No. 15/980,947 dated Aug. 21, 2019.
Amendment Response to NFOA for U.S. Appl. No. 15/980,947 dated Feb. 20, 2020.
Notice of Allowance for U.S. Appl. No. 15/980,947 dated Mar. 16, 2020.
Notice of Allowance for U.S. Appl. No. 16/903,279 dated Apr. 27, 2021.
Non-Final Office Action for U.S. Appl. No. 16/903,279 dated Dec. 1, 2020.
Amendment Response to NFOA for U.S. Appl. No. 16/903,279 dated Mar. 1, 2021.
Foreign Response for CN Patent Appln. No. 201880034011.8 dated Apr. 8, 2021.
Foreign OA for CN Patent Appln. No. 201880034011.8 dated May 26, 2021.
Foreign OA for KR Patent Appln. No. 10-2019-7036766 dated Jul. 9, 2021.
Extended European Search Report for EP Patent Appln. No. 18802379.1 dated May 27, 2020.
Notice of Allowance for U.S. Appl. No. 15/980,947 dated Jul. 2, 2020.
Foreign Response for AU Patent Appln. No. 2018270948 dated Oct. 20, 2022.
Foreign Response for CN Patent Appln. No. 202111339558.9 dated Oct. 24, 2022.
Foreign OA for CN Patent Appln. No. 202111339558.9 dated Nov. 3, 2022 (with English translation).
Foreign Exam Report for EP Patent Appln. No. 18803279.1 dated Oct. 27, 2022.
Foreign Response for CN Patent Appln. No. 202111339558.9 dated Jan. 3, 2023.
Foreign OA for KR Patent Appln. No. 10-2022-7005055 dated Jan. 11, 2023.
Foreign Response for EP Patent Appln. No. 18803279.1 dated Feb. 22, 2023.
Foreign Response for KR Patent Appln. No. 10-2022-7005055 dated Mar. 8, 2023.
Foreign Exam Report for AU Patent Appln. No. 2023201026 dated Apr. 3, 2023.

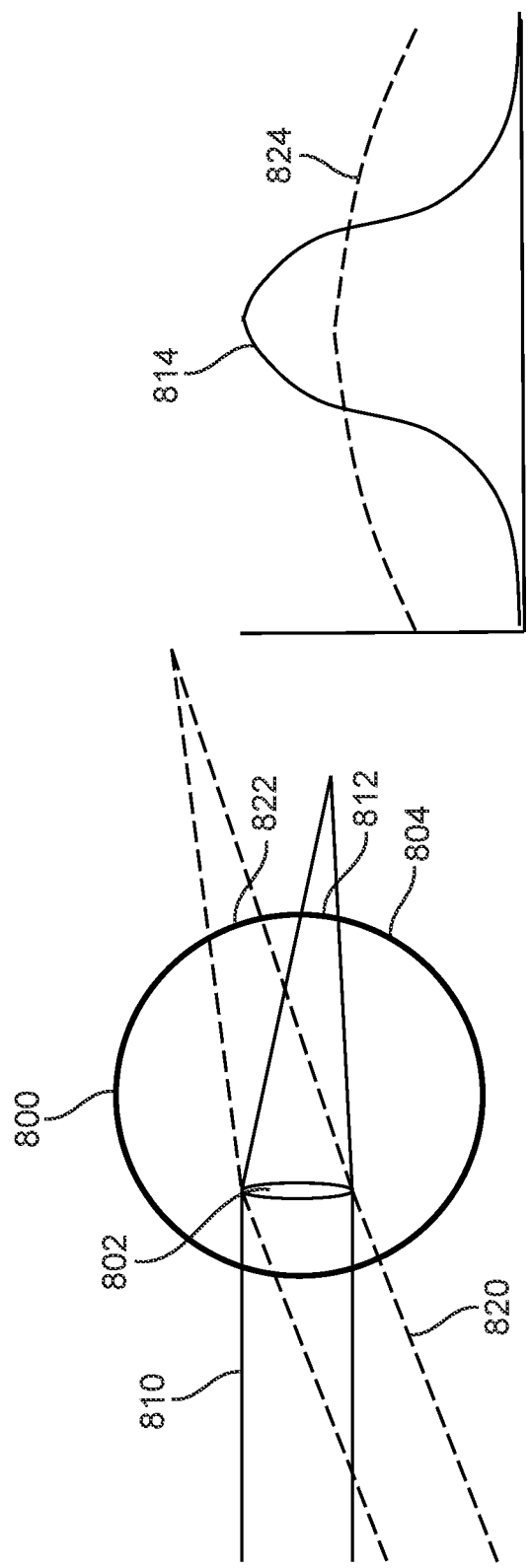

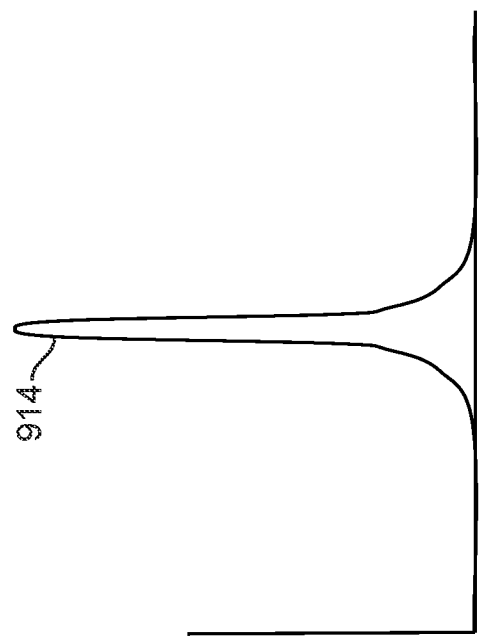
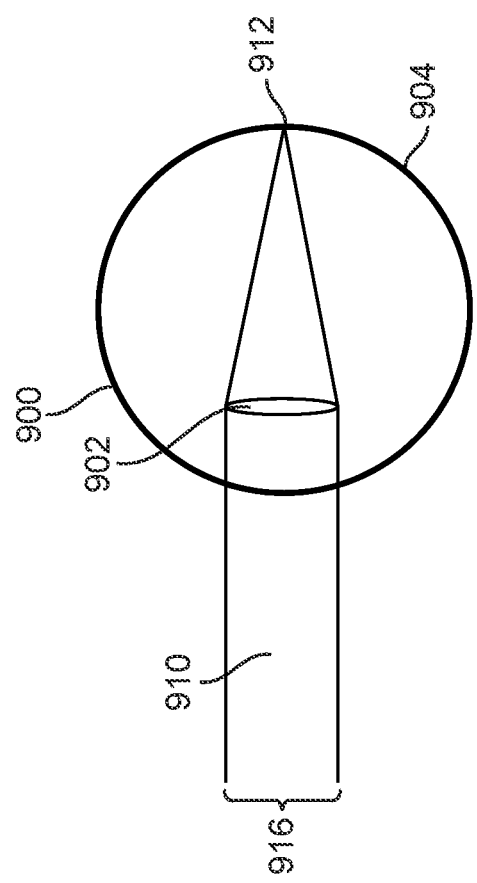
FIG. 14B
FIG. 14A

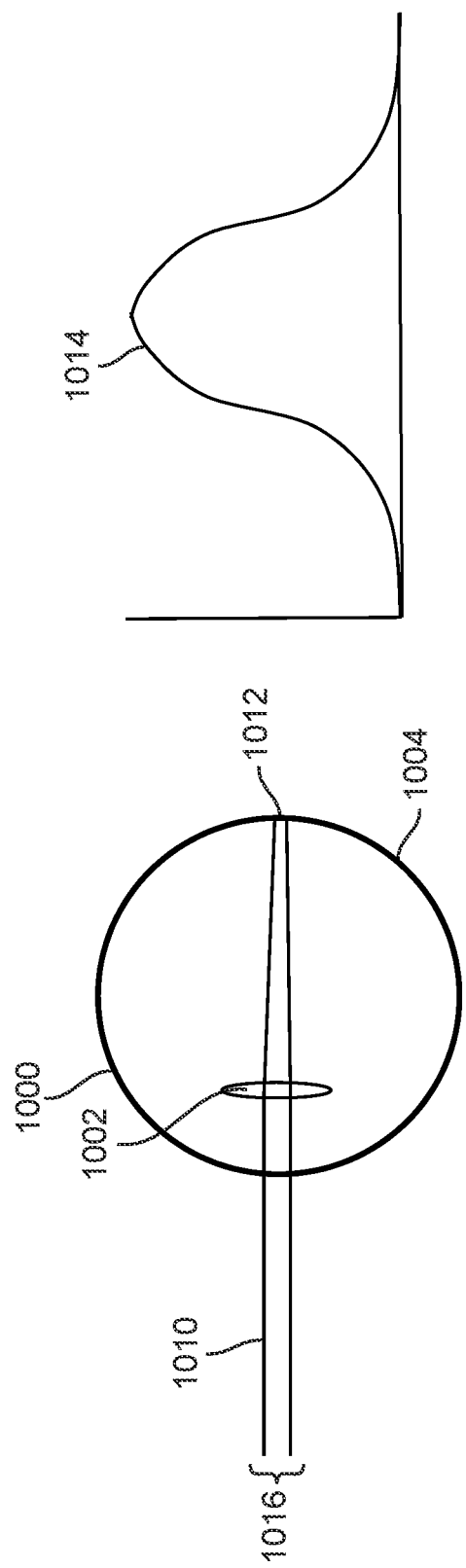

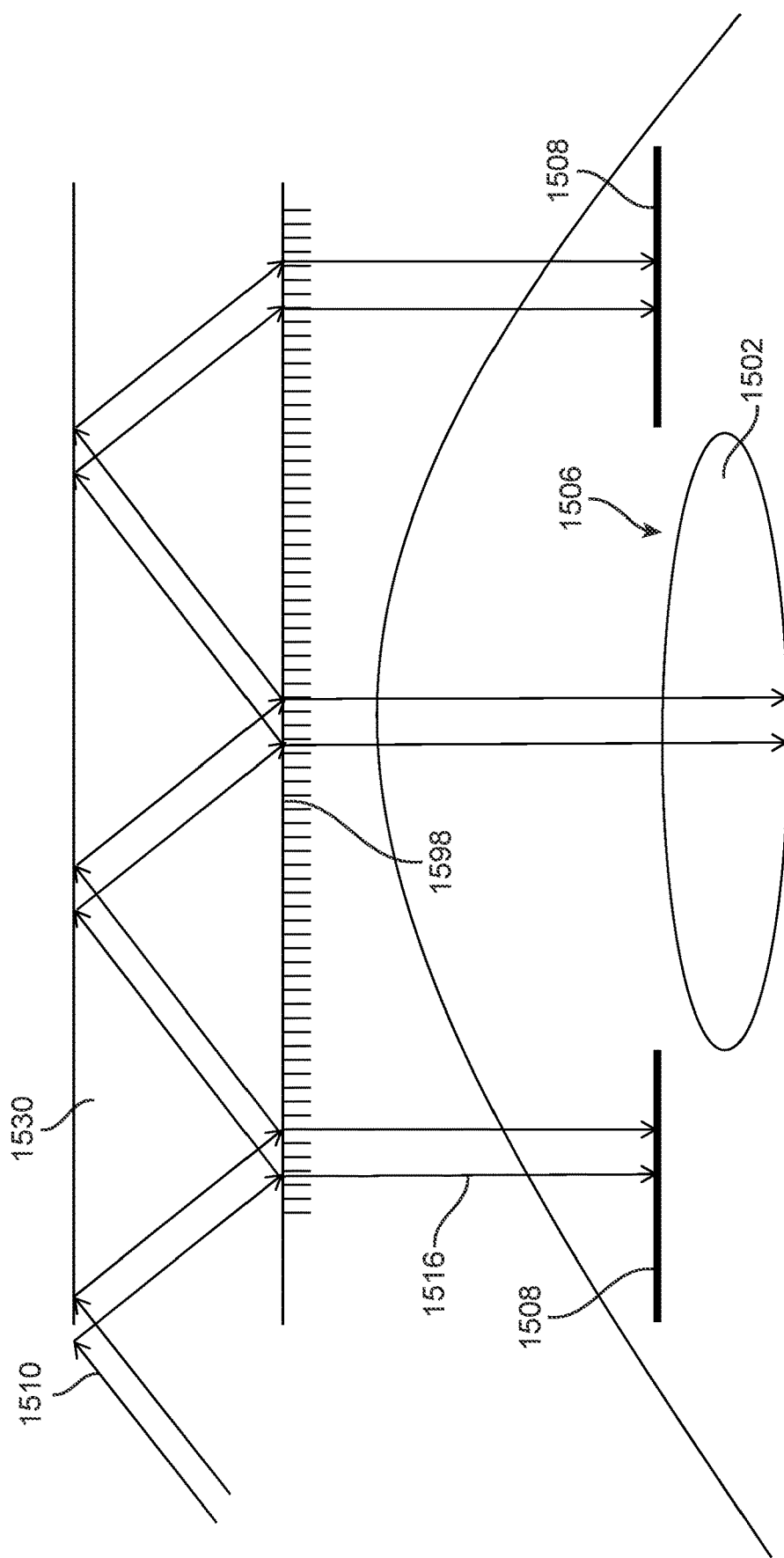

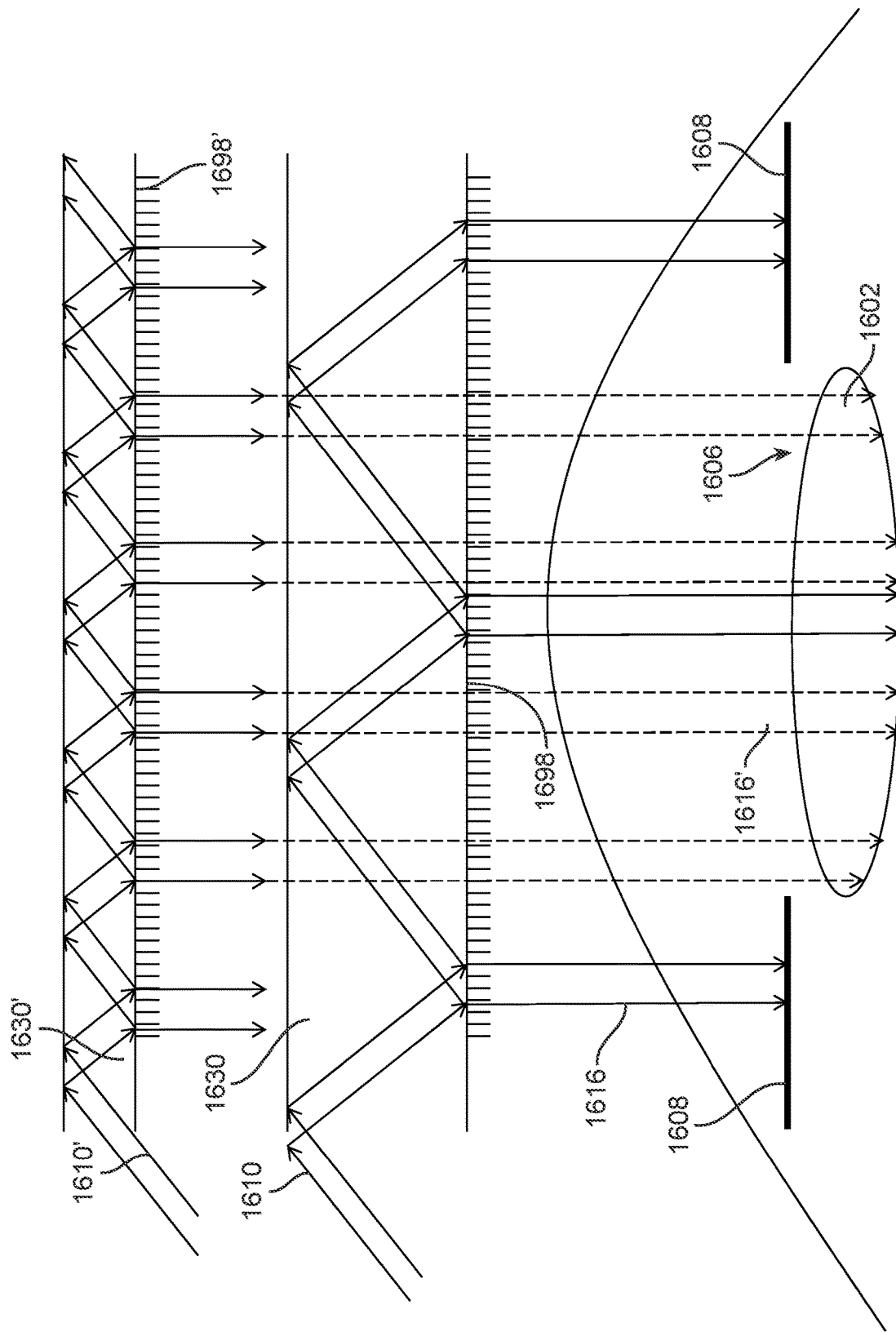

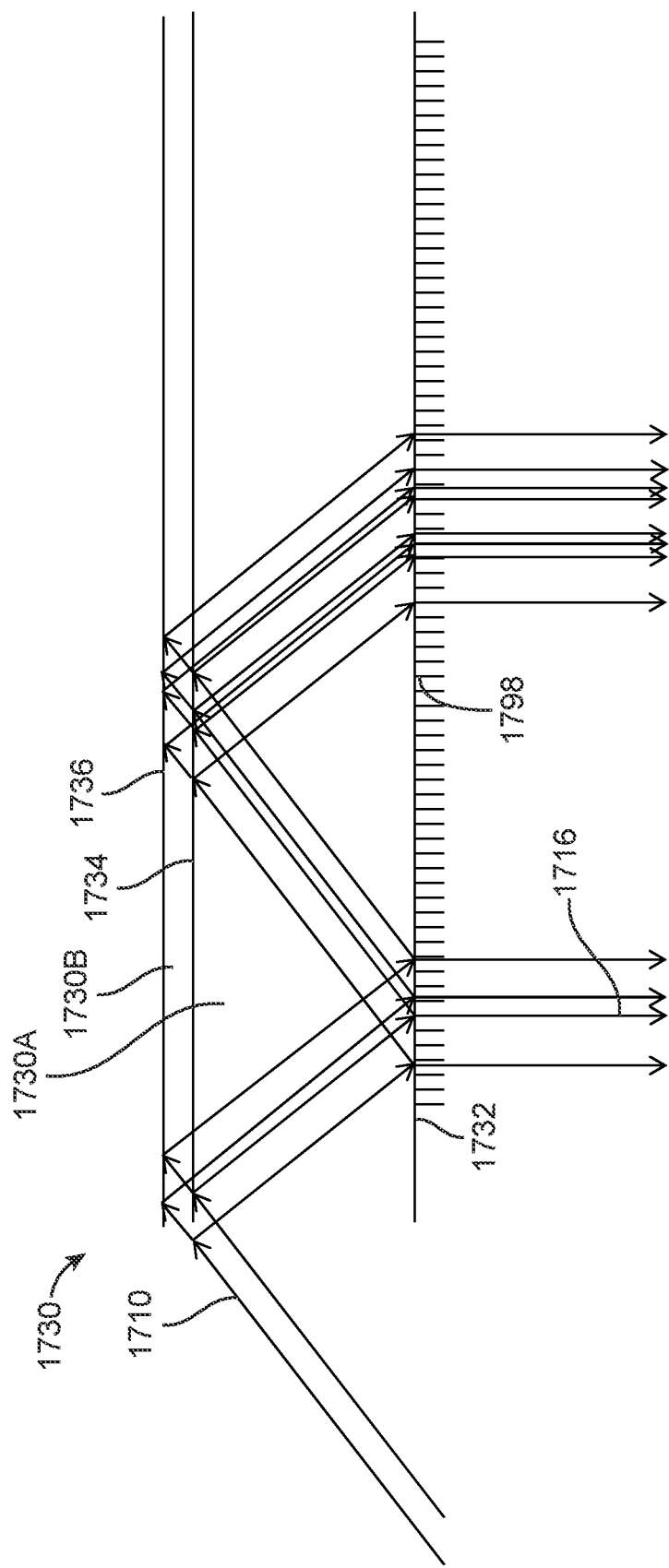

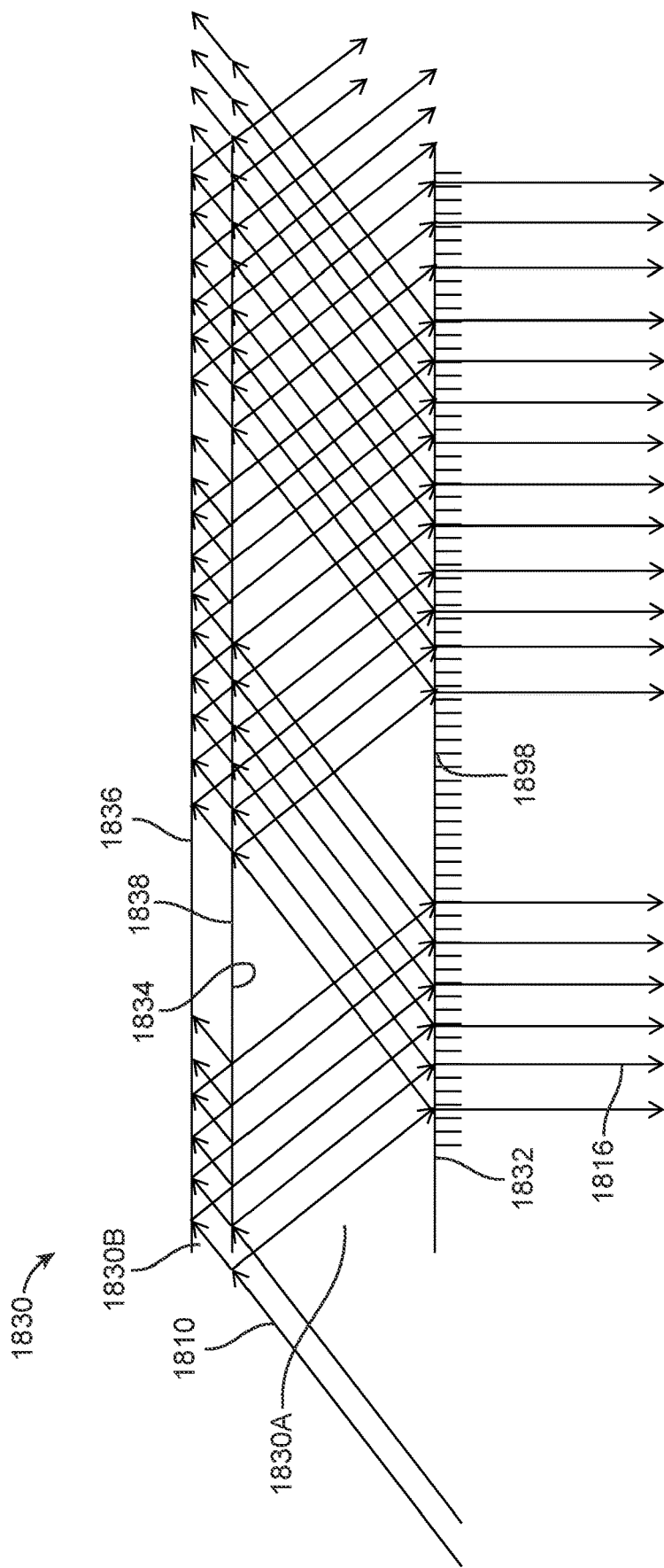

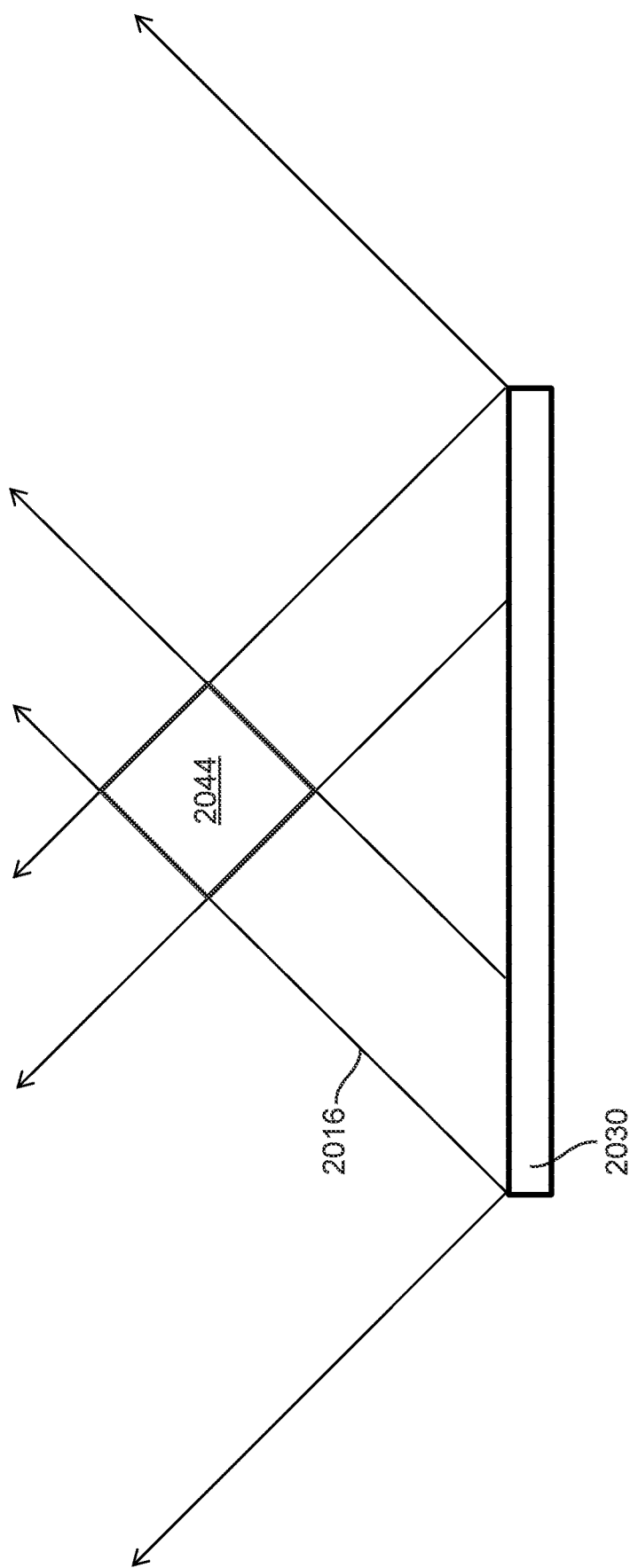

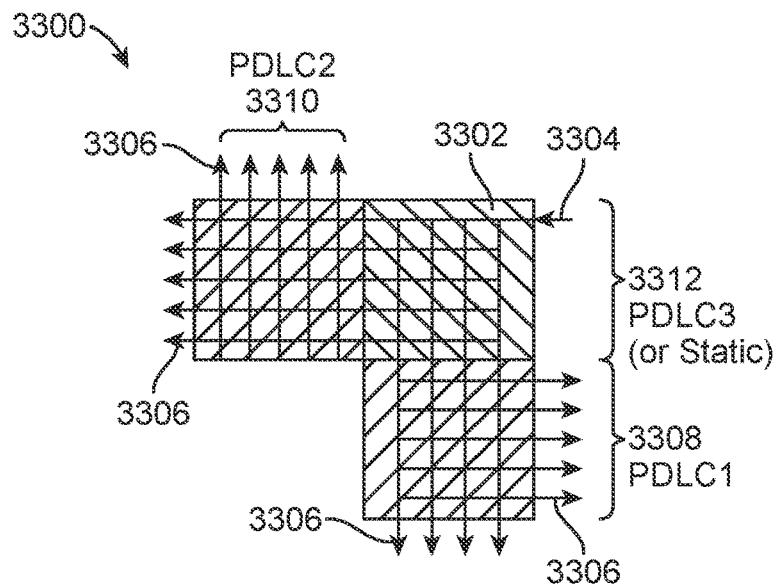
FIG. 33A
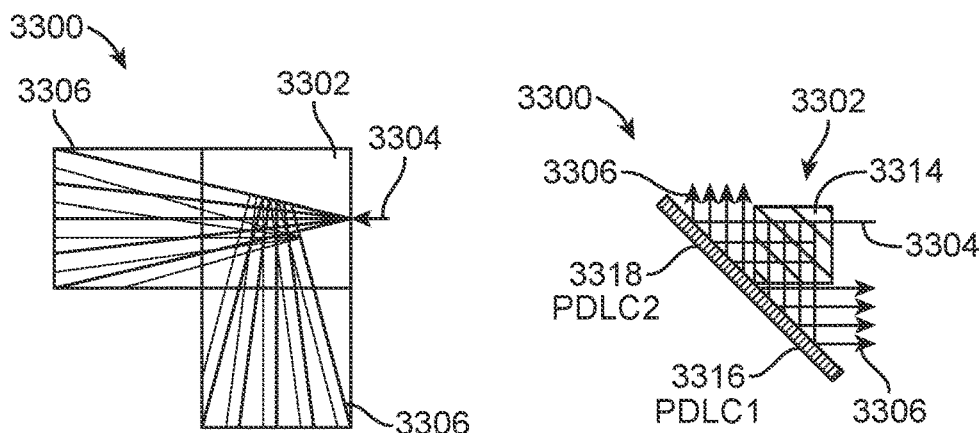
FIG. 33B
FIG. 33C
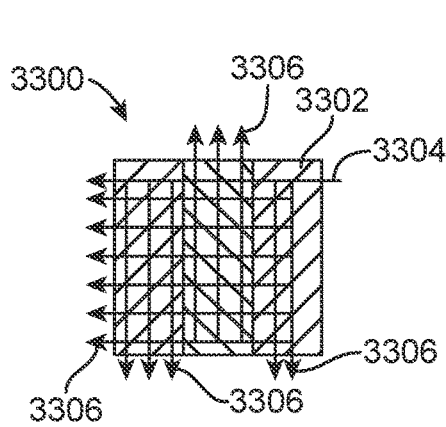
FIG. 33D
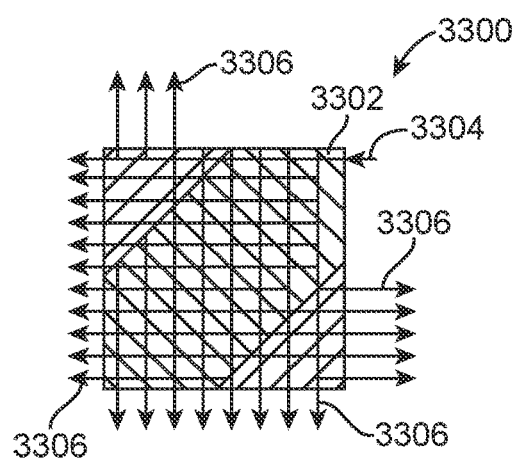
FIG. 33E OPE 3-Way Multipier

SYSTEMS AND METHODS FOR MIXED REALITY

CROSS-REFERENCE TO RELATED APPLICATION(S)

The present application is a continuation of U.S. patent application Ser. No. 16/903,279, filed on Jun. 16, 2020, entitled "SYSTEMS AND METHODS FOR MIXED REALITY", which claims priority to U.S. patent application Ser. No. 15/980,947, filed on May 16, 2018, entitled "SYSTEMS AND METHODS FOR MIXED REALITY", and claims priority to U.S. Provisional Application Ser. No. 62/506,841, filed on May 16, 2017, entitled "SYSTEMS AND METHODS FOR MIXED REALITY" and U.S. Provisional Application Ser. No. 62/509,499, filed on May 22, 2017, titled "TECHNIQUE FOR MULTIPLYING BEAMS TO OBTAIN EFFECTIVELY WIDER BEAM IN VIRTUAL/AUGMENTED REALITY SYSTEM." This application is related to U.S. Utility patent application Ser. No. 15/479,700, filed on Apr. 5, 2017 and entitled "SYSTEMS AND METHODS FOR AUGMENTED REALITY," U.S. Utility patent application Ser. No. 14/331,218 filed on Jul. 14, 2014 and entitled "PLANAR WAVEGUIDE APPARATUS WITH DIFFRACTION ELEMENT(S) AND SYSTEM EMPLOYING SAME," U.S. Utility patent application Ser. No. 14/555,585 filed on Nov. 27, 2014 and entitled "VIRTUAL AND AUGMENTED REALITY SYSTEMS AND METHODS," U.S. Utility patent application Ser. No. 14/726,424 filed on May 29, 2015 and entitled "METHODS AND SYSTEMS FOR VIRTUAL AND AUGMENTED REALITY," U.S. Utility patent application Ser. No. 14/726,429 filed on May 29, 2015 and entitled "METHODS AND SYSTEMS FOR CREATING FOCAL PLANES IN VIRTUAL AND AUGMENTED REALITY," and U.S. Utility patent application Ser. No. 14/726,396 filed under on May 29, 2015 and entitled "METHODS AND SYSTEMS FOR DISPLAYING STEREOSCOPY WITH A FREEFORM OPTICAL SYSTEM WITH ADDRESSABLE FOCUS FOR VIRTUAL AND AUGMENTED REALITY." The contents of the aforementioned patent applications are hereby expressly and fully incorporated by reference in their entirety, as though set forth in full.

FIELD OF THE INVENTION

The present disclosure relates to virtual reality, augmented reality, and mixed reality imaging and visualization systems.

BACKGROUND OF THE INVENTION

Modern computing and display technologies have facilitated the development of "mixed reality" (MR) systems for so called "virtual reality" (VR) or "augmented reality" (AR) experiences, wherein digitally reproduced images or portions thereof are presented to a user in a manner wherein they seem to be, or may be perceived as, real. A VR scenario typically involves presentation of digital or virtual image information without transparency to actual real-world visual input. An AR scenario typically involves presentation of digital or virtual image information as an augmentation to visualization of the real world around the user (i.e., transparency to real-world visual input). Accordingly, AR scenarios involve presentation of digital or virtual image information with transparency to the real-world visual input.

MR systems typically generate and display color data, which increases the realism of MR scenarios. Many of these MR systems display color data by sequentially projecting sub-images in different (e.g., primary) colors or "fields" (e.g., Red, Green, and Blue) corresponding to a color image in rapid succession. Projecting color sub-images at sufficiently high rates (e.g., 60 Hz, 120 Hz, etc.) may deliver a smooth color MR scenarios in a user's mind.

For example, referring to FIG. 1, an augmented reality scene 4 is depicted wherein a user of an AR/MR technology sees a real-world park-like setting 6 featuring people, trees, buildings in the background, and a concrete platform 8. In addition to these items, the end user of the AR/MR technology also perceives that he "sees" a robot statue 10 standing upon the real-world platform 8, and a cartoon-like avatar character 12 flying by which seems to be a personification of a bumble bee, even though these elements 10, 12 do not exist in the real world. As it turns out, the human visual perception system is very complex, and producing a VR, AR, and/or MR technology that facilitates a comfortable, natural-feeling, rich presentation of virtual image elements amongst other virtual or real-world imagery elements is challenging.

Some VR, AR, and/or MR systems employ head-worn displays (or helmet-mounted displays, or smart glasses) that are at least loosely coupled to a user's head, and thus move when the end user's head moves. If the end user's head motions are detected by the display subsystem, the data being displayed can be updated to take the change in head pose (i.e., the orientation and/or location of user's head) into account. Head-worn displays that enable AR/MR (i.e., the concurrent viewing of real and virtual objects) can have several different types of configurations. In one such configuration, often referred to as a "video see-through" display, a camera captures elements of a real scene, a computing system superimposes virtual elements onto the captured real scene, and a non-transparent display presents the composite image to the eyes. Another configuration is often referred to as an "optical see-through" display, in which the end user can see through transparent (or semi-transparent) elements in the display subsystem to view directly the light from real objects in the environment. The transparent element, often referred to as a "combiner," superimposes light from the display over the end user's view of the real world.

Some head-worn VR/AR/MR systems employ a display screen in the field of view of the end user and an image projection assembly that projects images onto the display screen. As one example, the image projection assembly may take the form of an optical fiber scan-based image projection assembly, and the display screen may take the form of a optical waveguide-based display into which scanned and collimated light beams from the image projection assembly are injected via an in-coupling (IC) element, which the exit the surface of the optical waveguide-based display towards the user's eyes, thereby producing, e.g., images at single optical viewing distance closer than infinity (e.g., arm's length), images at multiple, discrete optical viewing distances or focal planes, and/or image layers stacked at multiple viewing distances or focal planes to represent volumetric 3D objects.

In a head-worn VR/AR/MR system, it is important that the entrance pupil of the user's eye (i.e., the image of the anatomical pupil as seen through the cornea) be aligned with and be of a similar size to the exit pupil of the display screen (i.e., the width of the cone of light that is available to the eye of the user) in order to properly couple the instrument to the eye (in the case of a monocular arrangement) or eyes (in the case of a binocular arrangement) of the user, given a fixed eye relief (i.e., the distance from the last surface of the display screen and the user's eye or eyes). An exit pupil of the display screen that is smaller than the entrance pupil of the user' eye will often result in a vignette or clipped image, whereas an exit pupil of the display screen that is larger than the entrance pupil of the user's eye wastes some light, but allows for movement of the eye without vignetting or clipping of the image.

In order to increase the wearability and comfort of a head-worn VR/AR/MR system, it is desirable to miniaturize the image source, and in some cases, the image projection assembly, as much as possible. Such an image projection assembly will, without intervention, result in an exit pupil that is much smaller than the entrance pupil of some eyes, assuming a reasonable eye relief between the eye and the display screen. As such, optics are incorporated into the display subsystem to effectively expand the exit pupil of the display screen to match the entrance pupil of the user's eye. That is, the exit pupil of the display screen should create an "eye box" that is slightly larger (e.g., 10 mm) than the entrance pupil of the user's eye (e.g., 5-7 mm) to allow movement of the eye within that eye box to maintain a full view of the image presented by the display screen.

Besides matching the exit pupil of the display screen with the entrance pupil of the user's eye(s), it is desirable to maximize the angular resolution, minimize the depth of field, and maximize the density of the wavefront density of the display screen in a VR/AR/MR system. Maximizing the angular resolution results in a clearer and more vivid virtual image, maximizing the wavefront density alleviates image artifacts (such as the "screen door" effect (grid-like pattern and non-uniformity), and minimizing the depth of the field allows the user to more easily accommodate to virtual content on which the user is currently focused. That is, the smaller the depth of field, the easier it is for an eye to accommodate to the virtual content, providing for a more natural visual real-world experience, whereas the greater the depth of field, the more difficult it is for the eye to accommodate to the virtual content, resulting in a less natural, and perhaps a nauseating, visual experience.

There, thus, remains a need to provide a display screen of a VR/AR/MR system that is capable of producing a highly-saturated light beamlet array exit pupil that matches the entrance pupil of the user's eye(s), without diminishing the wearability of the VR/AR/MR system.

The visualization center of the brain gains valuable perception information from the motion of both eyes and components thereof relative to each other. Vergence movements (i.e., rolling movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to focus upon an object at a different distance will automatically cause a matching change in vergence to the same distance, under a relationship known as the "accommodation-vergence reflex." Likewise, a change in vergence will trigger a matching change in accommodation, under normal conditions. Working against this reflex, as do most conventional stereoscopic VR/AR/MR configurations, is known to produce eye fatigue, headaches, or other forms of discomfort in users.

Stereoscopic wearable glasses generally feature two displays for the left and right eyes that are configured to display images with slightly different element presentation such that a three-dimensional perspective is perceived by the human visual system. Such configurations have been found to be uncomfortable for many users due to a mismatch between vergence and accommodation ("vergence-accommodation conflict") which must be overcome to perceive the images in three dimensions. Indeed, some VR/AR/MR users are not able to tolerate stereoscopic configurations. Accordingly, most conventional VR/AR/MR systems are not optimally suited for presenting a rich, binocular, three-dimensional experience/scenario in a manner that will be comfortable and maximally useful to the user, in part because prior systems fail to address some of the fundamental aspects of the human perception system, including the vergence-accommodation conflict.

One possible approach to address these problems (including the vergence-accommodation conflict) is to project images at multiple depth planes. To implement this type of system, one approach is to use a plurality of light guiding optical elements to direct light at the eyes of a user such that the light appears to originate from multiple depth planes. The light guiding optical elements are designed to in-couple virtual light corresponding to digital or virtual objects and propagate it by total internal reflection ("TIR"), then to out-couple the virtual light to display the digital or virtual objects to the user's eyes. In AR/MR systems, the light guiding optical elements are also designed to be transparent to light from (e.g., reflecting off of) actual real-world objects. Therefore, portions of the light guiding optical elements are designed to reflect virtual light for propagation via TIR while being transparent to real-world light from real-world objects.

Various optical systems generate images at various depths for displaying VR/AR/MR scenarios. Some such optical systems are described in U.S. Utility patent application Ser. No. 14/555,585, the contents of which have been previously incorporated by reference. Some VR/AR/MR systems employ wearable display devices (e.g., head-worn displays, helmet-mounted displays, or smart glasses) that are at least loosely coupled to a user's head, and thus move when the user's head moves.

Some three-dimensional ("3-D") optical systems, such as those in VR/AR/MR systems, optically render virtual objects. Objects are "virtual" in that they are not real physical objects located in respective positions in 3-D space. Instead, virtual objects only exist in the brains (e.g., the optical centers) of viewers and/or listeners when stimulated by light beams directed to the eyes of audience members.

VR/AR/MR systems must also be capable of displaying virtual digital content at various perceived positions and distances relative to the user. The design of VR/AR/MR systems presents numerous other challenges, including the speed of the system in delivering virtual digital content, quality of virtual digital content, eye relief of the user (addressing the vergence-accommodation conflict), size and portability of the system, and other system and optical challenges.

Further, VR/AR/MR systems must be capable of displaying virtual digital content in sharp focus to generate photo-realistic imagery required for a believable, immersive, enjoyable VR/AR/MR experience/scenario. The lens of an eye must change shape (i.e., accommodate) to bring images or portions thereof into better focus.

Size restrictions of head-worn displays also result in image resolution limitations. Head-worn VR/AR/MR display systems, such as those described in U.S. Utility patent application Ser. No. 14/555,585, the contents of which have been previously incorporated by reference, display images to users with light beams transmitted by TIR through light guiding optical elements which conserve light beam angles. Light beam diameters remain essentially the same through light guiding optical elements. Size limitations of head-worn displays limited the size of various optical components (e.g., light sources, light guiding optical elements, lenses, etc.), which limits the diameters of light beams generated by the head-worn displays. These light beam diameter limitations result in resolution and FOV limitations described above.

The systems and methods described herein are configured to address these challenges.

SUMMARY OF THE INVENTION

In accordance with a first aspect of the present disclosure, a virtual image generation system comprises a planar optical waveguide (which may be a single unitary substrate) having opposing first and second faces, and an in-coupling (IC) element configured for optically coupling a collimated light beam from an image projection assembly into the planar optical waveguide as an in-coupled light beam. The image projection assembly may comprise a scanning device configured for scanning the collimated light beam.

The virtual image generation system further comprises a first orthogonal pupil expansion (OPE) element associated with the first face of the planar optical waveguide for splitting the in-coupled light beam into a first set of orthogonal light beamlets, and a second orthogonal pupil expansion (OPE) element associated with the second face of the planar optical waveguide for splitting the in-coupled light beam into a second set of orthogonal light beamlets. In some embodiments, the first OPE element is disposed on the first face of the planar optical waveguide, and the second OPE element is disposed on the second face of the planar optical waveguide. The IC element may be configured for optically coupling the collimated light beam from the image projection assembly as the in-coupled light beam for propagation within the planar optical waveguide via total internal reflection (TIR) along a first optical path that alternately intersects the first OPE element and the second OPE element, such that portions of the in-coupled light beam are deflected as the respective first set of orthogonal light beamlets and the second set of orthogonal light beamlets that propagate within the planar optical waveguide via TIR along second parallel optical paths. In this case, the second parallel optical paths may be orthogonal to the first optical path.

The virtual image generation system further comprises an exit pupil expansion (EPE) element associated with the planar optical waveguide for splitting the first and second sets of orthogonal light beamlets into an array of out-coupled light beamlets (e.g., a two-dimensional out-coupled light beamlet array) that exit the planar optical waveguide. The collimated light beam may define an entrance pupil, and the out-coupled light beamlet array may define an exit pupil larger than the entrance pupil, e.g., at least ten times larger than the entrance pupil, or even at least one hundred times larger than the entrance pupil.

In some embodiments, the EPE element is disposed on one of the first and second surfaces of the planar optical waveguide. The first set of orthogonal light beamlets and the second set of orthogonal light beamlets may intersect the EPE element, such that portions of the first set of orthogonal light beamlets and the second set of orthogonal light beamlets are deflected as the out-coupled light beamlet array out of the planar optical waveguide. In some embodiments, the EPE element is configured for imparting a convex wavefront profile on the out-coupled light beamlet array exiting the planar optical waveguide. In this case, the convex wavefront profile may have a center of radius at a focal point to produce an image at a given focal plane. In another embodiment, each of the IC element, OPE element, and EPE element is diffractive.

In accordance with a second aspect of the present disclosure, a virtual image generation system comprises a planar optical waveguide comprising a plurality of substrates including a primary substrate having a first thickness, at least two secondary substrates having second thicknesses, and at least two semi-reflective interfaces respectively disposed between the substrates.

In some embodiments, each of the second thicknesses is less than the first thickness. For example, the first thickness may be at least twice each of the second thicknesses. In another embodiment, the second thicknesses are substantially equal to each other. In an alternative embodiment, two or more of the secondary substrate(s) have second thicknesses that are not equal to each other. In this case, at least two of the unequal second thicknesses may be non-multiples of each other. In still another embodiment, the first thickness is a non-multiple of at least one of the second thicknesses, and may be a non-multiple of each of the second thicknesses. In yet another embodiment, at least two of the plurality of secondary substrates have second thicknesses that are not substantially equal to each other.

In yet another embodiment, each of the semi-reflective interfaces comprises a semi-reflective coating, which may be, e.g., respectively disposed between the substrates via one of physical vapor deposition (PVD), ion-assisted deposition (IAD), and ion beam sputtering (IBS). Each of the coatings may, e.g., be composed of one or more of a metal (Au, Al, Ag, Ni—Cr, Cr and so on), dielectric (Oxides, Fluorides and Sulfides), and semiconductors (Si, Ge). In yet another embodiment, adjacent ones of the substrates are composed of materials having different indices of refraction.

The virtual image generation system further comprises an in-coupling (IC) element configured for optically coupling a collimated light beam from an image projection assembly for propagation as an in-coupled light beam within the planar optical waveguide. The image projection assembly may comprise a scanning device configured for scanning the collimated light beam. The semi-reflective interfaces are configured for splitting the in-coupled light beam into a plurality of primary light beamlets that propagate within the primary substrate.

The virtual image generation system further comprises one or more diffractive optical elements (DOEs) associated with the planar optical waveguide for further splitting the plurality of primary light beamlets into an array of out-coupled light beamlets (e.g., a two-dimensional out-coupled beamlet array) that exit a face of the planar optical waveguide. The collimated light beam may define an entrance pupil, and the out-coupled light beamlet array may define an exit pupil larger than the entrance pupil, e.g., at least ten times larger than the entrance pupil, or even at least one hundred times larger than the entrance pupil. In some embodiments, the first thickness of the primary substrate and the second thicknesses of the secondary substrates are selected, such that spacings between centers of at least two adjacent ones of the out-coupled light beamlets are equal to or less than a width of the collimated light beam. In another embodiment, the first thickness and the second thicknesses are selected, such that no gap resides between edges of greater than half of adjacent ones of the out-coupled light beamlets.

In some embodiments, the semi-reflective interfaces are configured for splitting the in-coupled light beam into at least two in-coupled light beamlets. In this case, the DOE(s) comprises an orthogonal pupil expansion (OPE) element configured for respectively splitting the at least two in-coupled light beamlets into at least two sets of orthogonal light beamlets, the semi-reflective interfaces are further configured for splitting the at least two sets of orthogonal light beamlets into at least four sets of orthogonal light beamlets, and the DOE(s) comprises an exit pupil expansion (EPE) element configured for splitting the at least four sets of orthogonal light beamlets into the set of out-coupled light beamlets. The OPE element and EPE element may be disposed on a face of the optical planar waveguide.

The at least two in-coupled light beamlets may propagate within the planar optical waveguide via total internal reflection (TIR) along a first optical path that intersects the OPE element, such that portions of the at least two in-coupled light beamlets are diffracted as the at least two sets of orthogonal light beamlets that propagate within the planar optical waveguide via TIR along second parallel optical paths. The second parallel optical paths may be orthogonal to the first optical path. The at least two sets of orthogonal light beamlets may intersect the EPE element, such that portions of the at least two sets of orthogonal light beamlets are diffracted as the out-coupled set of light beamlets out of the face of the planar optical waveguide. In some embodiments, the EPE element may be configured for imparting a convex wavefront profile on the out-coupled light beamlet array exiting the planar optical waveguide. In this case, the convex wavefront profile may have a center of radius at a focal point to produce an image at a given focal plane.

In accordance with a third aspect of the present disclosure, a virtual image generation system comprises a planar optical waveguide comprising a plurality of substrates including a primary substrate having a first thickness, at least one secondary substrate respectively having at least one second thicknesses, and at least one semi-reflective interface respectively disposed between the substrates.

The first thickness is at least twice each of the at least one second thickness. In some embodiments, the first thickness is a non-multiple of each of the second thickness(es). In another embodiment, the secondary substrate(s) comprises a plurality of secondary substrates. In this case, the second thicknesses may be equal to each other or two or more of the secondary substrate(s) may have second thicknesses that are not equal to each other. The first thickness may be a non-multiple of at least one of the second thicknesses. At least two of the unequal second thicknesses may be non-multiples of each other.

In some embodiments, each of the semi-reflective interface(s) comprises a semi-reflective coating, which may be, e.g., respectively disposed between the substrates via one of physical vapor deposition (PVD), ion-assisted deposition (IAD), and ion beam sputtering (IBS). Each of the coatings may, e.g., be composed of one or more of a metal (Au, Al, Ag, Ni—Cr, Cr and so on), dielectric (Oxides, Fluorides and Sulfides), and semiconductors (Si, Ge). In yet another embodiment, adjacent ones of the substrates are composed of materials having different indices of refraction.

The virtual image generation system further comprises an in-coupling (IC) element configured for optically coupling a collimated light beam from an image projection assembly for propagation as an in-coupled light beam within the planar optical waveguide. The image projection assembly may comprise a scanning device configured for scanning the collimated light beam. The semi-reflective interface(s) are configured for splitting the in-coupled light beam into a plurality of primary light beamlets that propagate within the primary substrate.

The virtual image generation system further comprises one or more diffractive optical elements (DOEs) associated with the planar optical waveguide for further splitting the plurality of primary light beamlets into an array of out-coupled light beamlets (e.g., a two-dimensional out-coupled beamlet array) that exit a face of the planar optical waveguide. The collimated light beam may define an entrance pupil, and the out-coupled light beamlet array may define an exit pupil larger than the entrance pupil, e.g., at least ten times larger than the entrance pupil, or even at least one hundred times larger than the entrance pupil. In some embodiments, the first thickness of the primary substrate and the second thickness(es) of the secondary substrate(s) are selected, such that spacings between centers of at least two adjacent ones of the out-coupled light beamlets are equal to or less than a width of the collimated light beam. In another embodiment, the first thickness and the second thickness(es) are selected, such that no gap resides between edges of greater than half of adjacent ones of the out-coupled light beamlets.

In some embodiments, the semi-reflective interface(s) are configured for splitting the in-coupled light beam into at least two in-coupled light beamlets. In this case, the DOE(s) comprises an orthogonal pupil expansion (OPE) element configured for respectively splitting the at least two in-coupled light beamlets into at least two sets of orthogonal light beamlets, the semi-reflective interface(s) are further configured for splitting the at least two sets of orthogonal light beamlets into at least four sets of orthogonal light beamlets, and the DOE(s) comprises an exit pupil expansion (EPE) element configured for splitting the at least four sets of orthogonal light beamlets into the set of out-coupled light beamlets. The OPE element and EPE element may be disposed on a face of the optical planar waveguide.

The at least two in-coupled light beamlets may propagate within the planar optical waveguide via total internal reflection (TIR) along a first optical path that intersects the OPE element, such that portions of the at least two in-coupled light beamlets are diffracted as the at least two sets of orthogonal light beamlets that propagate within the planar optical waveguide via TIR along second parallel optical paths. The second parallel optical paths may be orthogonal to the first optical path. The at least two sets of orthogonal light beamlets may intersect the EPE element, such that portions of the at least two sets of orthogonal light beamlets are diffracted as the out-coupled set of light beamlets out of the face of the planar optical waveguide. In some embodiments, the EPE element may be configured for imparting a convex wavefront profile on the out-coupled light beamlet array exiting the planar optical waveguide. In this case, the convex wavefront profile may have a center of radius at a focal point to produce an image at a given focal plane.

In accordance with a fourth aspect of the present disclosure, a virtual image generation system comprises a pre-pupil expansion (PPE) element configured for receiving a collimated light beam from an imaging element and splitting the collimated light beam into a set of initial out-coupled light beamlets. The virtual image generations system further comprises a planar optical waveguide, an in-coupling (IC) element configured for optically coupling the set of initial out-coupled light beamlets into the planar optical waveguide as a set of in-coupled light beamlets, and one or more diffractive elements associated with the planar optical waveguide for splitting the set of in-coupled light beamlets into a set of final out-coupled light beamlets that exit a face of the planar optical waveguide. The diffractive element(s) may comprises an orthogonal pupil expansion (OPE) element associated with the planar optical waveguide for further splitting the set of in-coupled light beamlets into a set of orthogonal light beamlets, and an exit pupil expansion (EPE) element associated with the planar optical waveguide for splitting the set of orthogonal light beamlets into the set of final out-coupled light beamlets.

In some embodiments, the collimated light beam defines an entrance pupil, the set of initial out-coupled light beamlets define a pre-expanded pupil larger than the entrance pupil, and the set of final out-coupled light beamlets define an exit pupil larger than the pre-expanded pupil. In one example, the pre-expanded pupil is at least ten times larger than the entrance pupil, and the exit pupil is at least ten times larger than the pre-expanded pupil. In some embodiments, the set of initial out-coupled light beamlets is optically coupled into the planar optical waveguide as a two-dimensional light beamlet array, and the set of final out-coupled light beamlets exits the face of the planar optical waveguide as a two-dimensional light beamlet array. In another embodiment, the set of initial out-coupled light beamlets is optically coupled into the planar optical waveguide as a one-dimensional light beamlet array, and the set of final out-coupled set of light beamlets exits the face of the planar optical waveguide as a two-dimensional light beamlet array.

In some embodiments, the PPE element comprises a mini-planar optical waveguide, a mini-OPE element associated with the mini-planar optical waveguide for splitting the collimated light beam into a set of initial orthogonal light beamlets, and a mini-EPE element associated with the mini-planar optical waveguide for splitting the set of initial orthogonal light beamlets into the set of initial out-coupled light beamlets that exit a face of the mini-planar optical waveguide. The PPE may further comprise a mini-IC element configured for optically coupling the collimated light beam into the planar optical waveguide.

In another embodiment, the PPE element comprises a diffractive beam splitter (e.g., a 1×N beam splitter or a M×N beam splitter) configured for splitting the collimated light beam into an initial set of diverging light beamlets, and a lens (e.g., a diffractive lens) configured for re-collimating the initial set of diverging light beamlets into the set of initial out-coupled light beamlets.

In still another embodiment, the PPE element comprises a prism (e.g., a solid prism or a cavity prism) configured for splitting the collimated light beam into the set of in-coupled light beamlets. The prism may comprise a semi-reflective prism plane configured for splitting the collimated light beam into the set of in-coupled light beamlets. The prism may comprise a plurality of parallel prism planes configured for splitting the collimated light beam into the set of in-coupled light beamlets. In this case, the parallel prism planes may comprise the semi-reflective prism plane. The plurality of parallel prism planes may comprise a completely reflective prism plane, in which case, a portion of the collimated light beam may be reflected by the at least one semi-reflective prism in a first direction, and a portion of the collimated light beam may be transmitted to the completely reflective prism plane for reflection in the first direction. The prism may comprise a first set of parallel prism planes configured for splitting the collimated light beam into a set of initial orthogonal light beamlets that are reflected in a first direction, and a second set of parallel prism planes configured for splitting the initial orthogonal light beamlets into the set of in-coupled light beamlets that are reflected in a second direction different from the first direction. The first and second directional may be orthogonal to each other.

In yet another embodiment, the PPE element comprises a first planar optical waveguide assembly configured for splitting the collimated light beam into a two-dimensional array of out-coupled light beamlets (e.g., an N×N light beamlet array) that exits a face of the first planar optical waveguide assembly, and a second planar optical waveguide assembly configured for splitting the two-dimensional out-coupled light beamlet array into multiple two-dimensional arrays of out-out-coupled light beamlets that exit a face of the second planar optical waveguide assembly as the set of in-coupled light beamlets. The first and second planar optical waveguide assemblies may respectively have unequal thicknesses.

The two-dimensional out-coupled light beamlet array has an inter-beamlet spacing, and the multiple two-dimensional out-coupled light beamlet arrays are spatially offset from each other by an inter-array spacing different from the inter-beamlet spacing of the two-dimensional out-coupled light beamlet array. In some embodiments, the inter-array spacing of the multiple two-dimensional out-coupled light beamlet arrays and the inter-beamlet spacing of the two-dimensional out-coupled light beamlet array are non-multiples of each other. The inter-array spacing of the multiple two-dimensional out-coupled light beamlet arrays may be greater than the inter-beamlet spacing of the two-dimensional out-coupled light beamlet array.

In some embodiments, the first planar optical waveguide assembly comprises a first planar optical waveguide having opposing first and second faces, a first in-coupling (IC) element configured for optically coupling the collimated light beam for propagation within the first planar optical waveguide via total internal reflection (TIR) along a first optical path, a first exit pupil expander (EPE) element associated with the first planar optical waveguide for splitting the collimated light beam into a one-dimensional light beamlet array that exit the second face of the first planar optical waveguide, a second planar optical waveguide having opposing first and second faces, a second IC element configured for optically coupling the one-dimensional light beamlet array for propagation within the second planar optical waveguide via TIR along respective second optical paths that are perpendicular to the first optical path, and a second exit pupil expander (EPE) element associated with the second planar optical waveguide for splitting the one-dimensional light beamlet array into the two-dimensional light beamlet array that exit the second face of the second planar optical waveguide. In this case, the first face of the second planar optical waveguide may be affixed to the second face of the first planar optical waveguide. The first and second planar optical waveguides may respectively have substantially equal thicknesses.

The second planar optical waveguide assembly may comprise a third planar optical waveguide having opposing first and second faces, a third IC element configured for optically coupling the first two-dimensional light beamlet array for propagation within the third planar optical waveguide via TIR along respective third optical paths, a third EPE element associated with the third planar optical waveguide for splitting the two-dimensional light beamlet array into a plurality of two-dimensional light beamlet arrays that exit the second face of the third planar optical waveguide, a fourth planar optical waveguide having opposing first and second faces, a fourth IC element configured for optically coupling the plurality of two-dimensional light beamlet arrays for propagation within the fourth planar optical waveguide via TIR along respective fourth optical paths that are perpendicular to the third optical paths, and a fourth EPE element associated with the fourth planar optical waveguide for splitting the plurality of two-dimensional light beamlet arrays into the multiple two-dimensional light beamlet arrays that exit the second face of the fourth planar optical waveguide as the input set of light beamlets. In this case, the first face of the fourth planar optical waveguide may be affixed to the second face of the third planar optical waveguide, and first face of the third planar optical waveguide may be affixed to the second face of the second planar optical waveguide. The first and second planar optical waveguides may respectively have substantially equal thicknesses, and the third and fourth planar optical waveguides may respectively have substantially equal thicknesses. In this case, the substantially equal thicknesses of the first and second planar optical waveguides may be different from the substantially equal thicknesses of the third and fourth planar optical waveguides. The equal thicknesses of the third and fourth planar optical waveguides may be greater than the equal thicknesses of the first and second planar optical waveguides.

In some embodiments, a mixed reality system includes a light source configured to generate a virtual light beam. The system also includes a light guiding optical element having an entry portion, an exit portion, a first light guiding optical sub-element, and a second light guiding optical sub-element. The first light guiding optical sub-element has a first thickness, and the second light guiding optical sub-element has a second thickness different from the first thickness.

In one or more embodiments, the light source and the light guiding optical element are configured such that the virtual light beam enters the light guiding optical element through the entry portion, propagates through the light guiding optical element by substantially total internal reflection, and divides into a plurality of virtual light beamlets. At least some of the plurality of virtual light beamlets may exit the light guiding optical element through the exit portion. The light guiding optical element may be transparent to a real-world light beam.

In one or more embodiments, neither a first quotient of the first and second thicknesses nor a second quotient of the second and first thicknesses are integers. The entry portion may include an in-coupling grating on the first light guiding optical sub-element. The exit portion may include an exit pupil expander on the first light guiding optical sub-element. The second light guiding optical sub-element may not overlay the exit pupil expander on the first light guiding optical sub-element.

In one or more embodiments, the second thickness of the second light guiding optical sub-element facilitates substantially total internal reflection of light having a predetermined wavelength. The predetermined wavelength may be from 515 nm to 540 nm. The predetermined wavelength may be 520 nm or 532 nm. The predetermined wavelength may be 475 nm or 650 nm. The second thickness of the second light guiding optical sub-element may facilitate substantially total internal reflection of light beams substantially parallel to an optical axis of the system to a greater degree than light beams oblique to the optical axis.

In one or more embodiments, the second light guiding optical sub-element overlays substantially all of the first light guiding optical sub-element. The second thickness may be substantially equal to a whole number multiple of a wavelength of the virtual light beam. The second thickness may be a whole number multiple of 475 nm, 520 nm, or 650 nm.

In one or more embodiments, each of the first and second light guiding optical sub-elements includes respective substantially flat sheets, such that the light guiding optical element includes a stack of substantially flat sheets. The light guiding optical element may also have a refractive index gap between the first and second light guiding optical sub-elements. The refractive index gap may be an air layer.

In one or more embodiments, the second light guiding optical sub-element includes two reflective surfaces that reflect light in substantially the same direction. The second light guiding optical sub-element may include two reflective surfaces that reflect light in substantially opposite directions. The system may also include a third light guiding optical sub-element.

In another embodiment, a mixed reality system includes a light source configured to generate a virtual light beam. The system also includes a light guiding optical element having an entry portion, an exit portion, a first light guiding optical sub-element, and a second light guiding optical sub-element. The first light guiding optical sub-element has a first diffractive index. The second light guiding optical sub-element has a second diffractive index different from the first diffractive index.

In one or more embodiments, the light source and the light guiding optical element are configured such that the virtual light beam enters the light guiding optical element through the entry portion, propagates through the light guiding optical element by substantially total internal reflection, and divides into a plurality of virtual light beamlets. At least some of the plurality of virtual light beamlets exit the light guiding optical element through the exit portion. The light guiding optical element may be transparent to a real-world light beam.

In one or more embodiments, neither a first quotient of the first and second diffractive indices nor a second quotient of the second and first diffractive indices are integers. The entry portion may include an in-coupling grating on the first light guiding optical sub-element. The exit portion may include an exit pupil expander on the first light guiding optical sub-element. The second light guiding optical sub-element may not overlay the exit pupil expander on the first light guiding optical sub-element.

In one or more embodiments, the second diffractive index of the second light guiding optical sub-element facilitates substantially total internal reflection of light have a predetermined wavelength. The predetermined wavelength may be from 515 nm to 540 nm. The predetermined wavelength may be 520 nm or 532 nm. The predetermined wavelength may be 475 nm or 650 nm.

In one or more embodiments, the second diffractive index of the second light guiding optical sub-element facilitates substantially total internal reflection of light beams substantially parallel to an optical axis of the system to a greater degree than light beams oblique to the optical axis. The second light guiding optical sub-element may overlay substantially all of the first light guiding optical sub-element.

In one or more embodiments, each of the first and second light guiding optical sub-elements includes respective substantially flat sheets, such that the light guiding optical element includes a stack of substantially flat sheets. The light guiding optical element may also have a refractive index gap between the first and second light guiding optical sub-elements. The refractive index gap may be an air layer.

In one or more embodiments, the second light guiding optical sub-element includes two reflective surfaces that reflect light in substantially the same direction. The second light guiding optical sub-element may include two reflective surfaces that reflect light in substantially opposite directions. The system may also include a third light guiding optical sub-element.

In still another embodiment, a mixed reality system includes a light source configured to generate a virtual light beam. The system also includes a light guiding optical element having an entry portion, an orthogonal pupil expander and a plurality of exit pupil expanders. The light source and the light guiding optical element are configured such that the virtual light beam enters the light guiding optical element through the entry portion, propagates through the light guiding optical element by substantially total internal reflection, divides into a plurality of first virtual light beamlets by interacting with the orthogonal pupil expander, the plurality of first virtual light beamlets entering respective ones of the plurality of exit pupil expanders, and divides into a plurality of second virtual light beamlets by interacting with the plurality of exit pupil expanders. At least some of the plurality of second virtual light beamlets exit the light guiding optical element through the exit pupil expander.

In one or more embodiments, the light guiding optical element is transparent to a real-world light beam. Each of the plurality of exit pupil expanders may include a substantially flat sheet, such that the plurality of exit pupil expanders includes a stack of substantially flat sheets.

In one or more embodiments, the orthogonal pupil expander facilitates substantially total internal reflection of light have a predetermined wavelength. The predetermined wavelength may be from 515 nm to 540 nm. The predetermined wavelength may be 520 nm or 532 nm. The predetermined wavelength may be 475 nm or 650 nm.

In one or more embodiments, the system also includes a plurality of light blockers to selectively block light to the plurality of exit pupil expanders. The plurality of light blockers may include LC shutters or PDLC out-coupling gratings. At least one of the plurality of light blockers may be disposed adjacent an edge of the orthogonal pupil expander. At least one of the plurality of light blockers may be disposed adjacent a central portion of the orthogonal pupil expander.

In yet another embodiment, a mixed reality system includes a light source configured to generate a virtual light beam. The system also includes a light guiding optical element having an entry portion, an orthogonal pupil expander and an exit portion. The light source and the light guiding optical element are configured such that the virtual light beam enters the light guiding optical element through the entry portion, propagates through the light guiding optical element by substantially total internal reflection, and divides into a plurality of virtual light beamlets by interacting with the orthogonal pupil expander. At least some of the plurality of virtual light beamlets exit the light guiding optical element through the exit portion.

In one or more embodiments, the orthogonal pupil expander includes a first orthogonal pupil sub-expander and a second orthogonal pupil sub-expander. Each of the first and second orthogonal pupil sub-expanders divides light beams entering the respective first and second orthogonal pupil sub-expanders. Each of the first and second orthogonal pupil sub-expanders may be a respective flat sheet. The first and second orthogonal pupil sub-expanders may be stacked on top of each other.

In one or more embodiments, the first orthogonal pupil sub-expander includes a first exit edge to direct beamlets into the second orthogonal pupil sub-expander. The first exit edge may include a mirror. The first orthogonal pupil sub-expander may include a second exit edge to direct beamlets into the second orthogonal pupil sub-expander. The first and second exit edges may each include a respective mirror.

In one or more embodiments, the orthogonal pupil expander includes first and second reflective edges. The first and second reflective edges may be orthogonal to each other. The orthogonal pupil expander may also include a third reflective edge.

In one or more embodiments, the orthogonal pupil expander includes an in-coupling grating and a region of high diffraction disposed opposite of the in-coupling grating. The orthogonal pupil expander may include a first light modifier configured to absorb light in a first wavelength range. The orthogonal pupil expander may also include a second light modifier configured to absorb light in a second wavelength range. The first and second light modifiers may be orthogonal to each other.

In one or more embodiments, the orthogonal pupil expander also includes a third light modifier configured to absorb light in a third wavelength range. The orthogonal pupil expander may include diffractive optical elements forming a "V" shape. The orthogonal pupil expander may include a plurality of PDLC swatches.

In still another embodiment, a mixed reality system includes a light source configured to generate a virtual light beam. The system also includes a light guiding optical element having an entry portion, an exit portion, a first light guiding optical sub-element, and a second light guiding optical sub-element. The first light guiding optical sub-element has a first light modifying characteristic. The second light guiding optical sub-element has a second light modifying characteristic different from the first light modifying characteristic.

A virtual image generation system comprises a planar optical waveguide comprising a plurality of substrates including a primary substrate having a first thickness and at least two secondary substrates having second thicknesses, and at least two semi-reflective interfaces respectively disposed between the substrates. The first thickness may be at least twice each of the second thicknesses. The system further comprises an in-coupling (IC) element configured for optically coupling a collimated light beam for propagation as an in-coupled light beam within the planar optical waveguide. The semi-reflective interfaces are configured for splitting the in-coupled light beam into a plurality of primary light beamlets that propagate within the primary substrate. The system further comprises one or more diffractive optical elements (DOEs) associated with the planar optical waveguide for further splitting the plurality of primary light beamlets into an array of out-coupled light beamlets that exit a face of the planar optical waveguide.

A virtual image generation system comprises a pre-pupil expansion (PPE) element configured for receiving a collimated light beam from an imaging element and splitting the collimated light beam into a set of initial out-coupled light beamlets, a planar optical waveguide, an in-coupling (IC) element configured for optically coupling the set of initial out-coupled light beamlets into the planar optical waveguide as a set of in-coupled light beamlets, and one or more diffractive elements associated with the planar optical waveguide for splitting the set of in-coupled light beamlets into a set of final out-coupled light beamlets that exit a face of the planar optical waveguide.

A mixed reality system includes a light source configured to generate a virtual light beam. The system also includes a light guiding optical element having an entry portion, an exit portion, a first light guiding optical sub-element, and a second light guiding optical sub-element. The first light guiding optical sub-element has a first thickness, and the second light guiding optical sub-element has a second thickness different from the first thickness.

Additional and other objects, features, and advantages of the disclosure are described in the detail description, figures and claims.

BRIEF DESCRIPTION OF DRAWINGS

The drawings illustrate the design and utility of preferred embodiments of the present disclosure, in which similar elements are referred to by common reference numerals. In order to better appreciate how the above-recited and other advantages and objects of the present disclosure are obtained, a more particular description of the present disclosure briefly described above will be rendered by reference to specific embodiments thereof, which are illustrated in the accompanying drawings. Understanding that these drawings depict only typical embodiments of the disclosure and are not therefore to be considered limiting of its scope, the disclosure will be described and explained with additional specificity and detail through the use of the accompanying drawings in which:

FIGS. 11A, 12A, 13A, 14A, and 15A are schematic views of light beams entering an eye according to various embodiments;

FIGS. 11B, 12B, 13B, 14B, and 15B are energy distribution patterns of the light beams in corresponding FIGS. 11A, 12A, 13A, 14A, and 15A as focused by a lens onto a retina according to various embodiments;

FIG. 20 is a schematic view of light beams and beamlets propagating through a beam multiplier and into an eye according to some embodiments;

FIG. 21 is a schematic view of light beams and beamlets propagating through two beam multipliers and into an eye according to some embodiments;

FIGS. 22A-33I are schematic views of light beams and beamlets propagating through beam multipliers according to various embodiments;

DETAILED DESCRIPTION OF EMBODIMENTS

The description that follows relates to display subsystems and methods to be used in an augmented reality system. However, it is to be understood that while the disclosure lends itself well to applications in augmented reality systems, the disclosure, in its broadest aspects, may not be so limited, and may be applied to any waveguide-based imaging system. For example, the disclosure can be applied to virtual reality systems. Thus, while often described herein in terms of an augmented reality system, the teachings should not be limited to such systems of such uses.

Various embodiments of the disclosure are directed to systems, methods, and articles of manufacture for implementing optical systems in a single embodiment or in multiple embodiments. Other objects, features, and advantages of the disclosure are described in the detailed description, figures, and claims.

Various embodiments will now be described in detail with reference to the drawings, which are provided as illustrative examples of the disclosure so as to enable those skilled in the art to practice the disclosure. Notably, the figures and the examples below are not meant to limit the scope of the present disclosure. Where certain elements of the present disclosure may be partially or fully implemented using known components (or methods or processes), only those portions of such known components (or methods or processes) that are necessary for an understanding of the present disclosure will be described, and the detailed descriptions of other portions of such known components (or methods or processes) will be omitted so as not to obscure the disclosure. Further, various embodiments encompass present and future known equivalents to the components referred to herein by way of illustration.

The optical systems may be implemented independently of AR/MR systems, but many embodiments below are described in relation to AR/MR systems for illustrative purposes only.

Figure 1:
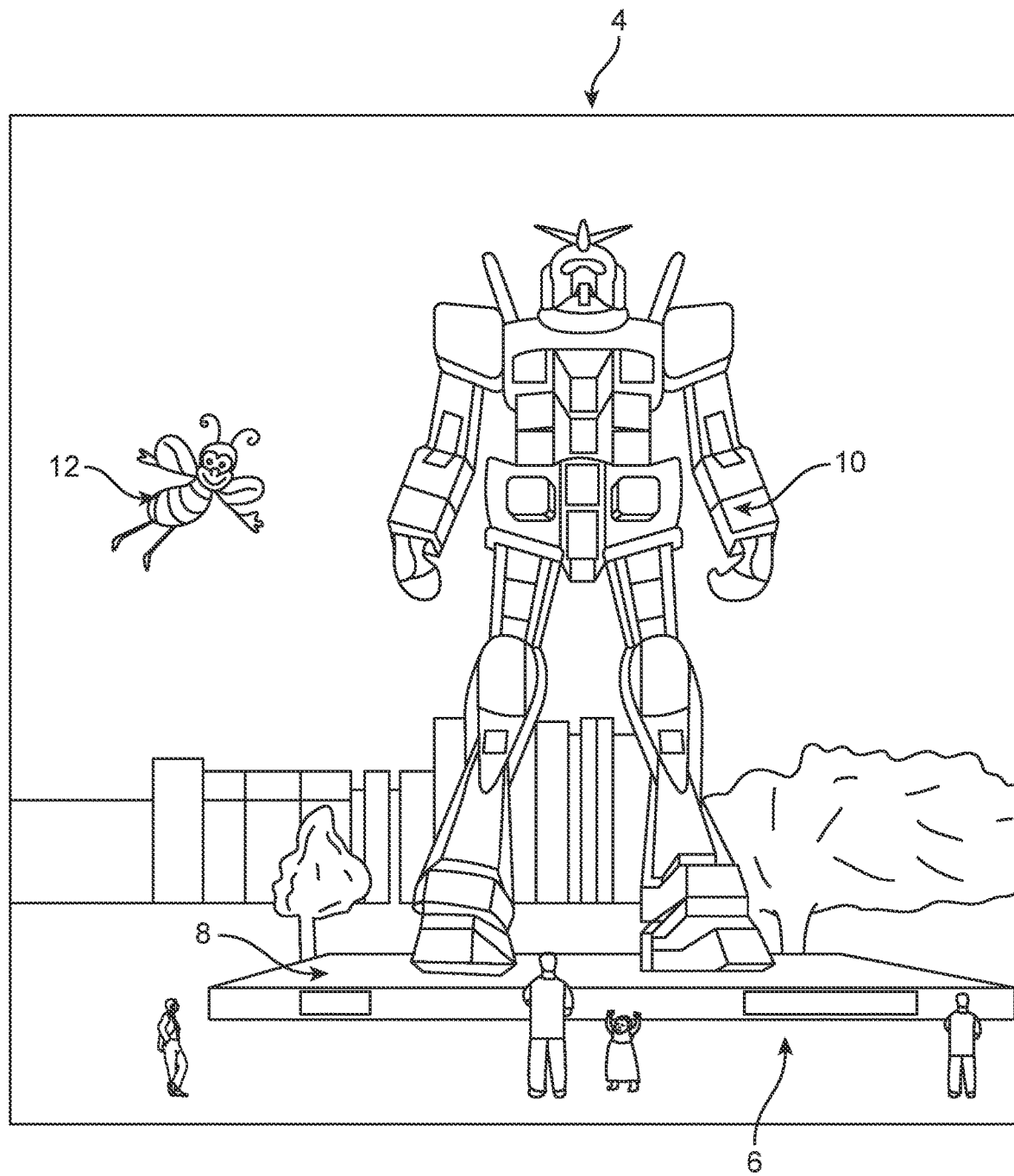
FIG. 1 is a picture of a three-dimensional augmented reality scene that can be displayed to an end user by a prior art augmented reality generation device.
Figure 2:
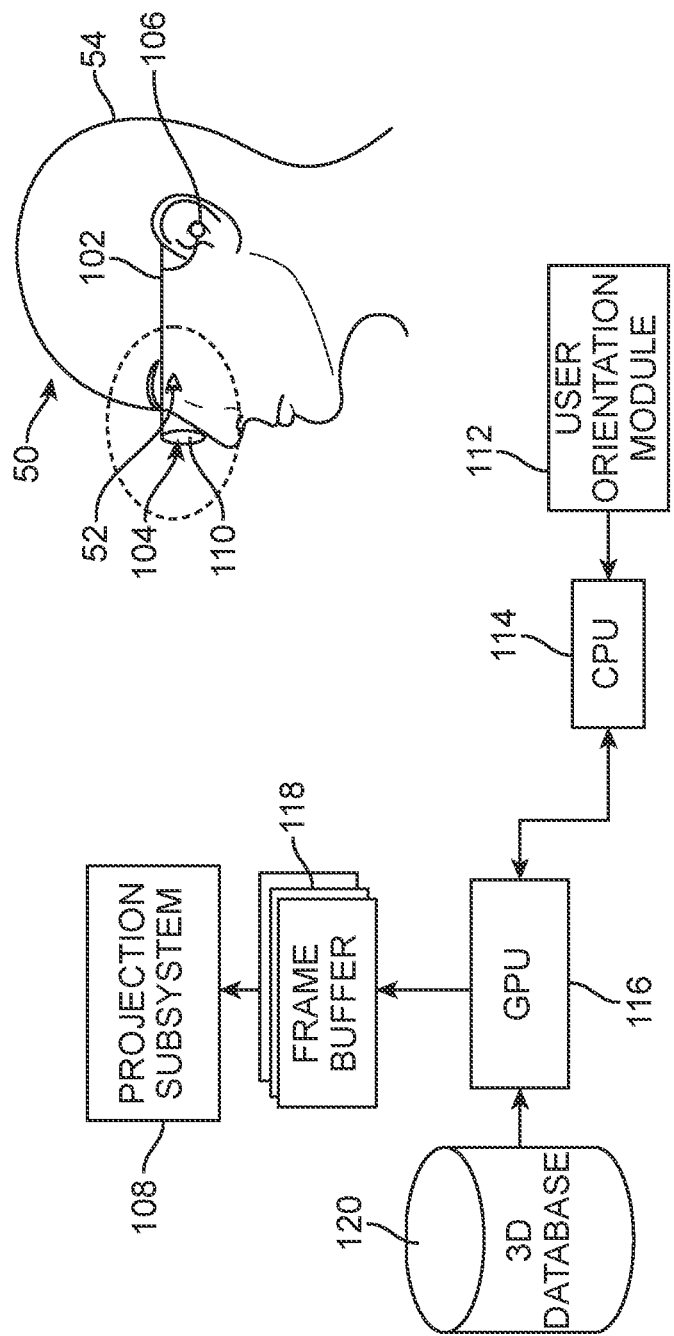
FIG. 2 is a block diagram of a virtual image generation system constructed in accordance with some embodiments of the present disclosure.

Referring to FIG. 2, some embodiments of a virtual image generation system 100 constructed in accordance with present disclosure will now be described. The virtual image generation system 100 may be operated as an augmented reality subsystem, providing images of virtual objects intermixed with physical objects in a field of view of an end user 50. There are two fundamental approaches when operating the virtual image generation system 100. A first approach employs one or more imagers (e.g., cameras) to capture images of the ambient environment. The virtual image generation system 100 inter-mixes the virtual images into the data representing the images of the ambient environment. A second approach employs one or more at least partially transparent surfaces through which the ambient environment can be seen and onto which the virtual image generation system 100 produces images of virtual objects.

The virtual image generation system 100, and the various techniques taught herein, may be employed in applications other than augmented reality and virtual reality subsystems. For example, various techniques may be applied to any projection or display subsystem, or may be applied to pico projectors where movement may be made by an end user's hand rather than the head. Thus, while often described herein in terms of an augmented reality subsystem or virtual reality subsystem, the teachings should not be limited to such subsystems of such uses.

At least for augmented reality applications, it may be desirable to spatially position various virtual objects relative to respective physical objects in a field of view of the end user 50. Virtual objects, also referred to herein as virtual tags or tag or call outs, may take any of a large variety of forms, basically any variety of data, information, concept, or logical construct capable of being represented as an image. Non-limiting examples of virtual objects may include: a virtual text object, a virtual numeric object, a virtual alphanumeric object, a virtual tag object, a virtual field object, a virtual chart object, a virtual map object, a virtual instrumentation object, or a virtual visual representation of a physical object.

The virtual image generation system 100 comprises a frame structure 102 worn by an end user 50, a display subsystem 104 carried by the frame structure 102, such that the display subsystem 104 is positioned in front of the eyes 52 of the end user 50, and a speaker 106 carried by the frame structure 102, such that the speaker 106 is positioned adjacent the ear canal of the end user 50 (optionally, another speaker (not shown) is positioned adjacent the other ear canal of the end user 50 to provide for stereo/shapeable sound control). The display subsystem 104 is designed to present the eyes 52 of the end user 50 with photo-based radiation patterns that can be comfortably perceived as augmentations to physical reality, with high-levels of image quality and three-dimensional perception, as well as being capable of presenting two-dimensional content. The display subsystem 104 presents a sequence of frames at high frequency that provides the perception of a single coherent scene.

In the illustrated embodiment, the display subsystem 104 employs "optical see-through" display through which the user can directly view light from real objects via transparent (or semi-transparent) elements. The transparent element, often referred to as a "combiner," superimposes light from the display over the user's view of the real world. To this end, the display subsystem 104 comprises a projection subsystem 108 and a partially transparent display screen 110 on which the projection subsystem 108 projects images. The display screen 110 is positioned in the end user's 50 field of view between the eyes 52 of the end user 50 and an ambient environment, such that direct light from the ambient environment is transmitted through the display screen 110 to the eyes 52 of the end user 50.

In the illustrated embodiment, the image projection assembly 108 provides a scanned light to the partially transparent display screen 110, thereby combining with the direct light from the ambient environment, and being transmitted from the display screen 110 to the eyes 52 of the user 50. In the illustrated embodiment, the projection subsystem 108 takes the form of an optical fiber scan-based projection device, and the display screen 110 takes the form of a waveguide-based display into which the scanned light from the projection subsystem 108 is injected to produce, e.g., images at a single optical viewing distance closer than infinity (e.g., arm's length), images at multiple, discrete optical viewing distances or focal planes, and/or image layers stacked at multiple viewing distances or focal planes to represent volumetric 3D objects. These layers in the light field may be stacked closely enough together to appear continuous to the human visual subsystem (i.e., one layer is within the cone of confusion of an adjacent layer). Additionally or alternatively, picture elements may be blended across two or more layers to increase perceived continuity of transition between layers in the light field, even if those layers are more sparsely stacked (i.e., one layer is outside the cone of confusion of an adjacent layer). The display subsystem 104 may be monocular or binocular.

The virtual image generation system 100 further comprises one or more sensors (not shown) mounted to the frame structure 102 for detecting the position and movement of the head 54 of the end user 50 and/or the eye position and inter-ocular distance of the end user 50. Such sensor(s) may include image capture devices (such as cameras), microphones, inertial measurement units, accelerometers, compasses, GPS units, radio devices, and/or gyros).

The virtual image generation system 100 further comprises a user orientation detection module 112. The user orientation module 112 detects the instantaneous position of the head 54 of the end user 50 and may predict the position of the head 54 of the end user 50 based on position data received from the sensor(s). Detecting the instantaneous position of the head 54 of the end user 50 facilitates determination of the specific actual object that the end user 50 is looking at, thereby providing an indication of the specific textual message to be generated for that actual object and further providing an indication of the textual region in which the textual message is to be streamed. The user orientation module 112 also tracks the eyes 52 of the end user 50 based on the tracking data received from the sensor(s).

The virtual image generation system 100 further comprises a control subsystem that may take any of a large variety of forms. The control subsystem includes a number of controllers, for instance one or more microcontrollers, microprocessors or central processing units (CPUs), digital signal processors, graphics processing units (GPUs), other integrated circuit controllers, such as application specific integrated circuits (ASICs), programmable gate arrays (PGAs), for instance field PGAs (FPGAs), and/or programmable logic controllers (PLUs).

The control subsystem of virtual image generation system 100 comprises a central processing unit (CPU) 114, a graphics processing unit (GPU) 116, one or more frame buffers 118, and three-dimensional data base 120 for storing three-dimensional scene data. The CPU 114 controls overall operation, while the GPU 116 renders frames (i.e., translating a three-dimensional scene into a two-dimensional image) from the three-dimensional data stored in the three-dimensional data base 120 and stores these frames in the frame buffer(s) 116. While not illustrated, one or more additional integrated circuits may control the reading into and/or reading out of frames from the frame buffer(s) 116 and operation of the image projection assembly 108 of the display subsystem 104.

Figure 3A:
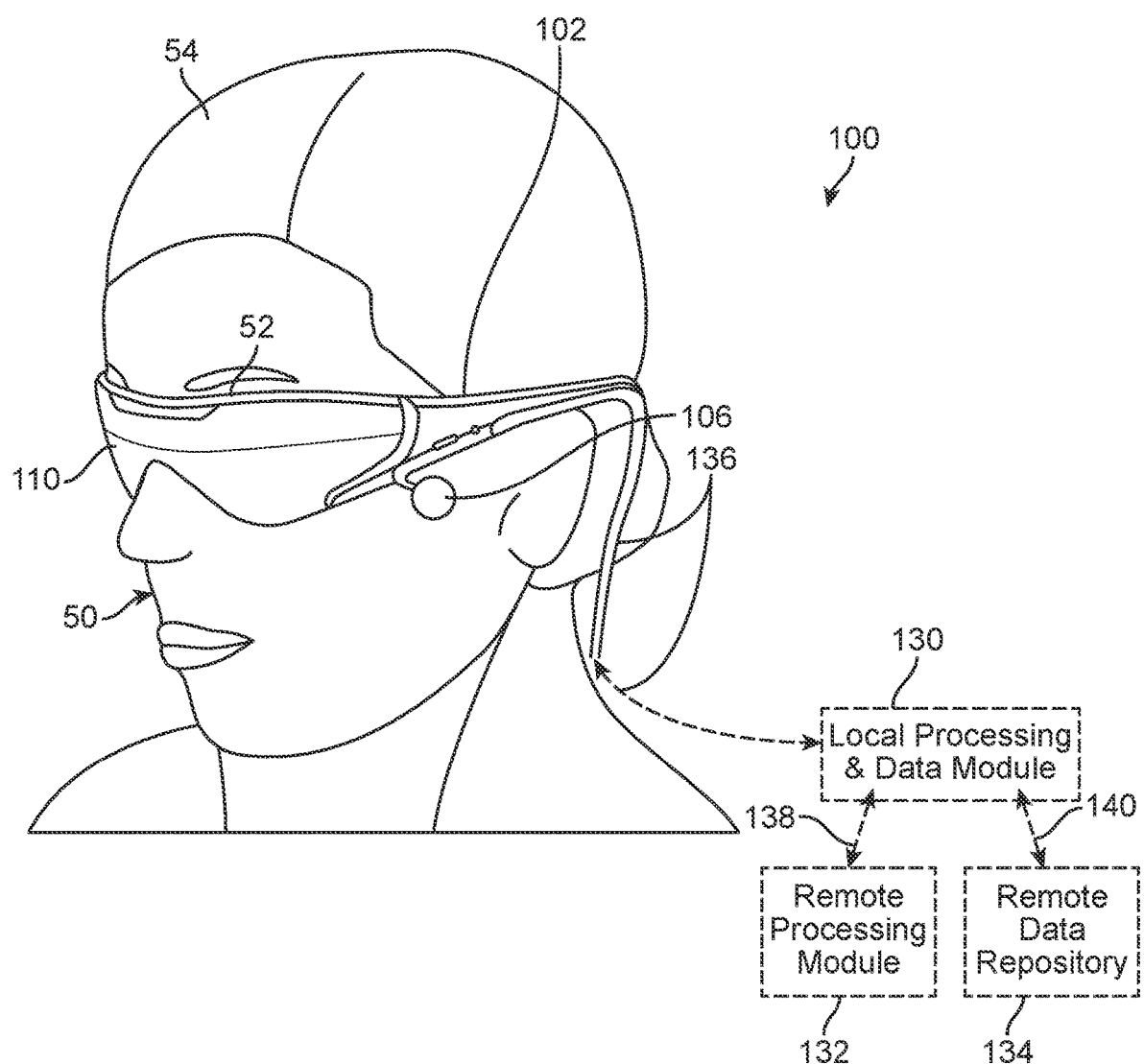
FIG. 3A is a plan view of one technique that can be used to wear the virtual image generation system of FIG. 2.
Figure 3B:
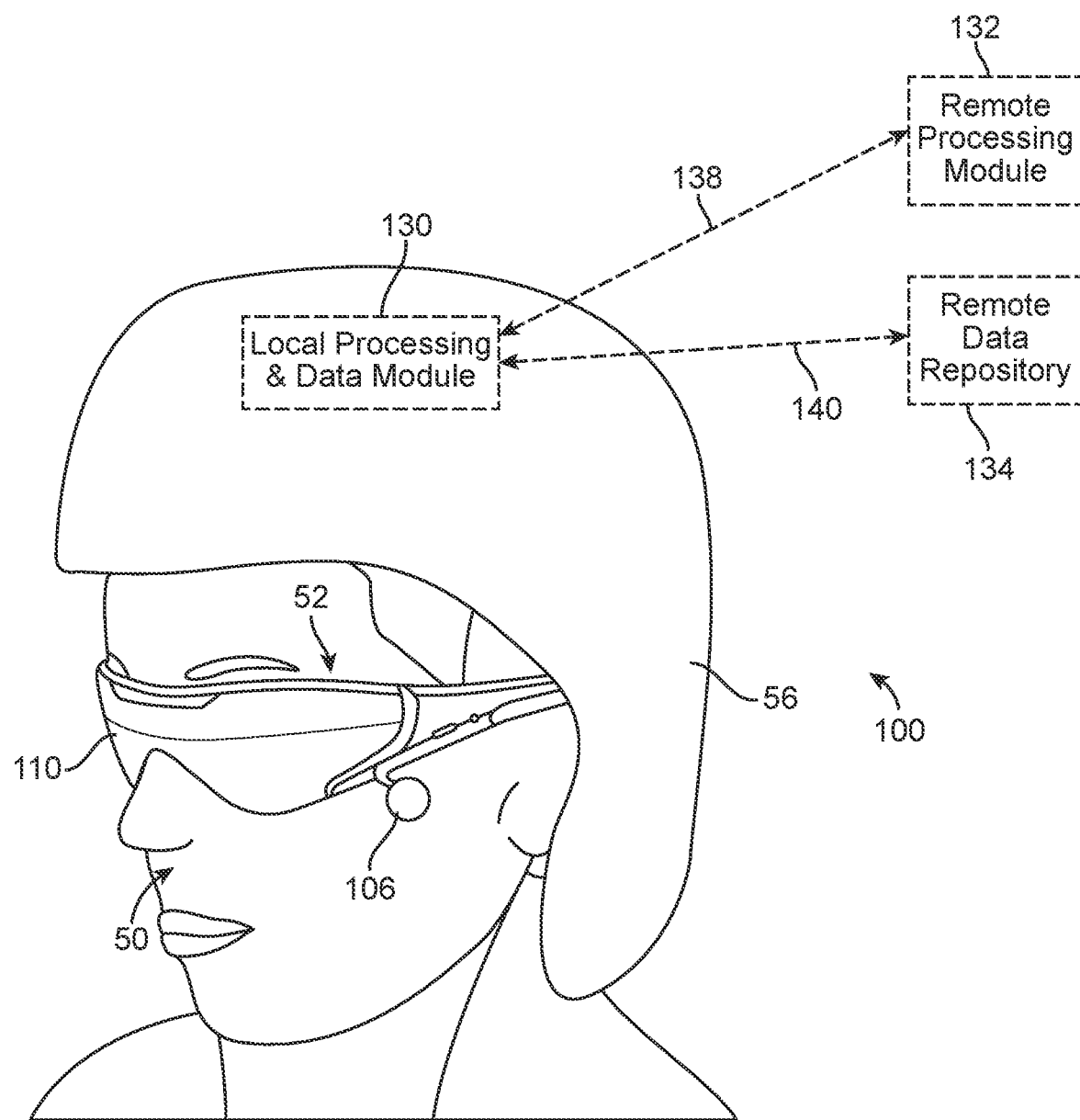
FIG. 3B is a plan view of another technique that can be used to wear the virtual image generation system of FIG. 2.
Figure 3C:
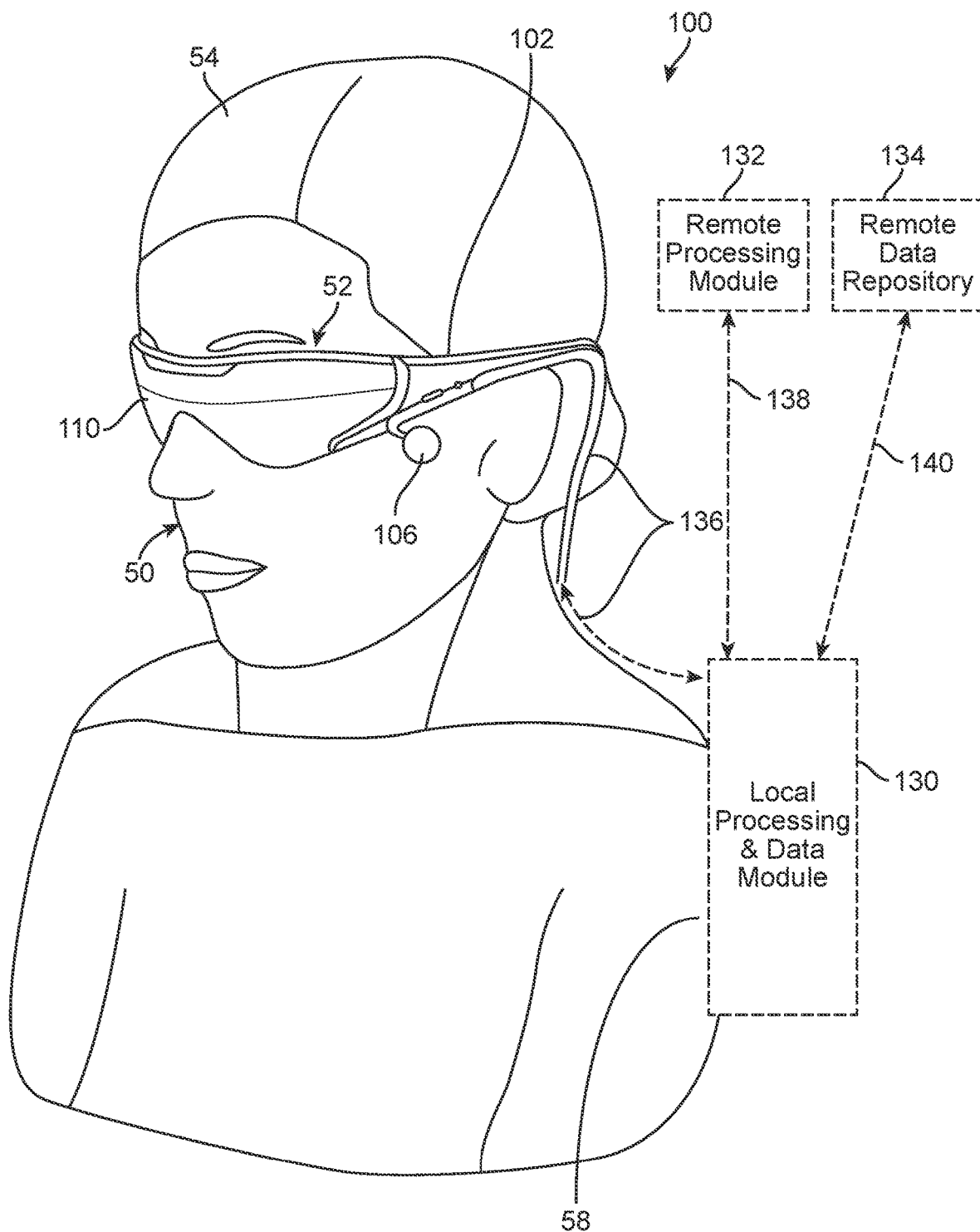
FIG. 3C is a plan view of still another one technique that can be used to wear the virtual image generation system of FIG. 2.
Figure 3D:
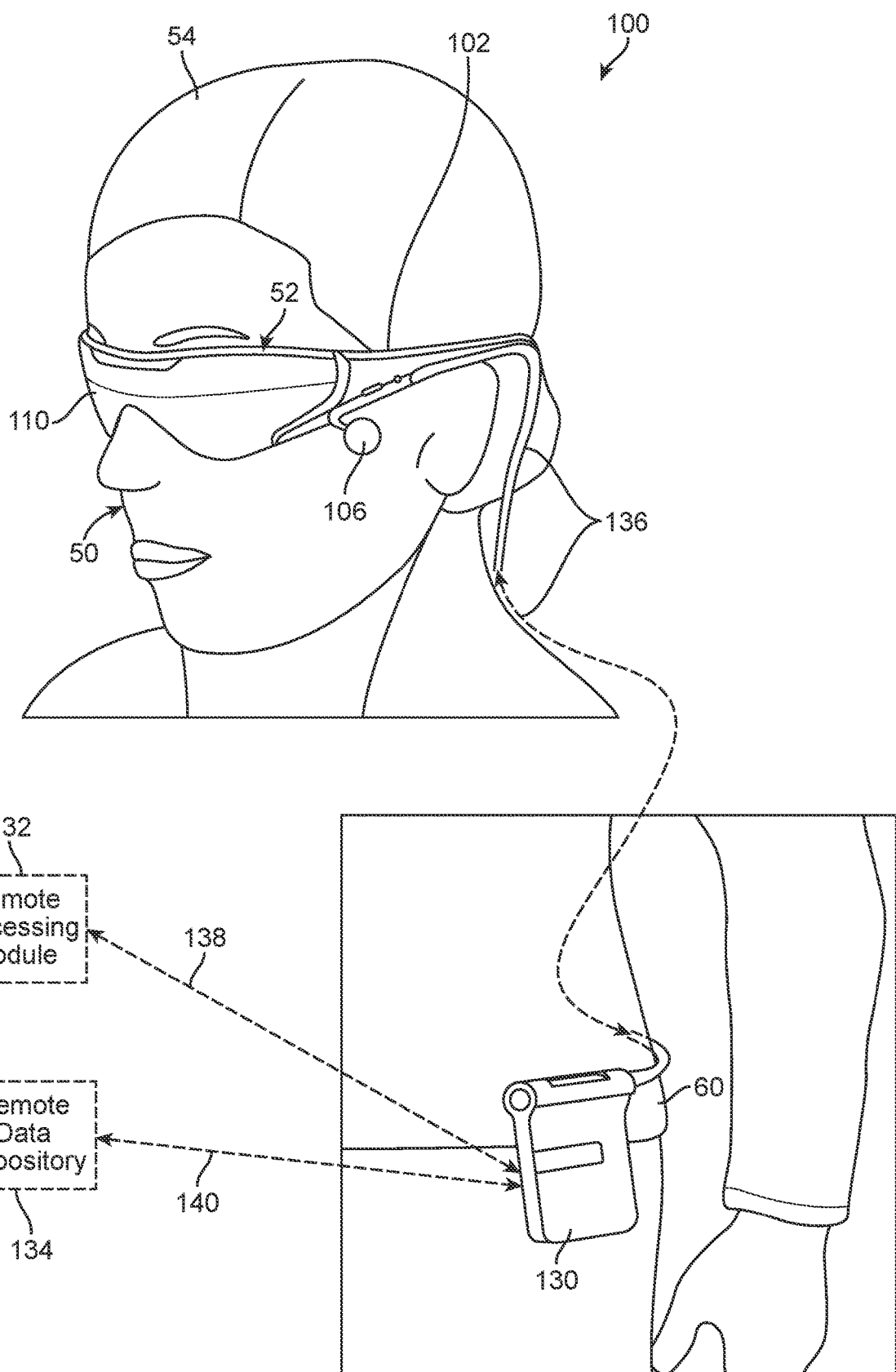
FIG. 3D is a plan view of yet another one technique that can be used to wear the virtual image generation system of FIG. 2.

The various processing components of the virtual image generation system 100 may be physically contained in a distributed subsystem. For example, as illustrated in FIGS. 3A-3D, the virtual image generation system 100 comprises a local processing and data module 130 operatively coupled, such as by a wired lead or wireless connectivity 136, to the display subsystem 104 and sensors. The local processing and data module 130 may be mounted in a variety of configurations, such as fixedly attached to the frame structure 102 (FIG. 3A), fixedly attached to a helmet or hat 56 (FIG. 3B), embedded in headphones, removably attached to the torso 58 of the end user 50 (FIG. 3C), or removably attached to the hip 60 of the end user 50 in a belt-coupling style configuration (FIG. 3D). The virtual image generation system 100 further comprises a remote processing module 132 and remote data repository 134 operatively coupled, such as by a wired lead or wireless connectivity 138, 140, to the local processing and data module 130, such that these remote modules 132, 134 are operatively coupled to each other and available as resources to the local processing and data module 130.

The local processing and data module 130 may comprise a power-efficient processor or controller, as well as digital memory, such as flash memory, both of which may be utilized to assist in the processing, caching, and storage of data captured from the sensors and/or acquired and/or processed using the remote processing module 132 and/or remote data repository 134, possibly for passage to the display subsystem 104 after such processing or retrieval. The remote processing module 132 may comprise one or more relatively powerful processors or controllers configured to analyze and process data and/or image information. The remote data repository 134 may comprise a relatively large-scale digital data storage facility, which may be available through the internet or other networking configuration in a "cloud" resource configuration. In some embodiments, all data is stored and all computation is performed in the local processing and data module 130, allowing fully autonomous use from any remote modules.

The couplings 136, 138, 140 between the various components described above may include one or more wired interfaces or ports for providing wires or optical communications, or one or more wireless interfaces or ports, such as via RF, microwave, and IR for providing wireless communications. In some implementations, all communications may be wired, while in other implementations all communications may be wireless. In still further implementations, the choice of wired and wireless communications may be different from that illustrated in FIGS. 3A-3D. Thus, the particular choice of wired or wireless communications should not be considered limiting.

In the illustrated embodiment, the user orientation module 112 is contained in the local processing and data module 130, while CPU 114 and GPU 116 are contained in the remote processing module 132, although in alternative embodiments, the CPU 114, GPU 124, or portions thereof may be contained in the local processing and data module 130. The 3D database 120 can be associated with the remote data repository 134.

Before describing the details of embodiments of the light guiding optical elements, this disclosure will now provide a brief description of illustrative MR systems.

One possible approach to implementing an MR system uses a plurality of volume phase holograms, surface-relief holograms, or light guiding optical elements that are embedded with depth plane information to generate images that appear to originate from respective depth planes. In other words, a diffraction pattern, or diffractive optical element ("DOE") may be embedded within or imprinted/embossed upon a light guiding optical element ("LOE"; e.g., a planar waveguide) such that as collimated light (light beams with substantially planar wavefronts) is substantially totally internally reflected along the LOE, it intersects the diffraction pattern at multiple locations and exits toward the user's eye. The DOEs are configured so that light exiting therethrough from an LOE are verged so that they appear to originate from a particular depth plane. The collimated light may be generated using an optical condensing lens (a "condenser").

For example, a first LOE may be configured to deliver collimated light to the eye that appears to originate from the optical infinity depth plane (0 diopters). Another LOE may be configured to deliver collimated light that appears to originate from a distance of 2 meters (½ diopter). Yet another LOE may be configured to deliver collimated light that appears to originate from a distance of 1 meter (1 diopter). By using a stacked LOE assembly, it can be appreciated that multiple depth planes may be created, with each LOE configured to display images that appear to originate from a particular depth plane. It should be appreciated that the stack may include any number of LOEs. However, at least N stacked LOEs are required to generate N depth planes. Further, N, 2N or 3N stacked LOEs may be used to generate RGB colored images at N depth planes.

In order to present 3-D virtual content to the user, the mixed reality (MR) system projects images of the virtual content into the user's eye so that they appear to originate from various depth planes in the Z direction (i.e., orthogonally away from the user's eye). In other words, the virtual content may not only change in the X and Y directions (i.e., in a 2D plane orthogonal to a central visual axis of the user's eye), but it may also appear to change in the Z direction such that the user may perceive an object to be very close or at an infinite distance or any distance in between. In other embodiments, the user may perceive multiple objects simultaneously at different depth planes. For example, the user may see a virtual dragon appear from infinity and run towards the user. Alternatively, the user may simultaneously see a virtual bird at a distance of 3 meters away from the user and a virtual coffee cup at arm's length (about 1 meter) from the user.

Figure 9:
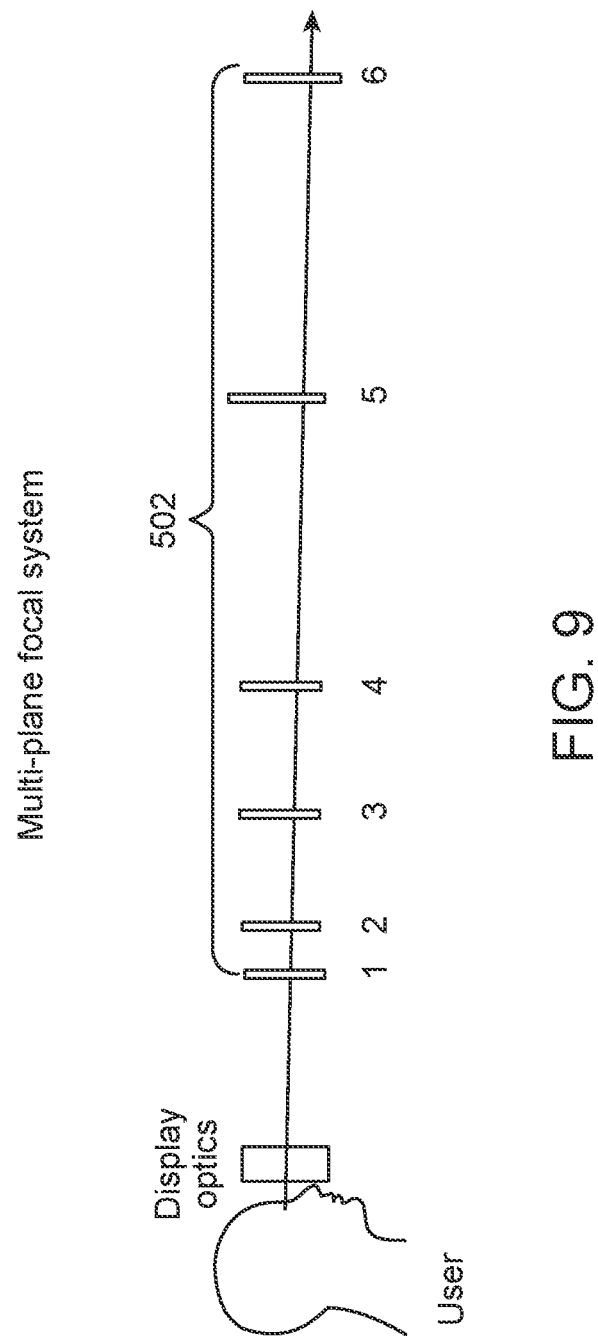
FIG. 9 is a diagram depicting the focal planes of an mixed reality system.

Multiple-plane focus systems create a perception of variable depth by projecting images on some or all of a plurality of depth planes located at respective fixed distances in the Z direction from the user's eye. Referring now to FIG. 9, it should be appreciated that multiple-plane focus systems may display frames at fixed depth planes 502 (e.g., the six depth planes 502 shown in FIG. 9). Although MR systems can include any number of depth planes 502, one exemplary multiple-plane focus system has six fixed depth planes 502 in the Z direction. In generating virtual content one or more of the six depth planes 502, 3-D perception is created such that the user perceives one or more virtual objects at varying distances from the user's eye. Given that the human eye is more sensitive to objects that are closer in distance than objects that appear to be far away, more depth planes 502 are generated closer to the eye, as shown in FIG. 9. In other embodiments, the depth planes 502 may be placed at equal distances away from each other.

Depth plane positions 502 may be measured in diopters, which is a unit of optical power equal to the inverse of the focal length measured in meters. For example, in some embodiments, depth plane 1 may be ⅓ diopters away, depth plane 2 may be 0.3 diopters away, depth plane 3 may be 0.2 diopters away, depth plane 4 may be 0.15 diopters away, depth plane 5 may be 0.1 diopters away, and depth plane 6 may represent infinity (i.e., 0 diopters away). It should be appreciated that other embodiments may generate depth planes 502 at other distances/diopters. Thus, in generating virtual content at strategically placed depth planes 502, the user is able to perceive virtual objects in three dimensions. For example, the user may perceive a first virtual object as being close to him when displayed in depth plane 1, while another virtual object appears at infinity at depth plane 6. Alternatively, the virtual object may first be displayed at depth plane 6, then depth plane 5, and so on until the virtual object appears very close to the user. It should be appreciated that the above examples are significantly simplified for illustrative purposes. In another embodiment, all six depth planes may be concentrated on a particular focal distance away from the user. For example, if the virtual content to be displayed is a coffee cup half a meter away from the user, all six depth planes could be generated at various cross-sections of the coffee cup, giving the user a highly granulated 3-D view of the coffee cup.

In some embodiments, the AR system may work as a multiple-plane focus system. In other words, all six LOEs may be illuminated simultaneously, such that images appearing to originate from six fixed depth planes are generated in rapid succession with the light sources rapidly conveying image information to LOE 1, then LOE 2, then LOE 3 and so on. For example, a portion of the desired image, comprising an image of the sky at optical infinity may be injected at time 1 and the LOE 1090 retaining collimation of light (e.g., depth plane 6 from FIG. 9) may be utilized. Then an image of a closer tree branch may be injected at time 2 and an LOE 1090 configured to create an image appearing to originate from a depth plane 10 meters away (e.g., depth plane 5 from FIG. 9) may be utilized; then an image of a pen may be injected at time 3 and an LOE 1090 configured to create an image appearing to originate from a depth plane 1 meter away may be utilized. This type of paradigm can be repeated in rapid time sequential (e.g., at 360 Hz) fashion such that the user's eye and brain (e.g., visual cortex) perceives the input to be all part of the same image.

AR systems are required to project images (i.e., by diverging or converging light beams) that appear to originate from various locations along the Z axis (i.e., depth planes) to generate images for a 3-D experience/scenario. As used in this application, light beams include, but are not limited to, directional projections of light energy (including visible and invisible light energy) radiating from a light source. Generating images that appear to originate from various depth planes conforms the vergence and accommodation of the user's eye for that image, and minimizes or eliminates vergence-accommodation conflict.

Figure 4:
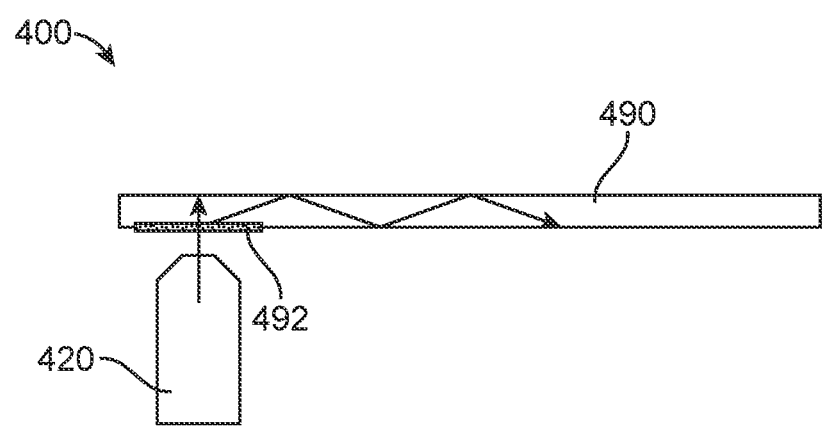
FIGS. 4, 7, and 8 are detailed schematic views of various mixed reality systems.

FIG. 4 depicts a basic optical system 400 for projecting images at a single depth plane. The system 400 includes a light source 420 and an LOE 490 having a diffractive optical element (not shown) and an in-coupling grating 492 (ICG) associated therewith. The diffractive optical elements may be of any type, including volumetric or surface relief. In some embodiments, the ICG 492 is a reflection-mode aluminized portion of the LOE 490. In another embodiment, the ICG 492 is a transmissive diffractive portion of the LOE 490. When the system 400 is in use, the light beam from the light source 420 enters the LOE 490 via the ICG 492 and propagates along the LOE 490 by substantially total internal reflection ("TIR") for display to an eye of a user. It is understood that although only one beam is illustrated in FIG. 4, a multitude of beams may enter LOE 490 from a wide range of angles through the same ICG 492. A light beam "entering" or being "admitted" into an LOE includes, but is not limited to, the light beam interacting with the LOE so as to propagate along the LOE by substantially TIR. The system 400 depicted in FIG. 4 can include various light sources 420 (e.g., LEDs, OLEDs, lasers, and masked broad-area/broad-band emitters). In other embodiments, light from the light source 420 may be delivered to the LOE 490 via fiber optic cables (not shown).

Figure 5:
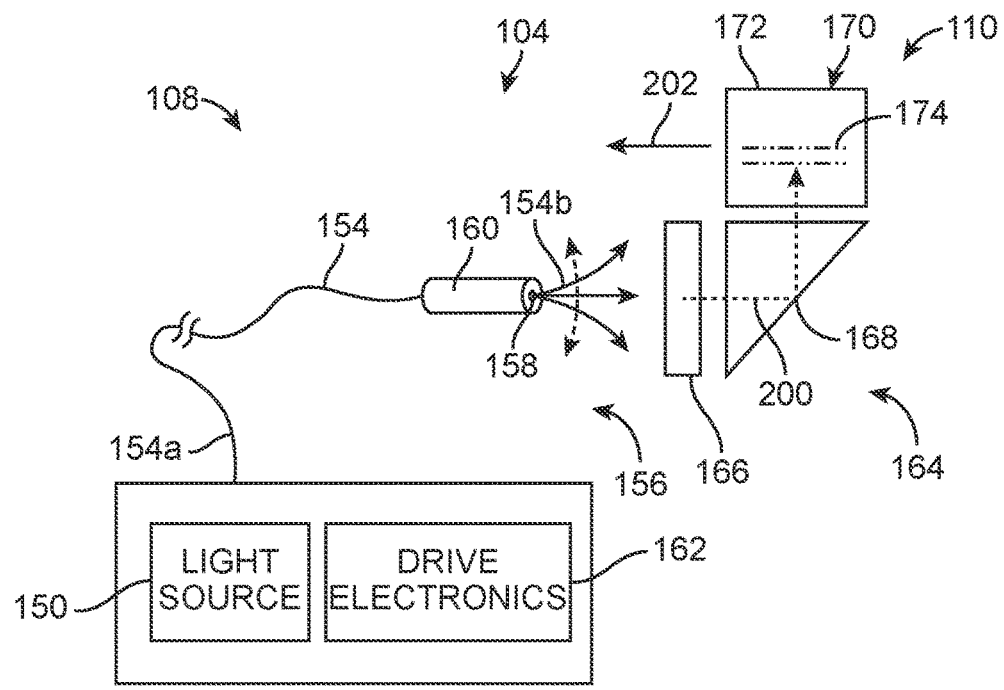
FIG. 5 is a plan view of some embodiments of a display subsystem used in the virtual image generation system of FIG. 2.

Referring now to FIG. 5, the image projection assembly 108 includes one or more light sources 150 that produces the light (e.g., emits light of different colors in defined patterns). The light source(s) 150 may take any of a large variety of forms, for instance, a set of RGB lasers (e.g., laser diodes capable of outputting red, green, and blue light) operable to respectively produce red, green, and blue coherent collimated light according to defined pixel patterns specified in respective frames of pixel information or data. Laser light provides high color saturation and is highly energy efficient.

The image projection assembly 108 further comprises a scanning device 152 that scans the light in a predetermined scan pattern in response to control signals. The scanning device 152 comprises one or more optical fibers 154 (e.g., single mode optical fiber), each of which has a proximal end 154a into which light is received from the light source(s) 150 and a distal end 154b from which light is provided to the display screen 110. The scanning device 152 further comprises a mechanical drive assembly 156 to which the optical fiber(s) 154 is mounted. The drive assembly 156 is configured for displacing the distal end 154b of each optical fiber 154 about a fulcrum 158 in accordance with a scan pattern.

To this end, the drive assembly 156 comprises a piezoelectric element 160 to which the optical fiber(s) 154 is mounted, and drive electronics 162 configured for conveying electrical signals to the piezoelectric element 160, thereby causing the distal end 154b of the optical fiber 154 to vibrate in accordance with the scan pattern. Thus, operation of the light source(s) 150 and drive electronics 162 are coordinated in a manner that generates image data that is encoded in the form of light that is spatially and/or temporally varying. Descriptions of optical fiber scanning techniques are provided in U.S. Patent No. 2015/0309264, which is expressly incorporated herein by reference.

The image projection assembly 108 further comprises an optical coupling assembly 164 that couples the light from the scanning device 152 into the display screen 110. The optical coupling assembly 164 comprises a collimation element 166 that collimates the light emitted by the scanning device 152 into a collimated light beam 250. Although the collimation element 166 is illustrated in FIG. 5 as being physically separated from the optical fiber(s) 154, a collimation element may be physically mounted to the distal end 154b of each optical fiber 154 in a "micro-lens" arrangement, as described in U.S. patent application Ser. No. 15/286,215, entitled "Microlens Collimator for Scanning Optical Fiber in Virtual/Augmented Reality System," which is expressly incorporated herein by reference. The optical coupling subsystem 164 further comprises an in-coupling (IC) element 168, for instance, one or more reflective surfaces, diffraction gratings, mirrors, dichroic mirrors, or prisms to optically couple light into the end of the display screen 110 at an angle that ensures that the light propagates within the display screen 110 in a desired direction, as will be described in further detail below.

As will be described in further detail below, the optical coupling subsystem 164 optically couples the collimated light beam 250 into the display screen 110, which will expand the pupil size of the collimated light beam 250 to be commensurate with the entrance pupil size of the end user 50. In the embodiments described below, the display screen 110 employs a technique known as "beam multiplication," which refers to methods of exit pupil expansion that are specifically designed to expand a small diameter entrance pupil of each collimated light beam 250 from the image projection assembly 108 (e.g., on the order of 50 microns to 1 mm) by multiplying the respective light beam 250 into multiple light beamlets, resulting in a light beamlet array exit pupil that effectively matches the entrance pupil of the user's eye or eyes (e.g., on the order of 5 mm-7 mm) for a fixed eye relief. Notably, although the "beam multiplication" techniques are described herein as being performed in the display screen 110, it should be appreciated that such "beam multiplication" techniques can be applied anywhere in the image generation system 100, including any similar substrate system/subsystem upstream from the display screen 110.

The extent to which the beam of collimated light 250 needs to be multiplied to achieve a given fill factor will depend upon the original pupil size of the collimated light beam 250. For example, if the original pupil size of the collimated light beam output by the image projection assembly 108 is 500 microns, such pupil size may need to be multiplied ten times to achieve desired fill factor, whereas if the original pupil size of the collimated light beam 250 output by the image projection assembly 108 is 50 microns, such pupil may need to be multiplied one hundred times to achieve a desired fill factor.

Preferably, the light beamlet array exit pupil of the display screen is completely in-filled or saturated with light beamlets to maximize the wavefront density and minimize the depth of field. If the in-fill of the light beamlets in the exit pupil is too sparse, the wavefront density and depth of field of the display screen will be compromised, and if the diameter of the light beamlets is too small, the angular resolution of the display screen will be compromised.

Theoretically, the thickness of display screen 110 can be reduced to increase the number of light beamlets created from a single collimated light beam 250 input into the display screen 110, thereby increasing the in-fill of the exit pupil with the light beamlets. However, due to durability and manufacturing limitations, a display screen 110 can only be made so thin, thereby limiting the in-fill of the exit pupil. Also, although the entrance pupil of the collimated light beam 250 transmitted from the image projection assembly 108 into the display screen 110 can theoretically be increased in order to increase the in-fill of the exit pupil with the light beamlets, this would require a commensurate increase in the size of the image projection assembly 108, thereby affecting the wearability of the VR/AR system in a negative manner. Significantly, the embodiments described below increase the in-fill of the exit pupil without requiring an increase in the size of the image projection assembly 108.

To this end, the display screen 110 serves as a pupil expander (PE) that expands the effective entrance pupil of the collimated light beam 250 (carrying the image information) for display to the eye 52 (monocular) or eyes 52 (binocular) of the end user 50. The display screen 110 takes the form of a waveguide apparatus 170 that includes a planar optical waveguide 172 and one or more diffractive optical elements (DOEs) 174 associated with the planar optical waveguide 172 for two-dimensionally expanding the effective entrance pupil of the collimated light beam 250 optically coupled into the planar optical waveguide 172. In alternative embodiments, the waveguide apparatus 170 may comprise multiple planar optical waveguides 172 and DOEs 174 respectively associated with the planar optical waveguides 172.

Figure 6:
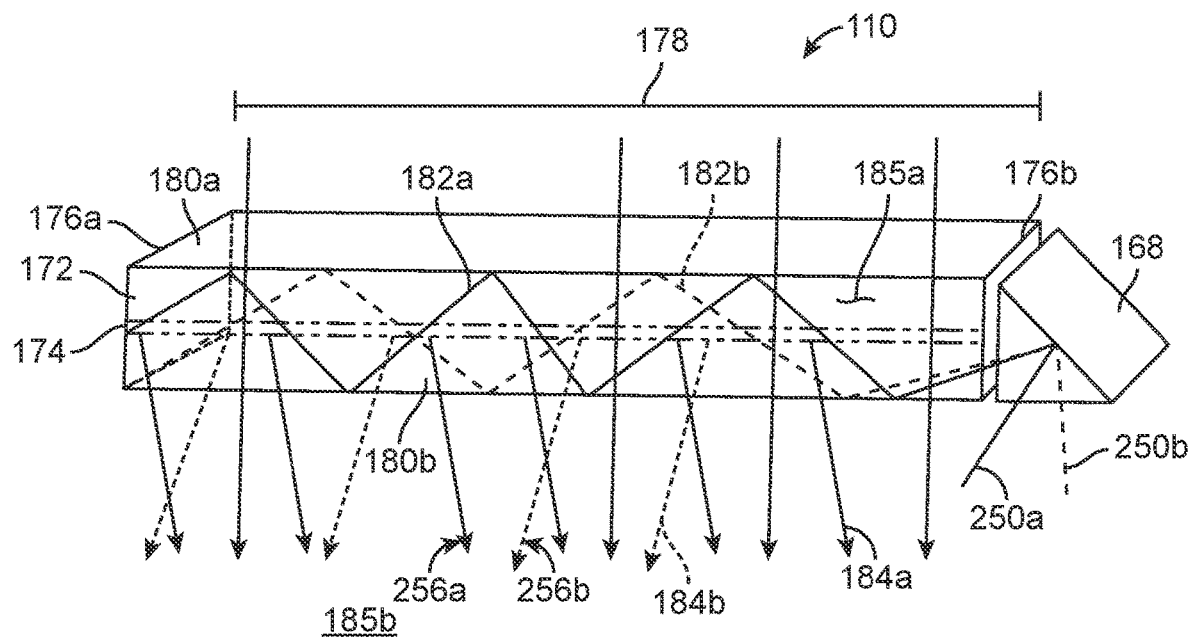
FIG. 6 is a conceptual view of some embodiments of a primary waveguide apparatus used in the display subsystem of FIG. 5.

As best illustrated in FIG. 6, the planar optical waveguide 172 has a first end 176a and a second end 176b, the second end 176b opposed to the first end 176a along a length 178 of the planar optical waveguide 172. The planar optical waveguide 172 has a first face 180a and a second face 180b, at least the first and the second faces 180a, 180b (collectively 180) forming at least one partially internally reflective optical path (illustrated by solid line arrow 182a and broken line arrow 182b, collectively 182) along at least a portion of the length 178 of the planar optical waveguide 172. The planar optical waveguide 172 may take a variety of forms that provide for substantially total internal reflection (TIR) for light striking the faces 180 at less than a defined critical angle.

The DOE(s) 174 (illustrated in FIGS. 5 and 6 by dash-dot double lines) may take a large variety of forms which interrupt the TIR optical path 182, providing a plurality of optical paths (illustrated by solid line arrows 184a and broken line arrows 184b, collectively 184) between an interior 185a and an exterior 185b of the planar optical waveguide 172 extending along at least a portion of the length 178 of the planar optical waveguide 172. As will be described in further detail below, the light propagates within the planar optical waveguide 172 along an internally reflective optical path and intersects with the DOE(s) 174 at various positions to split the light into light beamlets that are either diffracted along a different internally reflective optical path or diffracted out of the face 180b of the planar optical waveguide 172.

In the illustrated embodiment, the DOE(s) 174 comprise one or more diffraction gratings, each of which can be characterized as an optical component with a periodic structure on the order of the light wavelength that splits and diffracts light into several beams travelling in different directions. The diffraction gratings can be composed of, e.g., surface nano-ridges, nano-patterns, slits, etc. that may be photolithographically printed on a substrate. The DOE(s) 174 may allow positioning of apparent objects and focus plane for apparent objects. Such may be achieved on a frame-by-frame, subframe-by-subframe, or even pixel-by-pixel basis.

As illustrated in FIG. 6, the light propagates along the planar optical waveguide 172 with at least some reflections or "bounces" resulting from the TIR propagation. It is noted that some implementations may employ one or more reflectors in the internal optical path, for instance thin-films, dielectric coatings, metalized coatings, etc., which may facilitate reflection. Light propagates along the length 178 of the planar optical waveguide 172, and intersects with the DOE(s) 174 at various positions along the length 178. The DOE(s) 174 may be incorporated within the planar optical waveguide 172 or abutting or adjacent one or more of the faces 180 of the planar optical waveguide 172. The DOE(s) 174 accomplishes at least two functions. The DOE(s) 174 shifts an angle of the light, causing a portion of the light to escape TIR, and emerge from the interior 185a to the exterior 185b via a face 180 of the planar optical waveguide 172. The DOE(s) 174 focuses the out-coupled light at a viewing distance. Thus, someone looking through the face 180 of the planar optical waveguides 172 can see digital imagery at one or more viewing distances.

A collimated light beam 250 entering the waveguide 172 at one of two different angles will follow one of the two TIR optical paths 182a, 182b, resulting in light beamlets 256 exiting the planar optical waveguide 172 along one of the two sets of external optical paths 185a, 185b. That is, a collimated light beam 250a that enters the waveguide 172 at an angle represented by the TIR optical path 182a will result in the light beamlets 256a exiting the planar optical waveguide 172 along the set of external optical paths 185a, and a collimated light beam 250b that enters the waveguide 172 at an angle represented by the TIR optical path 182b will result in the light beamlets 256b exiting the planar optical waveguide 172 along the set of external optical paths 185b.

In can be appreciated from the foregoing, the display subsystem 104 generates a series of synthetic image frames of pixel information that present an image of one or more virtual objects to the user. Further details describing display subsystems are provided in U.S. patent application Ser. No. 14/212,961, entitled "Display Subsystem and Method," and U.S. patent application Ser. No. 14/696,347, entitled "Planar optical waveguide Apparatus With Diffraction Element(s) and Subsystem Employing Same," which are expressly incorporated herein by reference.

Figure 7:
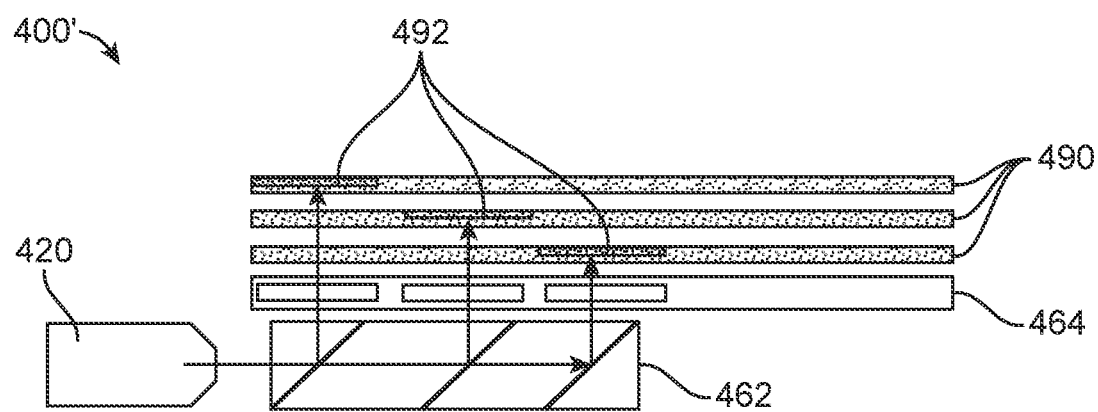

As described above, FIG. 4 depicts a basic optical system 400 for projecting images at a single depth plane. FIG. 7 depicts another optical system 400', which includes a light source 420, three LOEs 490, and three respective in-coupling gratings 492. The optical system 400' also includes three beam-splitters or dichroic mirrors 462 (to direct light to the respective LOEs) and three LC shutters 464 (to control when the LOEs are illuminated). When the system 400' is in use, the light beam from the light source 420 is split into three sub-beams/beamlets by the three-beam-splitters 462. The three beam-splitters also redirect the beamlets toward respective in-coupling gratings 492. After the beamlets enter the LOEs 490 through the respective in-coupling gratings 492, they propagate along the LOEs 490 by substantially TIR where they interact with additional optical structures resulting in display to an eye of a user. The surface of in-coupling gratings 492 on the far side of the optical path can be coated with an opaque material (e.g., aluminum) to prevent light from passing through the in-coupling gratings 492 to the next LOE 490. In some embodiments the beam-splitters 462 can be combined with wavelength filters to generate red, green and blue beamlets. In such an embodiment, three LOEs 490 are required to display a color image at a single depth plane. In another embodiment, LOEs 490 may each present a portion of a larger, single depth-plane image area angularly displaced laterally within the user's field of view, either of like colors, or different colors ("tiled field of view").

Figure 8:
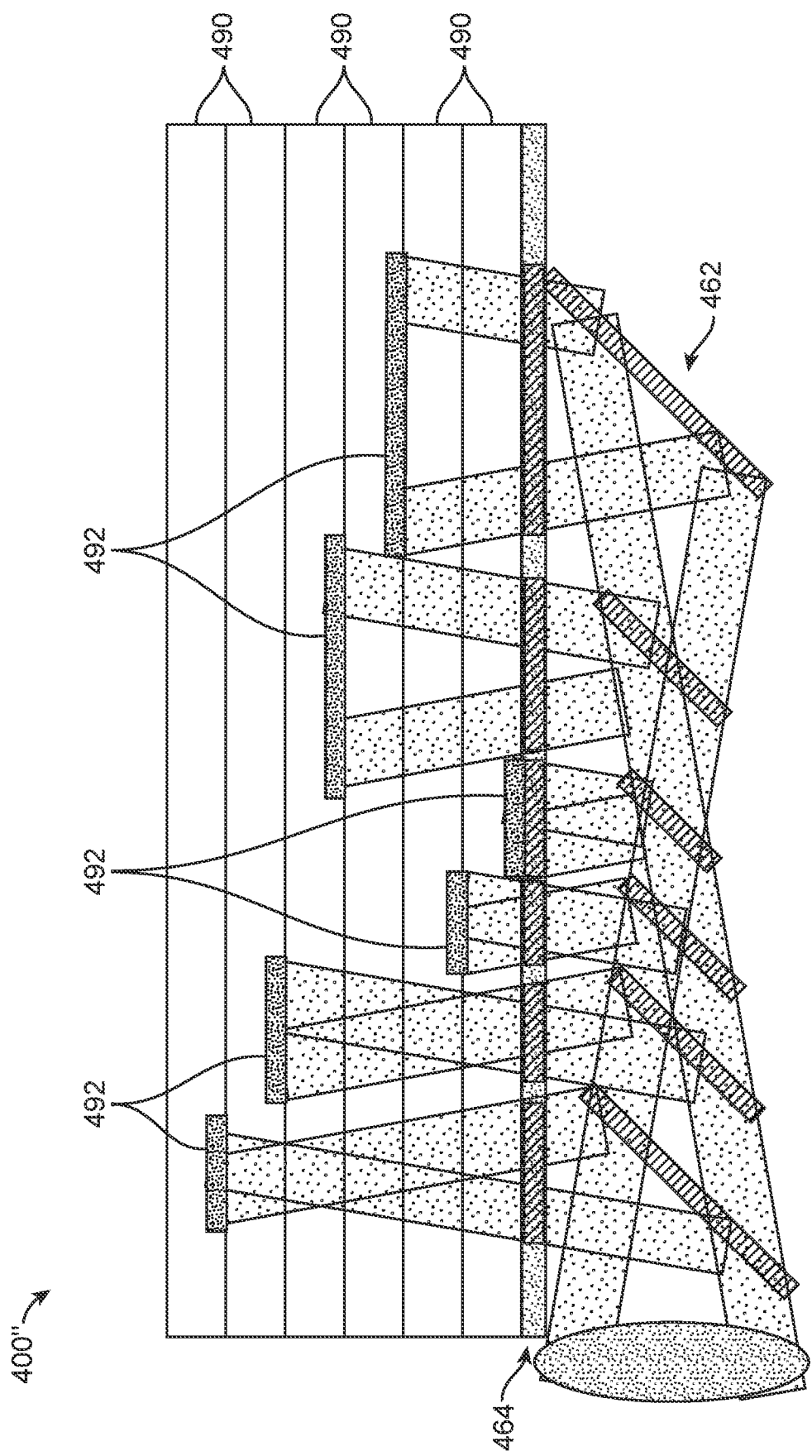

FIG. 8 depicts still another optical system 400", having six beam-splitters 462, six LC shutters 464 and six LOEs 490, each having a respective ICG 492. As explained above during the discussion of FIG. 7, three LOEs 490 are required to display a color image at a single depth plane. Therefore, the six LOEs 490 of this system 400" are able to display color images at two depth planes.

Figure 10:
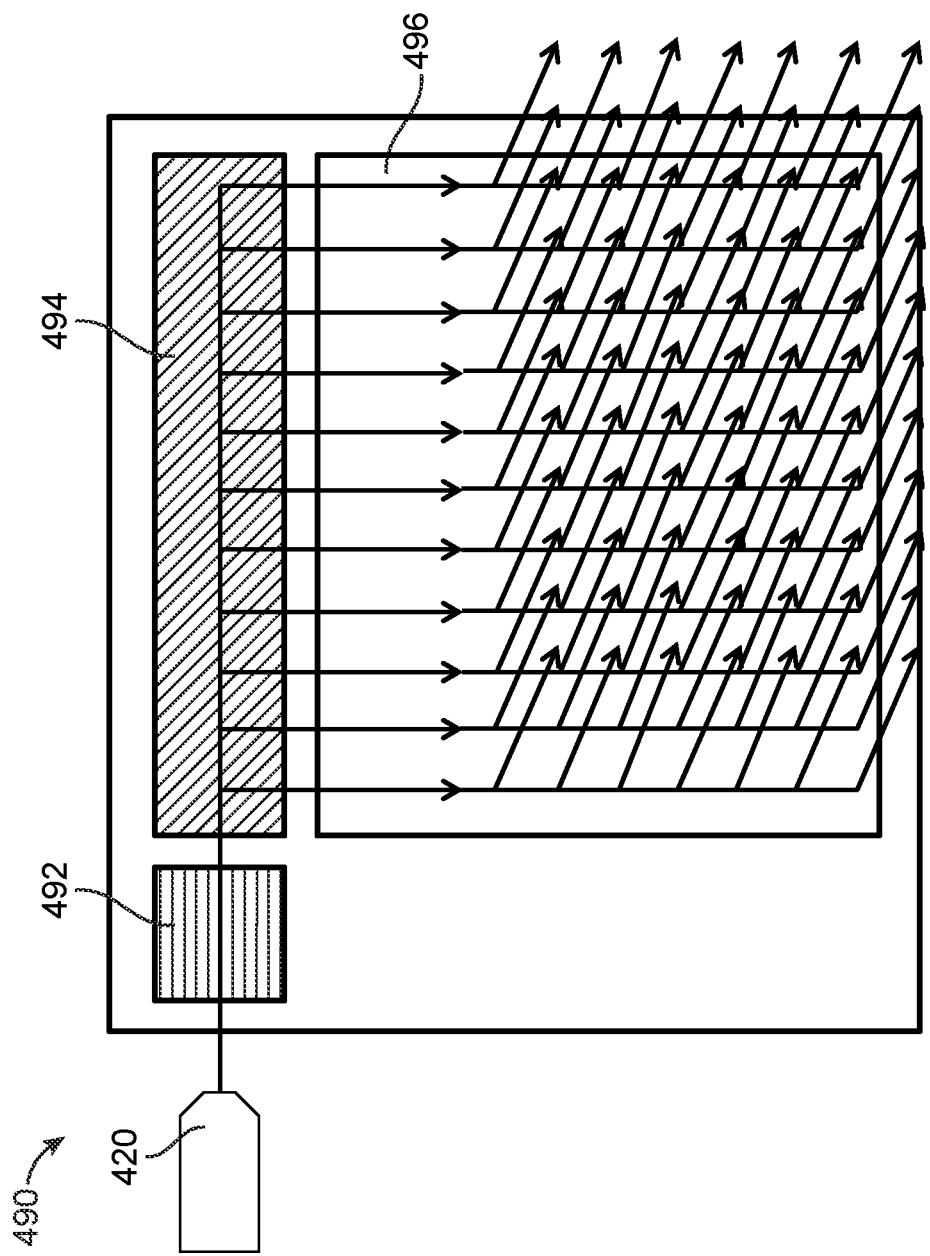
FIG. 10 is a detailed schematic view of a light-guiding optical element of an mixed reality system.

FIG. 10 depicts a LOE 490 having an ICG 492, an orthogonal pupil expander 494 ("OPE"), and an exit pupil expander 496 ("EPE").

As shown in FIGS. 4-9, as the number of depth planes, field tiles, or colors generated increases (e.g., with increased MR scenario quality), the numbers of LOEs 490 and ICGs 492 increases. For example, a single RGB color depth plane requires at least three LOEs 490 with three ICGs 492. As a result, any image defects (e.g., blurring from limited beam diameter) are also multiplied with additional opportunities to detract from MR scenario quality. Thus, the increasing number of optical elements required to generate an acceptable MR scenario exacerbates image quality problems.

The LOEs 490 discussed above can additionally function as exit pupil expanders 496 ("EPE") to increase the numerical aperture of a light source 420, thereby increasing the resolution of the system 400. Since the light source 420 produces light of a small diameter/spot size, the EPE 496 expands the apparent size of the pupil of light exiting from the LOE 490 to increase the system resolution. In other embodiments of the MR system 400, the system may further comprise an orthogonal pupil expander 494 ("OPE") in addition to an EPE 496 to expand the light in both the X and Y directions. More details about the EPEs 496 and OPEs 494 are described in the above-referenced U.S. Utility patent application Ser. No. 14/555,585 and U.S. Utility patent application Ser. No. 14/726,424, the contents of which have been previously incorporated by reference.

FIG. 10 depicts an LOE 490 having an ICG 492, an OPE 494 and an EPE 496. FIG. 10 depicts the LOE 490 from a top view that is similar to the view from a user's eyes. The ICG 492, OPE 494, and EPE 496 may be any type of DOE, including volumetric or surface relief.

The ICG 492 is a DOE (e.g., a linear grating) that is configured to admit light from a light source 420 for propagation by TIR. In the embodiment depicted in FIG. 10, the light source 420 is disposed to the side of the LOE 490.

The OPE 494 is a DOE (e.g., a linear grating) that is slanted in the lateral plane (i.e., perpendicular to the light path) such that a light beam that is propagating through the system 400 will be deflected by 90 degrees laterally. The OPE 494 is also partially transparent and partially reflective along the light path, so that the light beam partially passes through the OPE 494 to form multiple (e.g., 11) beamlets. In some embodiments, the light path is along an X axis, and the OPE 494 configured to bend the beamlets to the Y axis.

The EPE 496 is a DOE (e.g., a linear grating) that is slanted in the axial plane (i.e., parallel to the light path or the Y direction) such that the beamlets that are propagating through the system 400 will be deflected by 90 degrees axially. The EPE 496 is also partially transparent and partially reflective along the light path (the Y axis), so that the beamlets partially pass through the EPE 496 to form multiple (e.g., 7) beamlets. The EPE 496 is also slated in a Z direction to direction portions of the propagating beamlets toward a user's eye.

The OPE 494 and the EPE 496 are both also at least partially transparent along the Z axis to allow real-world light (e.g., reflecting off real-world objects) to pass through the OPE 494 and the EPE 496 in the Z direction to reach the user's eyes. In some embodiments, the ICG 492 is at least partially transparent along the Z axis also at least partially transparent along the Z axis to admit real-world light.

Figures 11A, 11B:
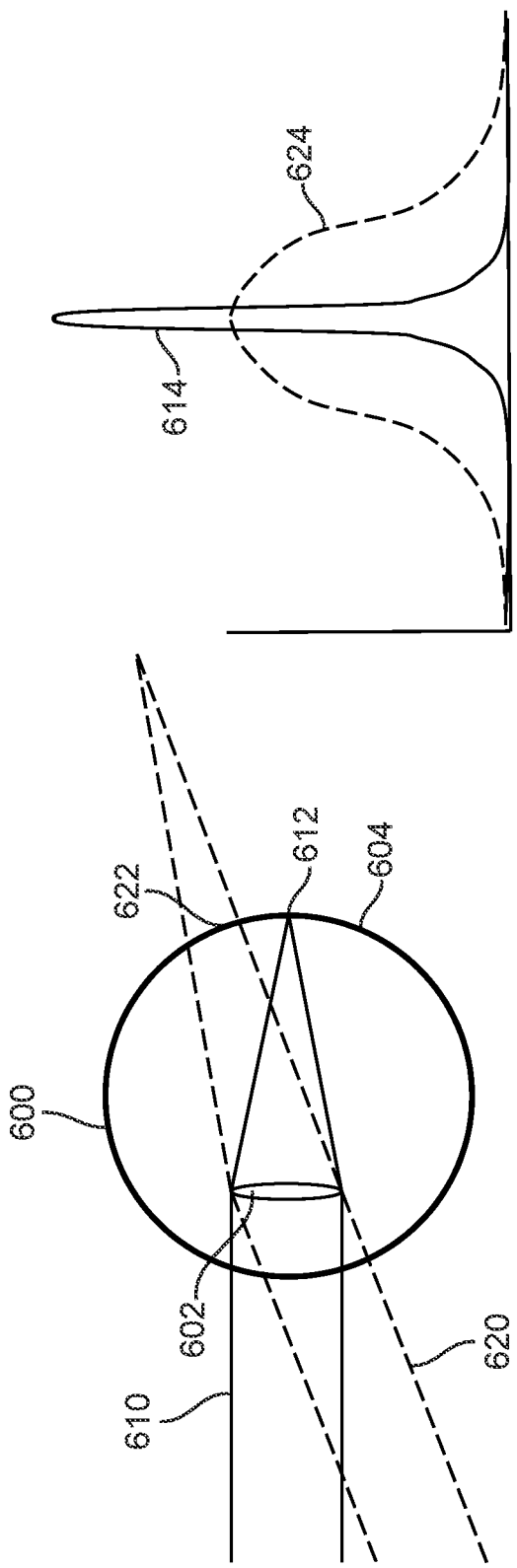

FIG. 11A shows a first light beam 610 entering an eye 600 and being focused by a lens 602 to a small spot 612 on the retina 604. Preferably, the small spot 612 is approximately the size of a photoreceptor on the retina 604. The first image or first portion of an image corresponding to the first light beam 610 is in focus, as shown by the energy distribution curve 614 corresponding to the first light beam 610 in the graph in FIG. 11B. FIG. 11A also depicts a second light beam 620 entering the eye 600 and being focused by the lens 602 to a larger spot 622 on the retina 604. The second image or second portion of an image corresponding to the second light beam 620 (with the larger spot 622) is less in focus (e.g., out of focus), as shown by the energy distribution curve 624 corresponding to the second light beam 620, in the graph in FIG. 11B. FIG. 11B depicts the energy distribution patterns of two real-world light beams as focused by a lens onto a retina.

Figure 12B:
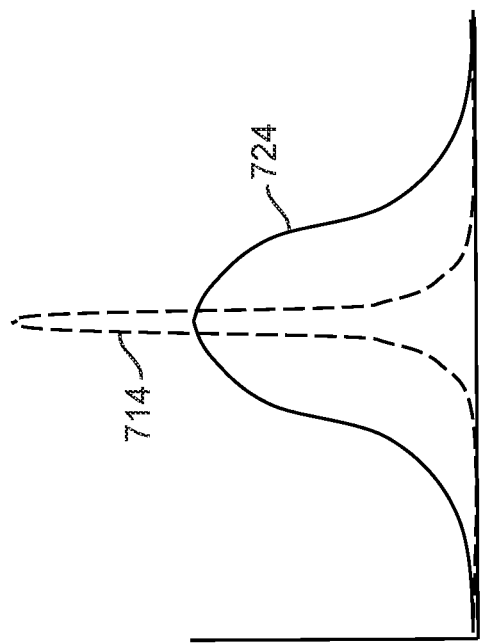
Figure 12A:
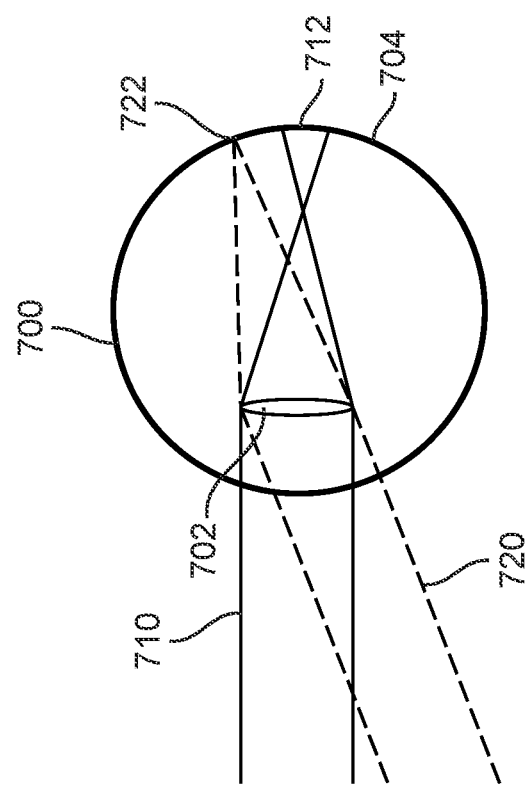

FIG. 12A shows an eye 700 with a lens 702 that is accommodated so that the second light beam 720 is focused to a small spot 722 on the retina 704. Consequently, a second image or second portion of an image corresponding to the second light beam 710 is in focus, as shown by the energy distribution curve 724 corresponding to the second light beam 720 in the graph in FIG. 12B. However, in FIG. 12A, the first light beam 710 is focused to a larger spot 712 on the retina 704, resulting in a larger spot 712 on the retina 704. The first image or first portion of an image corresponding to the first light beam 710 (with the larger spot 712) is less in focus (e.g., out of focus), as shown by the energy distribution curve 714 corresponding to the first light beam 710, in the graph in FIG. 12B. FIG. 12B depicts the energy distribution patterns of two real-world light beams as focused by a lens onto a retina.

The size of a beam spot on the retina affects the resolution of an image as follows. The function of an eye is to collect light information related to a "3-D" scene, which is comprised of a plurality of point sources of light (e.g., emitted or reflected). For instance, a tree may include millions of point sources of light that reflect light from the sun. The eye (e.g., the lens therein) bends light beams to a spot on the retina. Ideally, the beam spot on the retina is the size of a photoreceptor. An eye that is well focused on an object will focus light beams from that object on as small a spot on the retina as possible. When an eye is out of focus relative to an object, the light beams will be brought into focus in front of or behind retina, and the spot resembles a circle instead of a point. A wider circular spot may impinge on several photoreceptors on the retina resulting in a blurred image as interpreted by the optical cortex of the viewer. Further, smaller beam spots (e.g., from 2-3 mm diameter beams) will change spot size (i.e., blur or focus) with lens accommodation more quickly. On the other hand, larger beam spots (e.g., from a 0.5 mm diameter beam) will not change spot size (i.e., blur or focus) with lens accommodation.

FIG. 13A shows an eye 800 with a lens 802 that is accommodated so that the first and second light beams 810, 820 are focused to respective larger spots 812, 822 on the retina 804. Consequently, the first and second images or first and second portions of one or more images corresponding to the first and second light beams 810, 820 are less in focus (e.g., out of focus) compared to an in focus image, as shown by the energy distribution curves 814, 824 corresponding to the first and second light beams 810, 820, in the graph in FIG. 13B. FIG. 13B depicts the energy distribution patterns of two real-world light beams as focused by a lens onto a retina. As shown in FIGS. 11A-13B, the anatomy of a single lens eye renders it difficult to concurrently focus two light beams having different angles of incidence. When one beam is in focus, the other beam will be out of focus. Attempting to accommodate the lens to an intermediate focus of two light beams, as shown in FIGS. 13A and 13B, may result in two out of focus images or portions of one or more images. As a result of anatomical limitations, when a single lens eyes bring a light beam or portion of a field of view ("FOV") into focus, other light beams or portions of the FOV will be out of focus.

Compounding this image focus limitation are various other optical, anatomical, and technological limitations. Image resolution is a function of beam diameter and beam angle ("optical invariant"), which is tied to the number of resolvable spots (e.g., as in the laser scanner industry). The optical invariant is related to a numerical aperture collected by pixels multiplied by the number of pixels. Larger light beam diameters result in higher image resolutions. Smaller light beam diameters result in the ability to conserve increasing light beam angles to maximize the FOV. These optical limitations render beam diameter optimization difficult, because beam diameter affects both image resolution and light beam angle, resulting in a tradeoff between image quality and FOV size.

FIGS. 14A to 14B demonstrate the relationship between light beam diameter and image resolution. As shown in FIG. 14A, a light beam 910 having a maximally sized beam diameter 916 (e.g., sufficient to fill an entire pupil of the eye 900 or about 2-3 mm) generates the smallest spot size 912 for the given eye 900. The small spot size 912 results in a corresponding in focus image or portion thereof as shown in the energy distribution curve 914 in FIG. 14B. FIG. 14B depicts the energy distribution patterns of a real-world light beam as focused by a lens onto a retina. The larger diameter of light beam 910 allows the eye 900 to focus the light beam 900 by changing the shape of the lens 902. The ability to focus maximally sized light beams results in increased image resolution. However, a light beam 1010 having a smaller beam diameter 1016 (e.g., about 0.5 mm) generates a larger spot size 1012, as shown in FIG. 15A. Larger spot size 1012 results in a corresponding out of focus image or portions thereof as shown in the energy distribution curve 1014 in FIG. 15B. FIG. 15B depicts the energy distribution patterns of a real-world light beam as focused by a lens onto a retina.

Further, if a light beam diameter is around 0.5 mm, open loop accommodation with some eyes, as a result of which everything will appear to be at the same poor level of focus. As in pin-hole cameras, the entire FOV will be equally and poorly focused, because the retina space is too small to resolve larger spots displayed thereon, as shown in FIGS. 15A and 15B. Moreover, if a light beam diameter is around 0.5 mm, the pupil may become fully open, resulting in optical aberrations such as halos around point light sources.

As described above, various other optical, anatomical, and technological limitations result in performance limitations of head-worn displays. For instance, light beams with smaller diameters (e.g., around 0.5 mm) compared to light beams with larger diameters (e.g., around 2-3 mm) will result in lower image resolution and optical aberrations. On the other hand, light beams with larger diameters (e.g., around 2-3 mm) compared to light beams with smaller diameters (e.g., around 0.5 mm) will result in narrower FOVs. Balancing image resolution with FOV results in sub-optimal image resolution and FOVs.

Figure 16B:
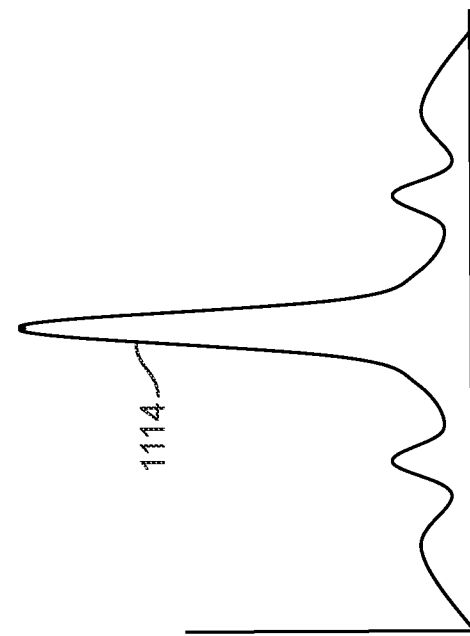
FIG. 16B is an energy distribution pattern of the light beamlets in FIG. 16A as focused by a lens onto a retina according to some embodiments.
Figure 16A:
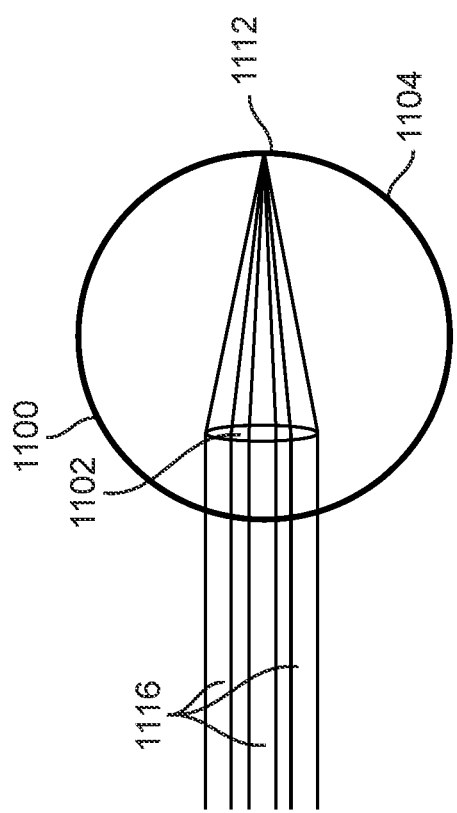
FIG. 16A is a schematic view of light beamlets entering an eye according to some embodiments.

The following disclosure describes various embodiments of systems and methods for simulating a larger diameter light beam using a plurality (e.g., an array) of smaller diameter light beams. These beam multiplier systems and methods generate bundles of interrelated, interacting, cloned beamlets 1116 that pass through the pupil to impinge on the retina 1104, as shown in FIG. 16A. A combination of a beam array, relative spacing, and beam diameter can generate compact energy images at the retina 1104 (see FIG. 16B). FIG. 16B depicts the energy distribution patterns of an array of real-world light beams as focused by a lens 1102 onto a retina 1104 including optical interactions of the light beams with each other. By eliminating energy in side-lobes (at constant power) through interference and other optical properties of beam arrays (e.g., coherency, phase uniformity, etc.), light energy (e.g., irradiance, peak intensity, etc.) is concentrated in the middle of the graph as shown by the energy distribution curve 1114 corresponding to the beamlets 1116 in the graph in FIG. 16B. This focused light energy, in turn, generates a more focused image with higher image resolution. For example, coherency and phase uniformity across the beamlets 1116 may correspond to energy distributions having relatively high peak values and attenuated side-lobes, and thus may serve to yield images that are relatively focused and sharp in appearance. In effect, the array of cloned smaller diameter beamlets 1116 generates a smaller spot 1112 on the retina 1104 with a sharp point spread function 1114 that approximates the sharp point spread function 914 generated by a larger diameter beam 910 (see FIGS. 14A and 14B). The array of smaller diameter beamlets 1116 allows the system to overcome the beam diameter limitation (resulting from diffraction and/or device size limitations). At the same time, the system's use of smaller diameter light beams results in a wider FOV.

The plurality/array of beamlets (each with a smaller diameter) simulates the light energy from a much larger diameter light beam, increasing image resolution while maintaining the wider FOV based on the smaller beam diameter.

Figure 17B:
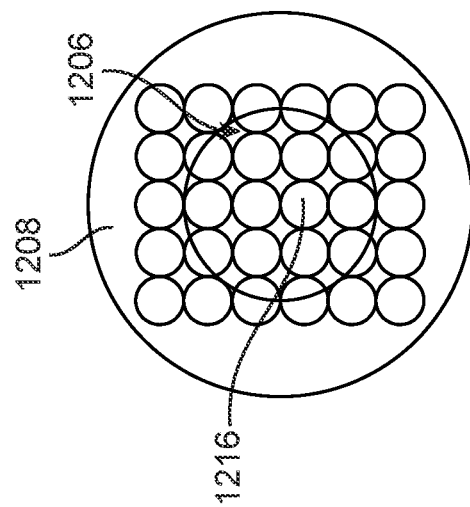
FIG. 17B is a schematic view of light beamlets in relationship to a pupil formed by an iris according to some embodiments.
Figure 17A:
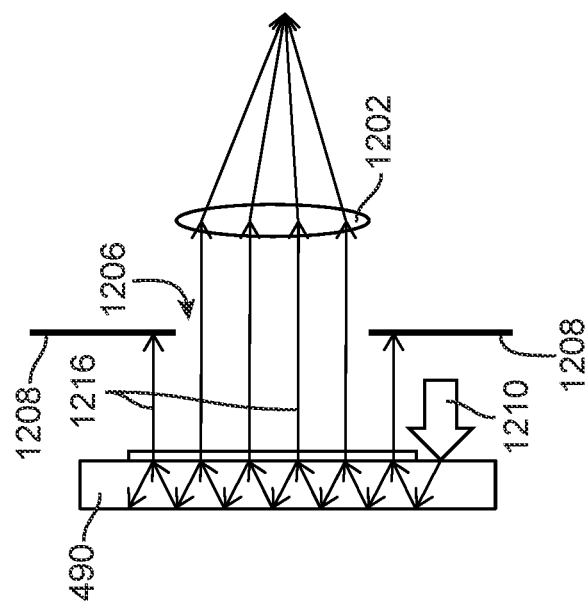
FIG. 17A is a schematic view of a light guiding optical element generating an array of beamlets according to some embodiments.

FIG. 17A schematically depicts an LOE 490 that generates an array of beamlets 1216 from a single incoming light beam 1210 (see beam multipliers described below). Some of the beamlets 1216 pass through a pupil 1206 formed by an iris 1208 to be focused by a lens 1202. While FIG. 17A depicts a plurality of beamlets 1216, FIG. 17A does not illustrate the two dimensional array of beamlets according to some embodiments. FIG. 17B schematically depicts select beamlets 1206 from a beamlet array passing through a pupil 1206 formed by an iris 1208.

Figure 18A:
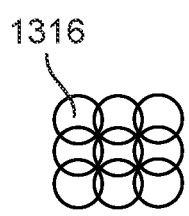
FIGS. 18A-18C are schematic views showing light beamlets on retinas according to various embodiments.
Figure 18B:
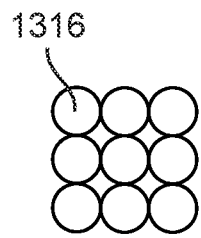
Figure 18C:
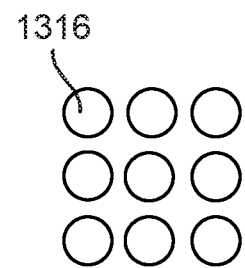

The spacing of beamlet spots can also affect image quality. As shown in FIG. 18A, beamlet spots 1316 on a retina may be overlapping, with each beamlet spot 1316 covering more than one photoreceptor. When coherent and in-phase, the distribution pattern of beamlet spots 1316 depicted in FIG. 18A may yield images that appear in focus and sharp. However, when each beamlet spot 1316 impinges on more than one photoreceptor, or when there is a phase disparity of multiple beamlet spots impinging on a single photoreceptor, the resulting images may not be as sharp in appearance. FIGS. 18B and 18C depict other beamlet spot 1316 distribution patterns on a retina, where each beamlet spot 1316 may approximately cover one photoreceptor. Generally, these distribution patterns may result in images that appear fairly in focus and sharp, as they may be less impacted by coherency and phase uniformity than that of FIG. 18A. Accordingly, beam array architecture, relative beam/beamlet spacing, and beam/beamlet diameter are factors that may affect the resolution/sharpness of images at a retina.

Figure 19:
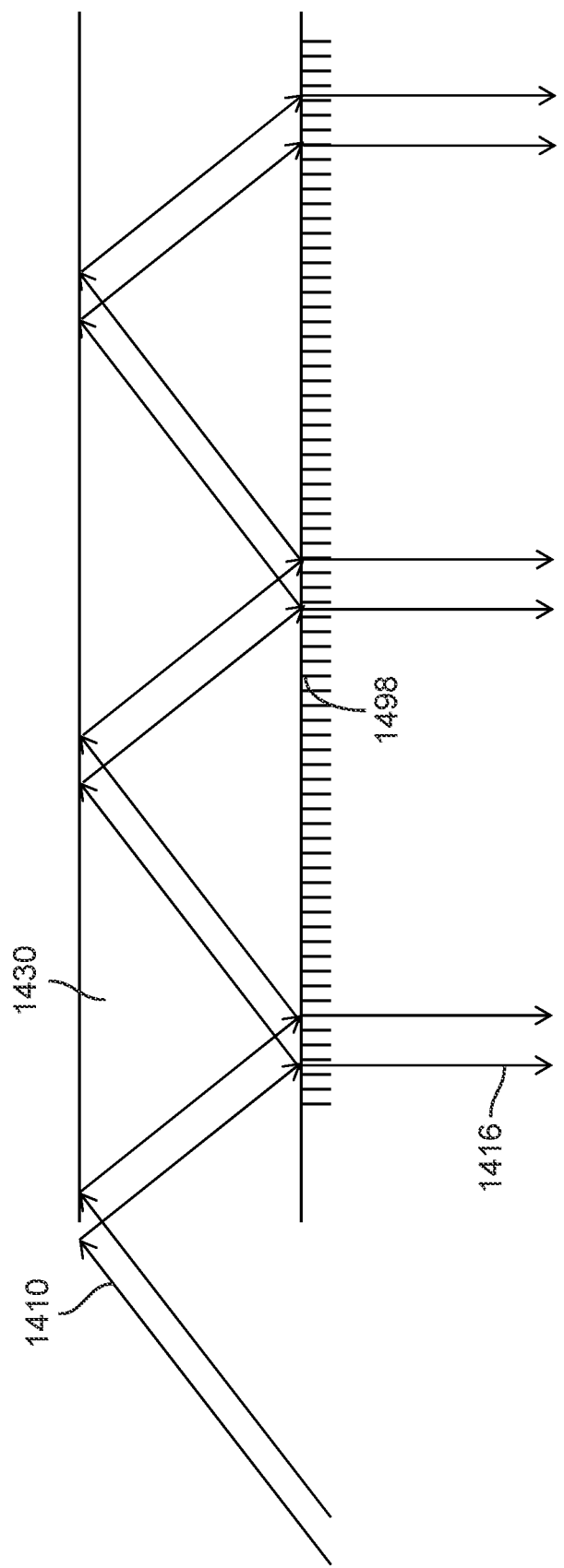
FIG. 19 is a schematic view of light beams and beamlets propagating through a beam multiplier according to some embodiments.

FIG. 19 depicts beam multiplier 1430 (i.e., a thin beam multiplier), which may be a light guiding optical element, such as an OPE 494 and/or an EPE 496 of an LOE 490 (see FIG. 67). An input beam 1410 enters the beam multiplier 1430 (e.g., via an ICG or other entry portion) and travels down the beam multiplier 1430 by substantially TIR. As the input beams 1410 travel down the beam multiplier 1430, each time the input beams 1410 interact with an out-coupling grating ("OCG") 1498, a portion of the input beams 1410 exits the beam multiplier 1430 via the OCG 1498. The OCG 1498 is configured to allow a portion of a light beam to exit the beam multiplier 1430 while another portion of the light beam propagates along the beam multiplier 1430 via substantially TIR. The OCG 1498 may be a diffractive optical element of any type, including volumetric or surface relief. The beam multiplier 1430 clones a single input beam 1410 into three output beamlets 1416, which each encode the same pixel information as the input beam 1410.

While the beam multiplier 1430 is depicted inside view in FIG. 19, the beam multiplier 1430 may have a length and a width like the OPE 494 and/or the EPE 496 shown in FIG. 67. Further, while the input beams 1410 are depicted as propagating in a generally left to right direction, the beam multiplier 1430 may be configured to direct light beams in a variety of patterns, including but not limited to zigzag patterns that generate an array of beamlets 1416 (see e.g., FIG. 18B).

As shown in FIG. 20, only some (i.e., one) of the beamlets 1516 exiting from the beam multiplier 1530 pass through the pupil 1506 defined by the iris 1508 to be focused by the lens 1502. Therefore, even with beam multiplication, spacing of beamlets 1516 can affect the actual number of beams perceived by a user. FIG. 20 also shows that the number of bounces of the input beams 1510 per length of the beam multiplier 1530 determines the number of beamlets 1516 exiting from a given length the beam multiplier 1530.

FIG. 21 depicts a thinner beam multiplier 1630' according to some embodiments. A thicker beam multiplier 1630 is also depicted for comparison. Over approximately the same length, each input light beam 1610 (which angle of incidence preserve between the two the multipliers) bounces more times in the thinner beam multiplier 1630' compared to the thicker beam multiplier 1630. The input light beam 1610 bounces back and forth a higher spatial frequency because there is less distance to traverse before the beam 1610 encounters each surface of the thinner beam multiplier 1630'. Accordingly, a higher density of beamlets emerge from the thinner beam multiplier 1630' compared to the thicker beam multiplier 1630. For instance, each input light beam 1610 bounces 13 times in the thinner beam multiplier 1630', while a similar input light beam 1610 bounces only three times in the thicker beam multiplier 1630. A thinner beam multiplier 1630' provides more beam multiplication (i.e., cloning) per length of beam multiplier compared to a thicker beam multiplier 1630. Further, when this linear increase in cloning efficiency is multiplied over two dimensions (e.g., length and width) the increase in cloning efficiency from reduced beam multiplier thickness is exponential. The respective spacing between multiplied beamlets into two dimensions are not necessarily the same (although symmetry is preferred). Moreover, a thinner beam multiplier 1630' may decrease during even with increased beam overlap through coherent interactions.

The beam multipliers depicted in FIGS. 19-21 include two opposing reflective surfaces that reflect light in substantially opposite directions to enable substantially TIR. In other embodiments, beam multipliers include more than two reflective surfaces. For instance, the multi-surface beam multiplier 1730 depicted in FIG. 22A includes first and second light guiding optical sub-elements ("LOS") 1730A, 1730B. The first LOS 1730A is similar to the beam multiplier 1530 depicted in FIG. 20 in that it has two (i.e., first and second) opposing reflective surfaces 1732, 1734. The second LOS 1730B depicted in FIG. 22A has a third reflective surface 1736 that reflects light in substantially the same direction as the second reflective surface 1734 in the first LOS 1730A.

The second LOS 17306 is disposed over the first LOS 1730A such that an incoming light beam 1710 at least partially passes through the first LOS 1730A and enters the second LOS 1730B. As an incoming light beam 1710 passes through the first LOS 1730A, a portion thereof is partially reflected by the second reflective surface 1734. The portion of the incoming light beams 1710 that passes through the second LOS 1730B is reflected by the third reflective surface 1736 in substantially the same direction as the portion of the incoming light beam 1710 that is reflected by the second reflective surface 1734. The result of the addition of the second LOS 17306 and its third reflective surface 1736 is a multiplication of the number of beamlets 1716 propagating along the first and second LOSs 1730A, 1730B by substantially TIR.

Figure 22A:
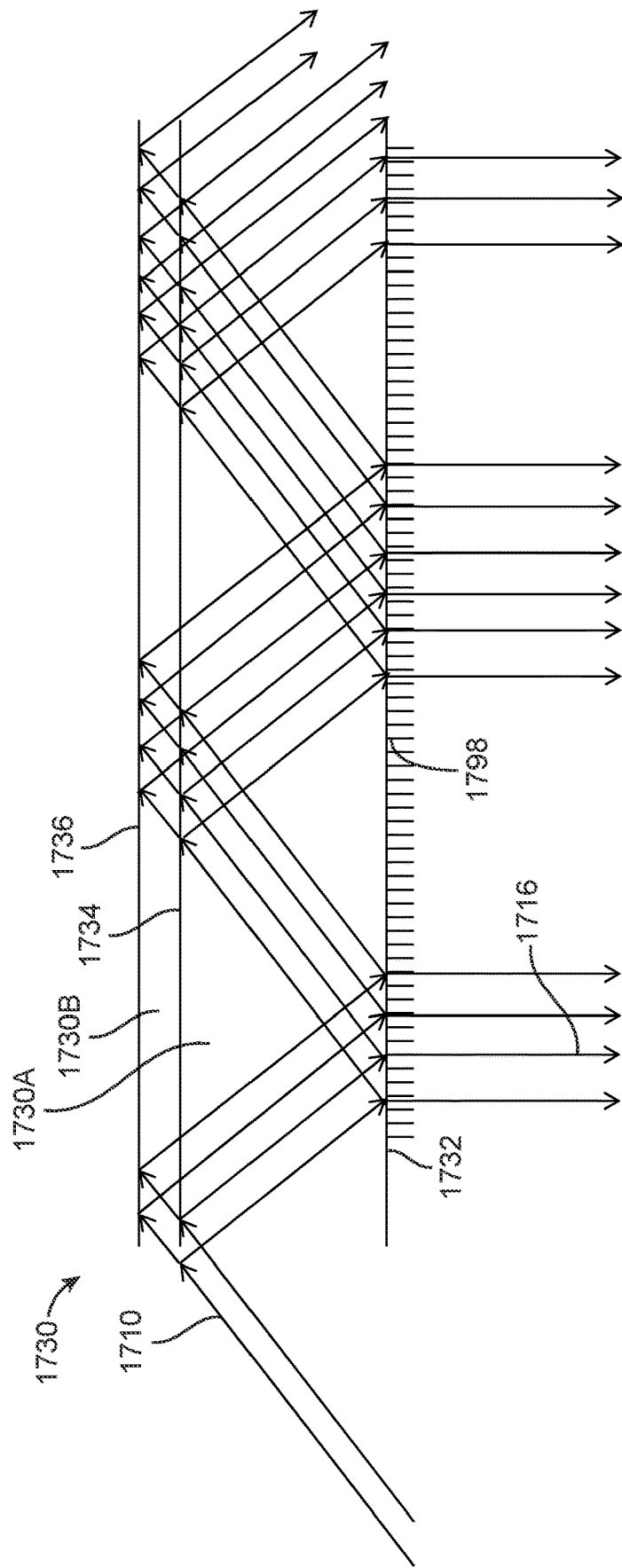

The thickness of the second LOS 1730B depicted in FIG. 22A is such that some of beamlets 1716 reflecting off of the third reflective surface 1736 substantially overlap with the beamlets 1716 reflecting off of the second reflective surface 1734. For situations in which some of the beamlets 1716 are out of phase with one another, such overlap can serve to amplify the effects of destructive interference between phase-mismatched beamlets. In addition, high levels of overlap can serve to minimize the degree of multiplication of the number of beamlets 1716. For instance, while the first bounce off of the second and third reflective surfaces 1734, 1736 multiplies the number of beams 1710/beamlets 1716 from 1 to 2, the second bounce only multiplies the number of beamlets 1716 from 2 to 3. The extent to which at least some of beamlets 1716 overlap can be controlled by adjusting the input beam 1710 diameter and/or the input beam 1710 separation, both of which are substantially conserved during substantially TIR. For example, the distance between the edges of two adjacent beamlets, from among the number of beamlets 1716, may be increased by reducing the diameter of the input beam 1710.

The beam multiplier 1730 depicted in FIG. 22B includes first and second LOSs 1730A, 1730B, like the beam multiplier 1730 depicted in FIG. 22A. However, the thickness of the second LOS 1730B has been tuned/selected such that the beamlets 1716 reflecting off of the third reflective surface 1736 do not overlap with the beamlets 1716 reflecting off of the second reflective surface 1734. Consequently, the beam multiplier 1730 depicted in FIG. 22B has a higher degree of beamlet multiplication than the beam multiplier 1730 depicted in FIG. 22A. For instance, while the first bounce off of the second and third reflective surfaces 1734, 1736 multiplies the number of beams 1710/beamlets 1716 from 1 to 2, the second bounce multiplies the number of beamlets 1716 from 2 to 4. Continuing with this pattern, each bounce off of the second and third reflective surfaces 1734, 1736 doubles the number of beamlets 1716 in substantially exponential growth.

The beam multiplier 1830 depicted in FIG. 23 includes first and second LOSs 1830A, 1830B, like the beam multiplier 1730 depicted in FIG. 22A. A difference between the beam multipliers 1730, 1830 is that the second LOS 1830B depicted in FIG. 23 has a fourth reflective surface 1838 in addition to the third reflective surface 1836. The third and fourth reflective surfaces 1836, 1838 are disposed on opposing sides of the second LOS 1830B, and reflect light in substantially opposite directions.

The second LOS 1830B is disposed over the first LOS 1830A such that an incoming light beam 1810 at least partially passes through the first LOS 1830A and enters the second LOS 1830B. As an incoming light beam 1810 passes through the first LOS 1830A, a portion thereof is partially reflected by the second reflective surface 1834. The portion of the incoming light beams 1810 that passes through the second LOS 1830B is reflected by the third reflective surface 1836 in substantially the same direction as the portion of the incoming light beam 1810 that is reflected by the second reflective surface 1834. Before the reflected beamlet 1816 exits the second LOS 1830B, a portion of the reflected beamlet 1816 is reflected by the fourth reflective surface 1838 back toward the third reflective surface 1836. The result of the addition of the fourth reflective surfaces 1838 in the second LOS 18306 is a further multiplication of the number of beamlets 1816 propagating along the first and second LOSs 1830A, 1830B by substantially TIR even compared to the beam multiplier 1730 depicted in FIG. 22A. As shown in FIG. 23, the addition of the fourth reflective surface 1838 results in an additional bounce for each light beam 1810/beamlet 1816, thereby multiplying the number of beamlets produced at each interaction with the first and second LOSs 1830A, 1830B (i.e., the light multiplier 1830).

Figure 24:
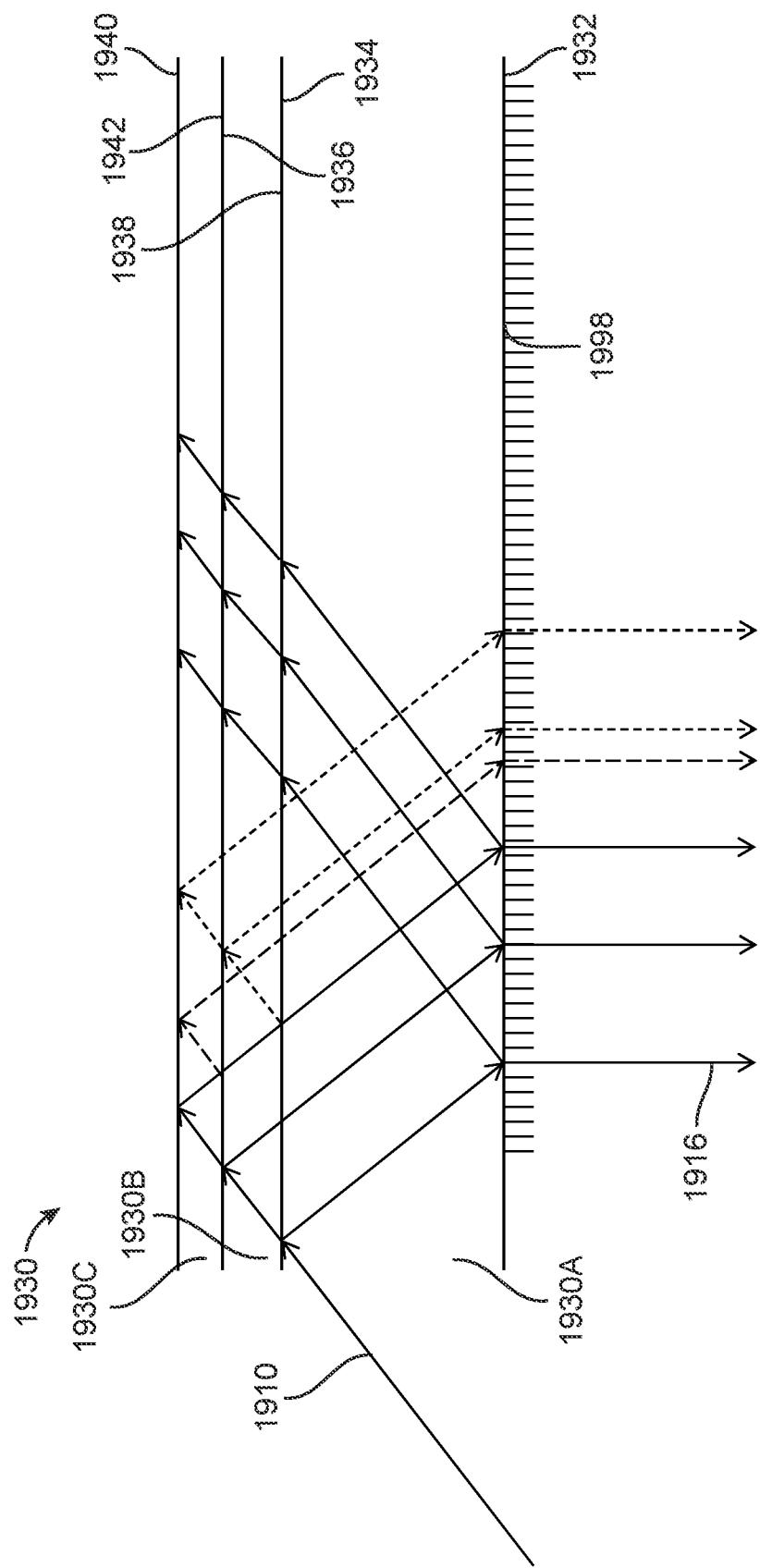

The beam multiplier 1930 depicted in FIG. 24 includes first and second LOSs 1930A, 1930B, like the beam multiplier 1830 depicted in FIG. 23. A difference between the beam multipliers 1830, 1930 is that the beam multiplier 1930 depicted in FIG. 24 includes a third LOS 1930C. Like the second LOS 1930B, the third LOS 1930C includes a b of opposing reflective surfaces (i.e., fifth and sixth reflective surfaces 1940, 1942) that reflect light in substantially opposite directions. The fifth and sixth reflective surfaces 1940, 1942 are disposed on opposing sides of the third LOS 1930C.

The third LOS 1930C is disposed over the second LOS 19306 (and therefore the first LOS 1930A) such that an incoming light beam 1910 at least partially passes through the first and second LOSs 1930A, 19306 and enters the third LOS 1930C. As an incoming light beam 1910 passes through the first LOS 1930A, a portion thereof is partially reflected by the second reflective surface 1934. Similarly, as an incoming light beam 1910 passes through the second LOS 1930B, a portion thereof is partially reflected by the third reflective surface 1936. The portion of the incoming light beams 1910 that passes through the second LOS 1930B is reflected by the third reflective surface 1936 in substantially the same direction as the portion of the incoming light beam 1910 that is reflected by the second reflective surface 1934. Similarly, The portion of the incoming light beams 1910 that passes through the third LOS 1930C is reflected by the fifth reflective surface 1940 in substantially the same direction as the portions of the incoming light beam 1910 that are respectively reflected by the second and third reflective surfaces 1934, 1936.

Before the reflected beamlet 1916 exits the second LOS 1930B, a portion of the reflected beamlet 1916 is reflected by the fourth reflective surface 1938 back toward the third reflective surface 1936. Similarly, before the reflected beamlet 1916 exits the third LOS 1930C, a portion of the reflected beamlet 1916 is reflected by the sixth reflective surface 1942 back toward the fifth reflective surface 1940. The result of the addition of the third LOS 1930C and its fifth and sixth reflective surfaces 1940, 1942 is a further multiplication of the number of beamlets 1916 propagating along the first, second, and third LOSs 1930A, 1930B, 1930C by substantially TIR. As shown in FIG. 24, the addition of the third LOS 1930C results in an additional pair of bounces for each light beam 1910/beamlet 1916, thereby multiplying the number of beamlets produced at each interaction with the first, second, and third LOSs 1930A, 1930B, 1930C (i.e., the light multiplier 1930).

Multi-surface beam multipliers can be fabricated using a lamination process. In some embodiments, a second substrate (e.g., a second LOS) having a second thickness is laminated onto a first substrate (e.g., a first LOS) having a first thickness. The interface between the two substrates may be partially reflective (e.g., a metallic coating/half-silvered mirror, a thin film coating, a dichroic mirror, a dielectric interface, a diffraction grating, a diffractive element, etc.) In another embodiment, separate waveguides/LOEs can be laminated together with a partially-reflective interface.

Further, the ratio of thicknesses of first and second LOSs (and various sub combinations of any plurality of LOSs in a system) can affect beamlet multiplication by beamlet overlap. If the respective thicknesses are whole number multiples or quotients (i.e., factors), then cloned beamlets may overlap when they exit the first and second LOSs, reducing the degree of beamlet multiplication. Therefore, in some embodiments (see FIG. 22B) the first thickness of the first LOS may be a non-even factor of the second thickness of the second LOS. For instance, the first thickness may be 0.3256 times the second thickness (instead of e.g., 0.2 or 0.5). Quasi-random beamlet arrays with multiple LOSs may be insensitive to angle or imperfections in LOS thicknesses.

Beam multipliers can also be tuned by varying the degree of reflectiveness/transmittance of various surfaces (e.g., other than 50/50). Using this and other techniques, the multipliers can be tuned to have an even distribution of energy across the beamlets. For moderate amounts of beam multiplication (e.g., sufficient to fill the pupils of the eyes), the beam multiplier(s) can be two to ensure that beamlets (and groups thereof) have the same amounts of energy, as the eye sweeps across different sets of beamlets. Equalizing the amount of energy across beamlets minimizes dropouts in intensity (artifacts; winking) as the user's eyes sweep the FOV. With an exponentially increasing number of beamlets, beamlets will eventually randomly overlap, thereby reducing intensity artifacts.

FIG. 25 depicts a beam multiplier 2030 that is tuned/optimized to produce the most light (e.g., with an optimal beam diameter/energy distribution) for beamlets 2016 that are directed toward the center 2044 of an FOV. For instance, the beam multiplier 2030 can be tuned to vary the light intensity/energy as a function of the angle of the beamlets 2016 that will be emerging from the beam multiplier 2030. Beamlets 2016 directed toward the center 2044 of an FOV 10 to be more perpendicular/orthogonal to the surface of the beam multiplier 2030 (i.e., have a smaller angle of incidence). This design minimizes artifacts at the center 2044 of the FOV where some users' eyes will be directed most of the time, while at the same time controlling the amount of energy required to display an image. As a trade-off, the beam multiplier 2030 has been less tuned/optimized for more eccentric beamlets 2016 at the peripheral portions of the FOV.

A FOV may be expanded with kaleidoscopically tuned beam multipliers. The relative reflectivity of surfaces can be tuned such that the beam multiplier has dense beam multiplication in optically important regions (e.g., center of an FOV) and sparse beam multiplication in optically less important regions (e.g., periphery of an FOV). The FOV can be determined to various types of eye tracking, including but not limited to interpupillary distance measurement and pupil motion tracking.

The OPE 494 and EPE 496 depicted in FIG. 67 do not cover/overlie each other. However, if an OPE overlies an EPE or a portion thereof, there is an increased opportunity for multiple reflections of beams (i.e., mirrored beams) that may exit the LOE 490 toward the user's eye. The mirrored beams may be shifted in phase resulting in artifact (e.g., bull's eye or Fresnel zone artifacts "FZA"). One method of reducing FZAs is by reducing mirrored beams using anti-reflective coatings. Another method of reducing FZAs is to separate a thin waveguide OPE from the EPE. The thickness of a thin waveguide OPE can also be tuned such that FZAs are minimized because the thin waveguide OPE brings the beamlets back into phase for one wavelength (e.g., using a two pi thickness relationship). The relative phase difference between beamlets is a function of wavelength and scan angle. The thickness of a thin waveguide OPE can be tuned to minimize FZAs with green light, for which the human eye is most sensitive. For instance, a thin waveguide OPE can be tuned for 515 nm-540 nm, 520 nm (green), or 532 nm (green). In other embodiments, a thin waveguide OPE can be tuned to minimize FZAs with 475 nm (blue) light or 650 nm (red) light. Because the human eye is more able to discern blue light in an annular region around the fovea, certain FZAs are more detrimental to blue light, and minimizing those FZAs for blue light can greatly improve image quality. Accordingly, a thin waveguide OPE can overlie an EPE while reducing FZAs if the thickness of the thin waveguide OPE is tuned to have a two pi thickness relationship.

Figure 26A:
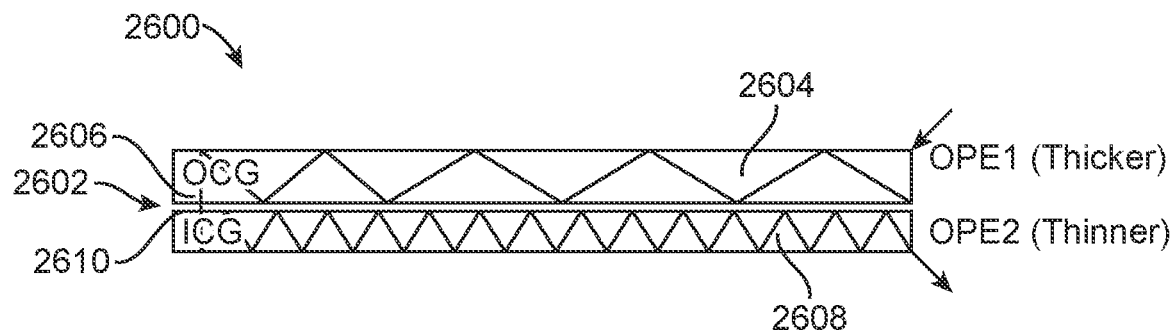
Figure 26B:
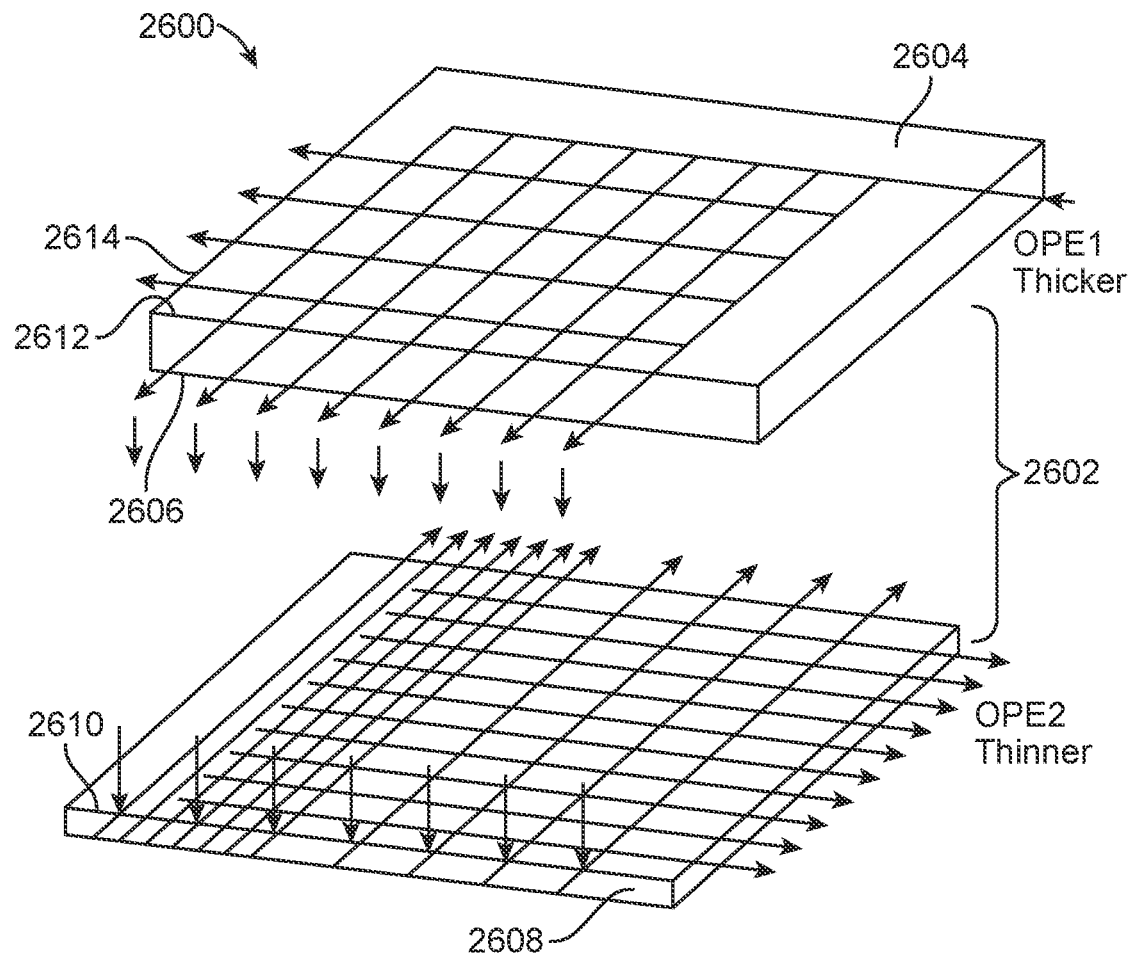

FIGS. 26A and 26B depict a beam multiplier 2600 having a refractive index gap (e.g., air gap) 2602 that ensures light will propagate by substantially TIR at the interface (with the refractive index gap) rather than be partially transmitted into the adjacent layer. The light path through the beam multiplier begins with entry into OPE1 2604 (e.g., a thicker LOS), out of OPE1 2604 via an OCG 2606, into OPE2 2608 via an ICG 2610, and through OPE2 2608 (e.g., a thinner LOS). The refractive index gap 2602 controls light flow through this beam multiplier 2600 allowing light to pass between OPE1 2604 and OPE2 2608 only via the OCG 2606 and ICG 2610. By varying the thicknesses of OPE1 2604 and OPE2 2608, different periodic relationships can be achieved for OPE1 2604 and OPE2 2608. This can be tuned to generate different spatial frequency for beamlet cloning. While the varied optical (light modifying) characteristic described above is LOE thickness, other optical characteristics (such as diffractive index) can also be varied to achieve effects similar to those described herein.

There are two exit edges 2612, 2614 for OPE1 2604 (see FIG. 26B). In some embodiments, both exits edges are coupled to OPE2 2608. In another embodiment, the diffraction efficiency of OPE1 2604 can be varied in various portions of OPE1 2604 to guide the majority of the light to one exit edge (e.g., 2606), which is coupled into OPE2 2608.

Using such a system, the OPE (as a separate element) can be removed from the LOE 490 (e.g., see FIG. 10) and stretched into a separate layer 494 that covers the entire eyepiece or a significant portion thereof. Light is coupled into the LOE 490 and enters the separate large OPE 494 for multiplication as a controlled interface between the two optical elements. The light beam can stair-step through the OPE 494 and be multiplied on multiple interactions with elements of the OPE 494. Exit beamlets from the OPE 494 are not single beams, but rather multiple, superimposed beamlets from the beam splitting by the OPE 494.

Using this design can also create a large region including a smaller region in which all or most of the information/light energy is contained. Such a system can use depth switching mechanisms to route light to different layers (e.g., multiple depth plane layers). The layers can be polymer dispersed liquid crystal ("PDLC") switchable layers. Alternatively, the layers can be waveguides with respective LC shutters. Such a system can use TIR based structures from a main LOE to generate multiple exit ports for redundant optical information that can be selected by LC shutter or PDLC swatches. In some embodiments, a single OPE can feed light/optical information to multiple EPE layers (e.g., EPEs corresponding to red, green, and blue light).

Figure 27:
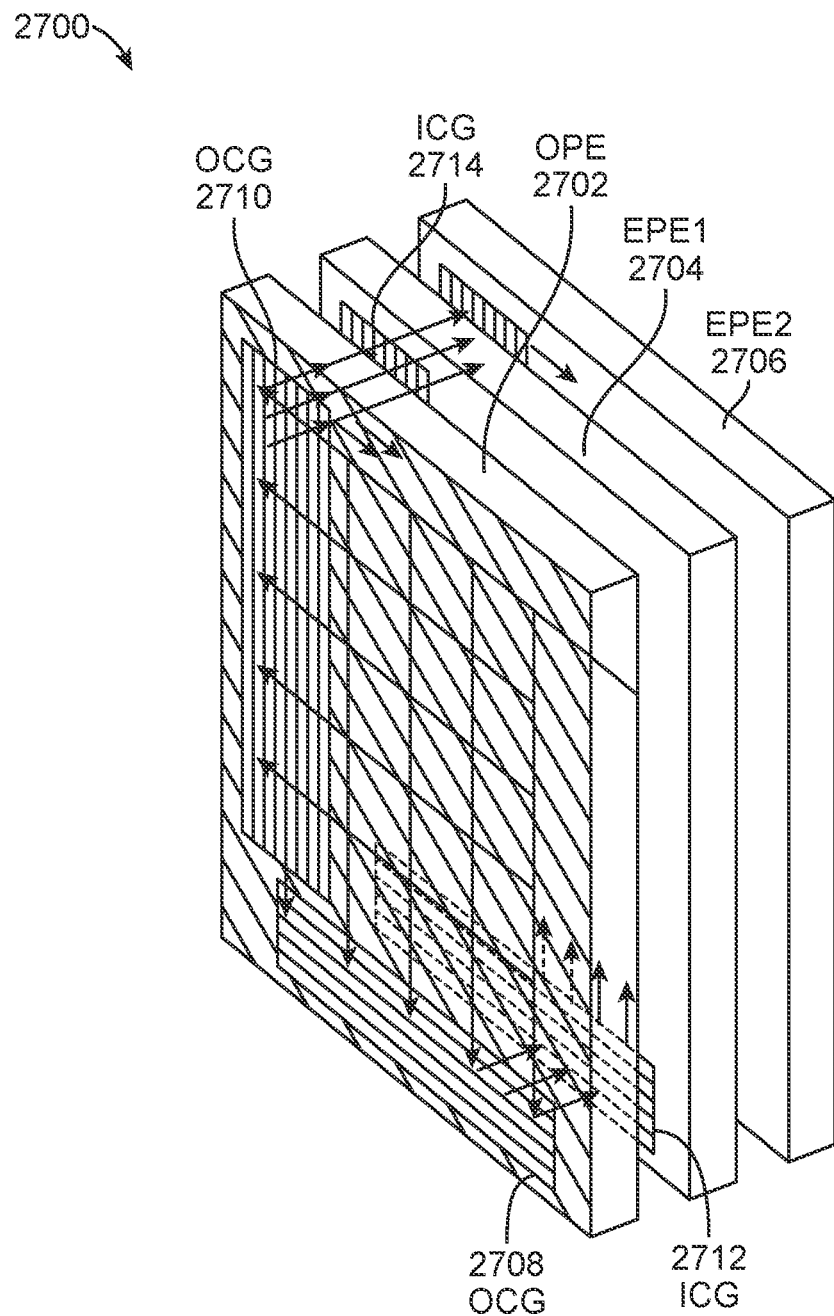
Figure 28:
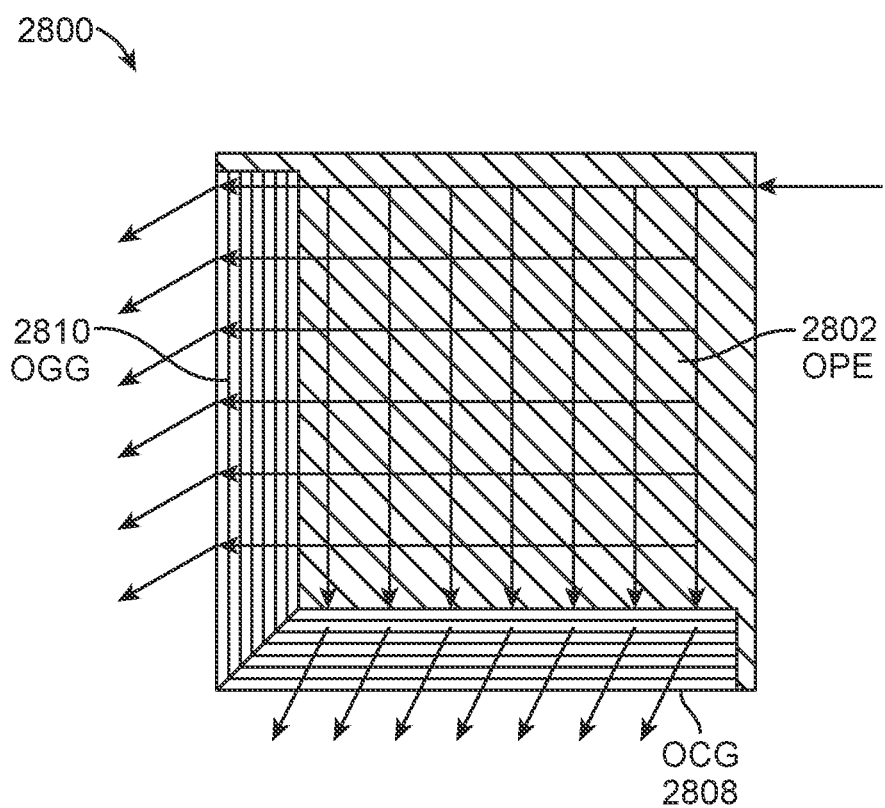

FIG. 27 depicts a beam multiplier 2700 wherein a single OPE 2702 feeds light/optical information to 2 EPE layers 2704, 2706 using 2 spatially displaced OCGs 2708, 2710. OCG1 2708 couples the OPE 2702 to EPE1 2704 through ICG1 2712. OCG2 2710 couples the OPE 2702 to EPE2 2706 through ICG2 2714. The OCGs 2708, 2710 can be PDLC, which can be turned on or off. Alternatively, an LC shutter layer (not shown) can be interposed between the OPE 2702 and the EPE layers 2704, 2706. In some embodiments, the number of EPE layers can be set to correspond to the number of multiple depth layers for an MR system. In alternative embodiments, a single OCG can be divided into multiple windows with shutters or switches to selectively feed light/optical information to a plurality of EPE layers. In another embodiment 2800 (FIG. 28), the OCGs 2808, 2810 can be formed at or from two exit edges of the OPE 2802.

Figure 29:
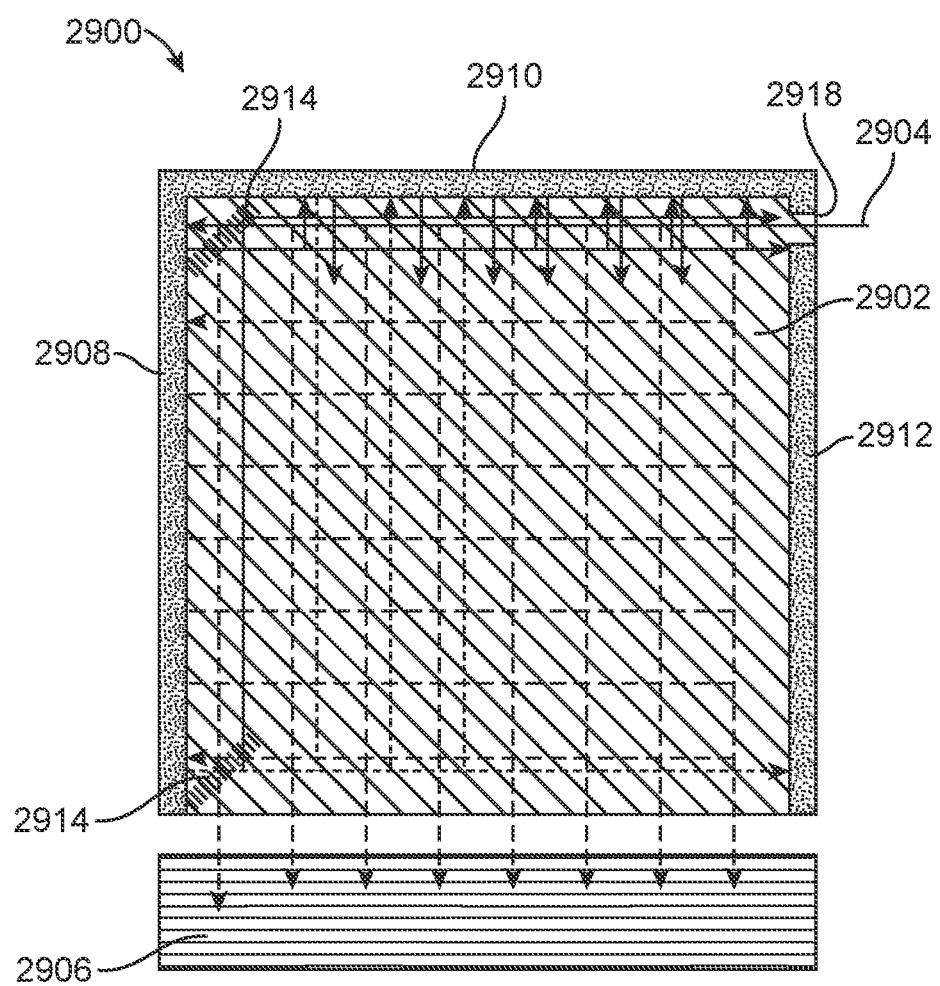

FIG. 29 depicts a beam multiplier 2900 with an OPE 2902 designed similar to a "hall of mirrors". In this independent, large OPE module 2902, an input/primary beam 2904 is multiplied by the OPE 2902 and multiplied beamlets exit the OPE 2902 via one or more OCGs 2906. Three of the four OPE edges 2908, 2910, 2912 may be polished and coated with aluminum to render them reflective. Two opposing mirrors 2908, 2912 reflect the beams and beamlets propagating through the OPE 2902, generating additional beamlets (with the same optical information) as the reflected beamlets interact with the OPE 2902. Such an OPE 2902 can be tuned to have a low diffraction efficiency toward the OCG 2906, but beam multiplication will be greatly increased with multiple passes through the OPE 2902. Optionally, the OPE 2902 may have one or more regions of relatively higher diffraction efficiency 2914 to facilitate beam multiplication by increasing the beam length through the OPE 2902 before beams/beamlets exit through the OCG 2906.

Figure 30:
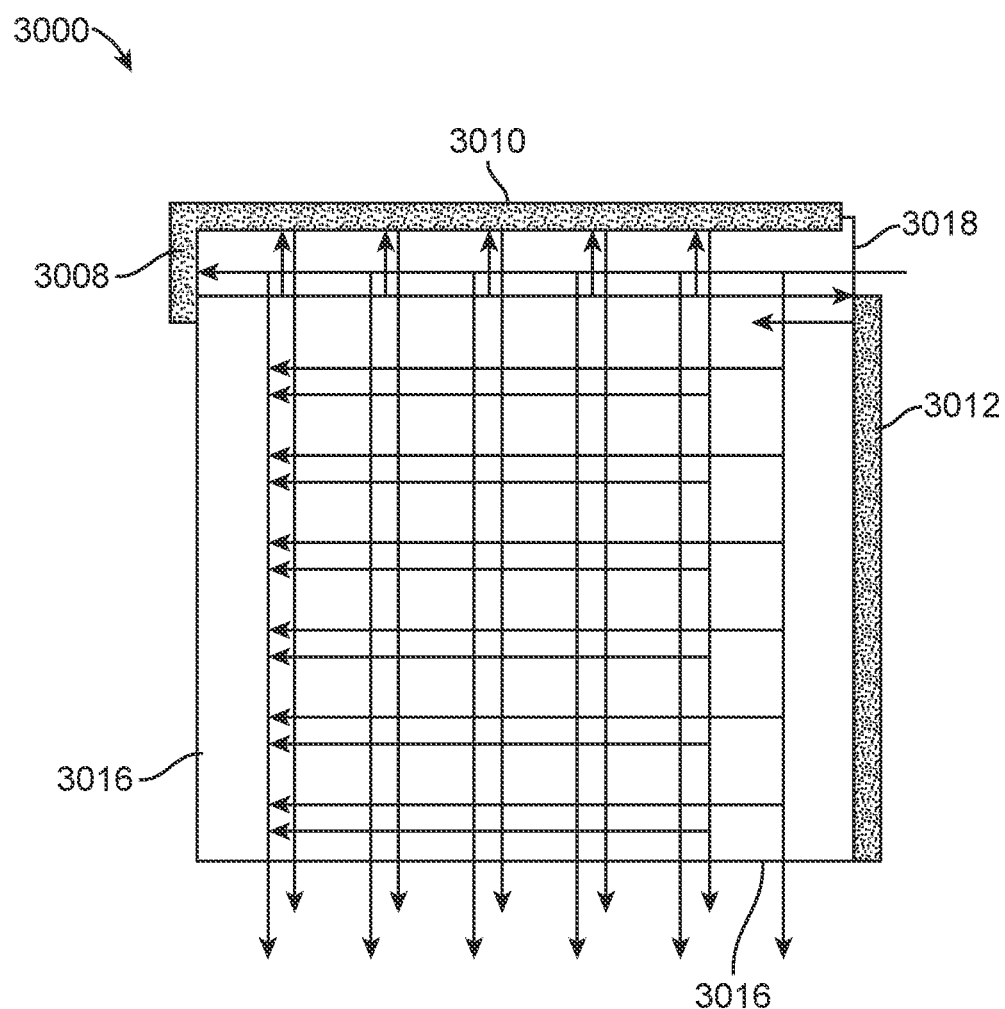

In a similar embodiment 3000 depicted in FIG. 30, only two of the edges 3010, 3012 (perpendicular edges) and a small portion of a third edge 3008 of the OPE 3002 are polished and coated with aluminum to render them reflective. This treatment results in reduced beamlet multiplication, but doubles the amount of area for exits 3016 (e.g., for OCGs (not shown)). This design increases the surface area 3016 for out-coupling.

For both of the embodiments depicted in FIGS. 29 and 30, the OPE 2902, 3002 can be optimized/tuned with variable diffraction efficiency. For instance, the upper left of regions in both of these embodiments can be tuned to diffract light in an up-and-down direction and to minimize light reflected back toward the ICG 2918, 3018, which may unintentionally couple out of the OPE 2902, 3002.

Figure 31:
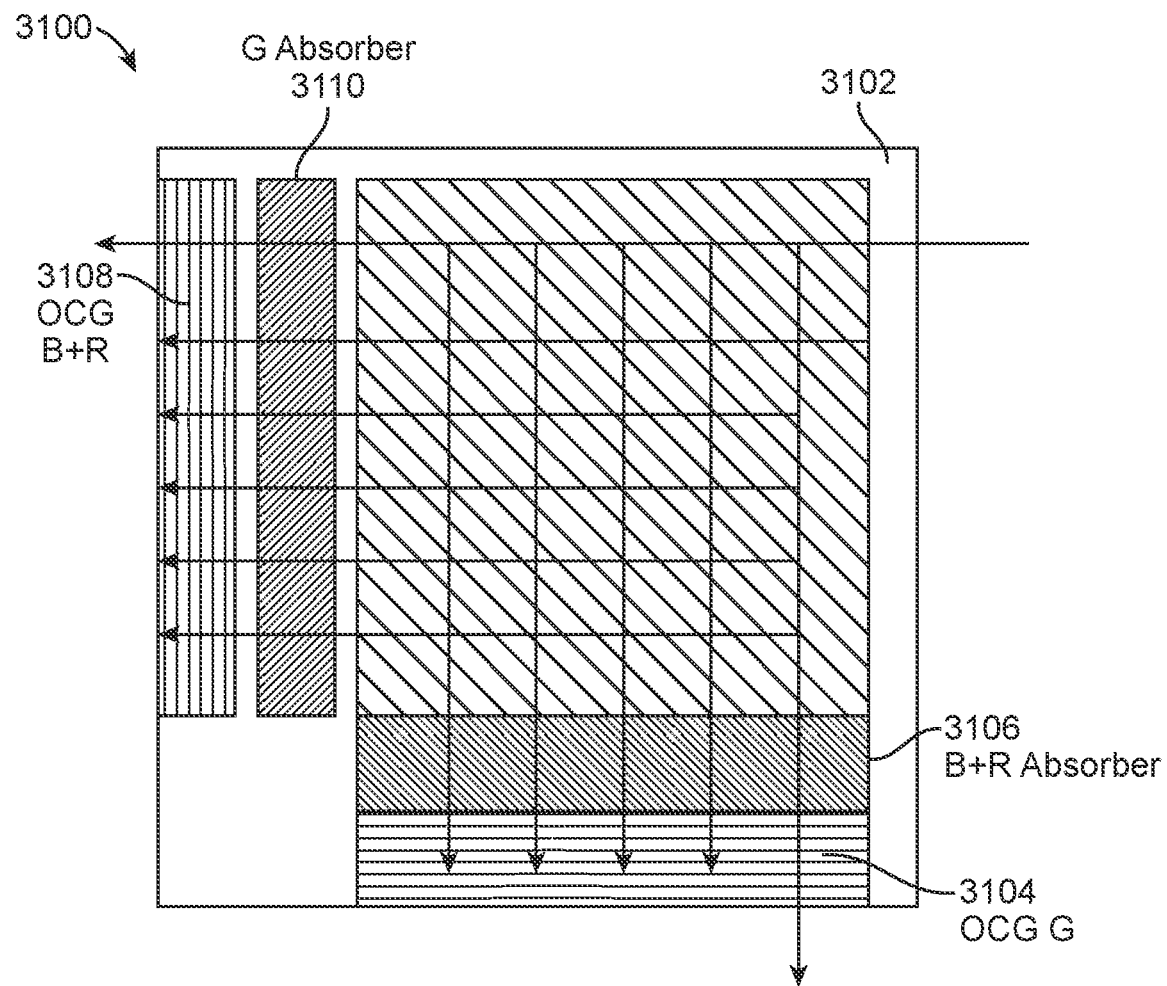

The beam multiplier 3100 depicted in FIG. 31 includes an OPE 3102 that is shared across wavelengths. A first OCG 3104 is tuned to out-couple green light with a blue and red light absorber 3106 coupled to the OCG 3104. A second OCG 3108 is tuned to out-couple blue and red (i.e., magenta) light with a green light absorber 3110 coupled to the OCG 3108.

Figure 32:
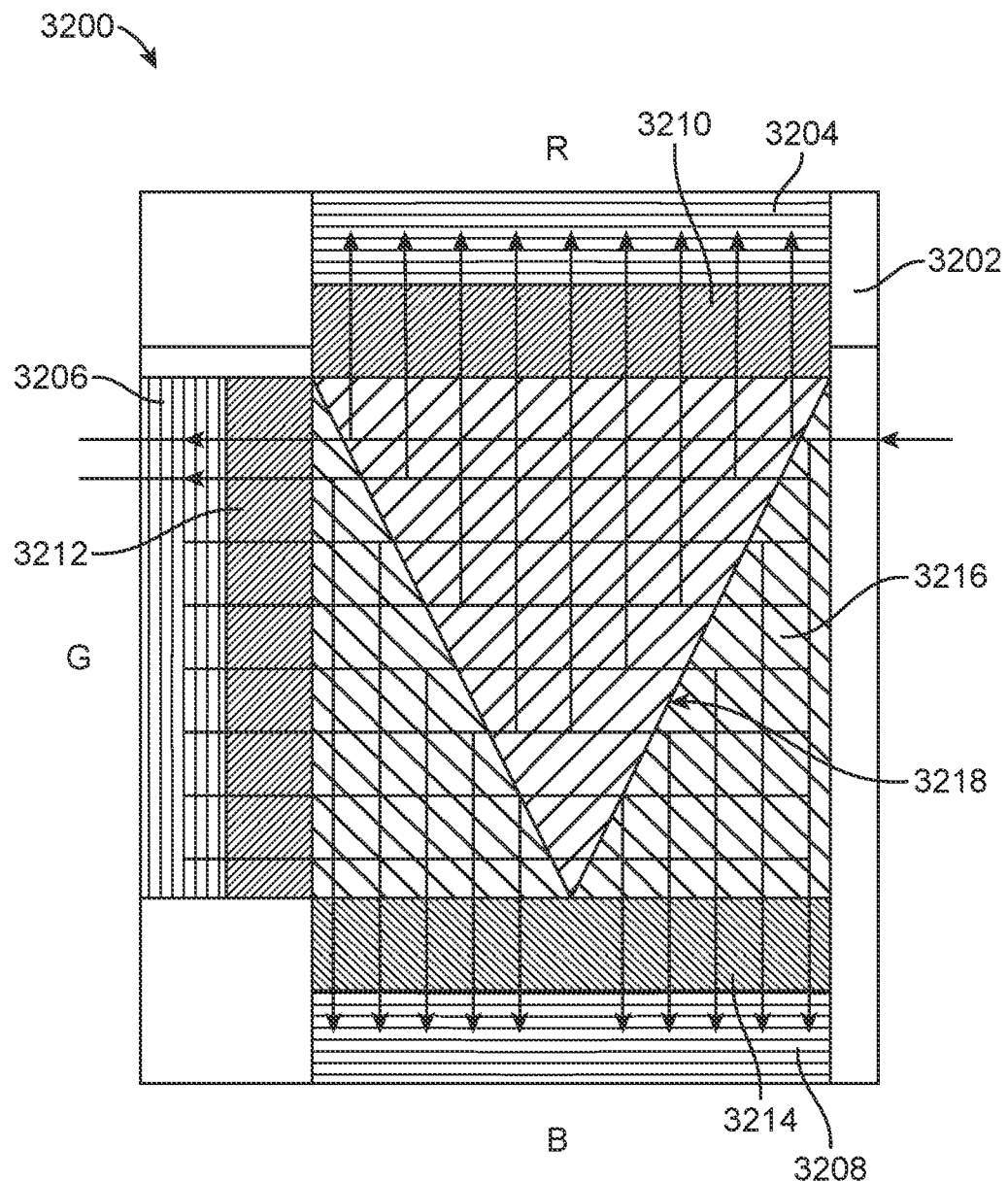

The beam multiplier 3200 depicted in FIG. 32 includes an OPE 3202 with three output regions 3204, 3206, 3208. The three output regions 3204, 3206, 3208 are tuned to respectively out-couple red 3204, green 3206, and blue 3208 light using OCGs 3204, 3206, 3208 with matching absorbers 3210, 3212, 3214. The DOEs 3216 in the OPE 3202 form a "V" shape 3218 with an approximately 90 degree angle, but the DOEs may form other shapes with different angles in other embodiments (e.g., to modify beamlet density (not shown)).

Figure 33F:
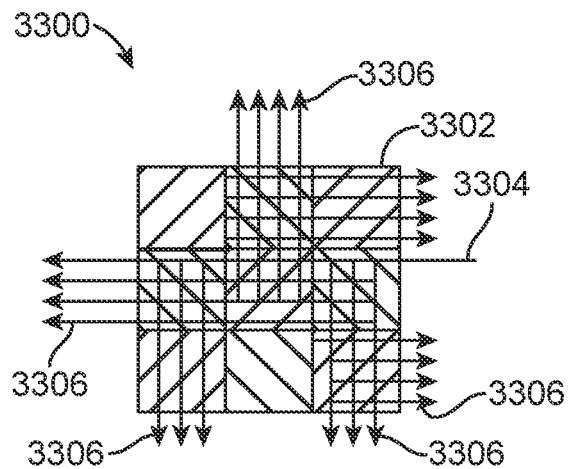
Figure 33G:
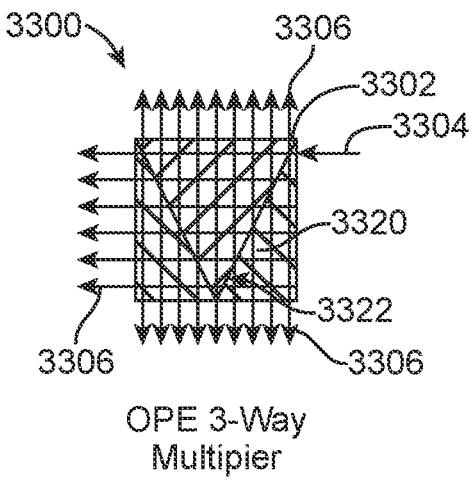
Figure 33H:
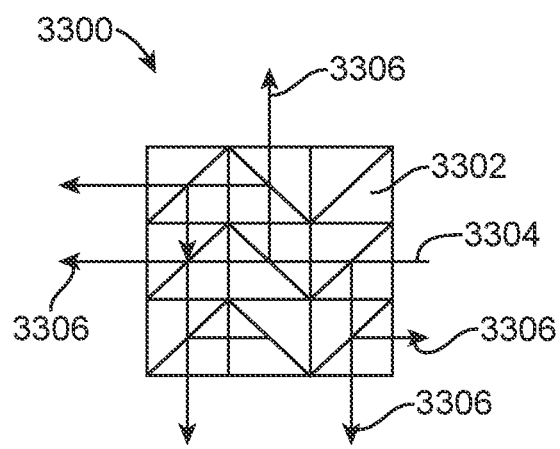
Figure 33I:
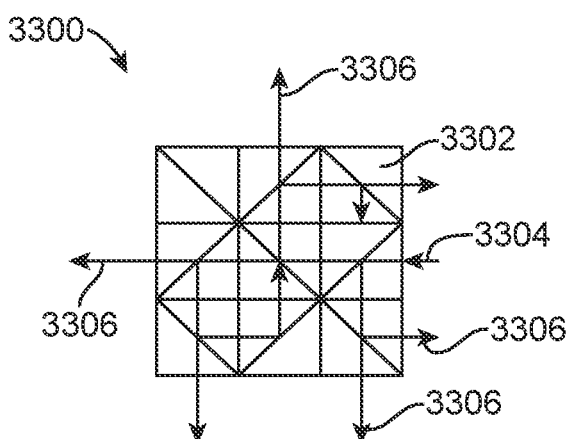

The beam multipliers 3300 depicted in FIGS. 33A-33I illustrate various "quilts" of different OPE 3302 regions that allow tuning of OPEs 3302 for various out-coupling patterns. In all of these OPEs 3302, a single input/primary beam 3304 is multiplied, diffracted, and/or reflected by various components of the OPEs 3302 to form various multiplied beams/beamlets 3306 having a variety of out-coupling patterns. For example, FIG. 33A depicts an OPE 3302 including three sections 3308, 3310, 3312 having different diffractive properties. The three sections may be independently switchable PDLC components (e.g., to change the out-coupling pattern) or they may be static components. FIG. 33C depicts an OPE 3302 having a diffractive section 3314 and first and second PDLC components 3316, 3318 (e.g., to change the out-coupling pattern). FIG. 33G depicts an OPE 3302 having DOEs 3320 in the OPE 3302 form a "V" shape 3322 similar to the OPE 3202 in FIG. 32.

Figure 34:
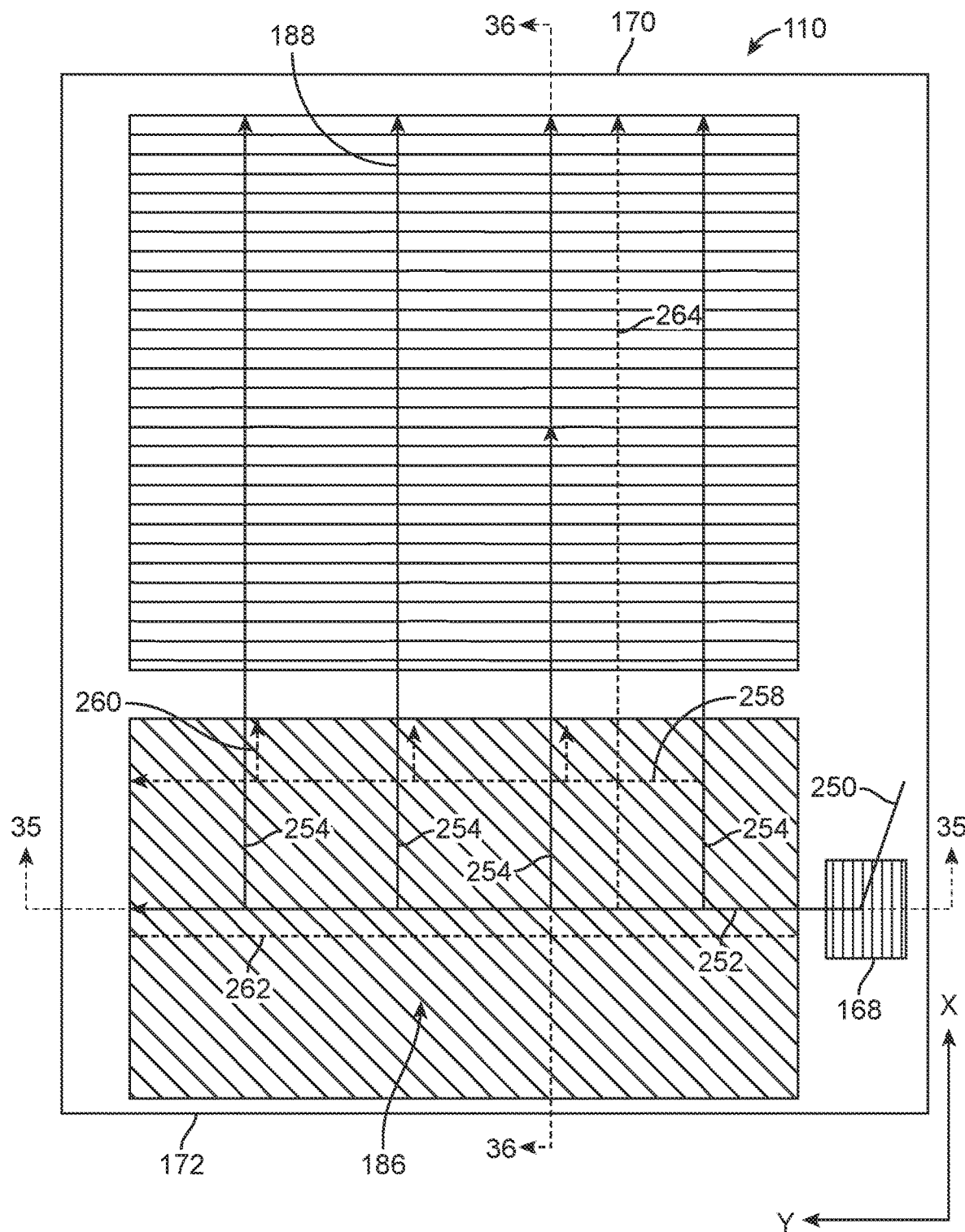
FIG. 34 is a plan view of some embodiments of the primary waveguide apparatus of FIG. 6.
Figure 35:
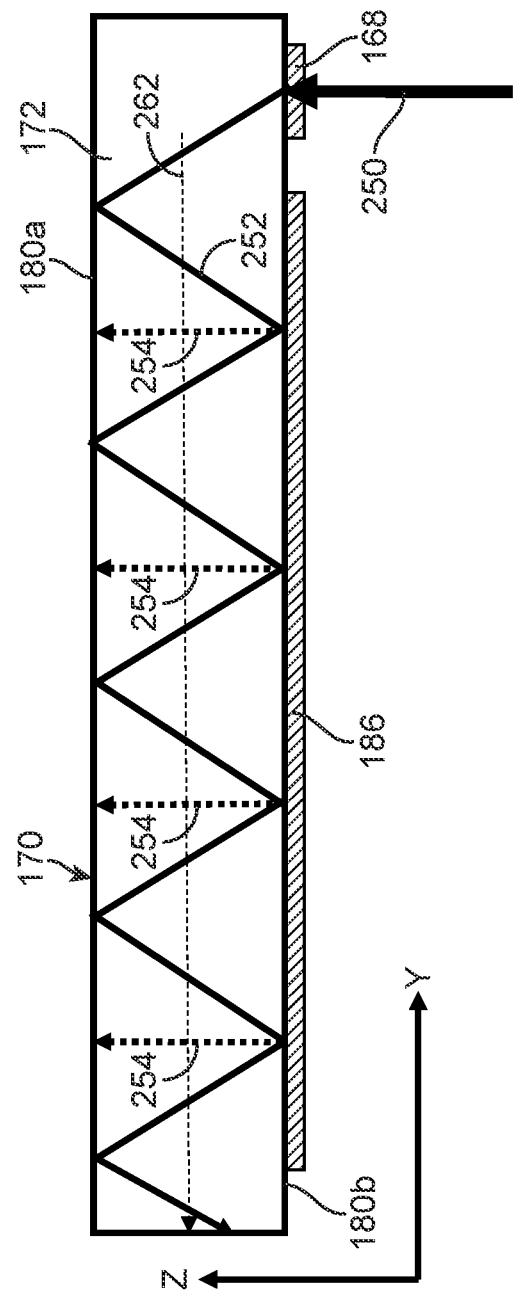
FIG. 35 is a cross-sectional view of the primary waveguide apparatus of FIG. 34, taken along the line 35-35.
Figure 36:
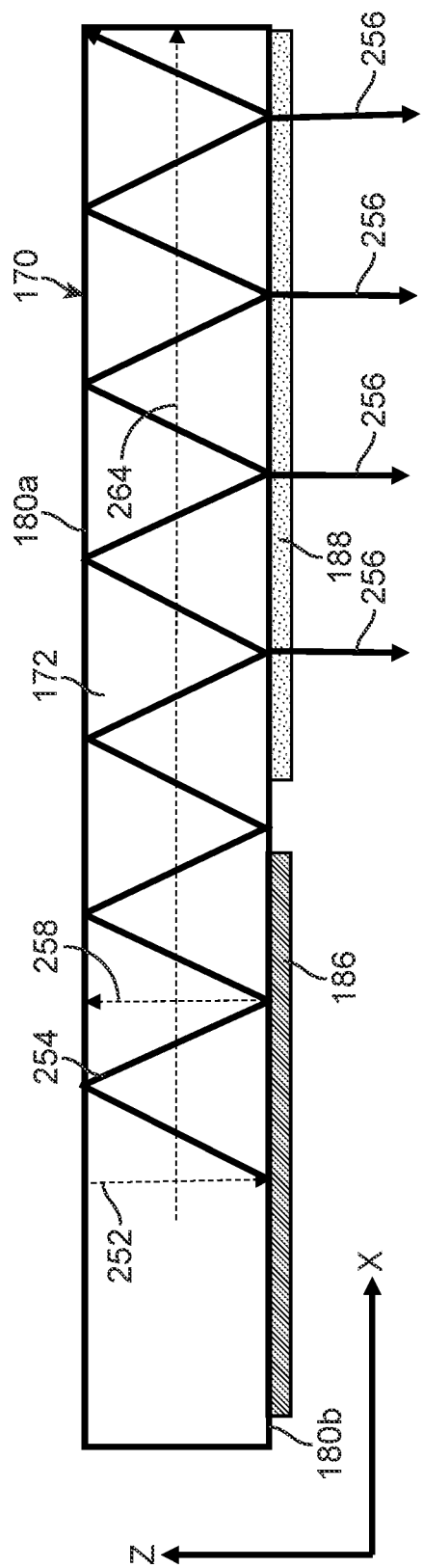
FIG. 36 is a cross-sectional view of the primary waveguide apparatus of FIG. 34, taken along the line 36-36.
Figure 37:
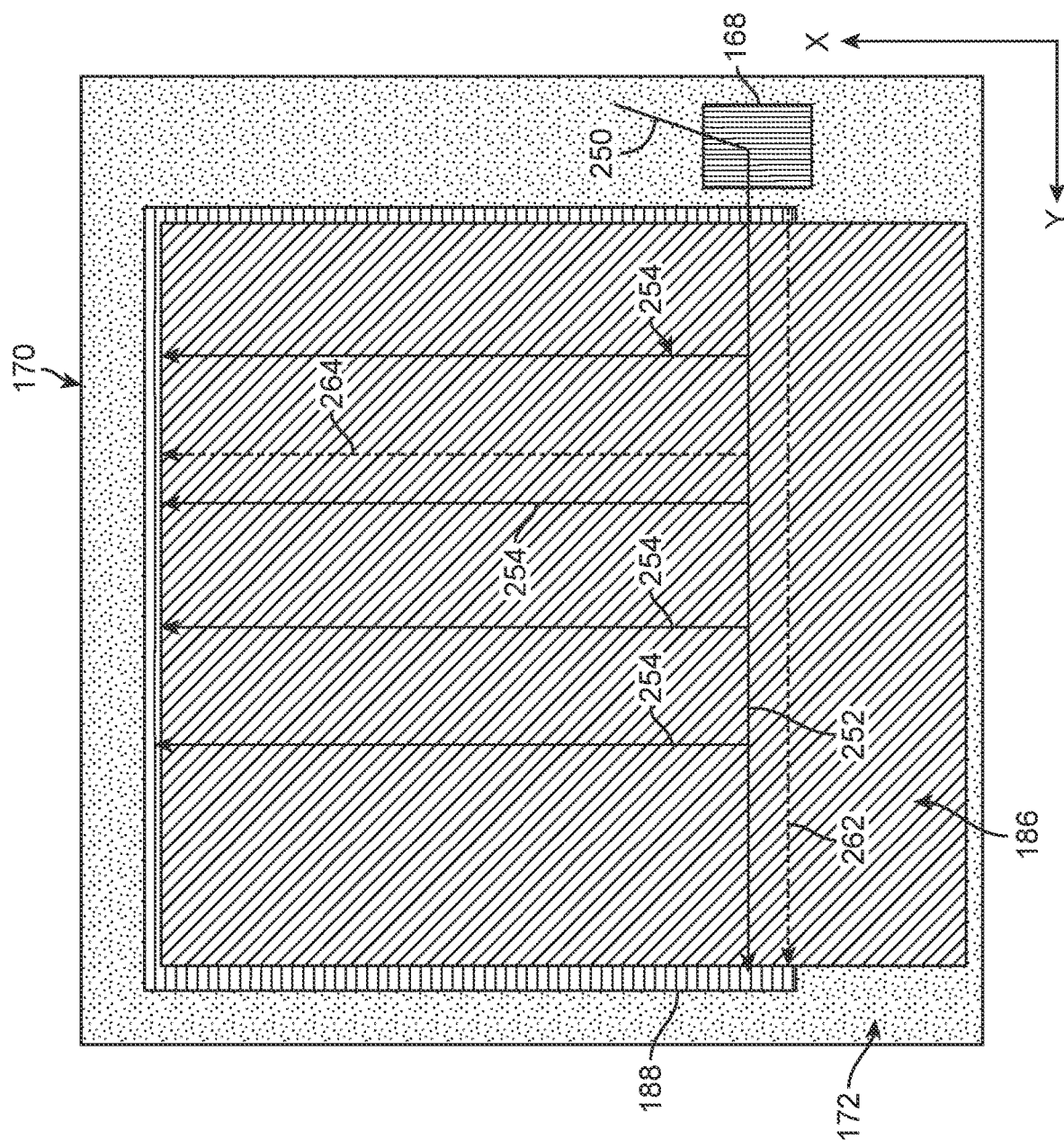
FIG. 37 is a plan view of another embodiment of the primary waveguide apparatus of FIG. 6.

Referring now to FIGS. 34-36, one specific embodiment of the display screen 110 will be described. As shown in FIG. 34, the waveguide 172 is a single unitary substrate or plane of an optically transparent material, such as, e.g., glass, fused silica, acrylic, or polycarbonate, although in alternative embodiments, the waveguide 172 may be composed of separate distinct substrates or panes of optically transparent material that are bonded together in the same plane or in different planes. The IC element 168 may be closely associated with (e.g., embedded in) the face 180b of the waveguide 172 for receiving the collimated light beam 250 from the image projection assembly 108 into the waveguide 172 via the face 180b, although in alternative embodiments, the IC element 168 may be associated with (e.g., embedded in) the other face 180a or even the edge of the waveguide 172 for coupling the collimated light beam 250 into the waveguide 172 as an in-coupled light beam. The DOE(s) 174 are associated with the waveguide 172 (e.g., incorporated within the waveguide 172 or abutting or adjacent one or more of the faces 180a, 180b of the waveguide 172) for, as briefly discussed above, two-dimensionally expanding the effective entrance pupil of the collimated light beam 250.

To this end, the DOE(s) 174 comprises an orthogonal pupil expansion (OPE) element 186 closely associated with (e.g., embedded in) the face 180b of the waveguide 172 for splitting the in-coupled light beam 252 into orthogonal light beamlets 254, and an exit pupil expansion (EPE) element 188 closely associated with (e.g., embedded in) the face 180b of the waveguide 172 for splitting the orthogonal light beamlets 254 into a set of out-coupled light beamlets 256 that exit the face 180b of the waveguide 172 towards the eye(s) 52 of the end user 50. In the alternative embodiment where the waveguide 172 is composed of distinct panes, the OPE element(s) 174 and EPE element 188 may be incorporated into different panes of the waveguide 172.

The OPE element 186 relays light along a first axis (horizontal or x-axis in FIG. 34), and expands the effective pupil of light along a second axis (vertical or y-axis in FIG. 34). In particular, as best shown in FIG. 35, the IC element 168 optically in-couples the collimated light beam 250 for propagation as an in-coupled light beam within the waveguide 172 via TIR along an internally reflective optical path parallel to an axis 262 (in this case, along the vertical or y-axis), and in doing so, repeatedly intersects the OPE element 186. In the illustrated embodiment, the OPE element 186 has a relatively low diffraction efficiency (e.g., less than 50%), and comprises a series of diagonal diffractive elements (forty-five degrees relative to the x-axis), such that, at each point of intersection with the OPE element 186, a portion (e.g., greater than 90%) of the in-coupled light beam 252 continues to propagate within the waveguide 172 via TIR along an internally reflective optical path parallel to the axis 262 (y-axis), and the remaining portion (e.g., less than 10%) of the in-coupled light beam 252 is diffracted as an orthogonal light beamlet 254 (shown as being dashed in FIG. 35) that propagates within the waveguide 172 via TIR along an internally reflective optical path parallel to the axis 264 (in this case, along the horizontal or x-axis) toward the EPE element 188. It should be appreciated that although the axis 264 is described as being perpendicular or orthogonal to the axis 262 (y-axis), the axis 264 may alternatively be obliquely oriented with respect to axis 262 (y-axis).

In a similar fashion, at each point of intersection with the OPE element 186, a portion (e.g., greater than 90%) of each orthogonal light beamlet 254 continues to propagate in the waveguide 172 via TIR along the respective internally reflective optical path parallel to the axis 264 (x-axis), and the remaining portion (e.g., less than 10%) of the respective orthogonal light beamlet 254 is diffracted as secondary light beamlets 256 that propagate within the waveguide 172 via TIR along respective internally reflective optical paths (shown by dashed lines) parallel to the axis 262 (y-axis). In turn, at each point of intersection with the OPE element 186, a portion of (e.g., greater than 90%) of each secondary light beamlet 256 continues to propagate in the waveguide 172 via TIR along a respective internally reflective optical path parallel to the axis 262 (y-axis), and the remaining portion (e.g., less than 10%) of the respective secondary light beamlet 256 is diffracted as tertiary light beamlets 258 that combine in phase with the orthogonal light beamlets 254 and propagate within the waveguide 172 via TIR along respective internally reflective optical paths parallel to the axis 264 (x-axis).

Thus, by dividing the in-coupled light beam 252 into multiple orthogonal light beamlets 254 that propagate within the waveguide 172 via TIR along respective internally reflective optical paths parallel to the axis 264 (x-axis), the entrance pupil of the collimated light beam 250 in-coupled into the display screen 110 is expanded vertically along the y-axis by the OPE element 186.

The EPE element 188, in turn, further expands the light's effective exit pupil along the first axis (horizontal x-axis in FIG. 36). In particular, as best shown in FIG. 36, the EPE element 188, like the OPE element 186, has a relatively low diffraction efficiency (e.g., less than 50%), such that, at each point of intersection with the EPE element 188, a portion (e.g., greater than 90%) of each orthogonal light beamlet 254 continues to propagate within the waveguide 172 respectively along an respective internally reflective optical path parallel to the axis 264 (x-axis), and the remaining portion of each orthogonal light beamlet 254 is diffracted as an out-coupled light beamlet 256 that exits the face 180b of the waveguide 172 (along the z-axis), as illustrated in FIG. 36. That is, every time a light beamlet hits the EPE element 188, a portion of it will be diffracted toward the face 180b of the waveguide 172, while the remaining portion will continue to propagate within the waveguide 172 via TIR along an internally reflective optical path parallel to the axis 264 (x-axis).

Thus, by dividing each orthogonal light beamlet 254 into multiple out-coupled light beamlets 256, the entrance pupil of the collimated light beam 250 is further expanded horizontally along the x-axis by the EPE element 188, resulting in a two-dimensional array of out-coupled light beamlets 256 that resemble a larger version of the original in-coupled light beam 252.

Figure 38:
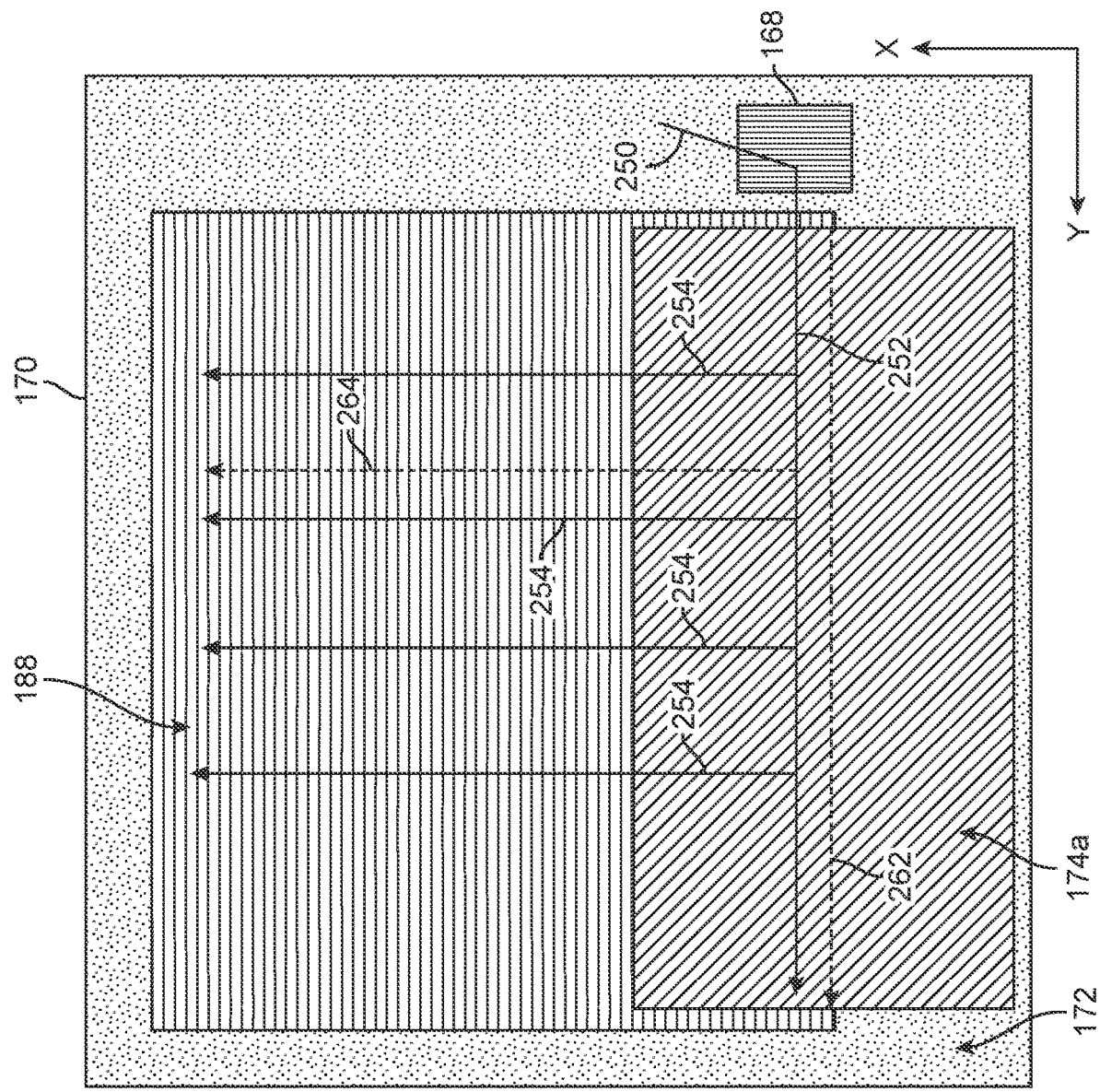
FIG. 38 is a plan view of still another embodiment of the primary waveguide apparatus of FIG. 6.

Although the OPE element 186 and EPE element 188 are illustrated in FIG. 34 as non-overlapping in the x-y plane, the OPE element 186 and EPE element 188 may overlap each other in the x-y plane, as illustrated in FIG. 39, or may partially overlap each other in the x-y plane, as illustrated in FIG. 38. In both cases, like in the embodiment illustrated in FIG. 34, the OPE element 186 will split the in-coupled light beam 252 that propagates within the waveguide 172 via TIR along an internally reflective optical path parallel to the axis 262 (y-axis) into orthogonal light beamlets 254 that propagate within the waveguide 172 via TIR along respective internally reflective optical paths parallel to the axis 264 (x-axis). In these cases, the OPE element 186 and EPE element 188 will need to be respectively disposed on opposite faces 180a, 180b of the waveguide 172.

Figure 39C:
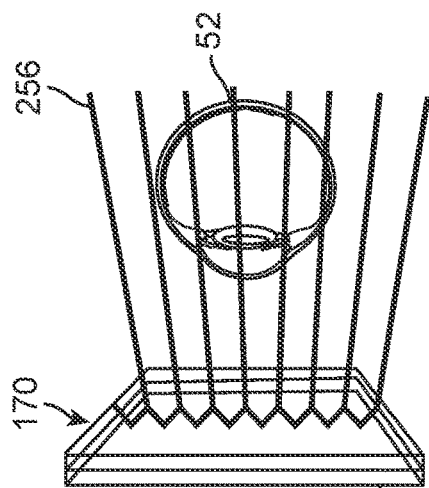
FIGS. 39A-39C are perspective views of the primary waveguide apparatus of FIG. 34, particularly showing the emission of out-coupled light beamlets at different focal planes.
Figure 39B:
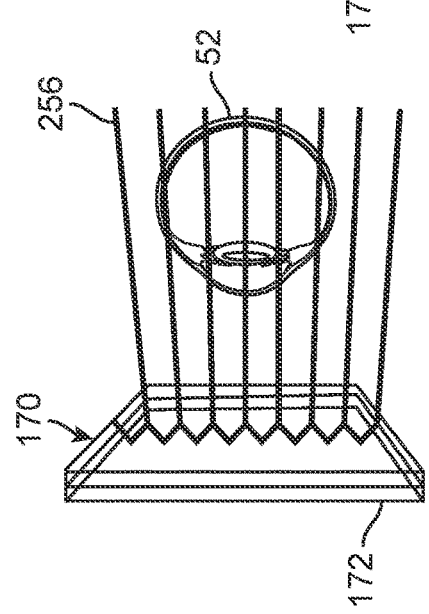
Figure 39A:
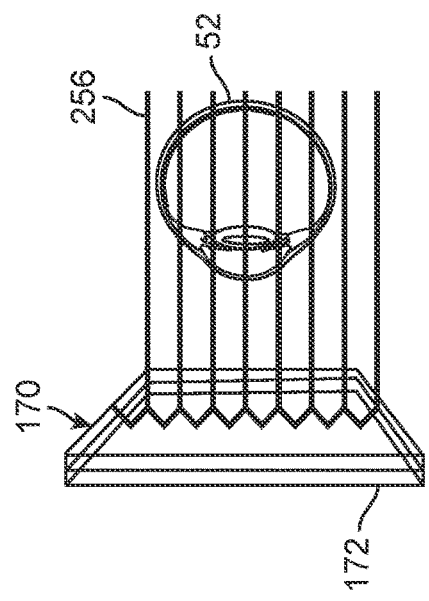

In addition to the function of out-coupling the light beamlets 256 from the face 180b of the waveguide 172, the EPE element 188 serves to focus the output set of light beamlets 256 at along a given focal plane, such that a portion of an image or virtual object is seen by end user 50 at a viewing distance matching that focal plane. For example, if the EPE element 188 has only a linear diffraction pattern, the out-coupled light beamlets 256 exiting the face 180b of the waveguide 172 toward the eye(s) 52 of the end user 50 will be substantially parallel, as shown in FIG. 39A, which would be interpreted by the brain of the end user 50 as light from a viewing distance (focal plane) at optical infinity. However, if the EPE element 188 has both a linear diffraction pattern component and a radially symmetric diffraction pattern component, the out-coupled light beamlets 256 exiting the face 180b of the waveguide 172 will be rendered more divergent from the perspective of the eye(s) 52 of the end user 50 (i.e., a convex curvature will be imparted on the light wavefront), and require the eye(s) 52 to accommodate to a closer distance to bring the resulting image into focus on the retina and would be interpreted by the brain of the end user 50 as light from a viewing distance (e.g., four meters) closer to the eye(s) 52 than optical infinity, as shown in FIG. 39B. The out-coupled light beamlets 256 exiting the face 180b of the waveguide 172 can be rendered even more divergent from the perspective of the eye(s) 52 of the end user 50 (i.e., a more convex curvature will be imparted on the light wavefront), and require the eye(s) 52 to accommodate to an even closer distance to bring the resulting image into focus on the retina and would be interpreted by the brain of the end user 50 as light from a viewing distance (e.g., 0.5 meters) closer to the eye(s) 52, as shown in FIG. 39C.

Although the waveguide apparatus 170 has been described herein as having only one focal plane, it should be appreciated that multiple planar optical waveguides 172 with associated OPEs 176 and EPEs 178 can be used to simultaneously or sequentially generate images at multiple focal planes, as discussed in U.S. Patent Publication Nos. 2015/0309264 and 2015/0346490, which are expressly incorporated herein by reference.

Figure 40A:
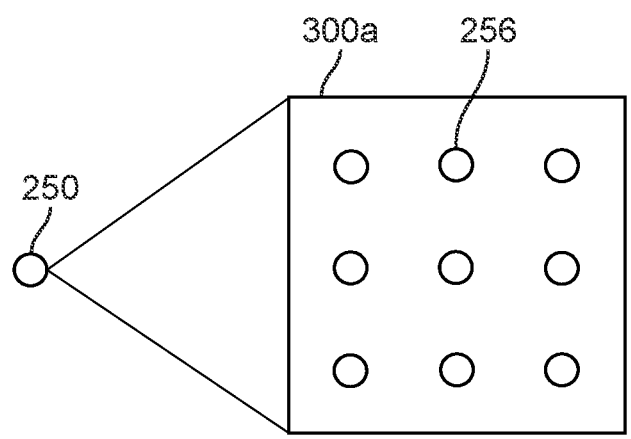
FIG. 40A is a conceptual view of a relatively sparse exit pupil of a waveguide apparatus of a display screen.
Figure 40B:
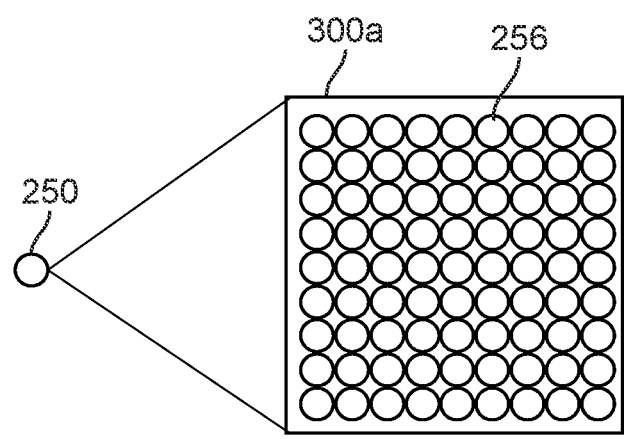
FIG. 40B is a conceptual view of a relatively dense exit pupil of a modified embodiment of the primary waveguide apparatus of FIG. 34.

As previously described, it is desirable to increase the saturation or in-fill of the exit pupil of the display screen 110. Without modification, the exit pupil of the display screen 110 may not be optimally saturated. For example, as illustrated in FIG. 40A, the pupil of the collimated light beam 250 may be expanded to an exit pupil 300a of a 3×3 array of out-coupled light beamlets 256, which are relatively sparse in nature (i.e., the gaps between the out-coupled light beamlets 256 are relatively large). However, the display screen 110 may be enhanced with beam-multiplication features, such that the pupil of the collimated light beam 250 is expanded to an exit pupil 300b of a more saturated 9×9 array of out-coupled light beamlets 256, as illustrated in FIG. 40B.

For example, in some embodiments, two OPEs 186 are employed to double the number of orthogonal light beamlets 254 obtained from the in-coupled light beam 252, and thus, double the saturation of the two-dimensional array of out-coupled light beamlets 256 that exit the face 180b of the waveguide 172.

Figure 41:
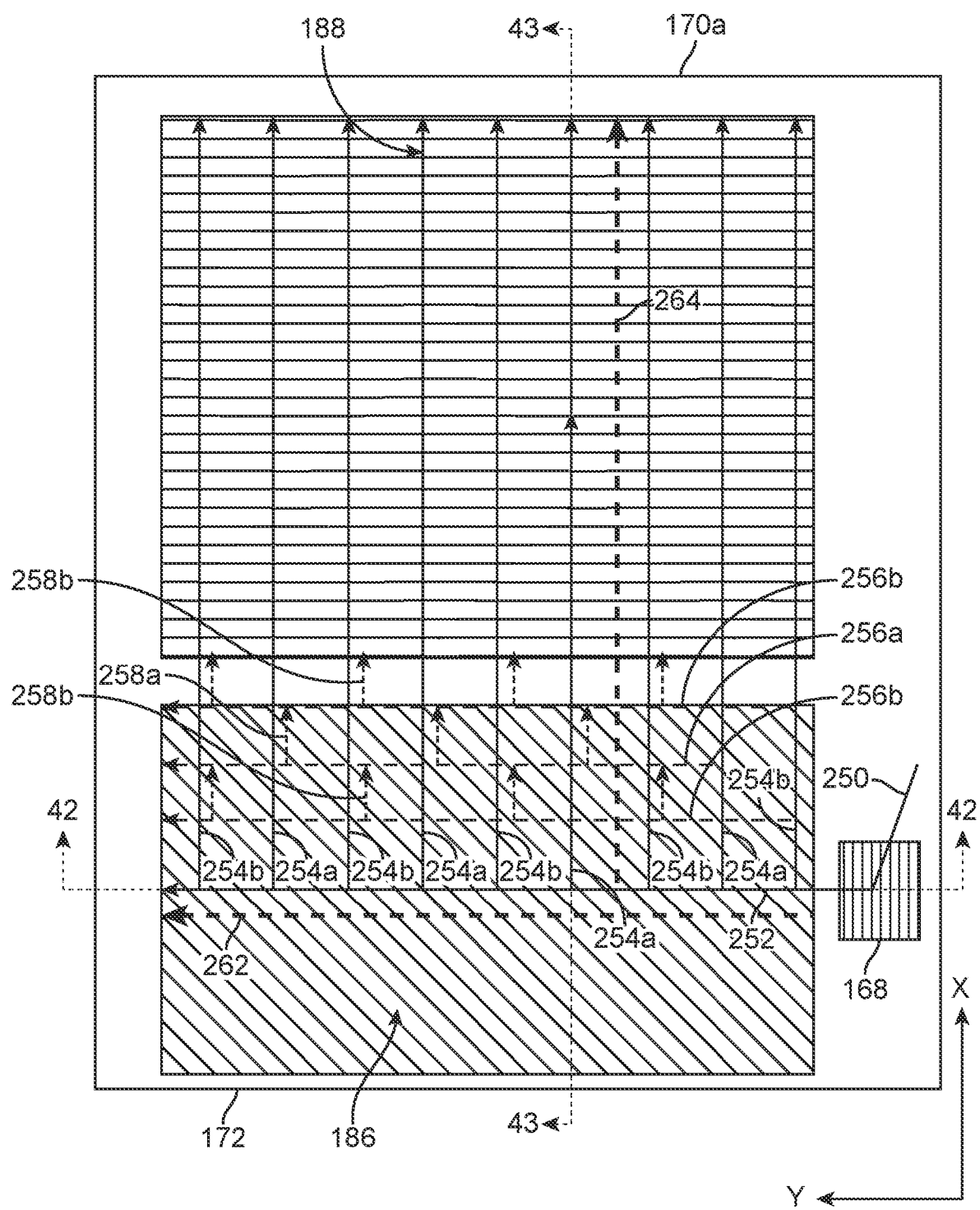
FIG. 41 is a plan view of some embodiments of the modified primary waveguide apparatus of FIG. 40B.
Figure 42:
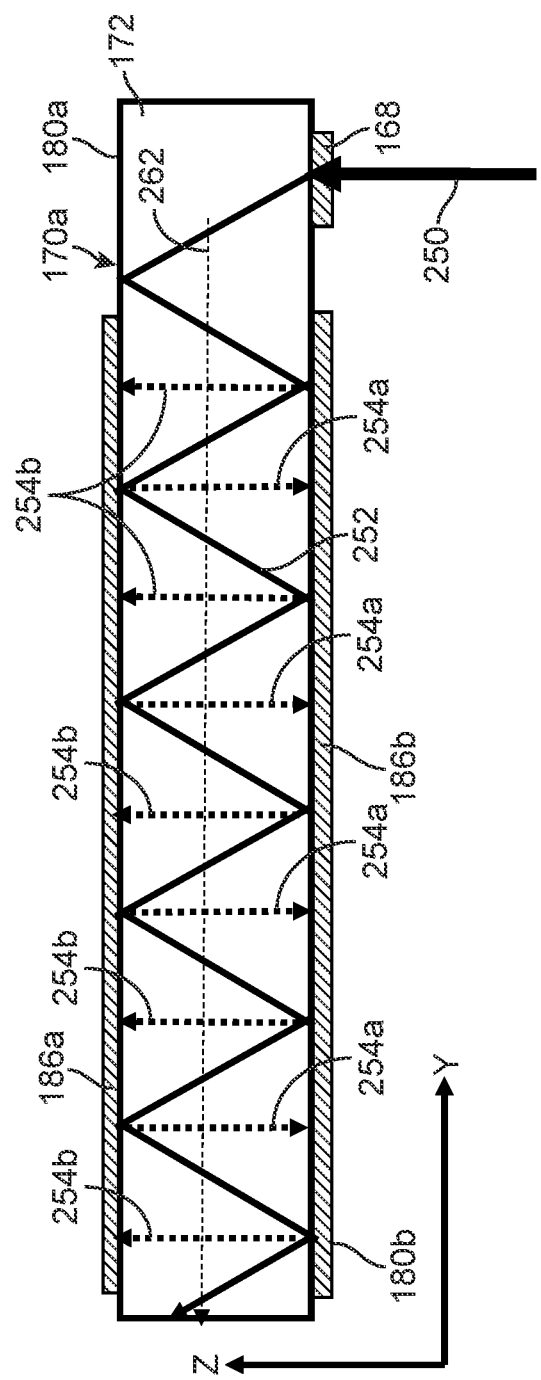
FIG. 42 is a cross-sectional view of the primary waveguide apparatus of FIG. 41, taken along the line 42-42.
Figure 43:
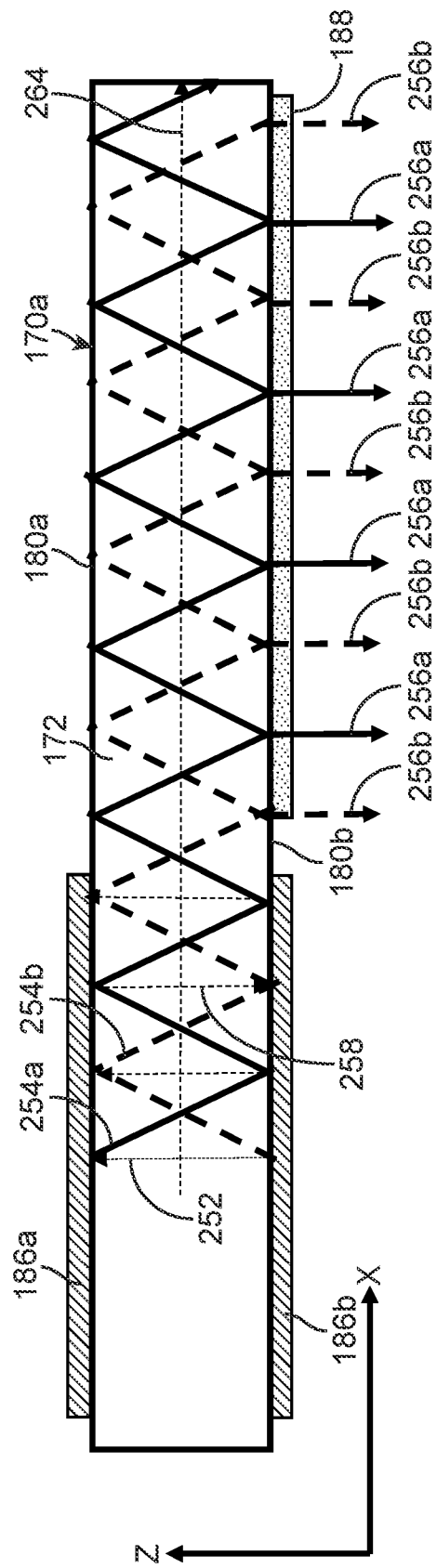
FIG. 43 is a cross-sectional view of the primary waveguide apparatus of FIG. 41, taken along the line 43-43.

In particular, as shown in FIGS. 41-43, a waveguide apparatus 170a is similar to the waveguide apparatus 170 described, with the exception that the waveguide apparatus 170a comprises a first OPE element 186a disposed adjacent (e.g., on) the first face 180a of the waveguide 172 for splitting the in-coupled light beam 252 propagating within the waveguide 172 via TIR along an internally reflecting optical path parallel to the axis 262 (y-axis) into a first set of orthogonal light beamlets 254a for propagation within the waveguide 172 via TIR along respective internally reflecting optical paths parallel to the axis 264 (x-axis) (best shown in FIG. 41), and a second OPE element 186b disposed adjacent (e.g., on) the second face 180b of the waveguide 172, for splitting the in-coupled light beam 252 propagating within the waveguide 172 via TIR along an internally reflecting optical path parallel to the axis 262 (y-axis) into a second set of orthogonal light beamlets 254b for propagation within the waveguide 172 via TIR along respective internally reflecting optical paths parallel to the axis 264 (x-axis). As best shown in FIG. 41, the first and second sets of orthogonal light beamlets 254a, 254b alternate with each other.

That is, because the in-coupled light beam 252 propagating within the waveguide 172 via TIR along the internally reflective optical path parallel to the axis 262 (y-axis) alternately intersects the first and second OPE elements 186a, 186b on the opposite faces 180a, 180b of the waveguide 172, portions of the in-coupled light beam 252 are respectively diffracted as the first and second primary sets of light beamlets 254a, 254b for propagation within the waveguide 172 via TIR along alternating internally reflective optical paths parallel to the axis 264 (x-axis). Secondary light beamlets 256a, 256b (shown in FIGS. 41 and 42) are also respectively generated from the beamlets 254a, 254b, which further creates tertiary light beamlets 258a, 258b (shown only in FIG. 41) that respectively combine in phase with the orthogonal light beamlets 254a, 254b. In turn, the first and second primary sets of light beamlets 254a, 254b intersect the EPE element 188 on the face 180b of the waveguide 172, portions of which are respectively diffracted as a first set of out-coupled light beamlets 256a and a second set of out-coupled light beamlets 256b that exit the face 180b of the waveguide 172. Thus, the doubling of the orthogonal light beamlets 254 correspondingly increases the saturation of the exit pupil 300a expanded by the display screen 110 (shown in FIG. 40B).

In another embodiment, partially reflective interfaces are incorporated into the waveguide 172 to increase the number of light beamlets propagating within the waveguide 172, and thus, increase the saturation of the two-dimensional array of out-coupled light beamlets 256 exiting the face 180b of the waveguide 172. In the embodiments illustrated below, the waveguide 172 comprises a plurality of layered substrates having at least one pair of adjacent substrates and a semi-reflective interface between each of the pair(s) of adjacent substrates, such that a light beam that intersects each semi-reflective interface is split into multiple beamlets that propagate within the waveguide 172 via TIR, thereby increasing the density of the out-coupled light beamlets exiting the face 180b of the waveguide 172. It should be noted that the adjacent substrates described below are not drawn to scale and are illustrated as being multiples of each other for purposes of simplicity. However, adjacent substrates may be, and preferably are, non-multiples of each other, such that the density of the in-fill of out-coupled light beamlets exiting the face of the waveguide is maximized.

Figure 44:
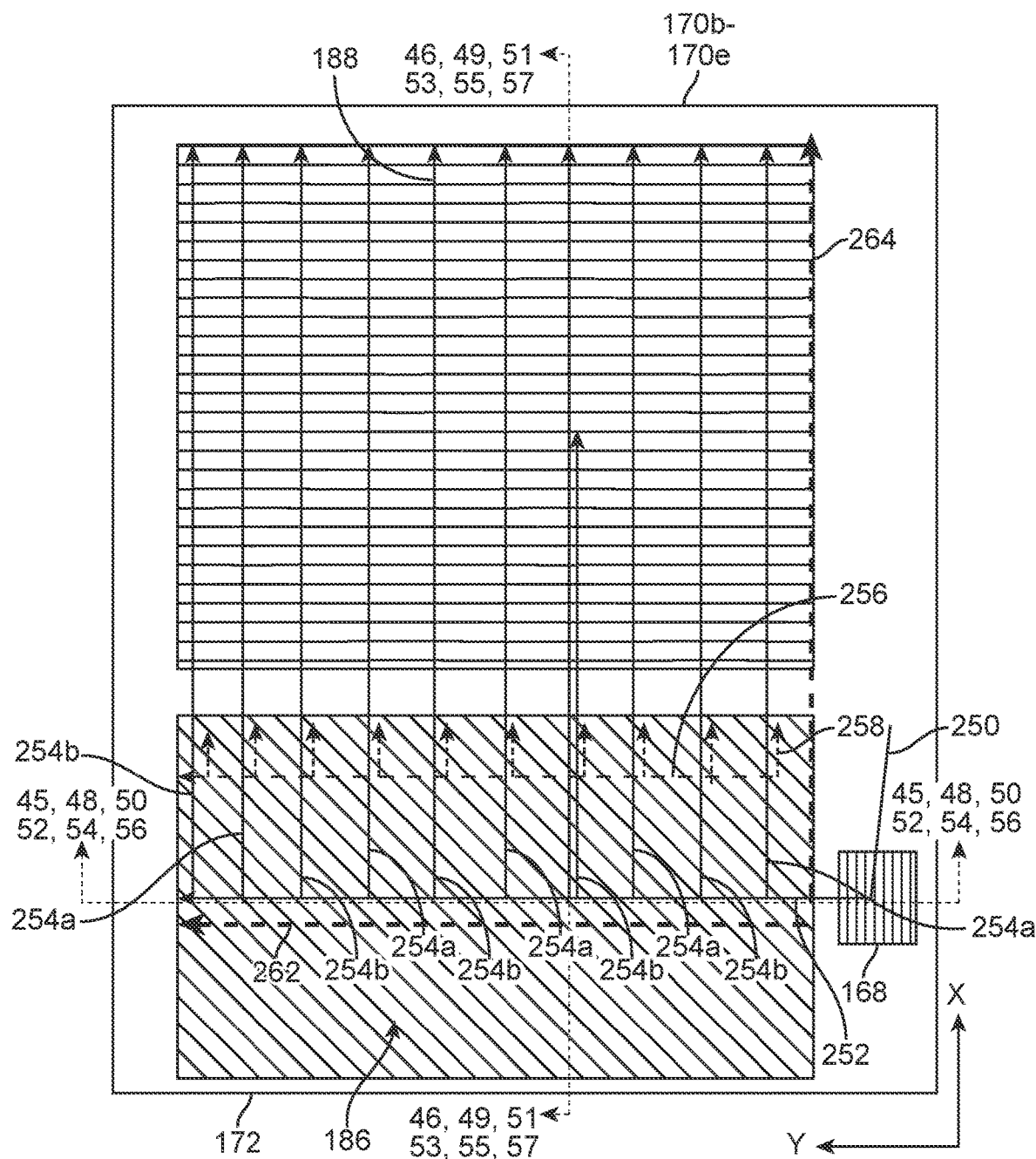
FIG. 44 is a plan view of another embodiment of the modified primary waveguide apparatus of FIG. 40B.
Figure 45:
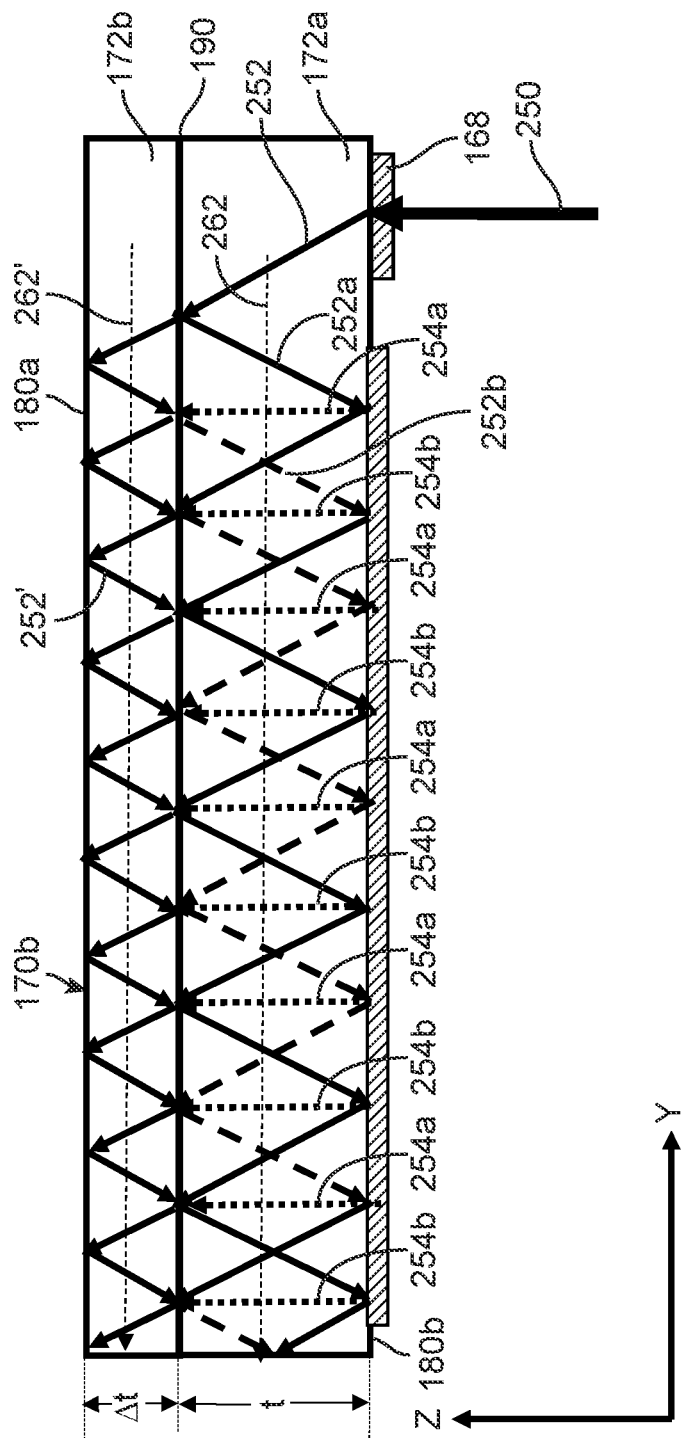
FIG. 45 is a cross-sectional view of a first variation of the primary waveguide apparatus of FIG. 44, taken along the line 45-45.
Figure 46:
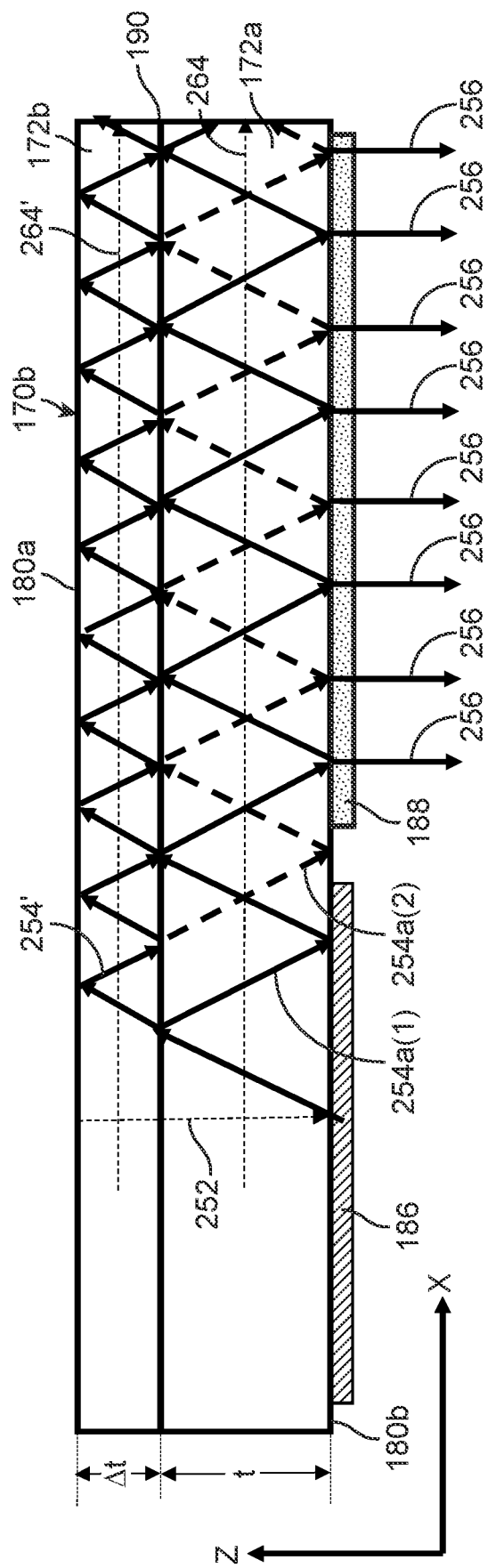
FIG. 46 is a cross-sectional view of the first variation primary waveguide apparatus of FIG. 44, taken along the line 46-46.

In particular, and with reference to FIGS. 44-46, a waveguide apparatus 170b is similar to the waveguide apparatus 170 described, with the exception that the waveguide 172 is a composite substrate composed of a primary waveguide 172a and secondary waveguide 172b. The waveguide apparatus 170b further comprise a semi-reflective interface 190 disposed between the primary waveguide 172a and secondary waveguide 172b.

In some embodiments, the semi-reflective interface 190 takes the form of a semi-reflective coating, such as one composed of, e.g., a metal, such as gold, aluminum, silver, nickel-chromium, chromium, etc., a dielectric, such as oxides, fluorides, sulfides, etc., a semiconductor, such as silicon, germanium, etc., and/or a glue or adhesive with reflective properties can be disposed between the primary waveguide 172a and secondary waveguide 172b via any suitable process, such as physical vapor deposition (PVD), ion-assisted deposition (IAD), ion beam sputtering (IBS), etc. The ratio of reflection to transmission of the semi-reflective coating 190 may be selected or determined based at least in part upon the thickness of the coating 190, or the semi-reflective coating 190 may have a plurality of small perforations to control the ratio of reflection to transmission. In an alternative embodiment, the primary waveguide 172a and secondary waveguide 172b are composed of materials having different indices of refraction, such that the interface between the waveguides 172a, 172b are semi-reflective for light that is incident on the semi-reflective interface of less than a critical angle (i.e., the incidence angle at which a portion of the light is transmitted through the semi-reflective interface, and the remaining portion of the light is reflected by the semi-reflective interface). The semi-reflective interface 190 is preferably designed, such that the angle of a light beam incident on the semi-reflective interface 190 is preserved.

In any event, as best shown in FIG. 45, the IC element 168 couples the collimated light beam 250 into the planar optical waveguide 172 as an in-coupled light beam 252, which propagates within the waveguide 172 via TIR along an internally reflective optical path parallel to the axis 262 (y-axis). The semi-reflective interface 190 is configured for splitting the in-coupled light beam 252 into multiple in-coupled light beamlets.

In particular, the semi-reflective interface 190 is configured for splitting the in-coupled light beam 252 into two primary in-coupled light beamlets (in this case, a first primary in-coupled light beamlet 252*a* (shown by a solid line) and a second primary in-coupled light beamlet 252*b* (shown by a dashed line) that propagate within the primary waveguide 172*a* along an internally reflective optical path parallel to the axis 262 (y-axis). As shown in FIG. 45, the semi-reflective interface 190 generates a secondary in-coupled light beamlet 252' that propagates within the secondary waveguide 172*b* via TIR along an internally reflective optical path parallel to the axis 262 (y-axis), and from which the second primary in-coupled light beamlet 252*b* is created.

It should be appreciated that, because the thickness of the primary waveguide 172 is a multiple of the thickness of the secondary waveguide 172*b* (in this case, exactly twice as thick), only two primary in-coupled light beamlets 252*a*, 252*b* are generated due to recombination of light beamlets. However, in the preferred case where the thickness of the primary waveguide 172*a* is a non-multiple of the thickness of the secondary waveguide 172*b*, an additional primary in-coupled light beamlet 252 is generated at each point of intersection between a secondary in-coupled light beamlet 252' and the semi-reflective interface 190, and likewise, an additional secondary in-coupled light beamlet 252' is generated at each point of intersection between a primary in-coupled light beamlet 252 and the semi-reflective interface 190. In this manner, the number of primary in-coupled light beamlets 252 geometrically increases from the ICO 168 along the axis 262.

The OPE element 186 is configured for respectively splitting the primary in-coupled light beamlets 252*a*, 252*b* into two sets of primary orthogonal light beamlets. In particular, the primary in-coupled light beamlets 252*a*, 252*b* intersect the OPE element 186 adjacent the face 180*b* of the waveguide 172, such that portions of the primary in-coupled light beamlets 252*a*, 252*b* are diffracted as two sets of primary orthogonal light beamlets 254*a*, 254*b* that propagate within the waveguide 172 via TIR along respective internally reflective optical paths parallel to the axis 264 (x-axis).

As best shown in FIG. 46, the semi-reflective interface 190 is configured for splitting the two sets of orthogonal light beamlets 254*a*, 254*b* into four sets of orthogonal light beamlets. In particular, the semi-reflective interface 190 splits the set of primary orthogonal light beamlets 254*a* into two sets of primary orthogonal light beamlets 254*a* (in this case, a first set of primary orthogonal light beamlets 254*a*(1) (shown by a solid line) and a second set of primary orthogonal light beamlets 254*a*(2) (shown by a dashed line) that propagate within the primary waveguide 172*a* via TIR along respective internally reflective optical paths parallel to the axis 264 (x-axis). As shown in FIG. 46, the semi-reflective interface 190 generates a set of secondary orthogonal light beamlets 252' that propagate within the secondary waveguide 172*b* via TIR along respective internally reflective optical paths parallel to the axis 264' (x-axis), and from which the second set of primary orthogonal light beamlets 254*a*(2) is created. Similarly, the semi-reflective interface 190 splits the set of orthogonal light beamlets 254*b* into two more sets of primary orthogonal light beamlets (not shown) that propagate within the primary waveguide 172*a* via TIR along respective internally reflective optical paths parallel to the axis 264 (x-axis).

It should be appreciated that, because the thickness of the primary waveguide 172*a* is a multiple of the thickness of the secondary waveguide 172*b* (in this case, exactly twice as thick), only two primary orthogonal light beamlets 254 are generated from each orthogonal light beamlet 254. However, in the preferred case where the thickness of the primary waveguide 172*a* is a non-multiple of the thickness of the secondary waveguide 172*b*, an additional primary orthogonal light beamlet 254 is generated at each point of intersection between a secondary orthogonal light beamlet 254' and the semi-reflective interface 190, and likewise, an additional secondary orthogonal light beamlet 254' is generated at each point of intersection between a primary in-coupled light beamlet 254 and the semi-reflective interface 190. In this manner, the number of primary orthogonal light beamlets 254 geometrically increases from the ICO 168 along the axis 264 (x-axis).

The EPE element 188 is configured for splitting each of the orthogonal light beamlets into the set of out-coupled light beamlets 256. For example, the sets of primary orthogonal light beamlets 254 (only the sets of primary orthogonal light beamlets 254*a*(1) and 254*a*(2) shown) intersect the EPE element 188 adjacent the face 180*b* of the waveguide 172, such that portions of the primary orthogonal light beamlets 254 are diffracted as the set of out-coupled light beamlets 256 that exit the face 180*b* of the waveguide 172. Thus, the increase in the number of the in-coupled light beamlets 252 and the number of orthogonal light beamlets 254 correspondingly increases the saturation of the exit pupil 300*a* expanded by the display screen 110 (shown in FIG. 40B).

Referring to FIGS. 47A-47D, the manner in which the semi-reflective interface 190 multiplies a light beam (in this case, the in-coupled light beam 252, although the same technique can be applied to the orthogonal beam 254 as well) into multiple beamlets 252 (in this case, two light beamlets 252*a* and 252*b*) will now be described. In the example of FIGS. 47A-47D, the primary waveguide 172*a* is a multiple of the secondary waveguide 172*b*, and therefore, the primary light beamlet 252 and secondary light beamlet 252' may share several intersection points at the semi-reflective interface 190. However, as briefly discussed above, the primary waveguide 172*a* is preferably a non-multiple of the secondary waveguide 172*b*, such that the number of common intersection points at the semi-reflective interface 190 is minimized, thereby generating additional light beamlets 252 and maximizing the in-fill of out-coupled beamlets.

Figure 47A:
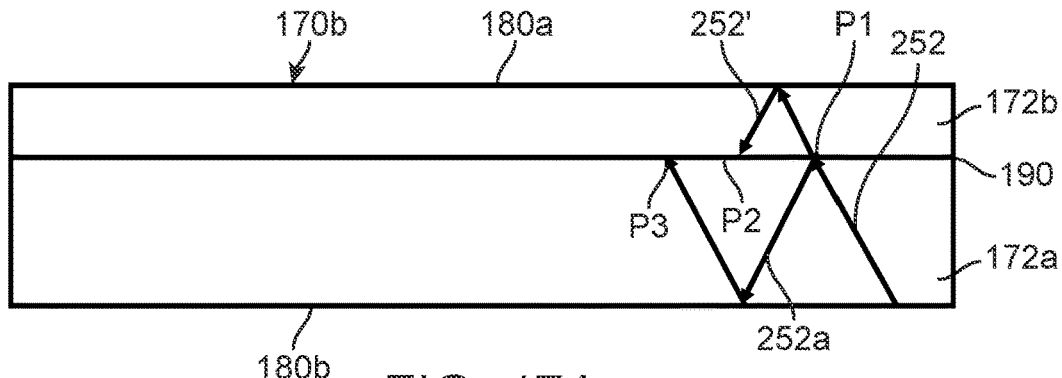
FIGS. 47A-47D are profile views illustrating the beam splitting technique employed in the modified primary waveguide apparatus of FIG. 45.

At the first point of intersection P1 with the semi-reflective interface 190, a portion of the light beam 252 is transmitted through the semi-reflective interface 190 into the secondary waveguide 172*b* as the secondary light beamlet 252', which is reflected by the face 180*a* of the waveguide 172 back to a second point of intersection P2 of the semi-reflective interface 190, while a portion of the light beam 252 is reflected by the semi-reflective interface 190 back into the primary waveguide 172a as the primary light beamlet 252a, which is reflected by the face 180b of the waveguide 172 back to a third point of intersection P3 of the semi-reflective interface 190 (FIG. 47A).

Figure 47B:
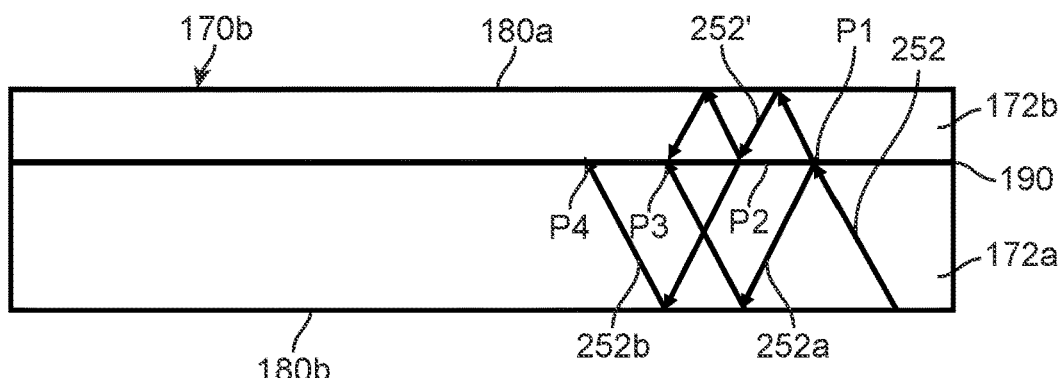

At the second point of intersection P2 with the semi-reflective interface 190, a portion of the secondary light beamlet 252' is transmitted through the semi-reflective interface 190 into the primary waveguide 172b as the primary light beamlet 252b, which is reflected by the face 180a of the waveguide 172 back to a fourth point of intersection P4 of the semi-reflective interface 190, while a portion of the secondary light beamlet 252' is reflected by the semi-reflective interface 190 back into the secondary waveguide 172b as the secondary light beamlet 252', which is reflected by the face 180a of the waveguide 172 back to the third point of intersection P3 of the semi-reflective interface 190 (FIG. 47B).

Figure 47C:
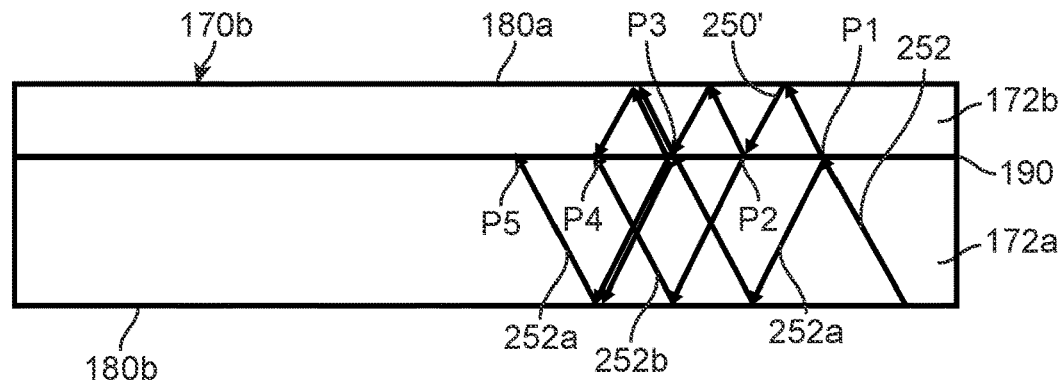

At the third point of intersection P3 with the semi-reflective interface 190, a portion of the primary light beamlet 252a is transmitted through the semi-reflective interface 190 into the secondary waveguide 172b, and a portion of the secondary light beamlet 252' is reflected by the semi-reflective interface 190 back into the secondary waveguide 172b, which portions happen to combine together as the secondary light beamlet 252' and reflected by the face 180b of the waveguide 172 back to the fourth point of intersection P4 (FIG. 47C). Of course, the primary light beamlet 252a and the secondary light beamlet 252' may not have a common point of intersection P3, in which case, an additional secondary light beamlet 252' may be generated. Furthermore, at the third point of intersection P3 with the semi-reflective interface 190, a portion of the secondary light beamlet 252' is transmitted through the semi-reflective interface 190 into the primary waveguide 172a, and a portion of the primary light beamlet 252a is reflected by the semi-reflective interface 190 back into the primary waveguide 172a, which portions may combine together as the primary light beamlet 252a, which is reflected by the face 180b of the waveguide 172 back to a fifth point of intersection P5 of the semi-reflective interface 190 (FIG. 47C). Of course, the secondary light beamlet 252' and the primary light beamlet 252a may not have a common point of intersection P3, in which case, an additional primary light beamlet 252 may be generated.

Figure 47D:
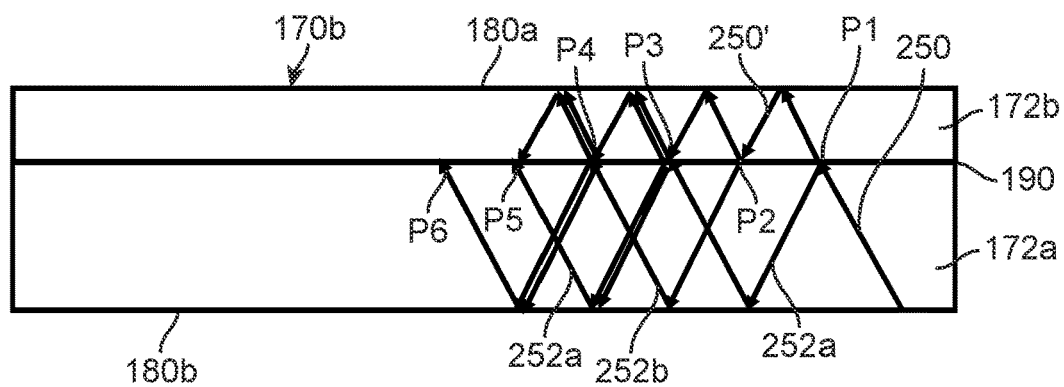

At the fourth point of intersection P4 with the semi-reflective interface 190, a portion of the primary light beamlet 252b is transmitted through the semi-reflective interface 190 into the secondary waveguide 172b, and a portion of the secondary light beamlet 252' is reflected by the semi-reflective interface 190 back into the secondary waveguide 172b, which portions may combine together as the secondary light beamlet 252' and reflected by the face 180b of the waveguide 172 back to the fifth point of intersection P5 (FIG. 47D). Of course, the primary light beamlet 252b and the secondary light beamlet 252' may not have a common point of intersection P4, in which case, an additional secondary light beamlet 252' may be generated. Furthermore, at the fourth point of intersection P4 with the semi-reflective interface 190, a portion of the secondary light beamlet 252' is transmitted through the semi-reflective interface 190 into the primary waveguide 172a, and a portion of the primary light beamlet 252b is reflected by the semi-reflective interface 190 back into the primary waveguide 172a, which portions combine together as the primary light beamlet 252b, which is reflected by the face 180b of the waveguide 172 back to a sixth point of intersection P6 of the semi-reflective interface 190 (FIG. 47D). Of course, the secondary light beamlet 252' and the primary light beamlet 252b may not have a common point of intersection P4, in which case, an additional primary light beamlet 252 may be generated.

Thus, it can be appreciated from the foregoing that light energy is transferred between the primary waveguide 172a and secondary waveguide 172b to generate and propagate two light beamlets 252a, 252b within the waveguide apparatus 170.

Significantly, the thicknesses of the layered substrates, in coordination with the expected incident angles of the light beams on each semi-reflective interface, are selected, such that there is no gap between the edges of adjacent out-coupled beamlets 256.

For example, in the embodiment illustrated in FIGS. 44-46, the thickness of the secondary waveguide 172b is less than the thickness of the primary waveguide 172a, with the thickness $\Delta t$ of the secondary waveguide 172b being selected such that the spacings between the centers of adjacent ones of the resulting out-coupled light beamlets 256 are equal to or less than the width w of the collimated light beamlet 250. Of course, if the primary waveguide 172a is not a multiple of the secondary waveguide 172b, the spacings between the centers of adjacent ones of the resulting out-coupled light beamlets 256 may be greater than the width w of the collimated light beamlet 250.

It should be noted that the width w of the collimated light beam 250 relative to the size of the IC element 168 has been exaggerated for purposes of illustration. In reality, the width w of the collimated light beam 250 will be much smaller than the size of the IC element 168, which needs to be large enough to accommodate all scan angles of the collimated light beam 250. In the preferred embodiment, the average spacing between adjacent out-coupled light beamlets 256 is minimized for the worst-case scan angle. For example, for the worst-case scan angle, although there may be gaps between some of the adjacent out-coupled light beamlets 256, there will be no gaps between most of the adjacent out-coupled light beamlets 256.

Thus, the thickness $\Delta t$ of the secondary waveguide 172b may be selected based on the worst-case scan angle to minimize the spacings between adjacent out-coupled beamlets 256. It should be noted that the worst-case scan angle is one that results in the smallest angle of incidence of the in-coupled light beam 252 on the semi-reflective interface 190. Of course, if the primary waveguide 172a is not a multiple of the secondary waveguide 172b, more out-coupled beamlets 256 will be generated, thereby naturally decreasing the average spacing between adjacent out-coupled beamlets 256. In this case, it may be beneficial to select the thickness values t and $\Delta t$ to have a least common multiple that is relatively high. For example, in selecting the thickness values t and $\Delta t$, one may seek to maximize the least common multiple of the thickness values t and $\Delta t$ to maximize the quantity of out-coupled beamlets 256 for the worst-case scan angle. Furthermore, selecting the thickness values t and $\Delta t$ may also yield an uneven/complex distribution of out-coupled beamlets 256 that may minimize adverse effects created by coherent light interactions between adjacent out-coupled beamlets 256.

Figure 48:
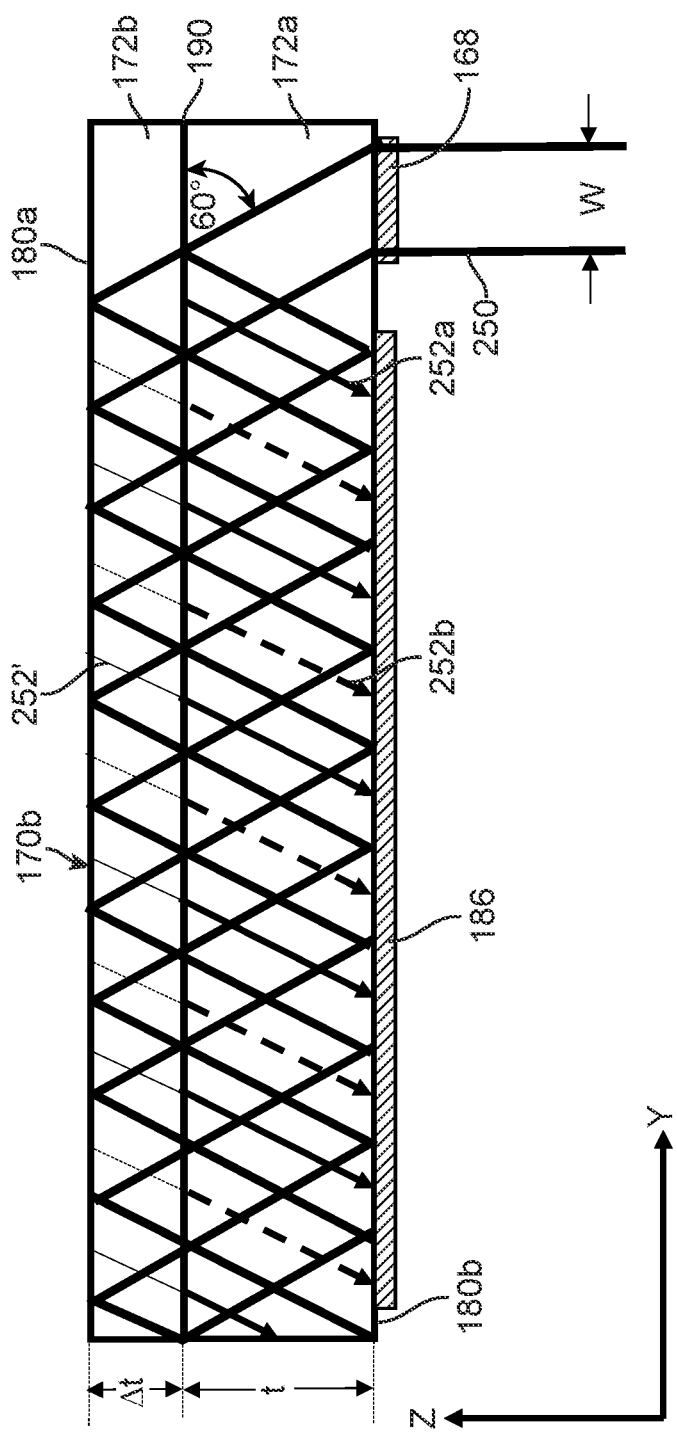
FIG. 48 is a cross-sectional view of the first variation of the primary waveguide apparatus of FIG. 44, taken along the line 48-48, particularly showing the overlap of light beamlets.
Figure 49:
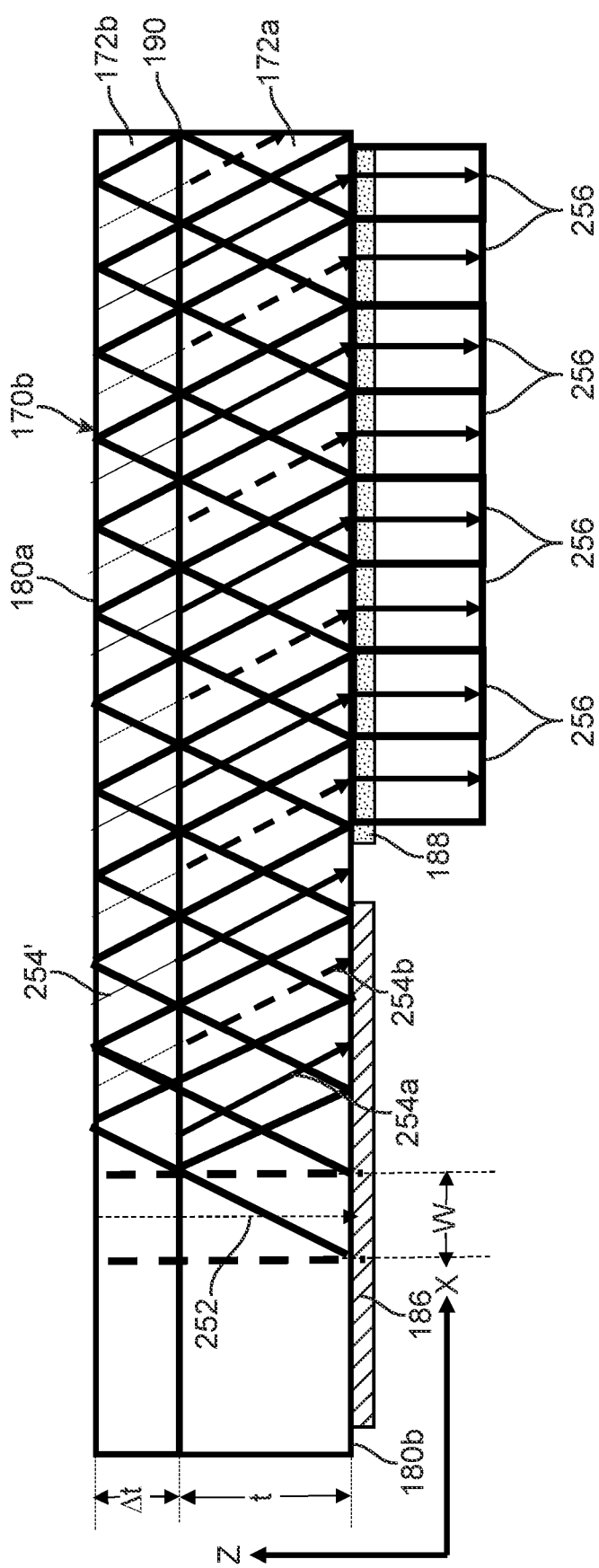
FIG. 49 is a cross-sectional view of the first variation of the primary waveguide apparatus of FIG. 44, taken along the line 49-49, particularly showing the overlap of light beamlets.

For example, if it is assumed that the worst-case angle of incidence between the in-coupled light beam 252 and the semi-reflective interface 190 is sixty degrees, and the thickness t of the primary waveguide 172a is exactly twice the thickness $\Delta t$ of the secondary waveguide 172b, the thickness $\Delta t$ of the secondary waveguide 172b should be $\sqrt{3}/2$ the width w of the in-coupled light beam 252, so that, as illustrated in FIG. 48, the adjacent primary in-coupled light beamlets 252 will have no gaps therebetween, and as illustrated in FIG. 49, the adjacent primary orthogonal light beamlets 254 will have no gaps therebetween, and thus, the adjacent out-coupled light beamlets 256 will have no gaps therebetween.

It should be appreciated that, for purposes of simplicity in explanation, no refraction of light transmitted through the semi-reflective interface 190 is assumed. However, in the case where substantial refraction of the transmitted light through the semi-reflective interface 190 occurs, the angle of transmission of the light due to such refraction must be taken into account when selecting the thickness Δt of the secondary waveguide 172b. For example, the greater the refraction of the light, such that the angle of the transmitted light relative to the semi-reflective interface 190 decreases, the more the thickness Δt of the secondary waveguide 172b must be decreased to compensate for such refraction.

It should also be appreciated from the foregoing that the generation of the primary in-coupled light beamlets 252 propagating within the primary waveguide 172a via TIR along the internally reflective optical paths parallel to the axis 262 (y-axis), and then the generation of the primary out-coupled light beamlets 256 propagating within the primary waveguide 172a along the internally reflective optical paths parallel to the axis 264 (x-axis), assuming an appropriate thickness Δt of the secondary waveguide 172b, will completely in-fill the exit pupil of the display screen 110.

In the case where it is desirable to decrease the thickness Δt of the secondary waveguide 172b to further decrease the average spacing between the adjacent primary in-coupled light beamlets 252, primary orthogonal light beamlets 254, and out-coupled light beamlets 256, the thickness t of the primary waveguide 172a may be much greater than the thickness Δt of the secondary waveguide 172b, e.g., greater than three, four, five, or even more times the thickness Δt of the secondary waveguide 172b.

Figure 50:
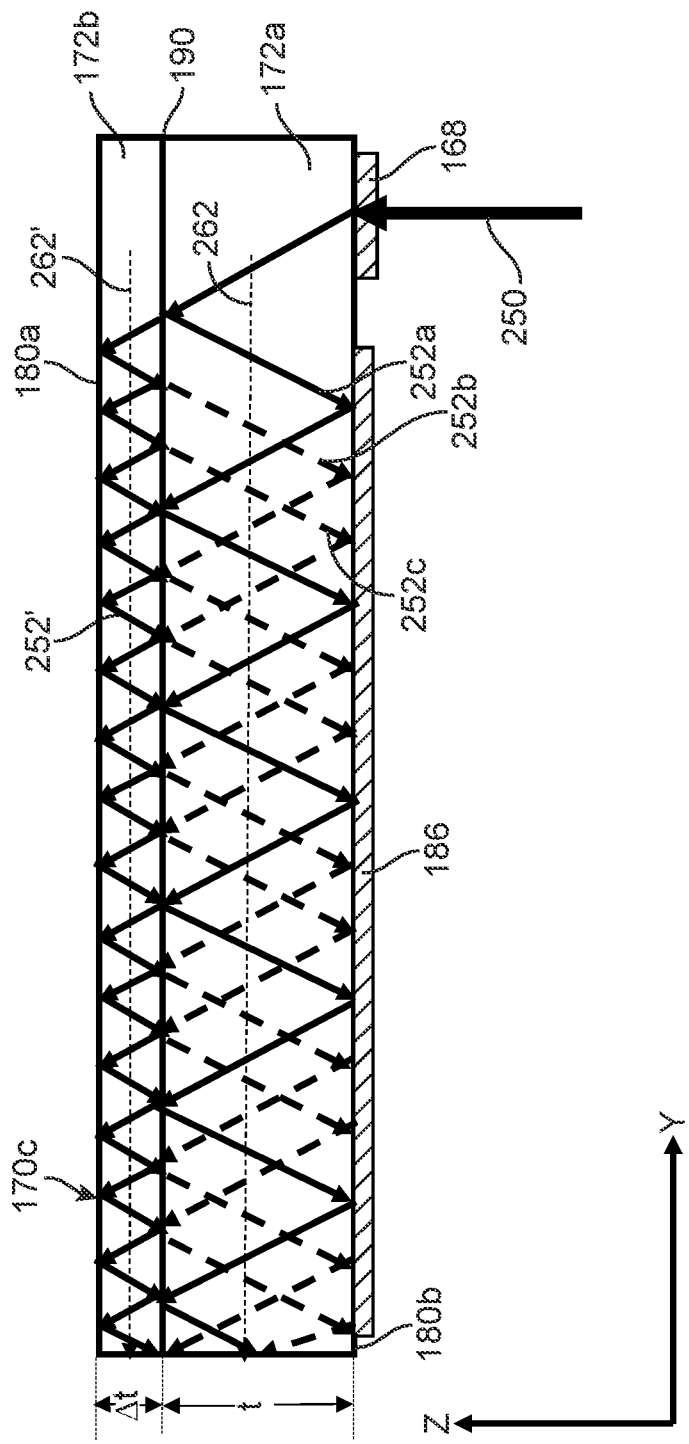
FIG. 50 is a cross-sectional view of a second variation of the primary waveguide apparatus of FIG. 44, taken along the line 50-50.
Figure 51:
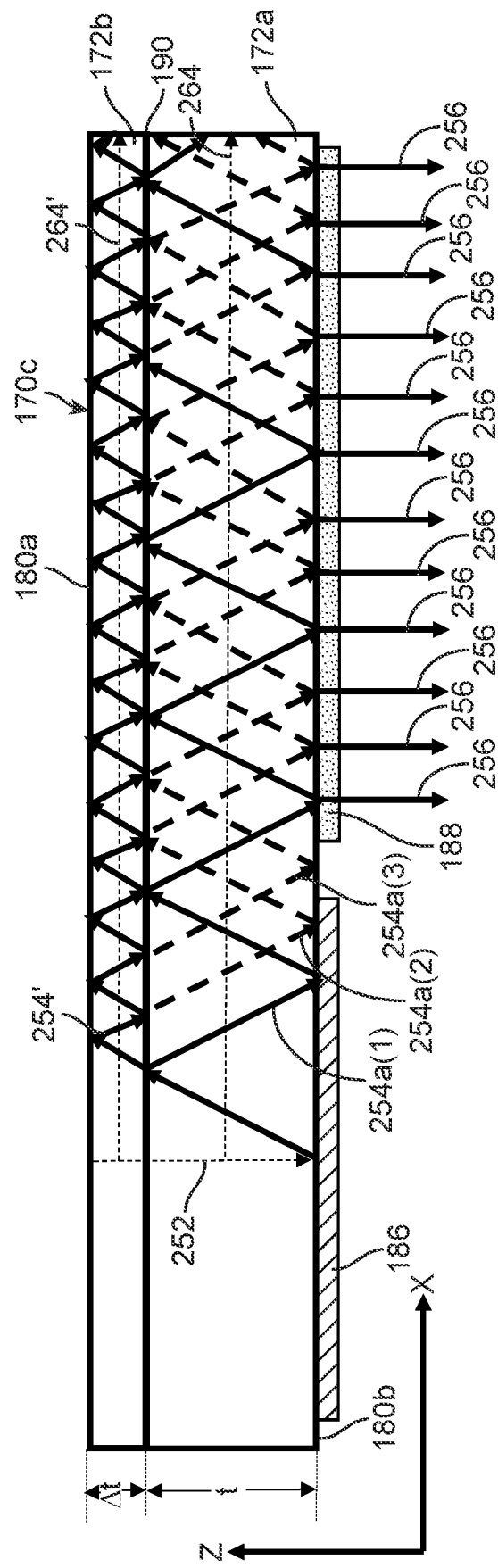
FIG. 51 is a cross-sectional view of the second variation primary waveguide apparatus of FIG. 44, taken along the line 51-51.

For example, as illustrated with respect to the waveguide apparatus 170c in FIGS. 50 and 51, the thickness t of the primary waveguide 172a is three times the thickness Δt of the secondary waveguide 172b. As best shown in FIG. 50, the IC element 168 couples the in-coupled light beam 252 into the waveguide 172, which propagates within the waveguide 172 via TIR along an internally reflective optical path parallel to the axis 262 (y-axis). The semi-reflective interface 190 is configured for splitting the in-coupled light beam 252 into three in-coupled light beamlets. In particular, the semi-reflective interface 190 splits the in-coupled light beam 252 into three primary in-coupled light beamlets 252 (a first primary in-coupled light beamlet 252a (shown by a solid line) and two more primary in-coupled light beamlets 252b, 252c (shown by dashed lines)) that propagate within the primary waveguide 172a along respective internally reflective optical paths parallel to the axis 262. As shown in FIG. 50, the semi-reflective interface 190 generates a secondary in-coupled light beamlet 252' that propagates within the secondary waveguide 172b via TIR along an internally reflective optical path parallel to the axis 264' (x-axis), and from which the two primary in-coupled light beamlet 252b, 252c are created.

It should be appreciated that, because the thickness of the primary waveguide 172a is a multiple of the thickness of the secondary waveguide 172b (in this case, exactly three times as thick), only three primary in-coupled light beamlets 252a, 252b, 252c are generated due to recombination of light beamlets. However, in the preferred case where the thickness of the primary waveguide 172a is a non-multiple of the thickness of the secondary waveguide 172b, an additional primary in-coupled light beamlet 252 is generated at each point of intersection between a secondary in-coupled light beamlet 252' and the semi-reflective interface 190, and likewise, an additional secondary in-coupled light beamlet 252' is generated at each point of intersection between a primary in-coupled light beamlet 252 and the semi-reflective interface 190. In this manner, the number of primary in-coupled light beamlets 252 geometrically increases from the ICO 168 along the axis 262 (y-axis).

The OPE element 186 is configured for respectively splitting the primary in-coupled light beamlets 252a-252c into three sets of primary orthogonal light beamlets. In particular, the primary in-coupled light beamlets 252a-252c intersect the OPE element 186 adjacent the face 180b of the waveguide 172, such that portions of the primary in-coupled light beamlets 252a-252c are diffracted as three sets of primary orthogonal light beamlets 254a-254c that propagate within the waveguide 172 via TIR along respective internally reflective optical paths parallel to the axis 264 (x-axis).

As best shown in FIG. 51, the semi-reflective interface 190 is configured for splitting the three sets of orthogonal light beamlets 254a-254c into nine sets of orthogonal light beamlets. In particular, the semi-reflective interface 190 splits the set of primary orthogonal light beamlets 254a into three sets of primary orthogonal light beamlets 254a (a first set of primary in-coupled light beamlets 254a (shown by a solid line) and two more sets of primary in-coupled light beamlets 254b, 254c (shown by dashed lines)) that propagate within the primary waveguide 172a via TIR along a respective internally reflective optical path parallel to the axis 264 (x-axis). As shown in FIG. 51, the semi-reflective interface 190 generates a set of secondary in-coupled light beamlets 252' that propagates within the secondary waveguide 172b via TIR along respective internally reflective optical paths parallel to the axis 262' (y-axis), and from which the two sets of primary in-coupled light beamlets 254b, 254c are created. Similarly, the semi-reflective interface 190 splits the set of orthogonal light beamlets 254b into three more sets of primary orthogonal light beamlets (not shown) and the set of orthogonal light beamlets 254c into three more set of primary orthogonal light beamlets (not shown) that propagate within the primary waveguide 172a via TIR along respective internally reflective optical paths parallel to the axis 264 (x-axis).

It should be appreciated that, because the thickness of the primary waveguide 172a is a multiple of the thickness of the secondary waveguide 172b (in this case, exactly three times as thick), only three primary sets of orthogonal light beamlets 254a, 254b, 254c are generated due to recombination of light beamlets. However, in the preferred case where the thickness of the primary waveguide 172a is a non-multiple of the thickness of the secondary waveguide 172b, an additional set of primary orthogonal light beamlets 254 is generated at each point of intersection between a set of secondary orthogonal light beamlets 254' and the semi-reflective interface 190, and likewise, an additional set of secondary orthogonal light beamlets 254' is generated at each point of intersection between a primary set of orthogonal light beamlet 254 and the semi-reflective interface 190. In this manner, the number of primary orthogonal light beamlets 254 geometrically increases from the ICO 168 along the axis 264 (x-axis).

The EPE element 188 is configured for splitting the nine sets of orthogonal light beamlets into the set of out-coupled light beamlets 256. In particular, as shown in FIG. 51, the sets of primary orthogonal light beamlets 254 (only the sets of primary orthogonal light beamlets 254a(1)-254a(3) shown) intersect the EPE element 188 adjacent the face 180b of the waveguide 172, such that portions of the primary orthogonal light beamlets 254 are diffracted as the set of out-coupled light beamlets 256 that exit the face 180b of the waveguide 172. Thus, the increase in the number of the in-coupled light beamlets 252 and the number of orthogonal light beamlets 254 correspondingly increases the saturation of the exit pupil 300a expanded by the display screen 110 (shown in FIG. 40B).

Figure 52:
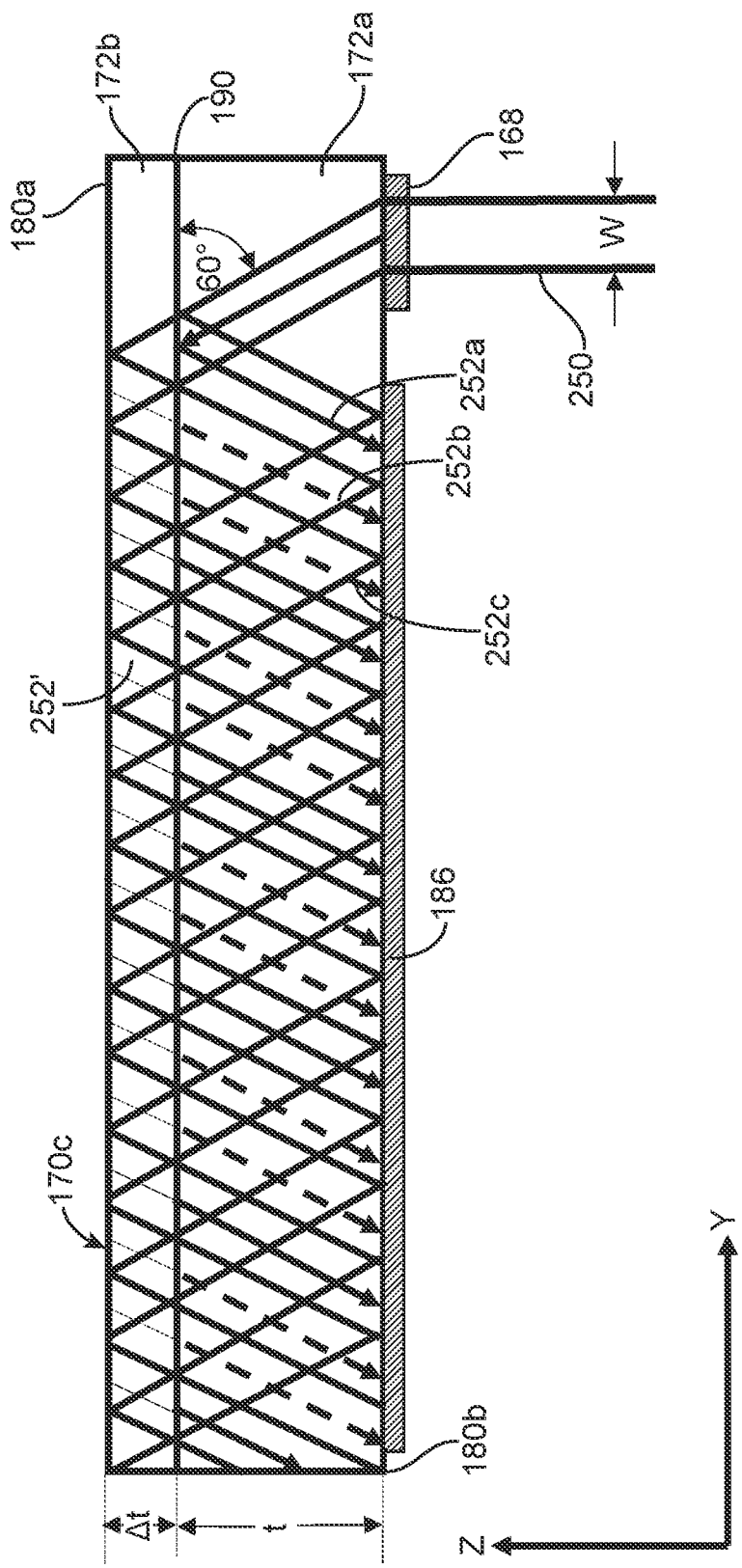
FIG. 52 is a cross-sectional view of the second variation of the primary waveguide apparatus of FIG. 44, taken along the line 52-52, particularly showing the overlap of light beamlets.
Figure 53:
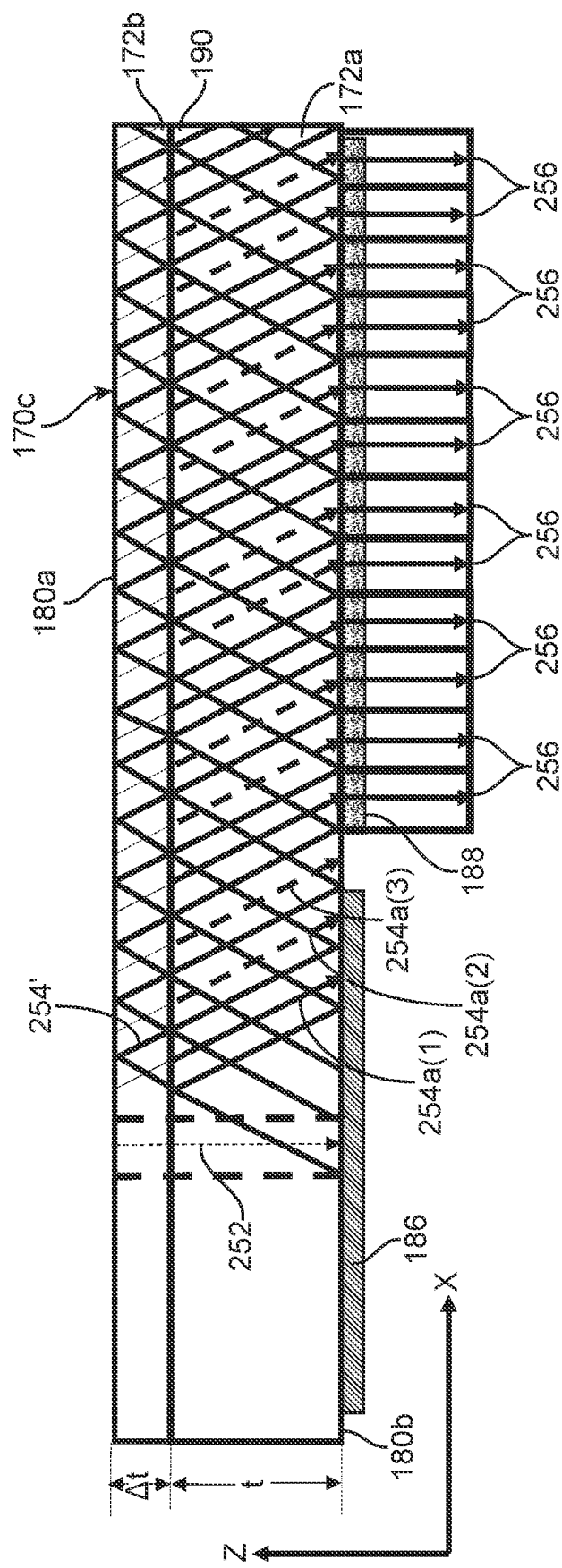
FIG. 53 is a cross-sectional view of the second variation of the primary waveguide apparatus of FIG. 44, taken along the line 53-53, particularly showing the overlap of light beamlets.

Notably, such saturation of the exit pupil 300a by the waveguide apparatus 170c of FIGS. 50-51 is equivalent to the saturation of the exit pupil 300a by the waveguide apparatus 170b of FIGS. 45-46 if the width w of the collimated light beam 250 in-coupled in the waveguide apparatus 170c is ⅔ smaller than the width w of the collimated light beam 250 in-coupled in the waveguide apparatus 170b. That is, the thickness Δt of the secondary waveguide 172b need only be scaled downed to be commensurate with the decrease in the width w of the collimated light beam 250 in-coupled in the waveguide apparatus 170b. For example, assuming the same worst-case angle of incidence between the in-coupled light beam 252 and the semi-reflective interface 190 to be sixty degrees, the thickness Δt of the secondary waveguide 172b can be scaled down to $\sqrt{3}/2$ the width w of the in-coupled light beam 252, so that, as illustrated in FIG. 52, the edges of the adjacent primary in-coupled light beamlets 252 will have no gaps therebetween, and as illustrated in FIG. 53, the edges of the adjacent primary orthogonal light beamlets 254 will have no gaps therebetween, and thus, the edges of the adjacent out-coupled light beamlets 256 will have no gaps therebetween.

It can be appreciated from the foregoing that, while the thickness t of the primary waveguide 172a may be much larger than the width w of the collimated light beam 250 in-coupled into the waveguide apparatuses 170b, 170c, illustrated in FIGS. 44-53, the thickness Δt of the secondary waveguide 172b may be smaller than the width w of the collimated light beam 250. However, if the thickness Δt of the secondary waveguide 172b required to eliminate spacings between the centers of adjacent ones of the resulting out-coupled light beamlets 256, given the worst-case scanning angle, is too small for manufacturability purposes, the thickness of the secondary waveguide 172b may alternatively be selected, such that the difference in the thicknesses between the primary waveguide 172a and secondary waveguide 172b is equal to a difference thickness Δt, as illustrated in the waveguide apparatus 170d of FIGS. 54 and 55.

Figure 54:
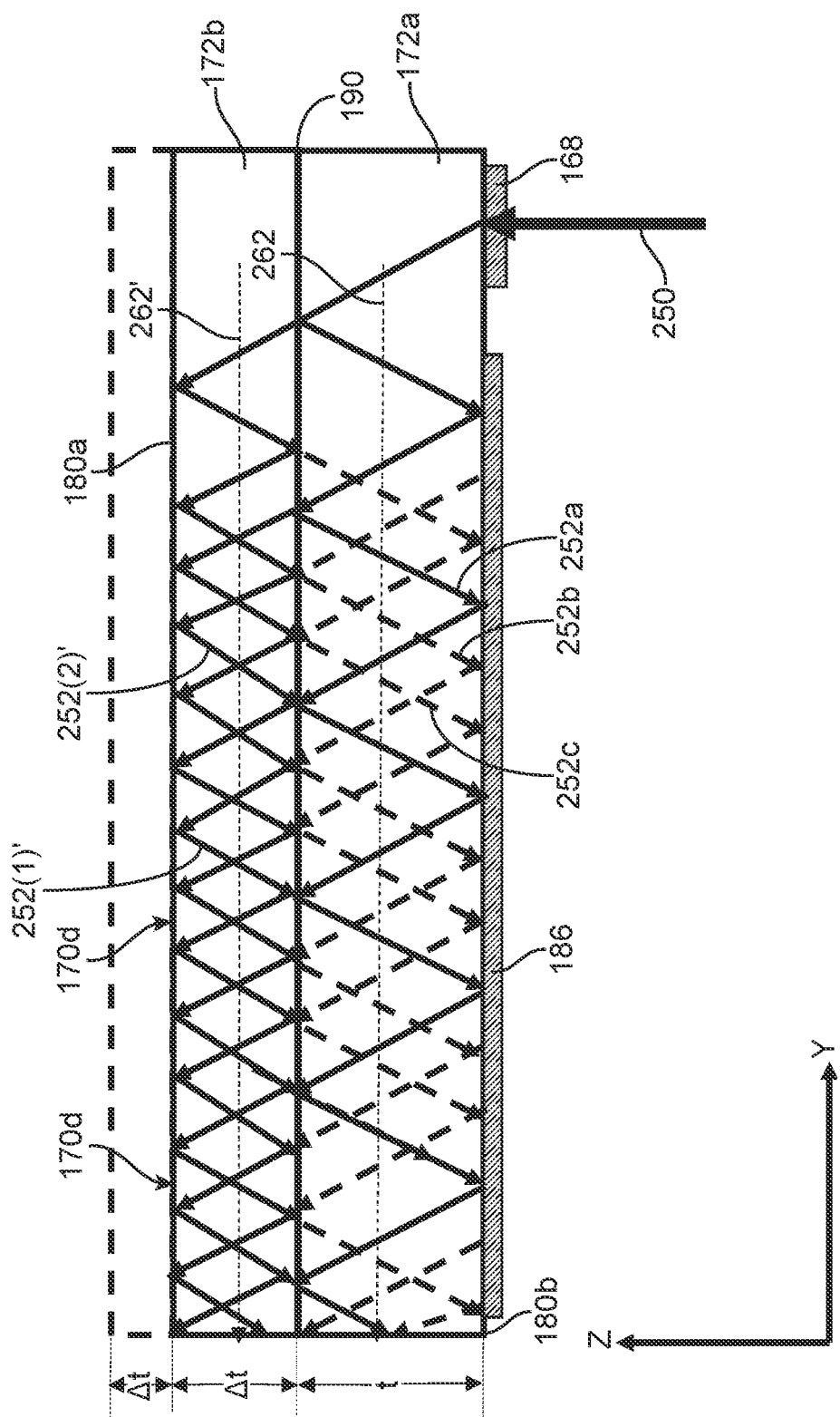
FIG. 54 is a cross-sectional view of a third variation of the primary waveguide apparatus of FIG. 44, taken along the line 54-54.

Thus, in this case, the thickness of the secondary waveguide 172b may be selected to be slightly less than the thickness t of the primary waveguide 172a, i.e., t-Δt. As best shown in FIG. 54, the IC element 168 couples the in-coupled light beam 252 into the waveguide 172, which propagates within the waveguide 172 via TIR along an internally reflective optical path parallel to the axis 262 (y-axis). The semi-reflective interface 190 is configured for splitting the in-coupled light beam 252 into three in-coupled light beamlets. In particular, the semi-reflective interface 190 splits the in-coupled light beam 252 into three primary in-coupled light beamlets 252 (a first primary in-coupled light beamlet 252a (shown by a solid line) and two more primary in-coupled light beamlets 252b, 252c (shown by dashed lines)) that propagate within the primary waveguide 172a along respective internally reflective optical paths parallel to the axis 262. As shown in FIG. 54, the semi-reflective interface 190 generates two secondary in-coupled light beamlets 252(1)' and (2)' that propagate within the secondary waveguide 172b via TIR along respective internally reflective optical paths parallel to the axis 262' (y-axis), and from which the two primary in-coupled light beamlet 252b, 252c are created.

The OPE element 186 is configured for respectively splitting the primary in-coupled light beamlets 252a-252c into three sets of primary orthogonal light beamlets. In particular, the primary in-coupled light beamlets 252a-252c intersect the OPE element 186 adjacent the face 180b of the waveguide 172, such that portions of the primary in-coupled light beamlets 252a-252c are diffracted as three sets of primary orthogonal light beamlets 254a-254c that propagate within the waveguide 172 via TIR along respective internally reflective optical paths parallel to the axis 264 (x-axis).

Figure 55:
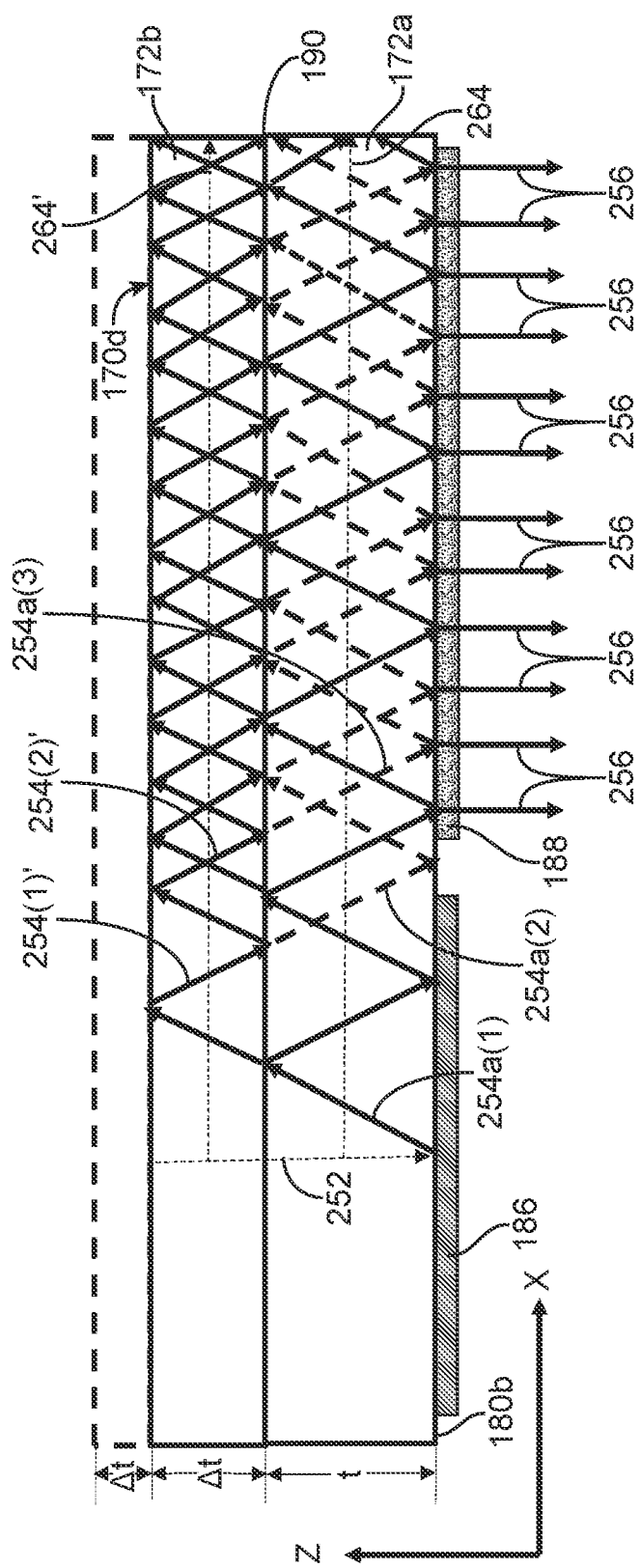
FIG. 55 is a cross-sectional view of the third variation primary waveguide apparatus of FIG. 44, taken along the line 55-55.

As best shown in FIG. 55, the semi-reflective interface 190 is configured for splitting the three sets of orthogonal light beamlets 254a-254c into nine sets of orthogonal light beamlets. In particular, the semi-reflective interface 190 splits the set of primary orthogonal light beamlets 254a into three sets of primary orthogonal light beamlets 254a (a first set of primary in-coupled light beamlets 254a (shown by a solid line) and two more sets of primary in-coupled light beamlets 254b, 254c (shown by dashed lines)) that propagate within the primary waveguide 172 along respective internally reflective optical paths parallel to the axis 264 (x-axis). As shown in FIG. 55, the semi-reflective interface 190 generates two sets of secondary in-coupled light beamlets 254(1)' and 254(2)' that propagate within the secondary waveguide 172b via TIR along respective internally reflective optical paths parallel to the axis 264' (x-axis), and from which the two sets of primary in-coupled light beamlets 254b, 254c are created. Similarly, the semi-reflective interface 190 splits the set of orthogonal light beamlets 254b into three more sets of primary orthogonal light beamlets (not shown) and the set of orthogonal light beamlets 254c into three more set of primary orthogonal light beamlets (not shown) that propagate within the primary waveguide 172a along respective internally reflective optical paths parallel to the axis 264 (x-axis).

The EPE element 188 is configured for splitting the nine sets of orthogonal light beamlets into the set of out-coupled light beamlets 256. In particular, as shown in FIG. 55, the sets of primary orthogonal light beamlets 254 (only the sets of primary orthogonal light beamlets 254a(1)-254a(3) shown) intersect the EPE element 188 adjacent the face 180b of the waveguide 172, such that portions of the primary orthogonal light beamlets 254 are diffracted as the set of out-coupled light beamlets 256 that exit the face 180b of the waveguide 172. Thus, the increase in the number of the in-coupled light beamlets 252 and the number of orthogonal light beamlets 254 correspondingly increases the saturation of the exit pupil 300a expanded by the display screen 110 (shown in FIG. 40B).

In the same manner that the thickness Δt of the secondary waveguide 172b is selected above with respect to the waveguide apparatuses 170b and 170c of FIGS. 44-53, the difference in thickness Δt between the primary waveguide 172a and the secondary waveguide 172b in the embodiment of FIGS. 54-55 is selected, such that assuming the same worst-case angle of incidence between the in-coupled light beam 252 and the semi-reflective interface 190 to be sixty degrees, the difference thickness Δt may be selected to be $\sqrt{3}/2$ the width w of the in-coupled light beam 252, so that the adjacent primary in-coupled light beamlets 252 and the edges of the adjacent primary orthogonal light beamlets 254 will have no gaps therebetween, and thus, the edges of the adjacent out-coupled light beamlets 256 will have no gaps therebetween. Thus, in this case, the thickness of the secondary waveguide 172b will be greater than the width w of the in-coupled light beam 252.

Although the previous waveguide apparatuses 170a-170d illustrated in FIGS. 44-55 have been described as comprising only one secondary waveguide 172b, it should be appreciated that waveguide apparatus 170 may have multiple secondary waveguides 172b. For example, referring to FIGS. 56 and 57, a waveguide apparatus 170e comprises two secondary waveguides 172b disposed on the primary waveguide 172a, and four semi-reflective interfaces 190, one of which is disposed between the primary waveguide 172a and one of the secondary waveguides 172b, and the remaining one of which is disposed between the respective secondary waveguides 172b.

Figure 56:
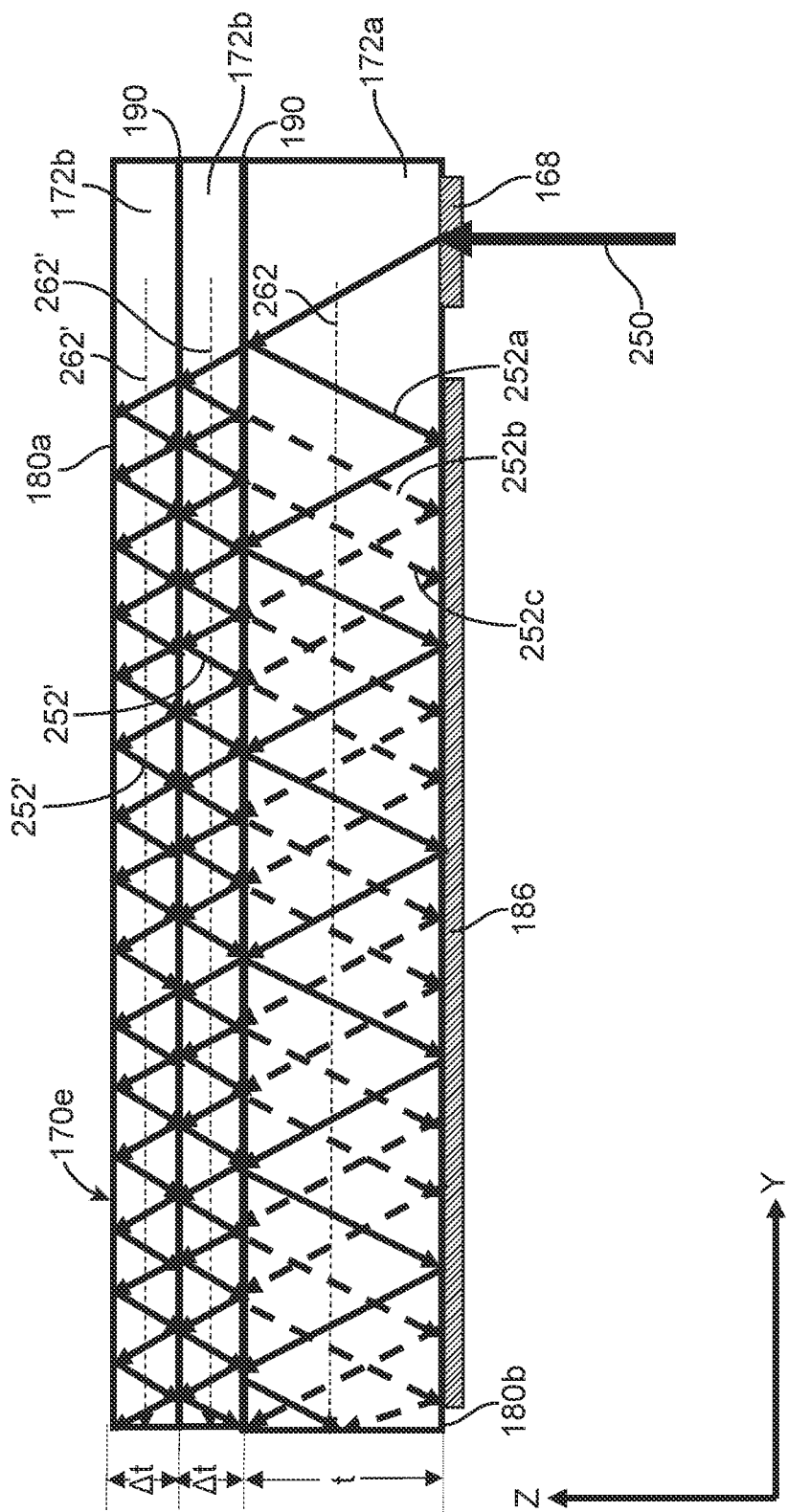
FIG. 56 is a cross-sectional view of a fourth variation of the primary waveguide apparatus of FIG. 44, taken along the line 56-56.

As best shown in FIG. 56, the IC element 168 couples the in-coupled light beam 252 into the waveguide 172, which propagates within the waveguide 172 via TIR along an internally reflective optical path parallel to the axis 262 (y-axis). The semi-reflective interface 190 is configured for splitting the in-coupled light beam 252 into three in-coupled light beamlets. In particular, the semi-reflective interfaces 190 split the in-coupled light beam 252 into three primary in-coupled light beamlets 252 (a first primary in-coupled light beamlet 252a (shown by a solid line) and two more primary in-coupled light beamlets 252b, 252c (shown by dashed lines)) that propagate within the primary waveguide 172a along respective internally reflective optical paths parallel to the axis 262 (y-axis). As shown in FIG. 56, the semi-reflective interface 190 generates two secondary in-coupled light beamlets 252' that propagate within the respective two secondary waveguides 172b via TIR along respective internally reflective optical paths parallel to the axis 262' (y-axis), and from which the two primary in-coupled light beamlet 252b, 252c are created.

The OPE element 186 is configured for respectively splitting the primary in-coupled light beamlets 252a-252c into three sets of primary orthogonal light beamlets. In particular, the primary in-coupled light beamlets 252a-252c intersect the OPE element 186 adjacent the face 180b of the waveguide 172, such that portions of the primary in-coupled light beamlets 252a-252c are diffracted as three sets of primary orthogonal light beamlets 254a-254c that propagate within the waveguide 172 via TIR along internally reflective optical paths parallel to the axis 264 (x-axis).

Figure 57:
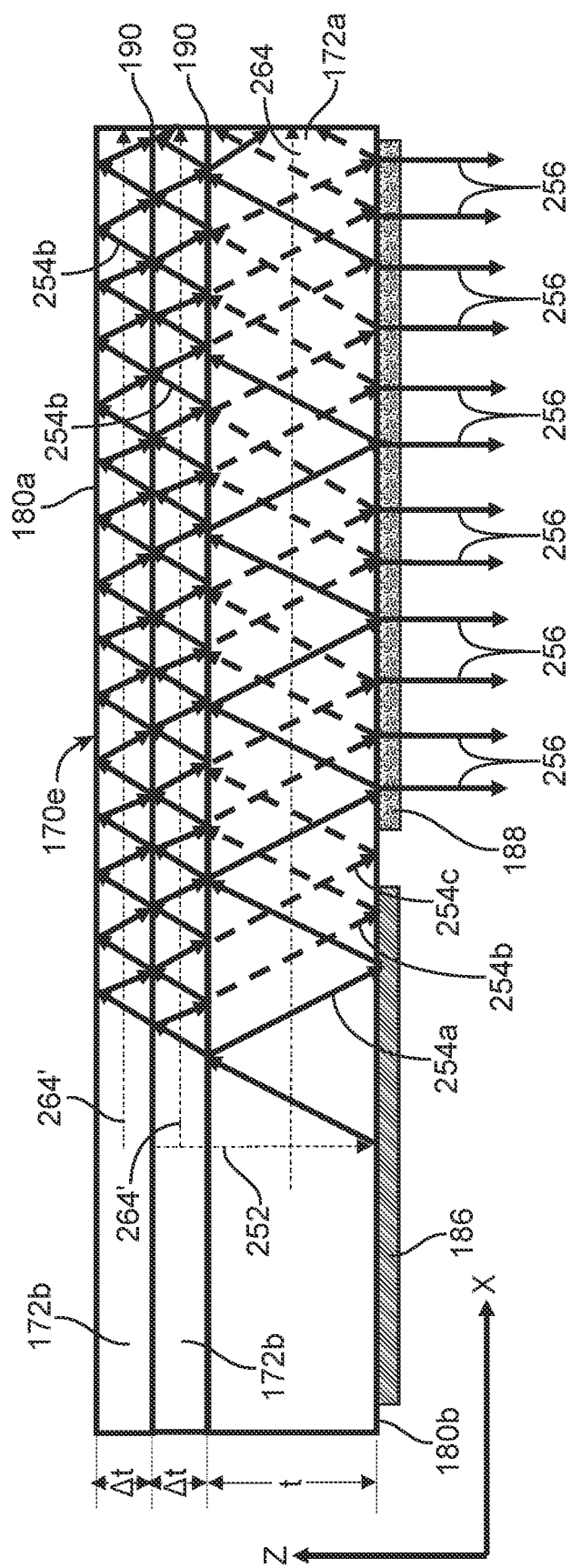
FIG. 57 is a cross-sectional view of the fourth variation primary waveguide apparatus of FIG. 44, taken along the line 57-57.

As best shown in FIG. 57, the semi-reflective interfaces 190 are configured for splitting the three sets of orthogonal light beamlets 254a-254c into nine sets of primary orthogonal light beamlets. In particular, the semi-reflective interfaces 190 split the set of primary orthogonal light beamlets 254a into three sets of primary orthogonal light beamlets 254a (a first set of primary orthogonal light beamlets 254a (shown by a solid line) and two more sets of primary orthogonal light beamlets 254b, 254c (shown by dashed lines)) that propagate within the primary waveguide 172a via TIR along respective internally reflective optical paths parallel to the axis 264 (x-axis). As shown in FIG. 57, the semi-reflective interface 190 generates two sets of secondary in-coupled light beamlets 252' that propagate within the respective two secondary waveguides 172b via TIR along respective internally reflective optical paths parallel to the axis 264' (x-axis), and from which the two primary orthogonal light beamlet 252b, 252c are created. Similarly, the semi-reflective interface 190 splits the set of orthogonal light beamlets 254b into three more sets of primary orthogonal light beamlets (not shown) and the set of orthogonal light beamlets 254c into three more set of primary orthogonal light beamlets (not shown) that propagate within the primary waveguide 172a along respective internally reflective optical paths parallel to the axis 264 (x-axis). In some embodiments, the two secondary waveguides 172b may be different thicknesses. In addition, for reasons similar to those having been described above with reference to FIGS. 44-55, in some examples, these different thicknesses may be non-multiples of each other. It also follows that the thickness of the primary waveguide 172a may be a non-multiple of one or both of the two different thicknesses of the two secondary waveguides 172b. In other embodiments, the two secondary waveguides 172b may be of equal thickness.

The EPE element 188 is configured for splitting the nine sets of orthogonal light beamlets into the set of out-coupled light beamlets 256. In particular, as shown in FIG. 57, the sets of primary orthogonal light beamlets 254 (only the sets of primary orthogonal light beamlets 254a(1)-254a(3) shown) intersect the EPE element 188 adjacent the face 180b of the waveguide 172, such that portions of the primary orthogonal light beamlets 254 are diffracted as the set of out-coupled light beamlets 256 that exit the face 180b of the waveguide 172. Thus, the increase in the number of the in-coupled light beamlets 252 and the number of orthogonal light beamlets 254 correspondingly increases the saturation of the exit pupil 300a expanded by the display screen 110 (shown in FIG. 40B). Although the waveguide apparatus 170e illustrated in FIGS. 56 and 57 has been described above as comprising two secondary waveguides 172b, it should be appreciated that waveguide apparatus 170e and others described herein may have at least two (e.g., three, four, five, or more) secondary waveguides 172b.

Figure 58:
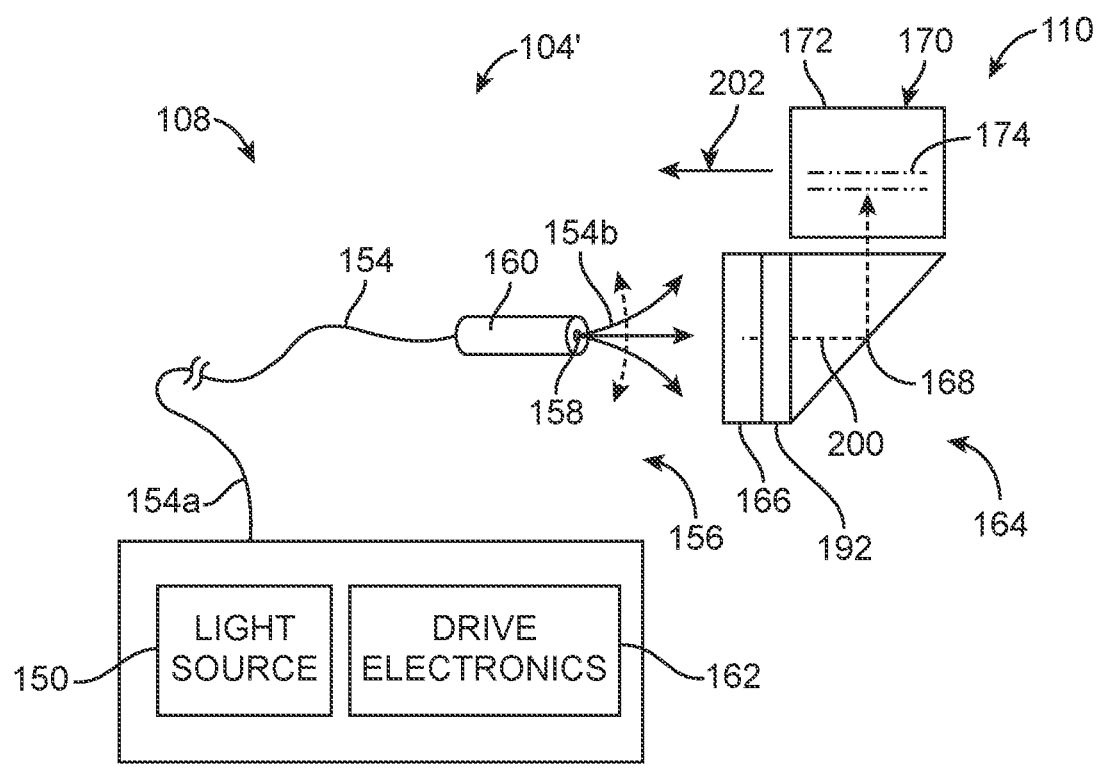
FIG. 58 is a plan view of another embodiment of a display subsystem used in the virtual image generation system of FIG. 2.

In the prior embodiments, the entrance pupil of the collimated light beam output by the collimation element 154 is expanded only by the combination of the OPE element 186 and EPE element 188 of the display screen 110, and includes features in close association with the OPE element 186 and EPE element 188 for increasing the saturation of the exit pupil of the display screen 110. In the embodiments of a display subsystem 104' subsequently described herein, the image projection assembly 108 further includes a pre-pupil expansion (PPE) 192, which in the embodiment illustrated in FIG. 58, is disposed between the collimation element 166 and the IC element 168 of the display screen 110.

Figure 59A:
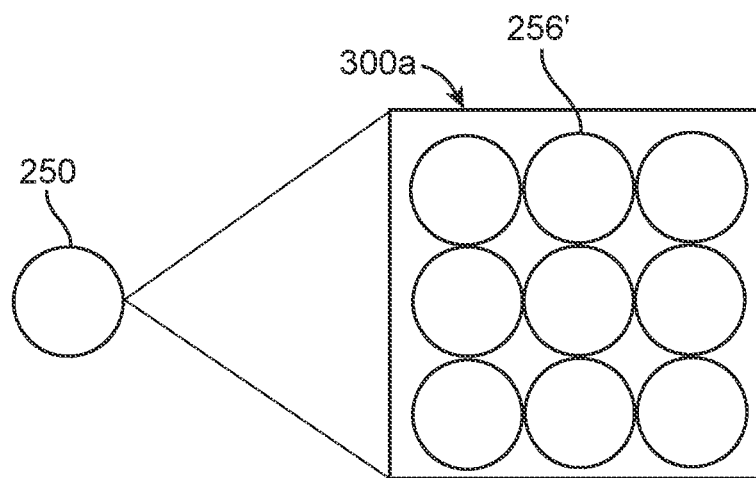
FIGS. 59A and 59B are conceptual views of a relatively dense exit pupil of a primary waveguide apparatus of a display screen that has been pre-expanded with a pre-pupil expander (PPE)
Figure 59B:
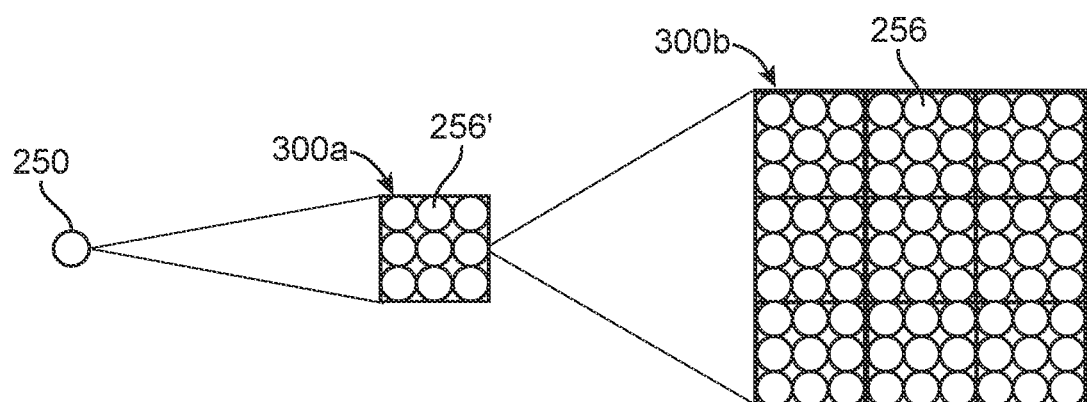

The PPE 192 represents the first pupil expansion stage, and is designed to use one or more beam-multiplication techniques to pre-expand the entrance pupil of the collimated light beam 250 to an intermediate exit pupil 300a of a set (in this case, a two-dimensional 3×3 array) of initial out-coupled light beamlets 256' prior to in-coupling into the waveguide apparatus 170 of the display screen 110 (which emulates inputting a conventional collimated light beam having a larger pupil size as illustrated in FIG. 59A), and the display screen 110 represents the second pupil expansion stage, which further expands, in a conventional manner, the pupil size of the collimated light beam 250 to a final exit pupil 300b of a set (in this case, a two-dimensional 9×9 array) of final out-coupled light beamlets 256, as illustrated in FIG. 59B.

In alternative embodiments, the display screen 110 may further expand the pupil size of the collimated light beam 250 to an exit pupil of an even more saturated set of final out-coupled light beamlets 256 using the aforementioned enhanced beam multiplication techniques. However, it should be appreciated that the use of the PPE 192 lends itself well to miniature-scale image devices that output relatively small pupil sized light beams that can be expanded to normal pupil sized light beams for input into a conventional PE for expansion to an exit pupil commensurate with the entrance pupil size of the eye(s) 52 of the end user 50. For example, the PPE 192 may expand the entrance pupil of a collimated beam to a pre-expanded pupil that is at least ten times larger (e.g., at least 0.5 mm pupil) than the entrance pupil (e.g., 50 mil pupil size), and the waveguide apparatus 170 of the display screen 110 may further expand the pre-expanded pupil of the collimated light beam 250 to an exit pupil that is at least ten times larger (e.g., at least 5 mm pupil) than the pre-expanded pupil of the collimated light beam 250. By utilizing a multi-stage pupil expansion system, manufacturing constraints associated with expanding the relatively small pupil of a collimated beam to a relatively large and saturated exit pupil need not be imposed on just one pupil expansion device, but rather can be distributed amongst multiple expansion devices, thereby facilitating manufacture of the entire system.

Referring now to FIGS. 60-63, some embodiments of the display subsystem 104' utilize a conventional PE that comprises the afore-described waveguide apparatus 170 illustrated in FIGS. 34-36 and a PPE 192*a* that, in the illustrated embodiment, takes the form of a mini-version of the waveguide apparatus 170 that is mounted to the IC element 168.

To this end, the PPE 192*a* takes the form of a waveguide apparatus 170' having a size commensurate with the size of the IC element 168 of the primary waveguide apparatus 170. As with the primary waveguide apparatus 170 of the display screen 110, the mini-waveguide apparatus 170' comprises a planar optical waveguide 172' that takes the form of a single unitary substrate or plane of optically transparent material (as described above with respect to the waveguide 172) and one or more DOEs 174' associated with the waveguide 172' for two-dimensionally pre-expanding the effective exit pupil of a collimated light beam 250 optically coupled into the waveguide 172'. The PPE 192*a* further comprises an IC element 168' disposed on the face 180*b*' of the waveguide 172' for receiving the collimated light beam 250 from the collimation element 166 into the waveguide 172' via the face 180*b*', although in alternative embodiments, the IC element 168' may be disposed on the other face 180*a*' or even the edge of the waveguide 172' for coupling the collimated light beam 250 into the waveguide 172 as an in-coupled light beam. The DOE(s) 174' are associated with the waveguide 172' (e.g., incorporated within the waveguide 172' or abutting or adjacent one or more of the faces 180*a*', 180*b*' of the waveguide 172') for, as briefly discussed above, two-dimensionally pre-expanding the effective entrance pupil of the collimated light beam 250 optically coupled into the waveguide 172'.

To this end, the DOE(s) 174 comprise an orthogonal pupil expansion (OPE) element 186 for splitting the in-coupled light beam 252 into a set of initial orthogonal light beamlets 254', and an exit pupil expansion (EPE) element 188' for splitting each initial orthogonal light beamlet 254' into a set of initial out-coupled light beamlets 256' that exit the face 180*b*' of the waveguide 172'. In the particular embodiment illustrated in FIGS. 60-63, the OPE element 186' and EPE element 188' completely overlap each other in the x-y plane, and thus, the OPE element 186' is disposed on the face 180*a* of the waveguide 172' and the EPE element 188' is disposed on the face 180*b* of the waveguide 172'. Alternatively, the OPE element 186' and EPE element 188' may not overlap at all in the x-y plane, in which case, both the OPE element 186' and EPE element 188' may be disposed on the same face 180*b* of the waveguide 172'.

Figure 60:
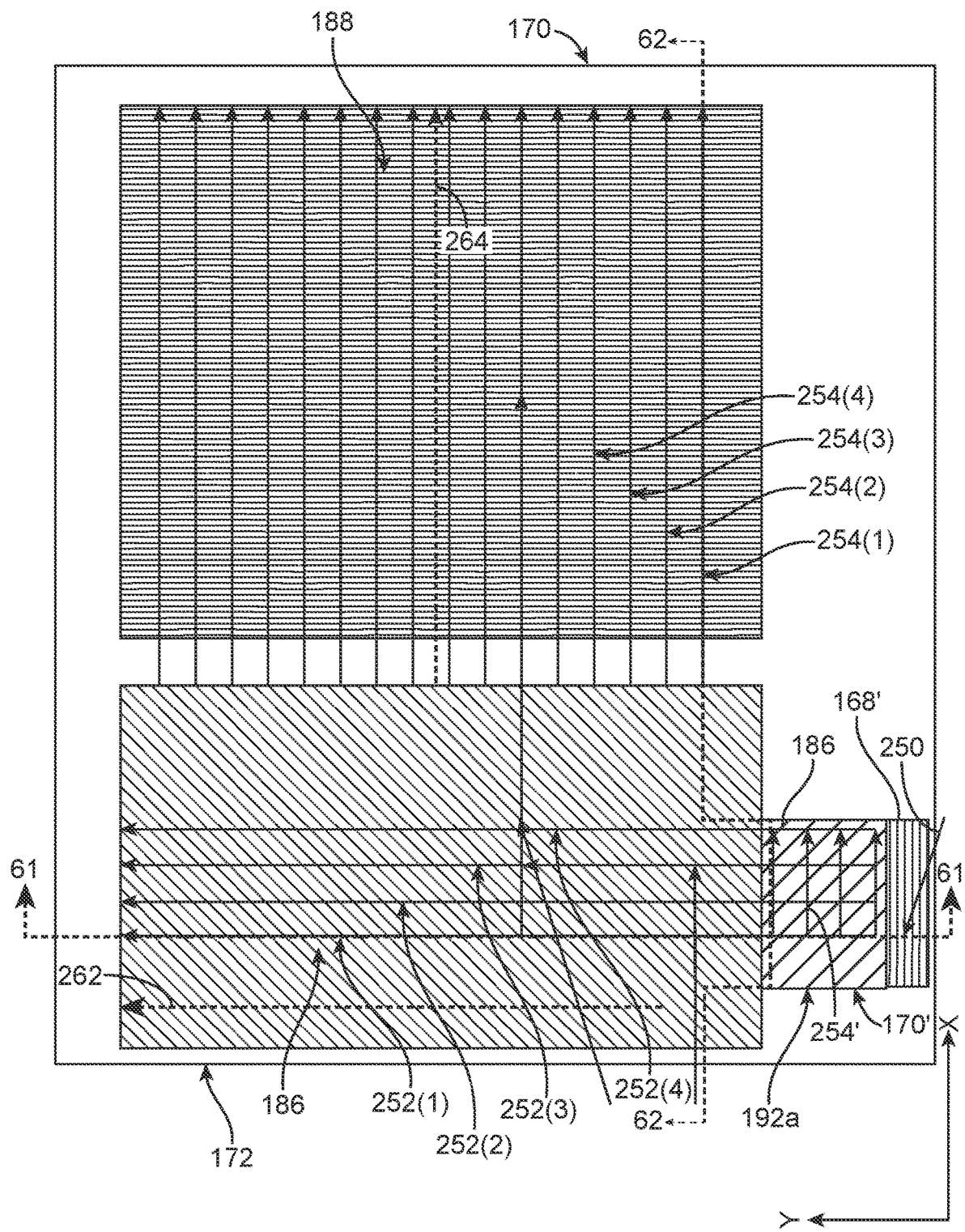
FIG. 60 is a plan view of some embodiments of the PPE of FIGS. 59A and 59B used with the primary waveguide apparatus of FIG. 6.
Figure 61:
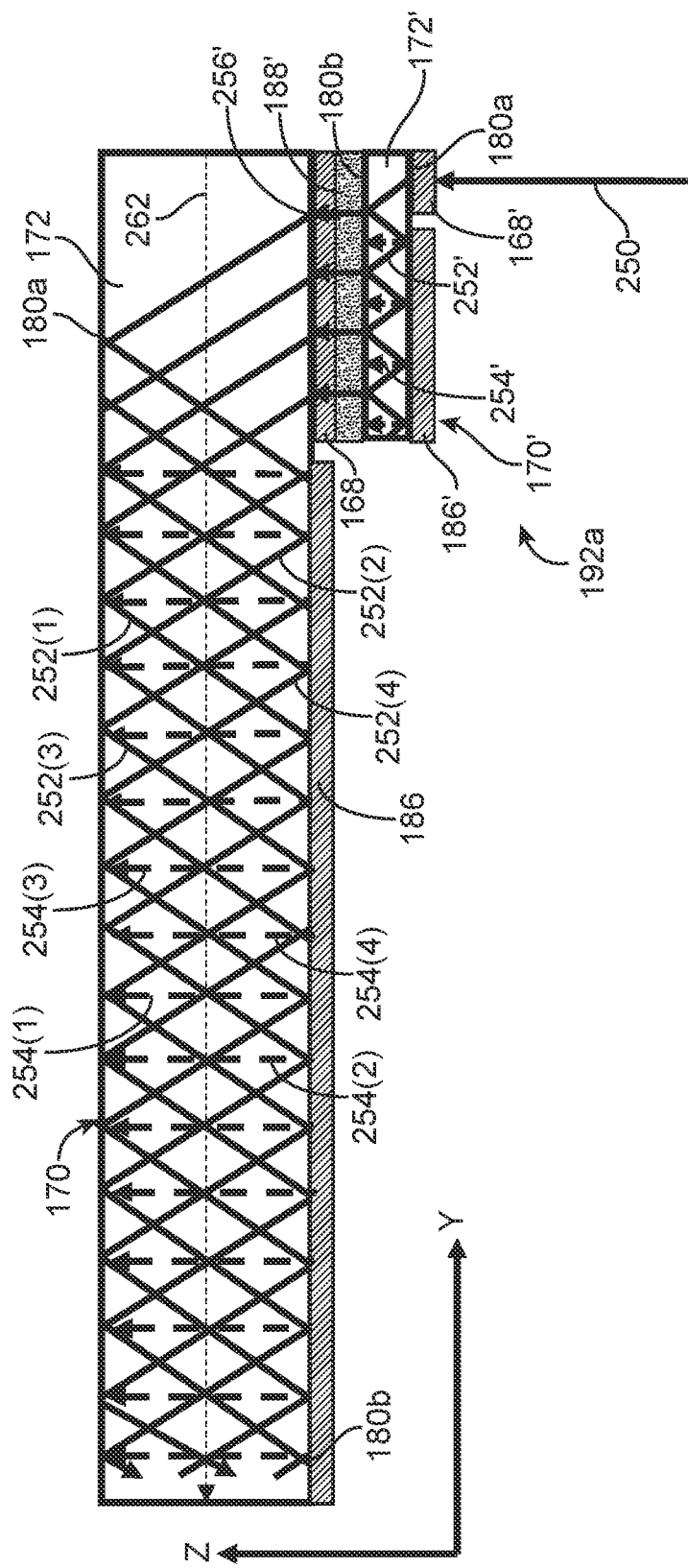
FIG. 61 is a cross-sectional view of the primary waveguide apparatus and PPE of FIG. 60, taken along the line 61-61.

The OPE element 186' relays light along a first axis (horizontal or x-axis in FIG. 60), and pre-expands the effective exit pupil of light along a second axis (vertical or y-axis in FIG. 60). In particular, as best shown in FIG. 61, the IC element 168' optically in-couples the collimated light beam 250 as an in-coupled light beam 252' for propagation within the waveguide 172' via TIR along an internally reflective optical path 262 (in this case, along the vertical or y-axis), and in doing so, repeatedly intersects the OPE element 186'. In the illustrated embodiment, the OPE element 186' has a relatively low diffraction efficiency (e.g., less than 50%), and comprises a series of diagonal diffractive elements (forty-five degrees relative to the x-axis), such that, at each point of intersection with the OPE element 186', a portion (e.g., greater than 90%) of the in-coupled light beam 252' continues to propagate within the waveguide 172' via TIR along an internally reflective optical path parallel to the axis 262 (y-axis), and the remaining portion (e.g., less than 10%) of the in-coupled light beam 252' is diffracted as an initial orthogonal light beamlet 254' (shown as being dashed in FIG. 61) that propagates within the waveguide 172' via TIR along an internally reflective optical path parallel to the axis 264 (in this case, along the horizontal or x-axis) toward the EPE element 188'. It should be appreciated that although the axis 264 is described as being perpendicular or orthogonal to the axis 262 (y-axis), the axis 264 may alternatively be obliquely oriented with respect to the axis 262.

Thus, by dividing the in-coupled light beam 252' into multiple initial orthogonal light beamlets 254' that propagate along parallel internally reflective optical paths 264, the entrance pupil of the collimated light beam 250 in-coupled into the mini-waveguide apparatus 170' is pre-expanded vertically along the y-axis by the OPE element 186'.

Figure 62:
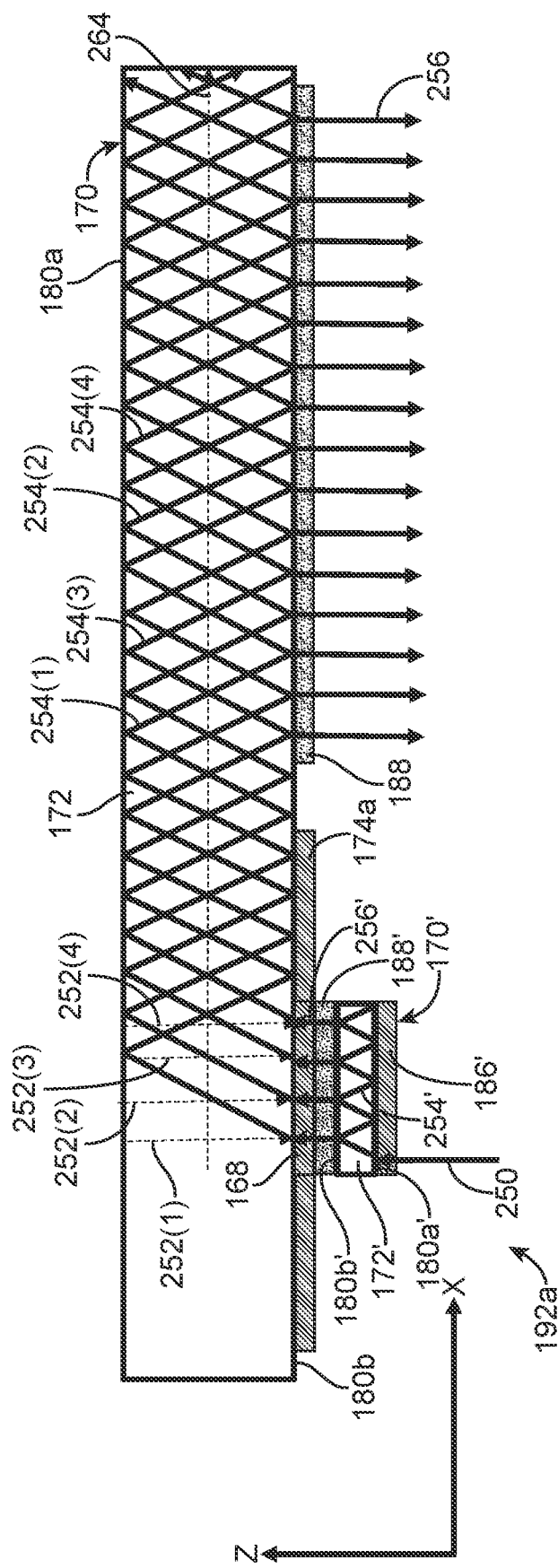
FIG. 62 is a cross-sectional view of the primary waveguide apparatus and PPE of FIG. 60, taken along the line 62-62.

The EPE element 188', in turn, further pre-expands the light's effective pupil along the first axis (horizontal x-axis in FIG. 62). In particular, the EPE element 188', like the OPE element 186', has a relatively low diffraction efficiency (e.g., less than 50%), such that, at each point of intersection with the EPE element 188', a portion (e.g., greater than 90%) of each initial orthogonal light beamlet 254' continues to propagate along a respective internally reflective optical path parallel to the axis 264 (x-axis), and the remaining portion of each initial orthogonal light beamlet 254' is diffracted as an initial out-coupled light beamlet 256' that exits the face 180*b*' of the waveguide 172' (along the z-axis), as illustrated in FIG. 62. That is, every time a light beamlet hits the EPE element 188', a portion of it will be diffracted toward the face 180*b* of the waveguide 172', while the remaining portion will continue to propagate along a respective internally reflective optical path parallel to the axis 264 (x-axis).

Thus, by dividing each initial orthogonal light beamlet 254' into multiple initial out-coupled light beamlets 256', the exit pupil of the in-coupled light beam 252 is further pre-expanded horizontally along the x-axis by the EPE element 188', resulting in a two-dimensional array of initial out-coupled light beamlets 256' that resemble a larger version of the original in-coupled light beam 252.

In the same manner as described above with respect to FIGS. 34-36, the primary waveguide apparatus 170 further two-dimensionally expands the pupil of the collimated light beam 250. That is, the initial out-coupled light beamlets 256' are input into the IC element 168 of the primary waveguide apparatus 170 as in-coupled light beamlets 252(1)-252(4), which are in turn, split by the OPE element 186 into four sets of orthogonal light beamlets 254(1)-254(4), which are further split by the EPE element 188 into final out-coupled light beamlets 256 that exit the face 180b of the waveguide 172 towards the eye(s) 52 of the end user 50.

Figure 63:
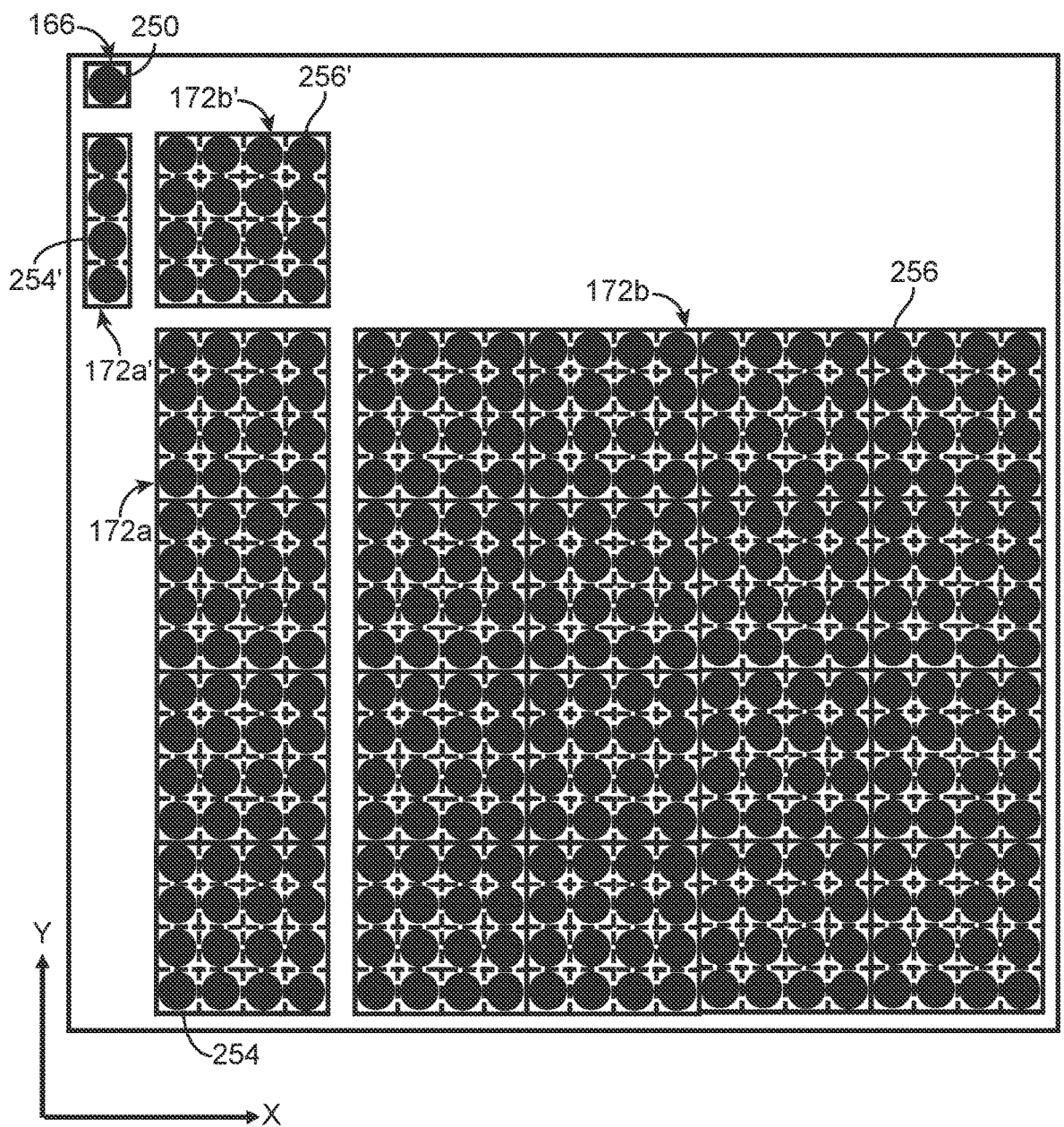
FIG. 63 is a conceptual view of the pre-expansion and conventional expansion of the entrance pupil of the collimated light beam to an exit pupil using the PPE of FIG. 60.

Thus, as illustrated in FIG. 63, a single collimated light beam 250 is split into a one-dimensional array of four initial orthogonal light beamlets 254' by the OPE element 186', which is further split into a two-dimensional 4×4 array of initial out-coupled light beamlets 256' by the EPE element 188', which is further split into a two-dimensional 4×16 array of orthogonal light beamlets 254 by the OPE element 174', which is further split into a 16×16 array of final out-coupled light beamlets 256. As can be appreciated, the use of the PPE 192a (i.e., the mini-waveguide apparatus 170') increases the saturation of the exit pupil of the display screen 110 from a 4×4 array of final out-coupled light beamlets 256 to a 16×16 array of final out-coupled light beamlets 256. Of course, the PPE 192a can be designed to create smaller or larger arrays of initial out-coupled light beamlets 256', e.g., a 2×2 array, 3×3 array, 5×5 array, etc., and can even be designed to create a non-square matrix of initial out-coupled light beamlets 256', e.g., a 2×3 array, 3×2 array, 3×4 array, 4×3 array, etc. Significantly, the thickness of the waveguide 172 of the primary waveguide apparatus 170 will be greater than the thickness of the waveguide 172' of the mini-waveguide apparatus 170'. In this case, for purposes of simplicity in illustration, the thickness of the primary waveguide 172 is four times the thickness of the secondary waveguide 172'. However, it should be appreciated that, as discussed above with respect to the embodiments of FIGS. 44-57, it may be beneficial to maximize the least common multiple of the respective thickness values of the waveguides 172, 172', thereby maximizing the quantity of exit pupils yielded for the widest scan angle, and furthermore, yielding an uneven/complex distribution of out-coupled beamlets 256 that may minimize adverse effects created by coherent light interaction between adjacent out-coupled beamlets 256.

Figure 64:
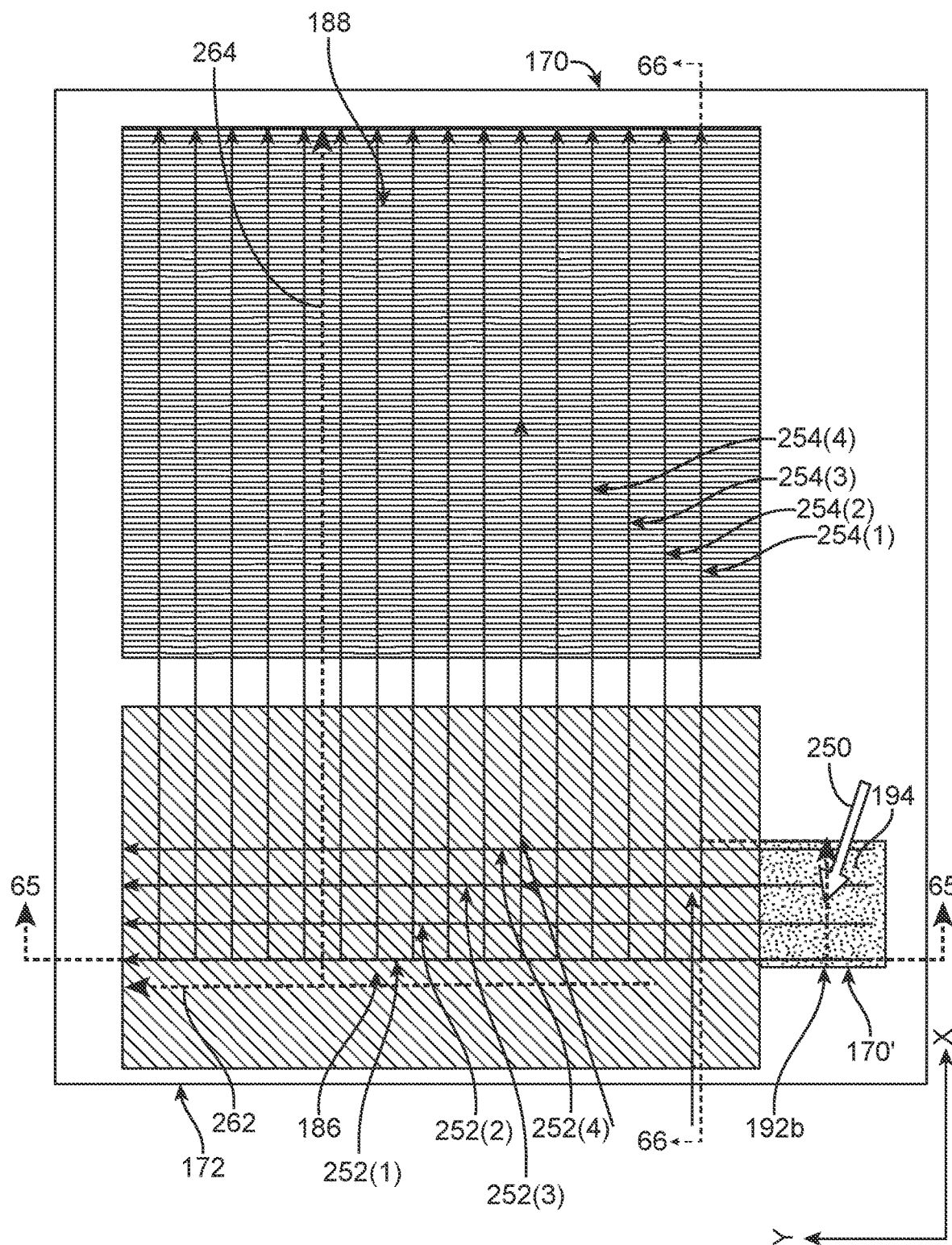
FIG. 64 is a plan view of another embodiment of the PPE of FIGS. 59A and 59B used with the primary waveguide apparatus of FIG. 34.
Figure 65:
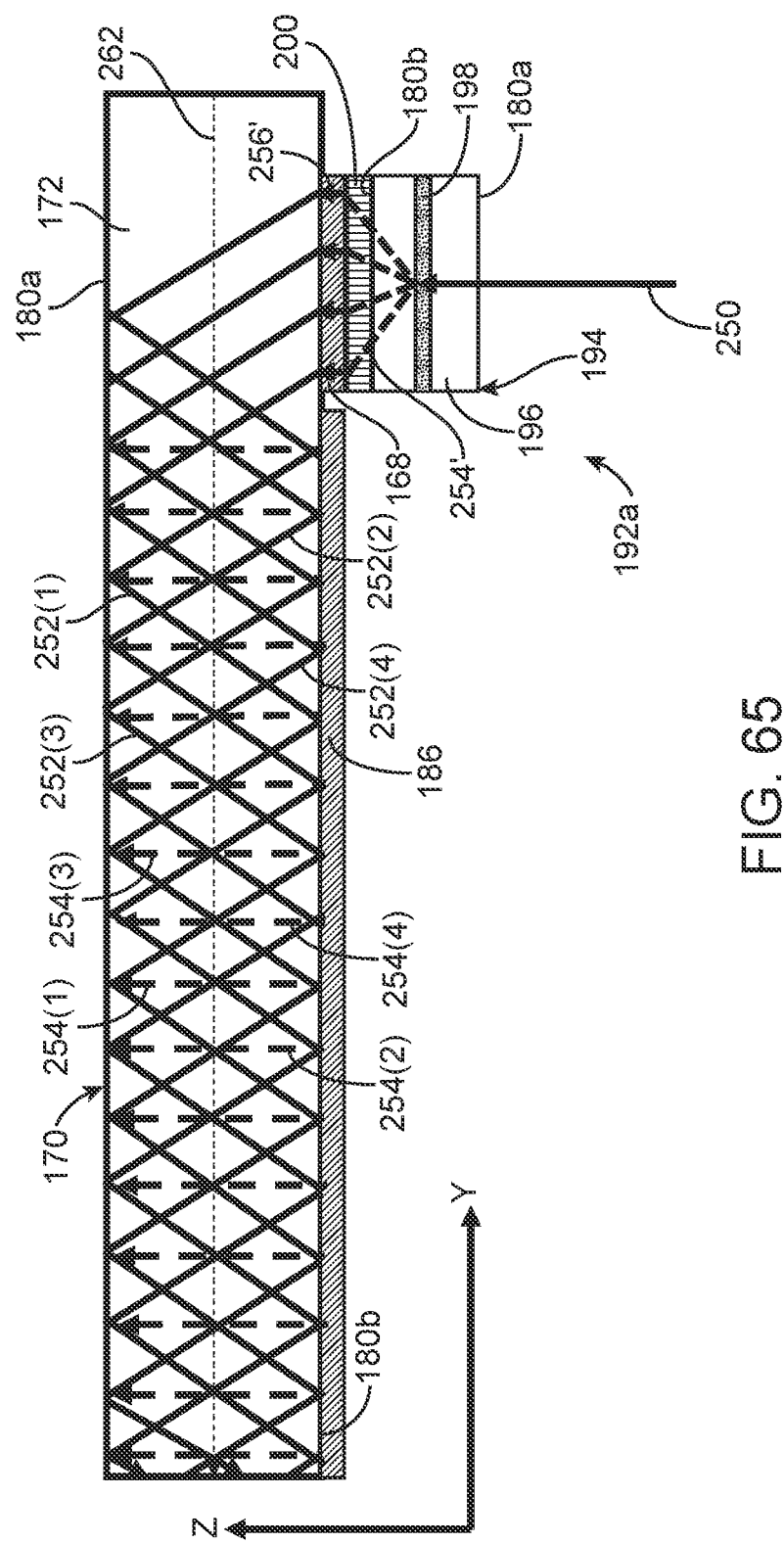
FIG. 65 is a cross-sectional view of the primary waveguide apparatus and PPE of FIG. 64, taken along the line 65-65.
Figure 66:
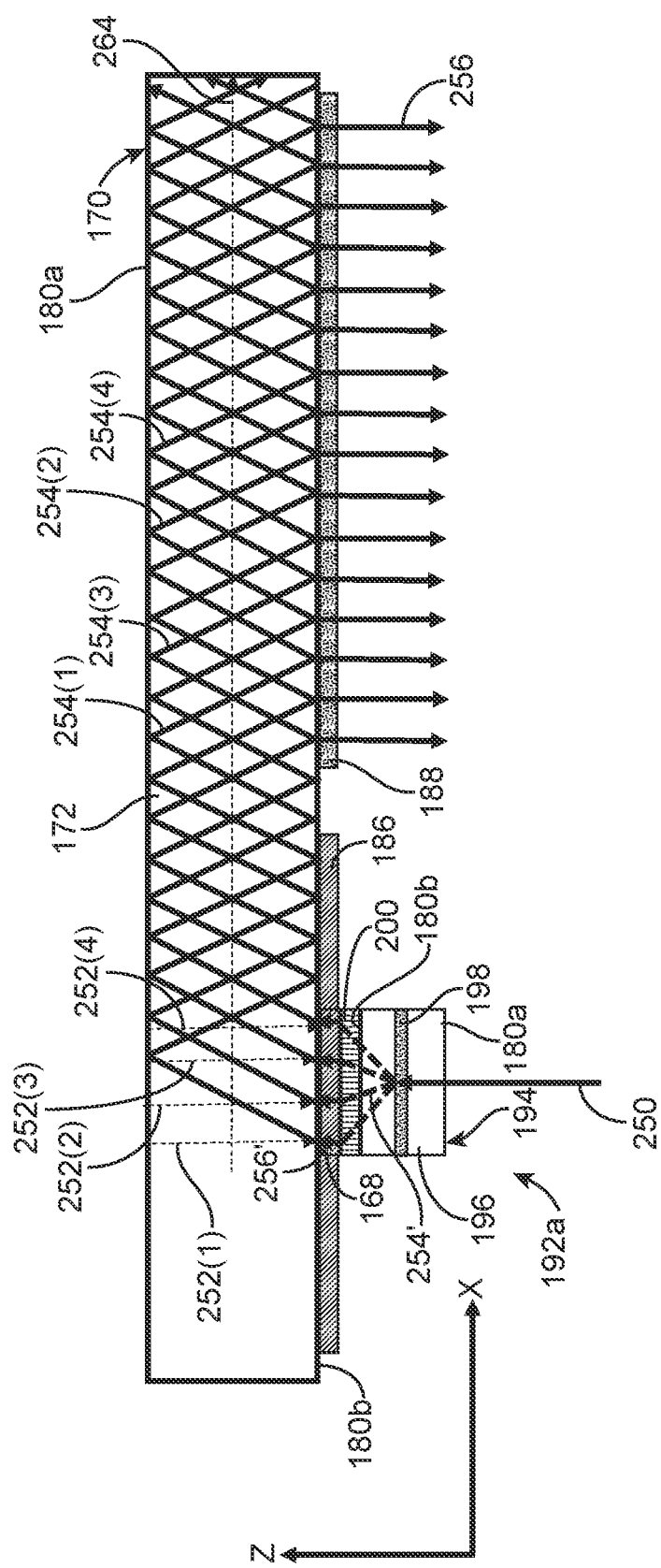
FIG. 66 is a cross-sectional view of the primary waveguide apparatus and PPE of FIG. 64, taken along the line 66-66.

Referring now to FIGS. 64-66, another embodiment of a display subsystem 104' utilizes a conventional PE that comprises the afore-described waveguide apparatus 170 illustrated in FIGS. 34-36 and a PPE 192b that, like the PPE 192a, two-dimensionally pre-expanding the effective entrance pupil of a collimated light beam 250 optically coupled into the PPE 192b, but unlike the PPE 192a, is not a waveguide, but rather takes the form of an adapter.

In particular, the PPE 192b comprises a diffractive beam splitter 194 that utilizes a single DOE that splits the collimated light beam 250 into a set of initial out-coupled light beamlets 256'. As best shown in FIGS. 65 and 66, the diffractive beam splitter 194 comprises an optical planar substrate 196 having opposing first and second faces 196a, 196b and a diffraction grating 198 associated with the one of the faces 196a, 196b, and in this case, the face 196b of the substrate 196. The diffraction grating 198 splits the collimated light beam 250 entering the face 196a of the substrate 196 into a set of diverging light beamlets 254' that exit the face 196b of the substrate 196 at diverging angles.

Figure 67A:
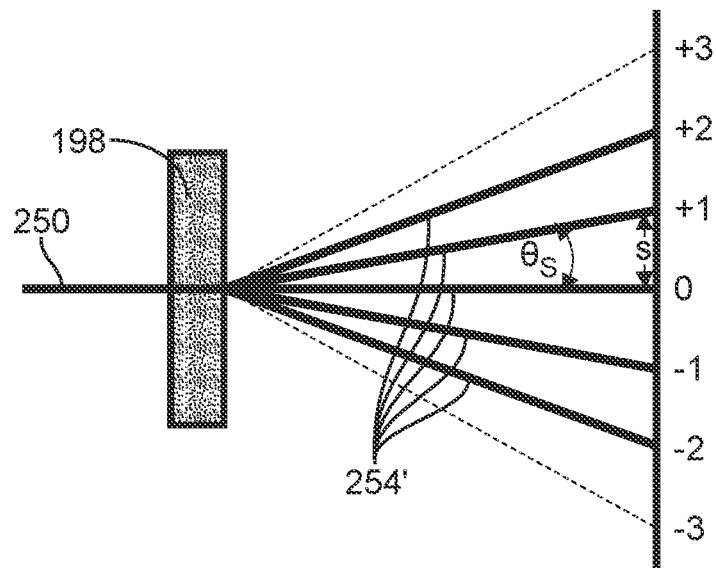
FIGS. 67A and 67B are profile views of different variations of the PPE of FIG. 64.
Figure 67B:
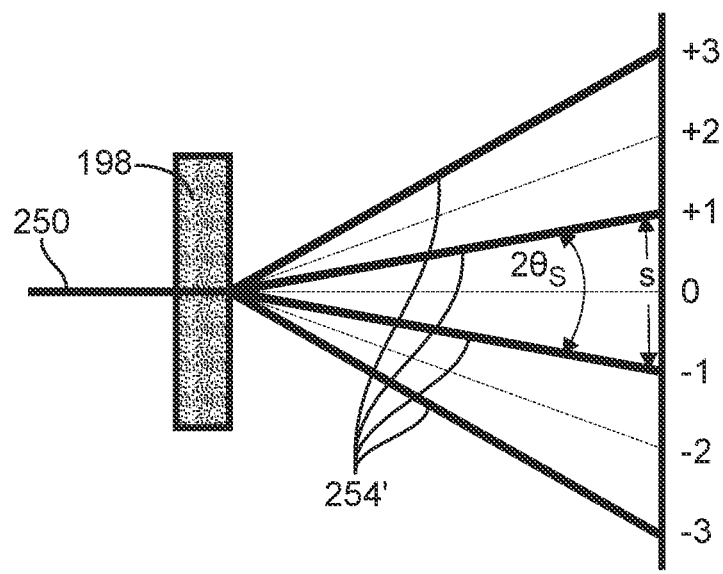

The diffraction grating 198 can be designed to generate an odd number of diverging light beamlets 254' from the single collimated light beam 250 or an even number of diverging light beamlets 254' from the single collimated light beam 250. Significantly, when the collimated light beam 250 intersects the diffraction grating 198, beamlets are created at different diffraction orders. For example, as illustrated in FIG. 67A, one diffraction grating 198' is designed to split the collimated light beam 250 into five diverging light beamlets 254' respectively corresponding to five diffraction orders (−2, −1, 0, +1, +2), each diverging light beamlet 254' being separated from an adjacent diverging light beamlet 254' by a separation angle $\theta_s$. As illustrated in FIG. 67B, another diffraction grating 198" is designed to split the collimated light beam 250 into four diverging light beamlets 254' respectively corresponding to four diffraction orders (−3, −1, +1, +3), each diverging light beamlet 256' being separated from an adjacent diverging light beamlet 256' by a separation angle $2\theta_s$.

The diffraction grating 198 may either split the collimated light beam 250' into a one-dimensional array of diverging light beamlets 254' or a two-dimensional (M×N) array of diverging light beamlets 254'. In the embodiment illustrated in FIGS. 64-66, the diffraction grating splits the collimated light beam 250 into a 4×4 array of diverging light beamlets 254'. Of course, the PPE 192b can be designed to create smaller or larger arrays of diverging light beamlets 254', e.g., a 1×2 array, 2×1 array, 2×2 array, 3×3 array, 5×5 array, etc., and can even be designed to create non-square two-dimensional arrays of diverging light beamlets 254', e.g., a 2×3 array, 3×2 array, 3×4 array, 4×3 array, etc.

Significantly, the PPE 192b applies an angle preserving expansion to the collimated light beam 250. That is, the PPE 192b bends the set of diverging light beamlets 254' exiting the face 196b of the substrate 196 back to the original angle of the collimated light beam 250'. To this end, the PPE 192b comprises a lens 200, and in this embodiment a diffractive lens, that refocuses the diverging light beamlets 254' as the set of initial out-coupled light beamlets 256' back to the original angle of the collimated light beam 250'. Although the diffractive lens 200 is illustrated as being separate from the IC element 168, the function of the diffractive lens 200 can be incorporated into the IC element 168.

It can be appreciated from the foregoing that the PPE 192b two-dimensionally pre-expands the effective entrance pupil of the collimated light beam 250. In the same manner as described above with respect to FIGS. 34-36, the primary waveguide apparatus 170 further two-dimensionally expands the pupil of the collimated light beam 250. That is, the 4×4 array of initial out-coupled light beamlets 256' are input into the IC element 168 of the primary waveguide apparatus 170 as a 4×4 array of in-coupled light beamlets 252 (only 252(1)-252(4) shown), which are in turn, split by the OPE element 186 into a 4×4 array of orthogonal light beamlets 254 (only 254(1)-254(4) shown), which are further split by the EPE element 188 into final out-coupled light beamlets 256 that exit the face 180b of the waveguide 172 towards the eye(s) 52 of the end user 50, as illustrated in FIGS. 64-66. Notably, the separation angle $\theta_s$ in the embodiment of FIG. 67A or the separation angle $2\theta_s$, in FIG. 67B will be selected, such that the separation distance s between adjacent initial out-coupled light beamlets 256' at the intersection with the lens 200 will be equal to the desired spacings of the final out-coupled light beamlets 256 exiting the primary waveguide apparatus 170.

Referring now to FIGS. 68-73, still another embodiment of a display subsystem 104 utilizes a conventional PE that comprises the afore-described waveguide apparatus 170 illustrated in FIGS. 34-36 and a PPE 192c that, like the PPE 192a, two-dimensionally pre-expands the effective exit pupil of a collimated light beam 250 optically coupled into the PPE 192c, but unlike the PPE 192a, is not a waveguide, but rather takes the form of a prism.

Figure 71:
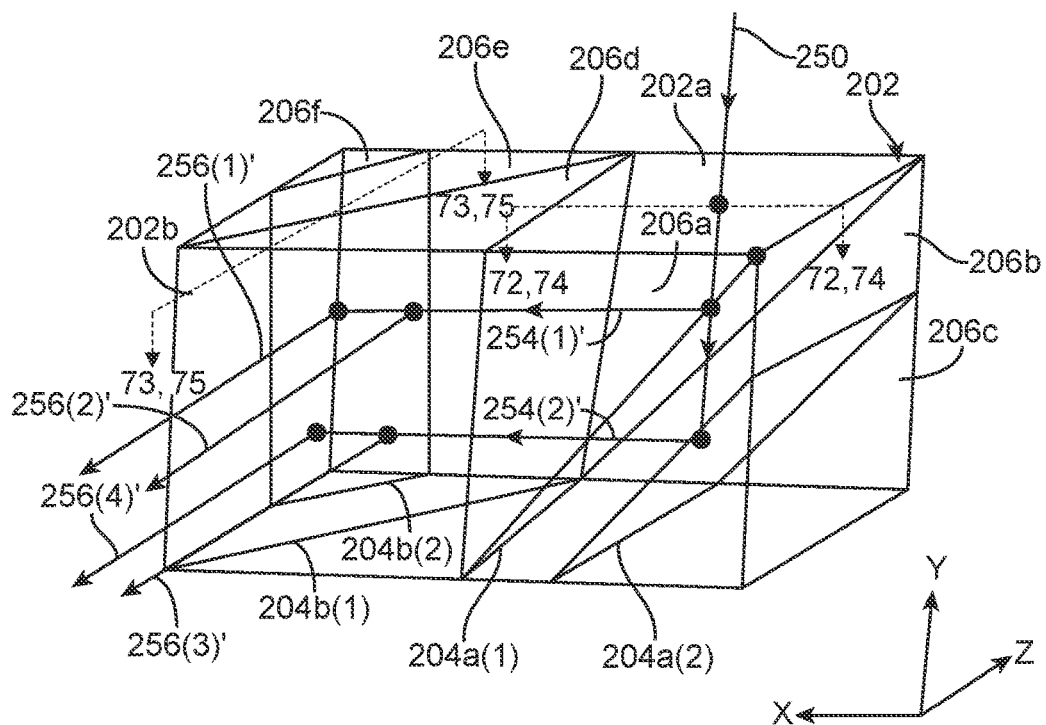
FIG. 71 is a perspective view of the PPE of FIG. 68.
Figure 72:
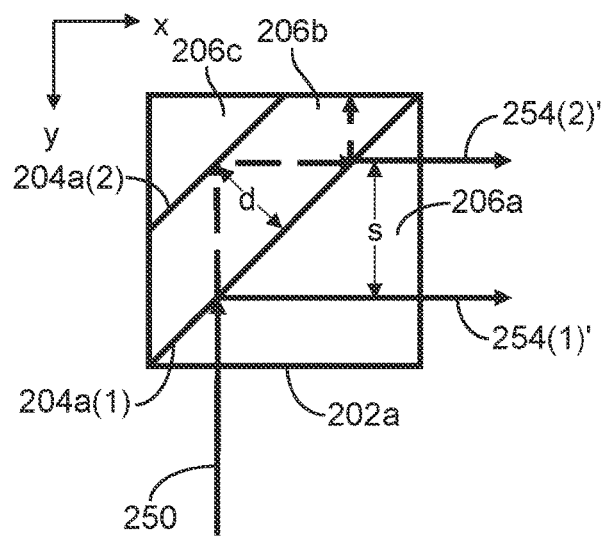
FIG. 72 is a cross-sectional view of a first variation of the PPE of FIG. 71, taken along the line 72-72.
Figure 73:
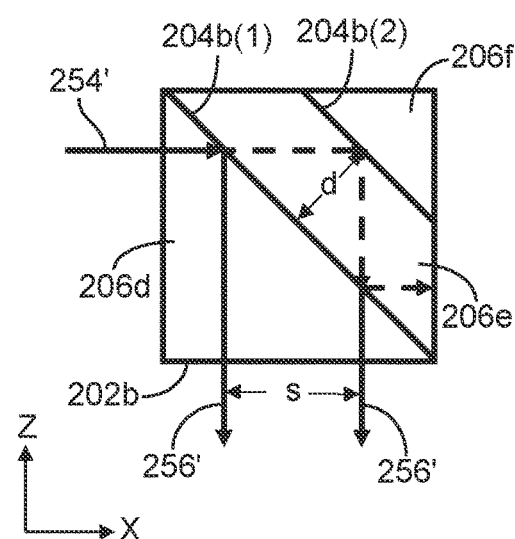
FIG. 73 is a cross-sectional view of the first variation of the PPE of FIG. 71, taken along the line 73-73.

As best shown in FIGS. 71-73, the PPE 192c comprises an optically transparent prism body 202, which, in the illustrated embodiment, takes the form of cuboid having a first face 202a and a second face 202b, and a plurality of prism planes 204 disposed in the interior of the prism body 202. The plurality of prism planes 204 comprises a first set of parallel prism planes 204a disposed at an oblique angle to the first face 202a (in this case, at a forty-five degree angle) and a second set of parallel prism planes 204b at an oblique angle to the second face 202b (in this case, at a forty-five degree angle). In the illustrated embodiment, the first set of parallel prism planes 204a consists of two prism planes 202a(1) and 202a(2), and the second set of parallel prism planes 204b consists of two prism planes 202b(1) and 202b(2), although in alternative embodiments, each set of parallel prism planes 204 may consist of more than two prism planes.

The prism body 202 comprises prism sections 206a-202f that are bonded together to create the whole of the prism body 202. The prism plane 204a(1) is formed at the interface between the prism sections 206a and 206b; the prism plane 204a(2) is formed at the interface between the prism sections 206b and 206c; the prism plane 204b(1) is formed at the interface between the prism sections 206d and 206e; and the prism plane 204b(2) is formed at the interface between the prism sections 206e and 206f.

The prism planes 204 are configured for splitting a collimated light beam 250 entering the first face 202a of the prism body 202 into a set of initial out-coupled light beamlets 256' (and in this case, a 2×2 array of light beamlets 256') that exit the second face 202b of the prism body 202.

To this end, each of the prism planes 204a(1) and 204b(1) is formed of a semi-reflective coating, such as one composed of, e.g., a metal, such as gold, aluminum, silver, nickel-chromium, chromium, etc., a dielectric, such as oxides, fluorides, sulfides, etc., a semiconductor, such as silicon, germanium, etc., and/or a glue or adhesive with reflective properties, which can be disposed between adjacent prism sections 206 via any suitable process, such as physical vapor deposition (PVD), ion-assisted deposition (IAD), ion beam sputtering (IBS), etc. The ratio of reflection to transmission of the semi-reflective coating may be selected or determined based at least in part upon the thickness of the coating, or the semi-reflective coating may have a plurality of small perforations to control the ratio of reflection to transmission. Thus, each of the prism planes 204a(1) and 204b(1) will split a light beam by reflecting a portion of the light beam and transmitted the remaining portion of the light beam. In contrast, each of the prism planes 204a(2) and 204b(2) is preferably formed of a completely reflective coating, which may be composed of the same material as the semi-reflective coating. However, the thickness of the coating may be selected, such that the prism planes 204a(2) and 204b(2) are completely reflective.

In an alternative embodiment, adjacent prism sections 206 may be composed of materials having different indices of refraction, such that the prism plane 204 between the respective prism sections 206 is semi-reflective (in the case of prism planes 204a(1) or 204b(1)) or completely reflective (in the case of prism planes 204a(2) and 204b(2)) for light that is incident on the semi-reflective interface at less than a critical angle. In any event, each prism plane 204 is preferably designed, such that the angle of a light beam incident on the prism plane 204 is preserved.

As best shown in FIG. 72, the first set of prism planes 204a relay light along a first axis (horizontal or x-axis), and pre-expands the effective exit pupil of light along a second axis (vertical or y-axis). In particular, the first set of prism planes 204a split the collimated light beam 250 entering the first face 202a of the prism body 202 into two orthogonal light beamlets 254(1)' and 254(2)', and reflects these light beamlets 254' toward the second set of prism planes 204b in a first direction. That is, a portion of the collimated light beam 250 is reflected by the prism plane 204a(1) as the orthogonal light beamlet 254(1)', and the remaining portion of the collimated light beam 250 is transmitted by the prism plane 204a(1) to the prism plane 204a(2) for reflection as the orthogonal light beamlet 254(2)'.

As best shown in FIG. 73, the second set of prism planes 204b, in turn, further pre-expand the light's effective exit pupil along the second axis (horizontal or x-axis). In particular, the second set of prism planes 204b split each of the orthogonal light beamlets 254' into two initial out-coupled light beamlets 256', and reflects these initial out-coupled light beamlets 256' out of the second face 202b of the prism body 202 in a second direction orthogonal to the first direction, although the second direction may be non-orthogonal to the first direction. That is, a portion of the orthogonal light beamlet 254(1)' is reflected by the prism plane 204b(1) as an initial out-coupled light beamlet 256(1)', and the remaining portion of the orthogonal light beamlet 254(1)' is transmitted by the prism plane 204b(1) to the prism plane 204b(2) for reflection as an initial out-coupled light beamlet 256(2)'. Likewise, a portion of the orthogonal light beamlet 254(2)' is reflected by the prism plane 204b(1) as an initial out-coupled light beamlet 256(3)', and the remaining portion of the orthogonal light beamlet 254(2)' is transmitted by the prism plane 204b(1) to the prism plane 204b(2) for reflection as an initial out-coupled light beamlet 256(4)'. Thus, a 2×2 array of initial out-coupled light beamlets 256' exit the second face 202b of the prism body 202.

Figure 68:
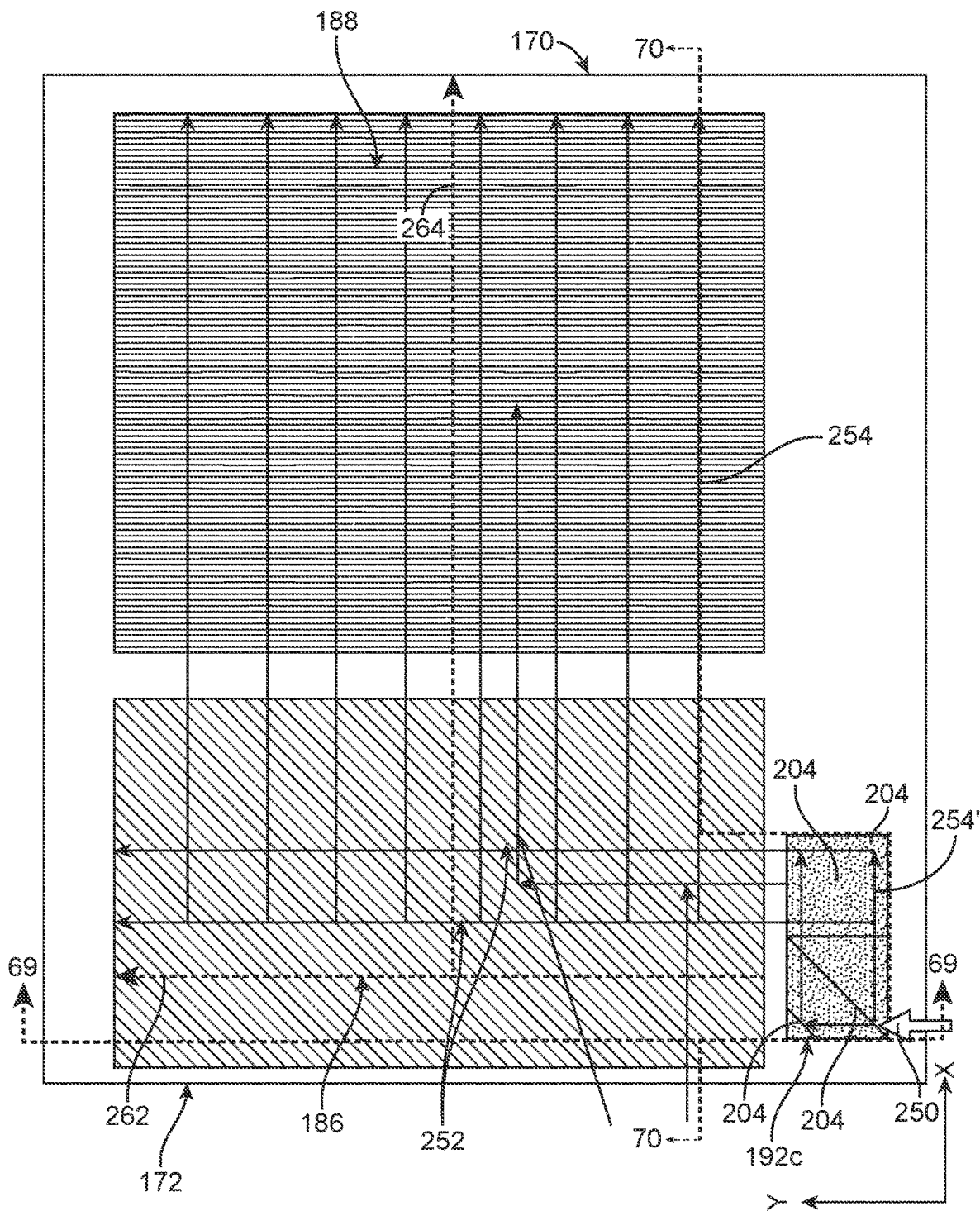
FIG. 68 is a plan view of still another embodiment of the PPE of 59A and 59B used with the primary waveguide apparatus of FIG. 34.
Figure 69:
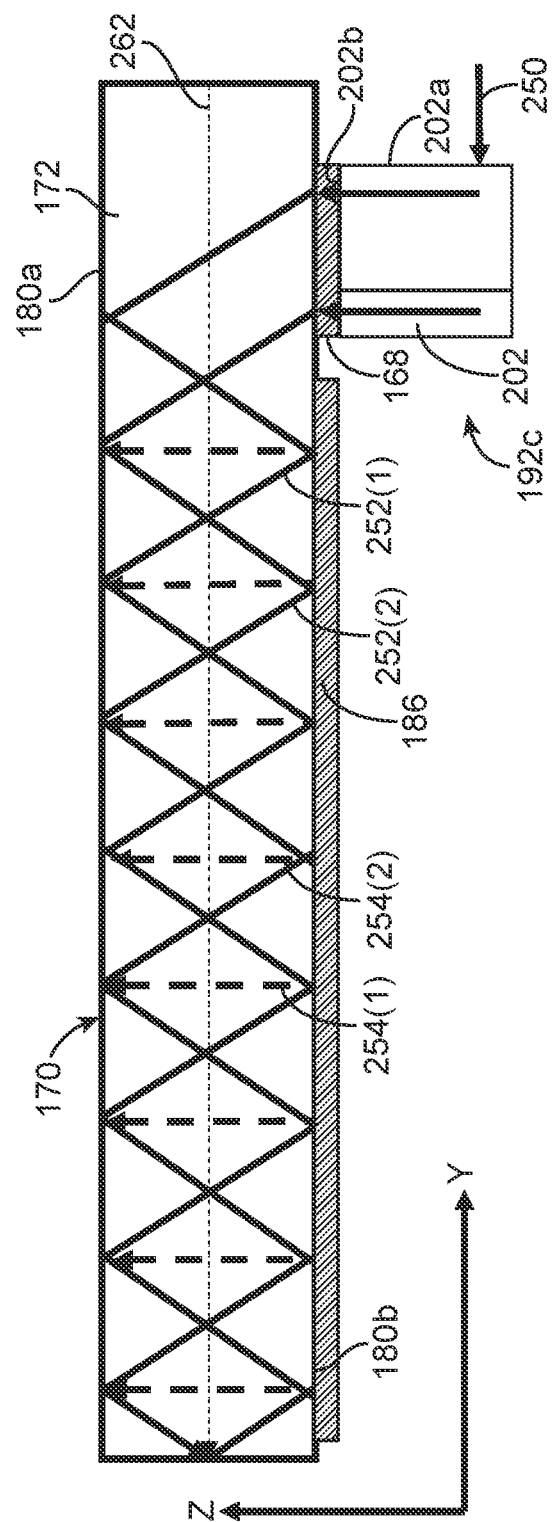
FIG. 69 is a cross-sectional view of the primary waveguide apparatus and PPE of FIG. 68, taken along the line 69-69.
Figure 70:
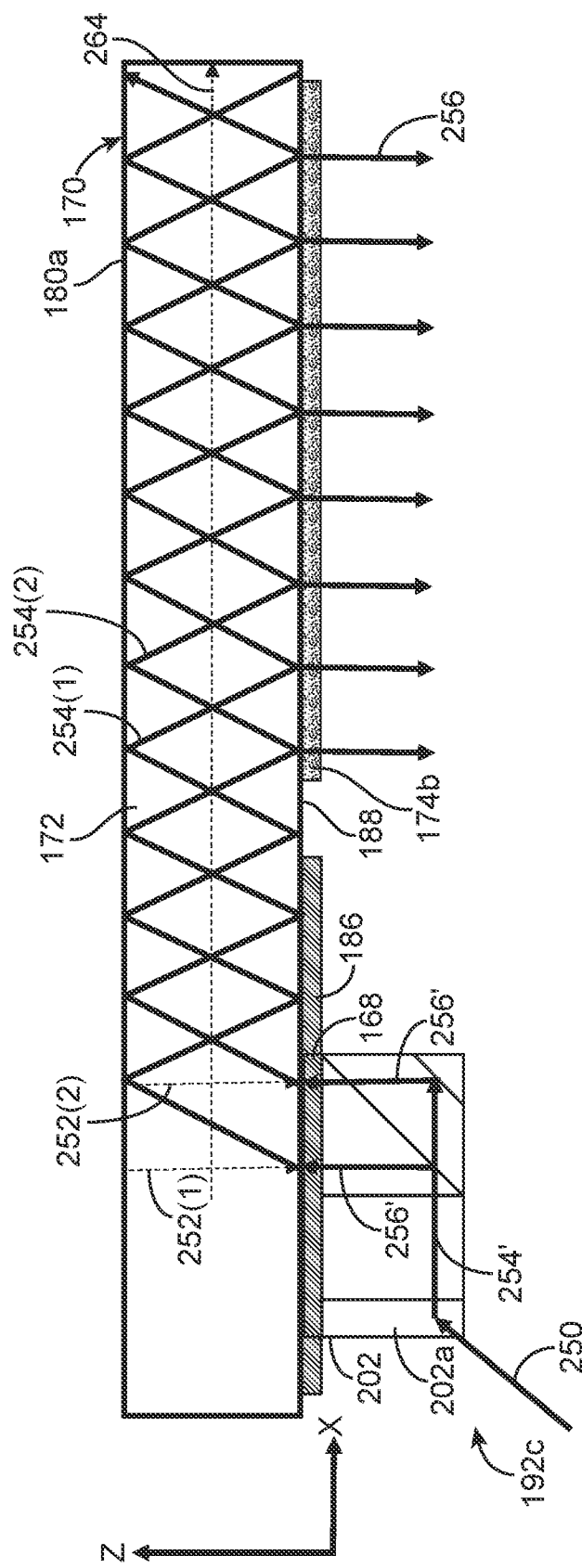
FIG. 70 is a cross-sectional view of the primary waveguide apparatus and PPE of FIG. 68, taken along the line 70-70.

It can be appreciated from the foregoing that the PPE 192c two-dimensionally pre-expands the effective entrance pupil of the collimated light beam 250. In the same manner as described above with respect to FIGS. 34-36, the primary waveguide apparatus 170 further two-dimensionally expands the pupil of the collimated light beam 250. That is, the initial out-coupled light beamlets 256' are input into the IC element 168 of the primary waveguide apparatus 170 as a 2×2 array of in-coupled light beamlets (only 252(1)-252(2) shown), which are in turn, split by the OPE element 186 into four sets of orthogonal light beamlets (only 254(1)-254(2) shown), which are further split by the EPE element 188 into final out-coupled light beamlets 256 that exit the face 180b of the waveguide 172 towards the eye(s) 52 of the end user 50, as illustrated in FIGS. 68-70.

The distance d between the prism planes 204 are preferably selected, such that the distance s between adjacent initial out-coupled light beamlets 256' will be equal to the desired spacings of the final out-coupled light beamlets 256 exiting the primary waveguide apparatus 170. In the illustrated embodiment, the prism planes 204 are oriented at forty-five degree angle to the faces 202a, 202b of the prism body 202, and thus, the distance d can be expressed as a function of the distance s, as follows: d=s*sin 45°. The thickness of the waveguide 172 in the primary waveguide apparatus 170 can be multiples of the distance d between the prism planes 204 in each set of parallel prism planes 204 of the PPE 192c (in this case, two times the distance d between the parallel prism planes 204), such that the in-fill of final out-coupled light beamlets 256 is facilitated.

Figures 74, 75:
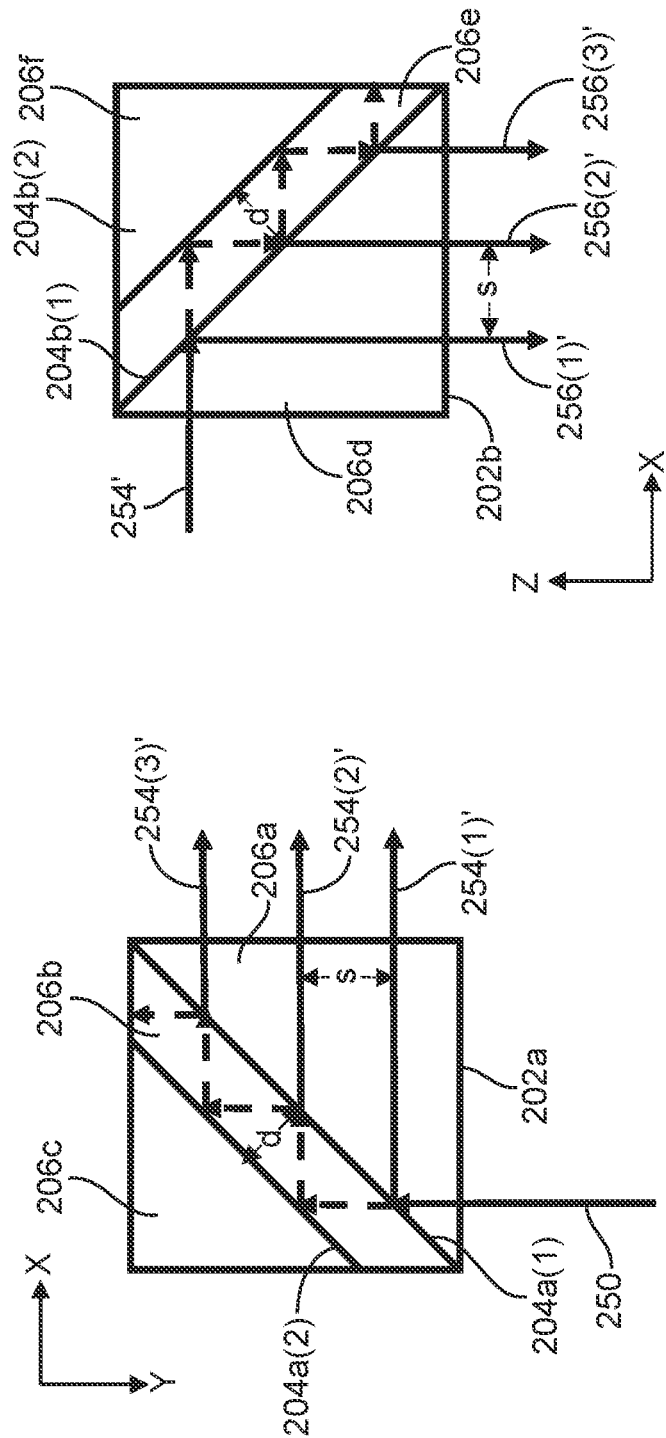
FIG. 74 is a cross-sectional view of a second variation of the PPE of FIG. 71, taken along the line 74-74.
FIG. 75 is a cross-sectional view of the second variation of the PPE of FIG. 71, taken along the line 75-75.

It should be appreciated that larger arrays of initial out-coupled light beamlets 256' may be created by decreasing the distance between the prism planes 204 in each set of parallel prism planes 204 of the PPE 192c relative to the size of the prism body 202, as illustrated in FIGS. 74 and 75.

For example, as illustrated in FIG. 74, the first set of prism planes 204a may split the collimated light beam 250 entering the first face 202a of the prism body 202 into three orthogonal light beamlets 254(1)'-254(3)', and reflects these light beamlets 254' toward the second set of prism planes 204b. That is, a portion of the collimated light beam 250 is reflected by the prism plane 204a(1) as the orthogonal light beamlet 254(1)', and the remaining portion of the collimated light beam 250 is transmitted by the prism plane 204a(1) to the prism plane 204a(2), where it is repeatedly reflected between the prism plane 204a(1) and 204a(2), portions of which will be transmitted back through the prism plane 204a(1) as the orthogonal light beamlets 254(2)' and 254(3)'.

As illustrated in FIG. 75, the second set of prism planes 204b split each of the orthogonal light beamlets 254' into three initial out-coupled light beamlets 256', and reflects these initial out-coupled light beamlets 256' out of the second face 202b of the prism body 202. Thus, a 3×3 array of initial out-coupled light beamlets 256' exit the second face 202b of the prism body 202. That is, a portion of each orthogonal light beamlet 254 is reflected by the prism plane 204b(1) as an initial out-coupled light beamlet 256(1)', and the remaining portion of this orthogonal light beamlet 254' is transmitted by the prism plane 204b(1) to the prism plane 204b(2), where it is repeatedly reflected between the prism plane 204b(1) and 204b(2), portions of which will be transmitted back through the prism plane 204b(1) as the initial out-coupled light beamlets 256(2)' and 256(3)'.

Again, the distance d between the prism planes 204 are preferably selected, such that the distance s between adjacent initial out-coupled light beamlets 256' will be equal to the desired spacings of the final out-coupled light beamlets 256 exiting the primary waveguide apparatus 170. In the illustrated embodiment, the prism planes 204 are oriented at forty-five degree angle to the faces 202a, 202b of the prism body 202, and thus, the distance d can be expressed as a function of the distance s, as follows: d=s*sin 45°.

Thus, for each orthogonal light beamlet 254, three initial out-coupled light beamlets 256' will be generating, thereby creating a 3×3 array of initial out-coupled light beamlets 256' exit the second face 202b of the prism body 202. Of course, the PPE 192c can be designed to create even larger arrays of initial out-coupled light beamlets 256', e.g., a 4×4 array, a 5×5 array, etc., by further decreasing the distance between the prism planes 204 in each set of parallel prism planes 204 of the PPE 192c relative to the size of the prism body 202.

Although the PPE 192c has been described as generated square arrays of initial out-coupled light beamlets 256', the PPE 192c can alternatively be designed to generate non-square arrays of initial out-coupled light beamlets 256', e.g., a 2×3 array, 3×2 array, 2×3 array, 3×2 array, etc., by making the distance between the prism planes 204a(1) and 204a(2) different from the distance between the prism planes 204b(1) and 204b(2). Furthermore, although the PPE 192c has been described as creating two-dimensional arrays of initial out-coupled light beamlets 256', the PPE 192c can be designed to create one-dimensional arrays of initial out-coupled light beamlets 256', e.g., 1×2 array, 1×3 array, etc., by designing the PPE 192c with only one set of parallel prism planes 204.

Furthermore, although the PPE 192c has been described as generating initial out-coupled light beamlets 256' that exit the prism body 202 at an orthogonal angle to the face 202b of the prism body 202, the PPE 192c can be designed, such that the initial out-coupled light beamlets 256' exit the prism body 202 at an oblique angle to the face 202b of the prism body 202 by changing the orientations of one or both of the sets of prism planes 204 relative to the face 202b of the prism body 202.

Referring now to FIGS. 76-79, yet another embodiment of a display subsystem 104' utilizes a conventional PE that comprises the afore-described waveguide apparatus 170 illustrated in FIGS. 34-36 and a PPE 192e that, like the PPE 192c, takes the form of a prism, but unlike the PPE 192c, utilizes a cavity prism, as opposed to a solid prism, that one-dimensionally pre-expands the effective entrance pupil of a collimated light beam 250 optically coupled into the PPE 192e.

Figure 79:
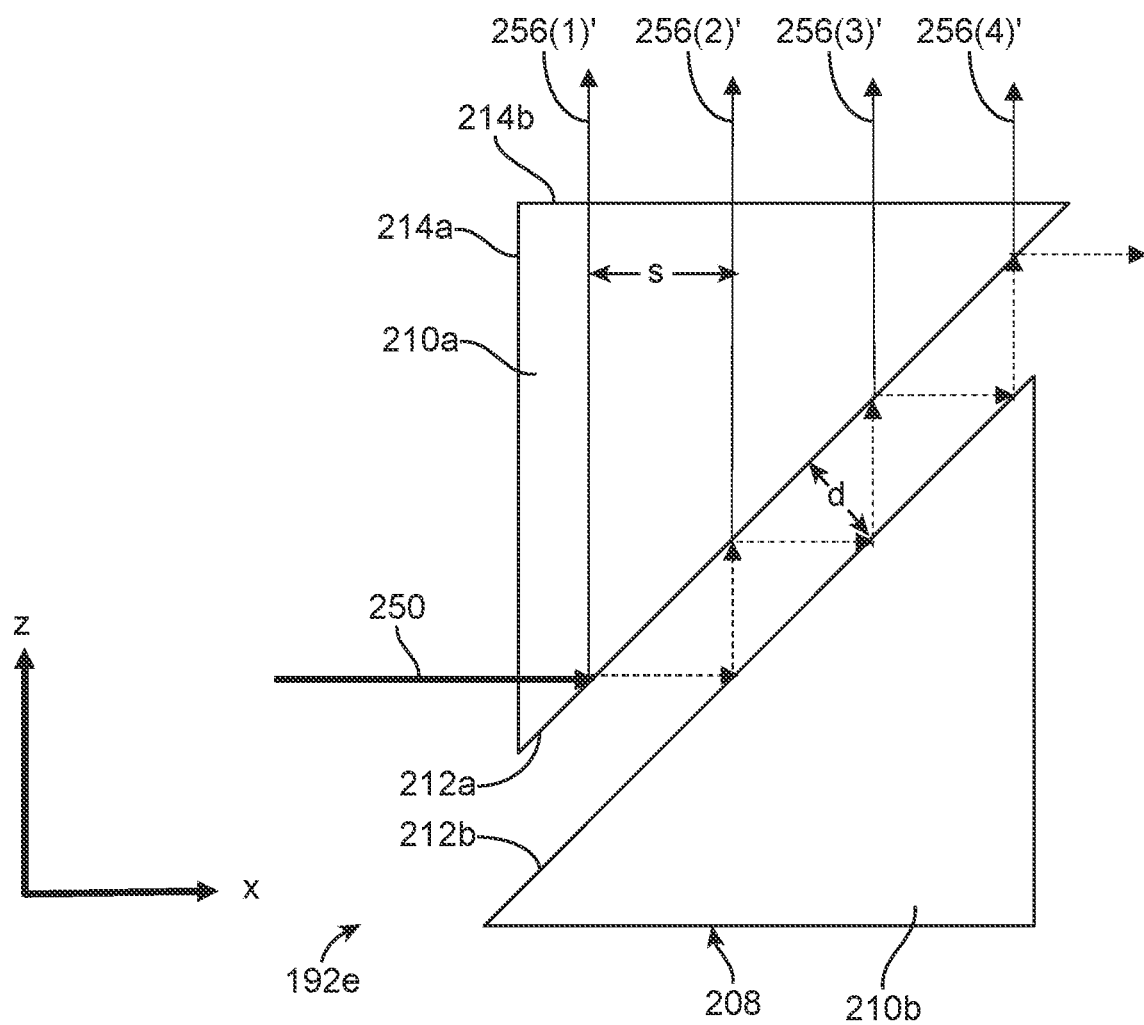
FIG. 79 is a perspective view of the PPE of FIG. 76.

As best shown in FIG. 79, the PPE 192e comprises an optically transparent cavity prism 208, which includes a first triangular prism section 210a and a second triangular prism section 210b. The prism sections 210a, 210b are spaced from each other to create an open space 212 therebetween that is bound on one side by a prism plane 212a of the prism section 210a and on the other side by a prism plane 212b of the prism section 210b, with the prism planes 212a, 212b being parallel to each other. The first prism section 210a has a first face 214a and a second face 214b opposite the prism plane 212a. The prism plane 212a is disposed at an oblique angle to the first and second faces 214a, 214b (in this case, at a forty-five degree angle).

The prism planes 212 are configured for splitting a collimated light beam 250 entering the first face 202a of the prism section 210 into a set of initial light beamlets 256' (in this case, a 1×4 array of initial out-coupled light beamlets 256') that exit the second face 214b of the first prism section 210a. To this end, the first prism plane 212a is designed to be partially reflective, whereas the second prism plane 212b is designed to be completely reflective in the same manner that the prism planes 204 of the PPE 192c described above are designed to be partially reflective or completely reflective. Each prism plane 212 is preferably designed, such that the angle of a light beam incident on the prism plane 212 is preserved.

As best shown in FIG. 79, the PPE 192c one-dimensionally pre-expands the effective exit pupil of light along a first axis (horizontal or x-axis). In particular, the set of prism planes 212 splits the collimated light beam 250 into four initial out-coupled light beamlets 256', and reflects these initial out-coupled light beamlets 256' out of the second face 214b of the prism section 210b. Thus, a 1×4 array of initial out-coupled light beamlets 256' exit the second face 214b of the prism body 210. That is, a portion of the collimated light beam 250 is reflected by the prism plane 212a as an initial out-coupled light beamlet 256(1)', and the remaining portion of the collimated light beam 250 is transmitted by the prism plane 212b to the prism plane 212a, where it is repeatedly reflected between the prism plane 212a and prism plane 212b, portions of which will be transmitted back through prism plane 212a as initial out-coupled light beamlets 256 (2)'-256(4)'. Of course, the PPE 192e can be designed to create smaller or larger one-dimensional arrays of initial out-coupled light beamlets 256', e.g., a 1×2 array, a 1×3 array, 1×5 array, etc., by decreasing or increasing the distance between the prism planes 212 relative to the size of the prism 208.

Figure 76:
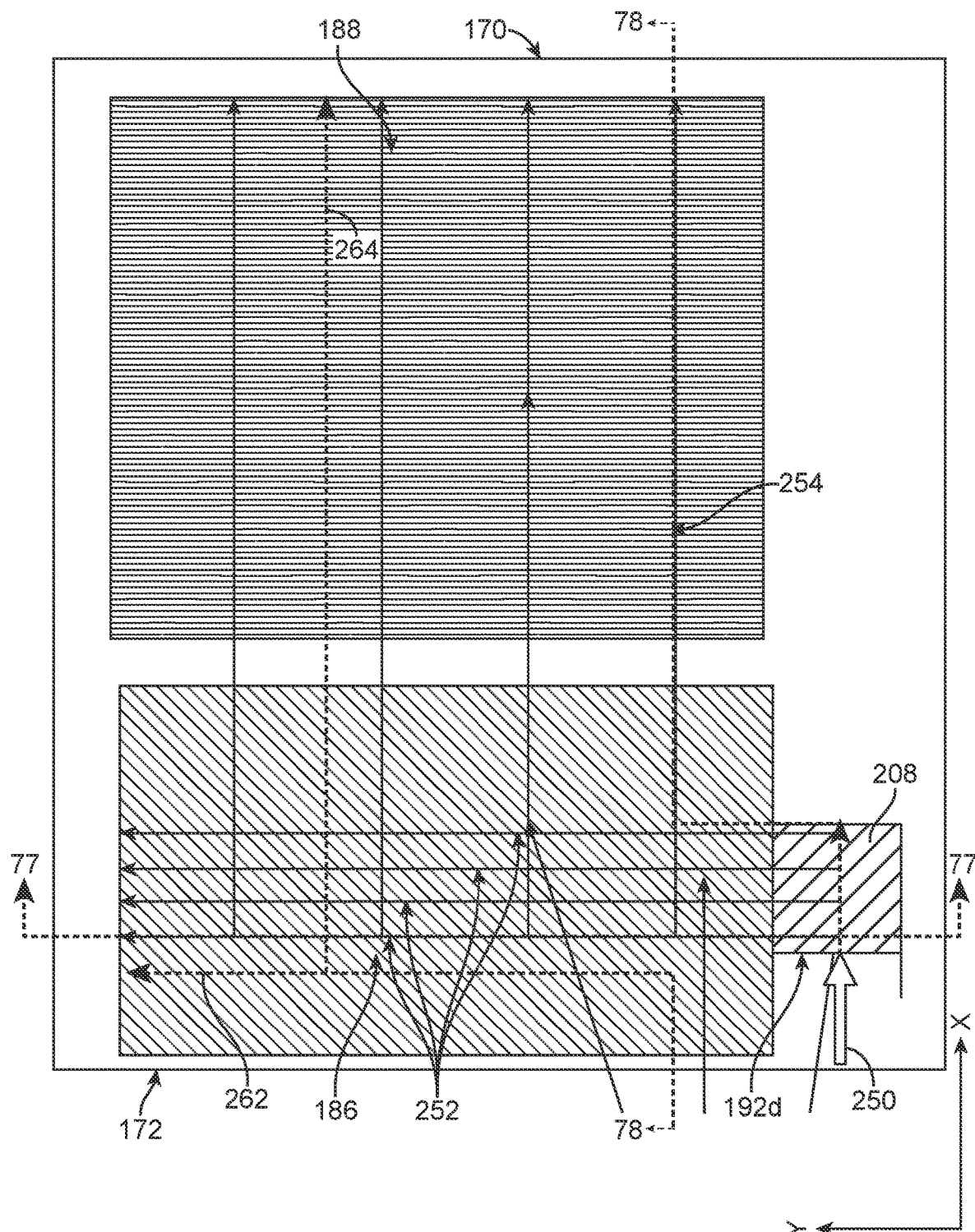
FIG. 76 is a plan view of still another embodiment of the PPE of FIGS. 31A and 31B used with the primary waveguide apparatus of FIG. 34.
Figure 77:
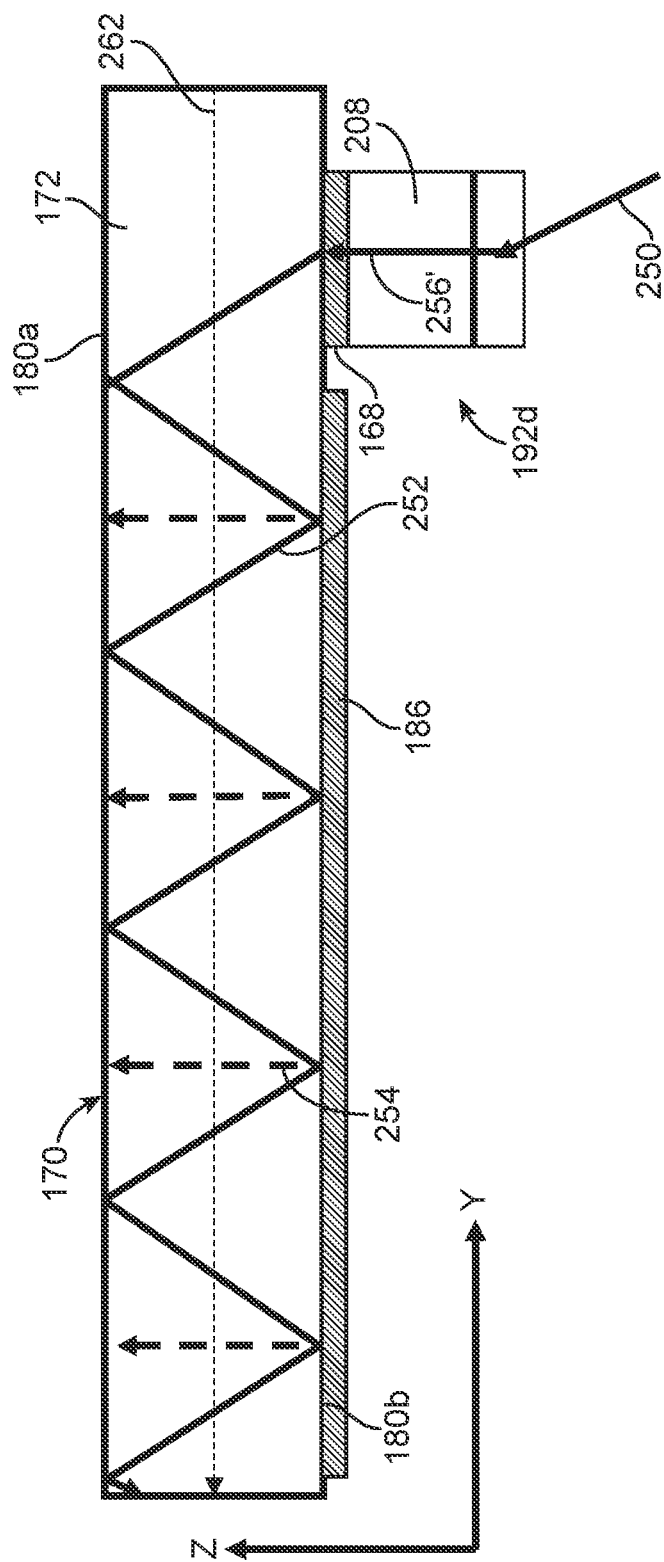
FIG. 77 is a cross-sectional view of the primary waveguide apparatus and PPE of FIG. 76, taken along the line 77-77.
Figure 78:
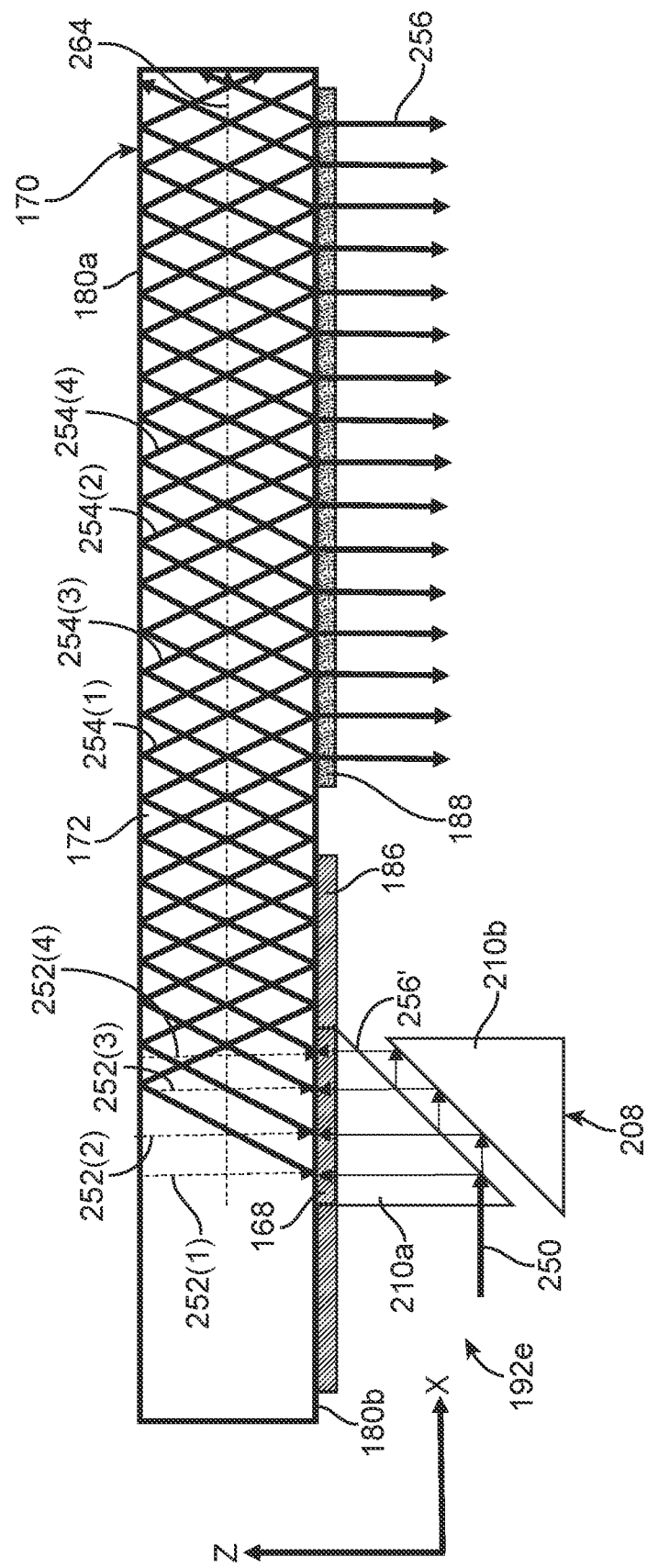
FIG. 78 is a cross-sectional view of the primary waveguide apparatus and PPE of FIG. 76, taken along the line 78-78.

It can be appreciated from the foregoing that the PPE 192e one-dimensionally pre-expands the effective entrance pupil of the collimated light beam 250. In the same manner as described above with respect to FIGS. 34-36, the primary waveguide apparatus 170 further two-dimensionally expands the pupil of the collimated light beam 250. That is, the initial out-coupled light beamlets 256' are input into the IC element 168 of the primary waveguide apparatus 170 as a 1×4 array of in-coupled light beamlets 252(1)-252(4), which are in turn, split by the OPE element 186 into a 1×4 array of orthogonal light beamlets 254(1)-254(4), which are further split by the EPE element 188 into final out-coupled light beamlets 256 that exit the face 180b of the waveguide 172 towards the eye(s) 52 of the end user 50, as illustrated in FIGS. 76-78.

The distance d between the prism planes 212 are preferably selected, such that the distance s between adjacent initial out-coupled light beamlets 256' will be equal to the desired spacings of the final out-coupled light beamlets 256 exiting the primary waveguide apparatus 170. In the illustrated embodiment, the prism planes 212 are oriented at forty-five degree angle to the faces 214a, 214b of the prism body 202, and thus, the distance d can be expressed as a function of the distance s, as follows: d=s*sin 45°. Significantly, the thickness of the waveguide 172 in the primary waveguide apparatus 170 will be multiples of the distance d between the prism planes 212 of the PPE 192e (in this case, two times the distance d between the prism planes 212), such that the in-fill of the final out-coupled light beamlets 256 is facilitated.

It should be appreciated that the because the distance d between the prism planes 212 is set merely by locating the prism planes 212 relative to each other, the spacings between the final out-coupled light beamlets 256 may be arbitrarily set without concern for manufacturing limitations. That is, since the PPE 192e does not utilize an optical substrate between the prism planes 212, but rather utilizes a cavity between the prism planes 212, one need not be concerned with the limitations related to the minimum thickness of such optical substrate.

Referring now to FIGS. 80-89, some embodiments of a display subsystem 104 utilize a conventional PE that comprises the afore-described waveguide apparatus 170 illustrated in FIGS. 34-36 and a PPE 192f that, in the illustrated embodiment, takes the form of a multi-layered mini-waveguide apparatus 220 mounted to the IC element 168.

The mini-waveguide apparatus 220 has a size commensurate with the size of the IC element 168 of the primary waveguide apparatus 170. The mini-waveguide apparatus 220 comprises a plurality of waveguide assemblies 222, and in this case, a top waveguide assembly 222a and a bottom waveguide assembly 222b. Each waveguide assembly 222 is configured for splitting each of one or more collimated beams or beamlets (collimated light beam 250 in the bottom waveguide assembly 222b and out-coupled light beamlets 256' in the top waveguide assembly 222b) a two-dimensional array (in this case, a 4×4 array) of out-coupled light beamlets 256', as will be described in further detail below.

Figure 83:
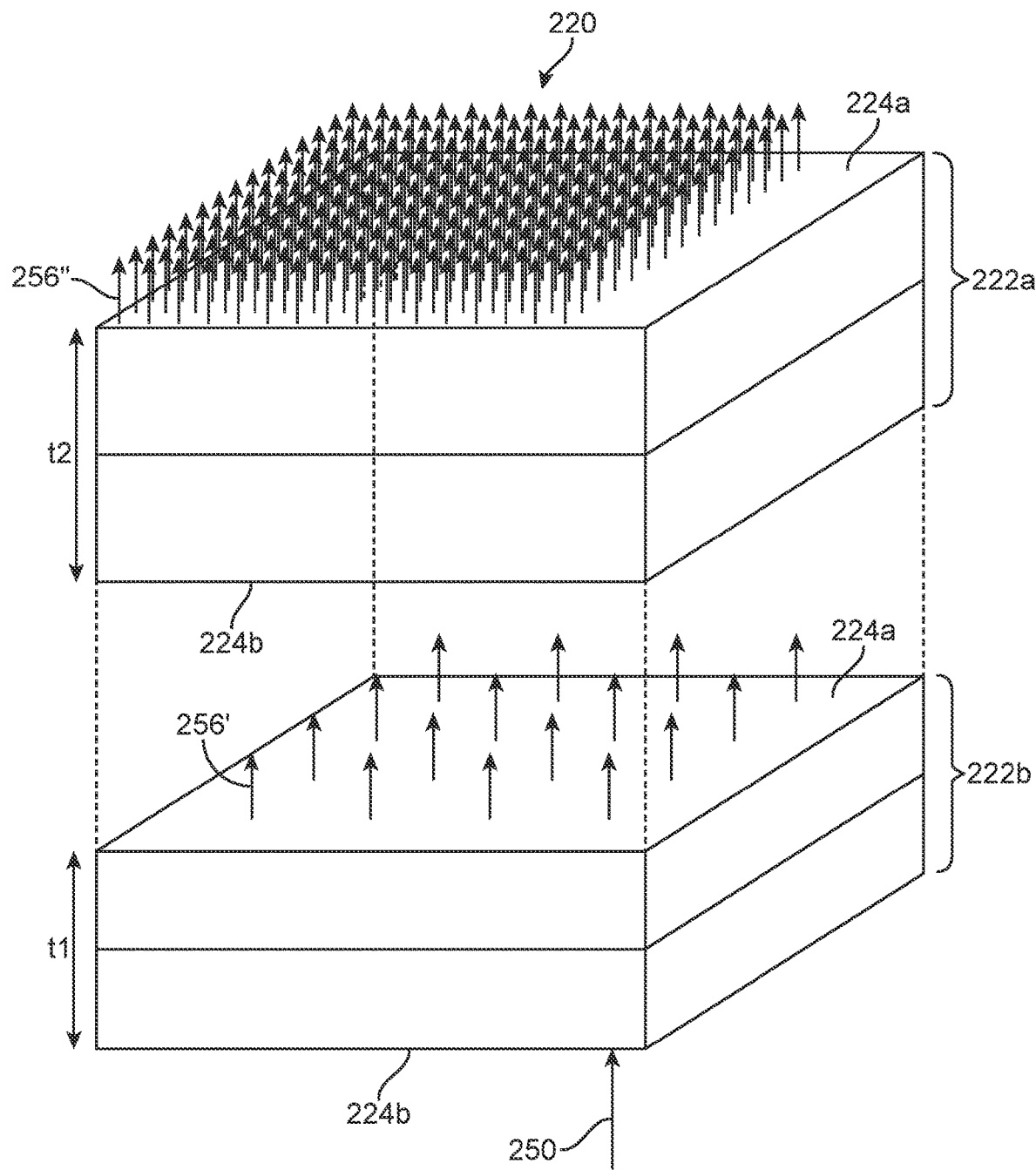
FIG. 83 is a perspective exploded view of the PPE of FIG. 80.

In the particular mini-waveguide apparatus 220 described herein, the bottom waveguide assembly 222b functions to split a single collimated light beam 250 into a two-dimensional array of out-coupled light beamlets 256', whereas the top waveguide assembly 222a functions to split the two-dimensional array of out-coupled light beamlets 256' from the bottom waveguide assembly 222b into multiple two-dimensional arrays of out-coupled light beamlets 256", as illustrated in FIG. 83. To this end, the top waveguide assembly 222a and bottom waveguide assembly 222b are disposed relative to each other, such that the top waveguide assembly 222a receives the out-coupled light beamlets 256' from the bottom waveguide assembly 222b. For example, as will be illustrated below, the top surface 224a of the bottom waveguide assembly 222b is affixed to the bottom surface 224b of the top waveguide assembly 222a.

Figure 84:
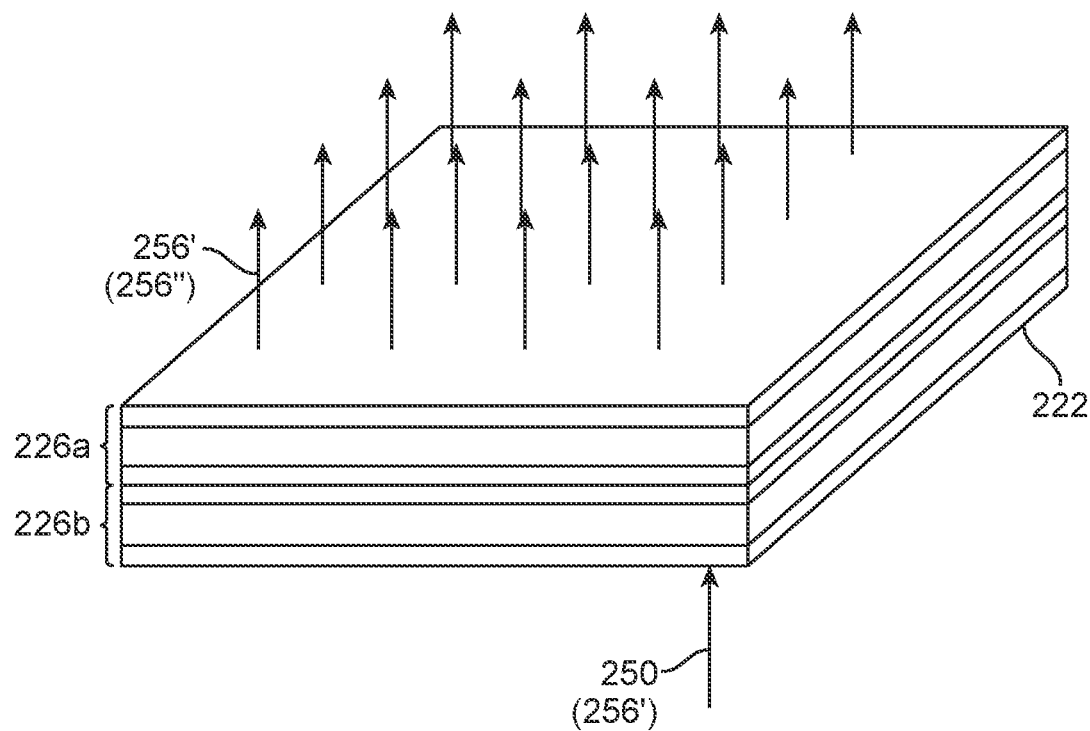
FIG. 84 is a perspective view of some embodiments of a planar waveguide assembly used in the PPE of FIG. 83.
Figure 85A:
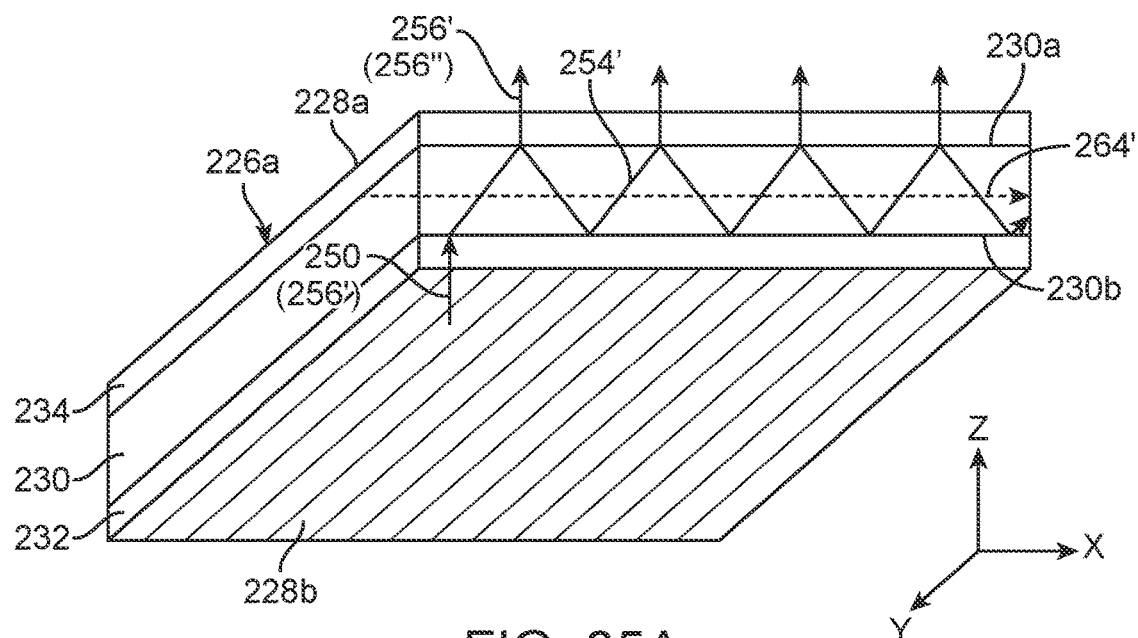
FIGS. 85A and 85B are perspective views of top and bottom planar orthogonal waveguide units used in the planar waveguide assembly of FIG. 84.
Figure 85B:
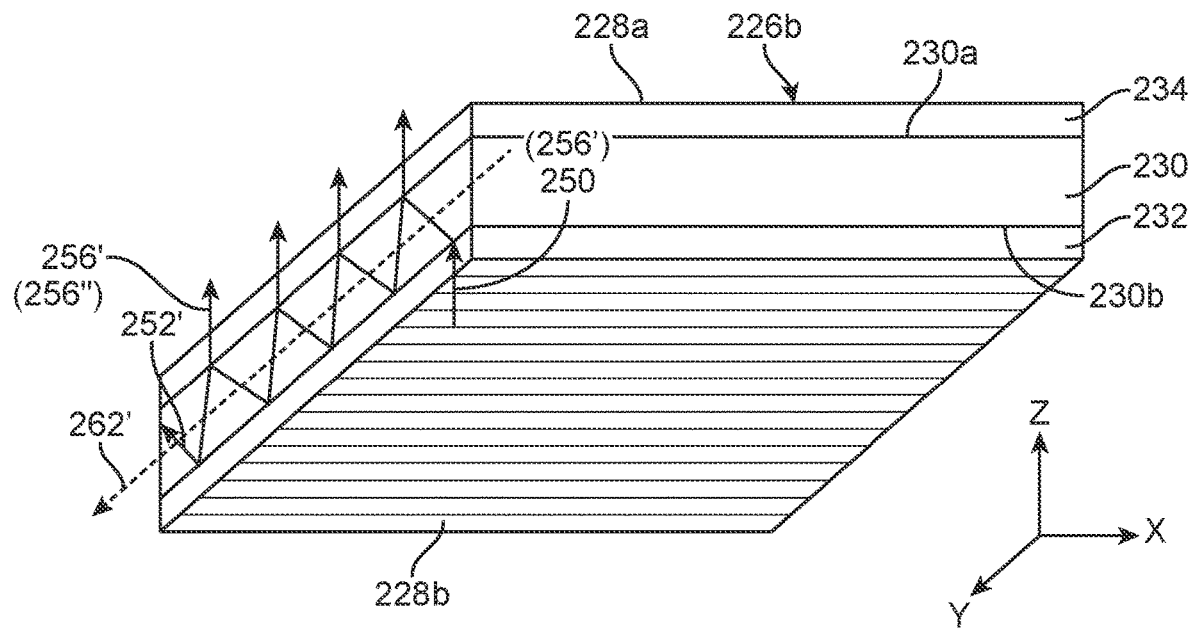

Referring further to FIGS. 84 and 85A-85B, each waveguide assembly 222 comprises a pair of orthogonal waveguide units configured as a top orthogonal waveguide unit 226a and a bottom orthogonal waveguide unit 226b, with the bottom surface 228b of the top orthogonal waveguide unit 226a being affixed to the top surface 228a of the bottom orthogonal waveguide unit 226b. The orthogonal waveguide units 226 are identical to each other, the only difference being that they are orthogonally oriented relative to each other. Each orthogonal waveguide unit 226 comprises a planar optical waveguide 230 taking the form of a single unitary substrate or plane of optically transparent material (as described above with respect to the waveguide 172). The planar optical waveguides 230 of the respective orthogonal waveguide units 226 are identically dimensioned, each having top and bottom faces 230a, 230b. Each orthogonal waveguide unit 226 further comprises an IC element 232 associated with (e.g., disposed on) the bottom face 230b of the respective planar optical waveguide 230, and an EPE 234 respectively associated with (e.g., disposed on) the top face 230a of the planar optical waveguide 230.

Each IC element 232 is configured for in-coupling one or more light beams or beamlets into the respective planar optical waveguide 230 for propagation via TIR along an internally reflective optical path (236a in the case of the top orthogonal waveguide unit 226a, and 236b in the case of the bottom orthogonal waveguide unit 226b), and in doing so, repeatedly intersects the EPE element 234. In the same manner as described above with respect to the EPE element 188 of the primary waveguide apparatus 170, the EPE element 234 has a relatively low diffraction efficiency (e.g., less than 50%), such that, at each point of intersection with the EPE element 234, a portion (e.g., greater than 90%) of each light beam or beamlet continues to propagate along the respective internally reflective optical path 236, and the remaining portion of each light beam or beamlet is diffracted as an initial out-coupled light beamlet 256' that exits the top face 230a of the respective planar optical waveguide 230. In the illustrated embodiment, the sizes of the IC element 232 and EPE element 234 are equal to each other and are commensurate to the size of the respective planar optical waveguide 230 with which the IC element 232 and EPE element 234 are associated, such that pupil expansion of the collimated light beam 250 is maximized, while also facilitating in-coupling of two-dimensional arrays of out-coupled light beamlets 256' from the bottom orthogonal waveguide unit 226b to the top orthogonal waveguide unit 226a, as will be described in further detail below.

The IC elements 232 of the orthogonal waveguide units 226 are oriented orthogonally to each other, such that each light beam or beamlet (250 or 256') that is in-coupled into the bottom face 224b of a respective waveguide assembly 222 is split into a two-dimensional array of initial out-coupled light beamlets 256' (or 256") that exit the top face 224a of the waveguide assembly 222, as illustrated in FIG. 84.

In particular, the IC elements 232 of each waveguide assembly 222 are oriented orthogonally relative to each other, such that the IC element 232 associated with the bottom orthogonal waveguide unit 226b in-couples light for propagation via TIR along an internally reflective optical path parallel to a first axis 262 (in this case, along the y-axis), such that the light is expanded by the corresponding EPE element 234 along the first axis 262 (see FIG. 85B), while the IC element 232 associated with the top orthogonal waveguide unit 226a in-couples each light beam or beamlet for propagation via TIR along internally reflective optical path parallel to a second axis 264 (in this case, along the x-axis) orthogonal to the first axis 264, such that the light is expanded by the corresponding EPE element 234 along that second axis 264 (see FIG. 85A).

As briefly discussed above with respect to FIG. 83, the bottom face 224b of the top waveguide assembly 222a is affixed to the top surface 224a of the bottom waveguide assembly 222b, such that the output of the bottom waveguide assembly 222b is provided as an input to the top waveguide assembly 222a, thereby generating multiple arrays of out-coupled light beamlets 256" from a single collimated light beam 250.

Figure 86A:
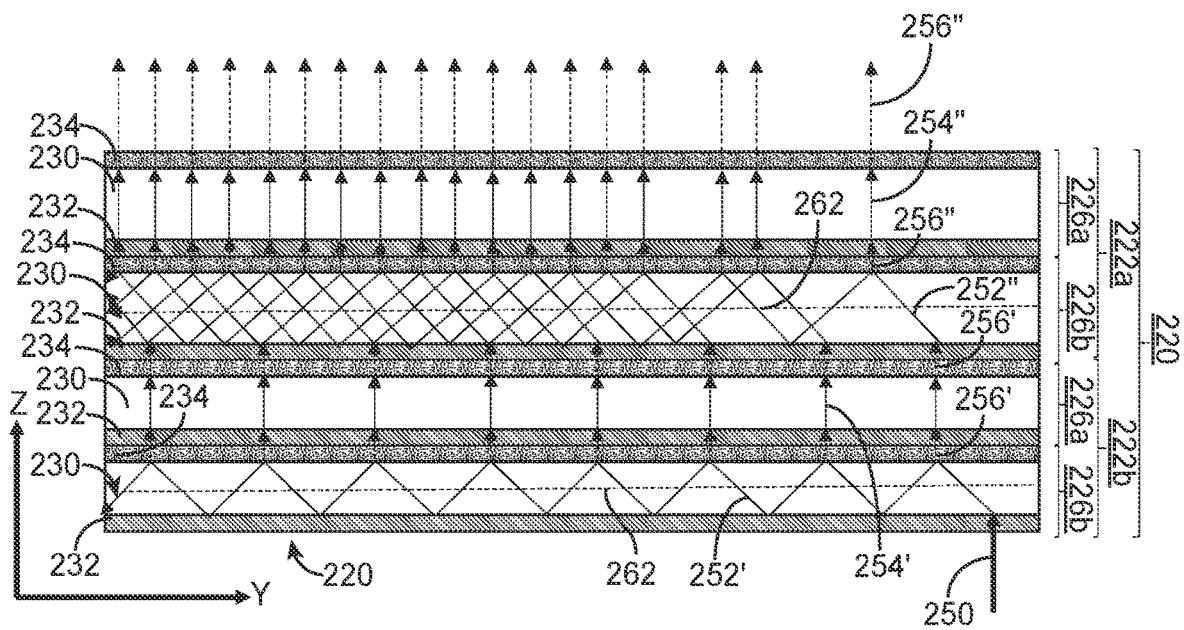
FIG. 86A and FIG. 86B are cross-sectional views of the PPE of FIG. 80.
Figure 86B:
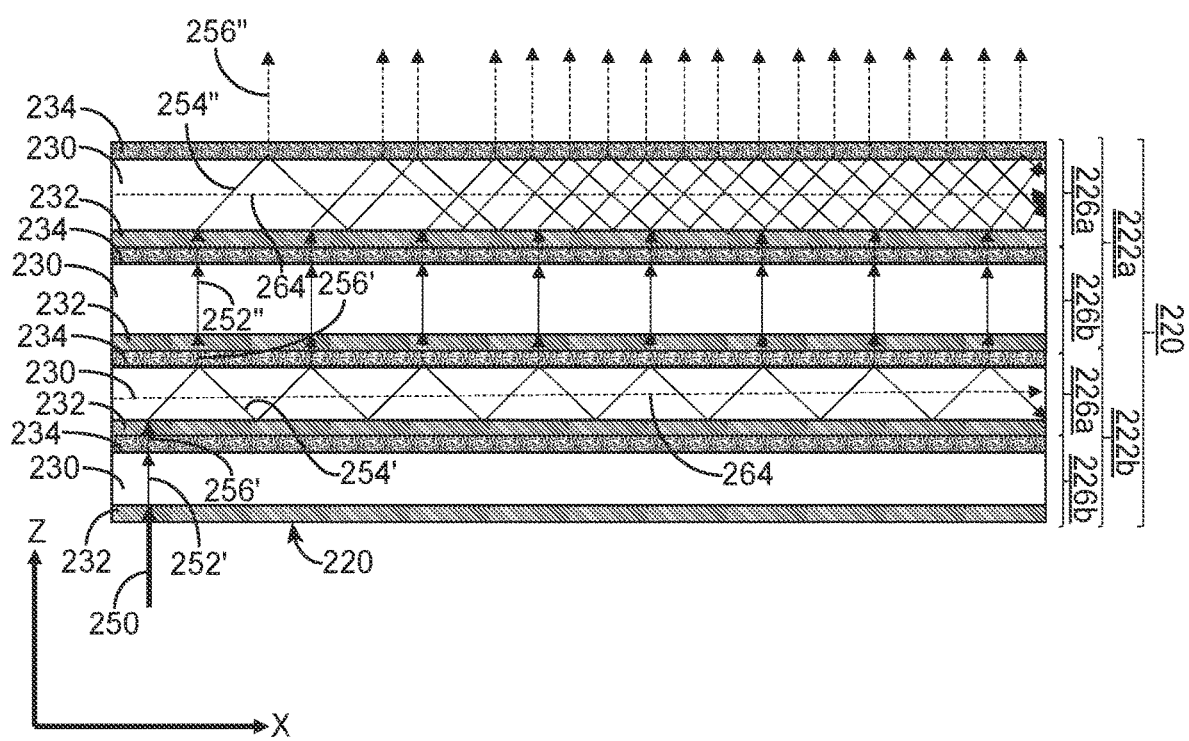

In particular, with further reference to FIGS. 86A and 86B, the bottom waveguide assembly 222b receives the collimated light beam 250 from the collimation element 166 and splits the collimated light beam 250 into a two-dimensional array of initial out-coupled light beamlets 256' that exit the top face 224a of the bottom waveguide assembly 222b.

That is, the IC element 224 associated with the bottom orthogonal waveguide unit 226b of the bottom waveguide assembly 222b optically couples the collimated light beam 250 as an initial in-coupled light beam 252' for propagation within the respective planar optical waveguide 230 via TIR along the first internally reflective optical path parallel to the axis 262 (y-axis), and the EPE element 226 associated with the bottom orthogonal waveguide unit 226b of the bottom waveguide assembly 222b splits the collimated light beam 250 into a one-dimensional array of initial out-coupled light beamlets 256' that exit the top face 228a of the respective bottom orthogonal waveguide unit 226b.

In turn, the IC element 224 associated with the top orthogonal waveguide unit 226a of the bottom waveguide assembly 222b optically couples the one-dimensional array of initial out-coupled light beamlets 256' as initial orthogonal light beamlets 254' for propagation within the respective planar optical waveguide 230 via TIR along respective second internally reflective optical paths parallel to the axis 264 (x-axis) that are orthogonal to first internally reflective optical path parallel to the axis 262 (y-axis), and the EPE element 226 associated with the top orthogonal waveguide unit 226a of the bottom waveguide assembly 222b splits the initial orthogonal light beamlets 254' into a two-dimensional array of initial out-coupled light beamlets 256' that exit the top face 228a of the respective top orthogonal waveguide unit 226a.

The top waveguide assembly 222a receives the two-dimensional array of initial out-coupled light beamlets 256' from the bottom waveguide assembly 222b and splits this two-dimensional array of initial out-coupled light beamlets 256' into a plurality of two-dimensional arrays of intermediate out-coupled light beamlets 256" that exit the top face 224a of the top waveguide assembly 222a.

That is, the IC element 224 associated with the bottom orthogonal waveguide unit 226b of the top waveguide assembly 222a optically couples the two-dimensional array of initial out-coupled light beamlets 256' as intermediate sets of in-coupled light beams 252" for propagation within the respective planar optical waveguide 230 via TIR along the first internally reflective optical path parallel to the axis 262 (y-axis), and the EPE element 226 associated with the bottom orthogonal waveguide unit 226b of the top waveguide assembly 222a splits the intermediate sets of in-coupled light beamlets 252" into two-dimensional arrays of intermediate out-coupled light beamlets 256" of initial out-coupled light beamlets 256' that exit the top face 228a of the respective bottom orthogonal waveguide unit 226b.

In turn, the IC element 224 associated with the top orthogonal waveguide unit 226a of the top waveguide assembly 222a optically couples the two-dimensional arrays of intermediate out-coupled light beamlets 256" as intermediate orthogonal light beamlets 254" for propagation within the respective planar optical waveguide 230 via TIR along respective second internally reflective optical paths 264 (x-axis) that are orthogonal to first internally reflective optical path parallel to the axis 262 (y-axis), and the EPE element 226 associated with the top orthogonal waveguide unit 226a of the top waveguide assembly 222a splits the intermediate orthogonal light beamlets 254" into two-dimensional arrays of intermediate out-coupled light beamlets 256" that exit the top face 228a of the respective top orthogonal waveguide unit 226a.

Thus, the bottom waveguide assembly 222b splits the collimated light beam 250 into a two-dimensional array of initial out-coupled light beamlets 256', and the top waveguide assembly 222a splits the two-dimensional array of out-coupled light beamlets 256' into several two-dimensional arrays of intermediate out-coupled light beamlets 256". The two-dimensional array of initial out-coupled light beamlets 256', as well as each of the two-dimensional arrays of intermediate out-coupled light beamlets 256", have an inter-beamlet spacing s1, and the two-dimensional array of intermediate out-coupled light beamlets 256" have an inter-array spacing s2 different from the inter-beamlet spacing s1 of the two-dimensional arrays of initial out-coupled light beamlets 256' and intermediate out-coupled light beamlets 256" (see, e.g., FIGS. 89A and 89B). The inter-array spacing s2 and the inter-beamlet spacing s1 are non-multiples of each other, so that the light beamlets 256" are distributed in a manner that maximizes the density of the in-fill of the exit pupil of the PPE 192f, and thus, the exit pupil of the display screen 110, as will be described in further detail below.

Notably, the inter-beamlet spacing s1 is dictated by the respective thicknesses of the waveguides 230 of the bottom waveguide assembly 222b. Similarly, the inter-array spacing s2 is dictated by the respective thicknesses of the waveguides 240 of the top waveguide assembly 222a. The thicknesses of the waveguides 230 of the top and bottom waveguide assemblies 222 may be strategically selected based on the diameter of the collimated light beam 250. In some examples, the inter-beamlet spacing s1 and inter-array spacing s2, although different from each other, may each be a multiple of the diameter of the collimated light beam 250 to maximize the in-fill of the exit pupil of the PPE 192f.

Thus, the inter-beamlet spacing s1 may be a multiple ("m") of the diameter of the collimated light beam 250 ("d"), such that s1=m×d. Using this value of s1, the inter-array spacing s2 may be described by: s2=s1+d. That is, s1 and s2 may be consecutive multiples of the diameter of the collimated light beam 250, such that s2=(m+1)×d. For example, the inter-beamlet spacing s1 may be three times the diameter of the diameter of the collimated light beam 250. Using this value of s1, the inter-array spacing s2 may be four times the diameter of the collimated light beam 250. As exemplified in the illustrated embodiment below, this results in the inter-array spacing s2 being 1.33 times the inter-beamlet spacing s1.

The first and second planar optical waveguide assemblies 222a, 222b respectively have unequal thicknesses t1, t2, as illustrated in FIG. 83, with such thicknesses being set by the thicknesses of the respective planar optical waveguides 230 incorporated into the respective orthogonal waveguide units 226a, 226b of the optical waveguide assemblies 222a, 222b. For example, as illustrated in FIGS. 86A and 86B, the thicknesses of the planar optical waveguides 230 incorporated into the top planar optical waveguide assembly 222a are greater than the thicknesses of the planar optical waveguides 230 incorporated into the bottom planar optical waveguide assembly 222b. Preferably, the first and second inter-beamlet spacing s1, s2, and thus, the thicknesses t1, t2 of the first and second planar optical waveguide assemblies 222a, 222b, are non-multiples of each other to ensure that the multiple arrays of the intermediate out-coupled light beamlets 252" are generated from the single array of initial out-coupled light beamlets 252'.

As briefly discussed above, the bottom waveguide assembly 222b splits the collimated light beam 250 into a two-dimensional array of initial out-coupled light beamlets 256', and the top waveguide assembly 222a splits the two-dimensional array of out-coupled light beamlets 256' into several two-dimensional arrays of intermediate out-coupled light beamlets 256". In other words, the bottom waveguide assembly 222b and top waveguide assembly 222a respectively generate two transfer functions that are convolved to produce the desired pattern of intermediate out-coupled light beamlets 252".

Figure 87A:
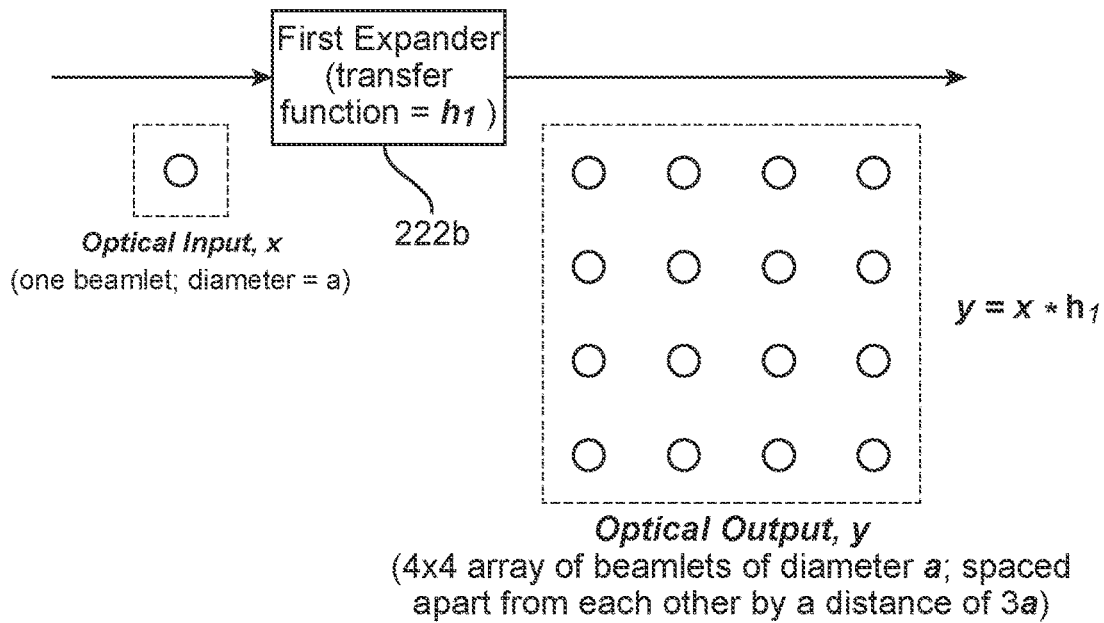
FIGS. 87A-87C are plan views of transfer functions of the top and bottom planar orthogonal wave guide units of FIGS. 85A and 85B.
Figure 87B:
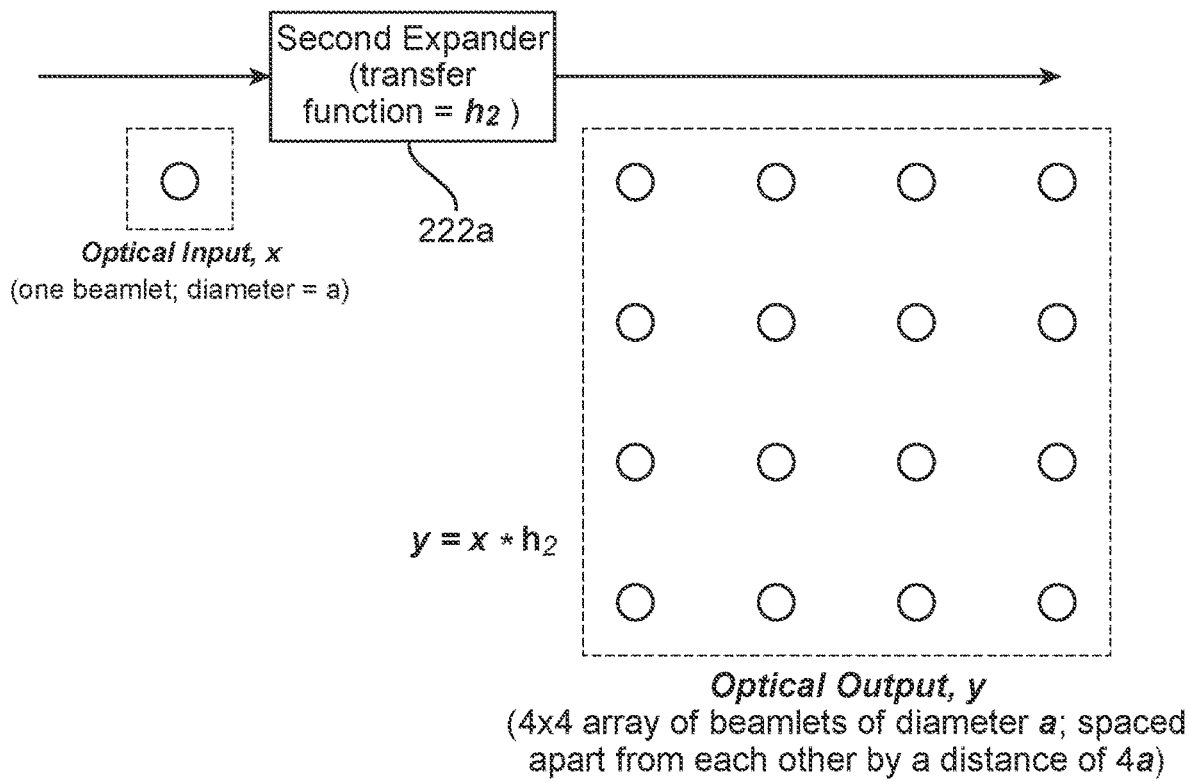
Figure 87C:
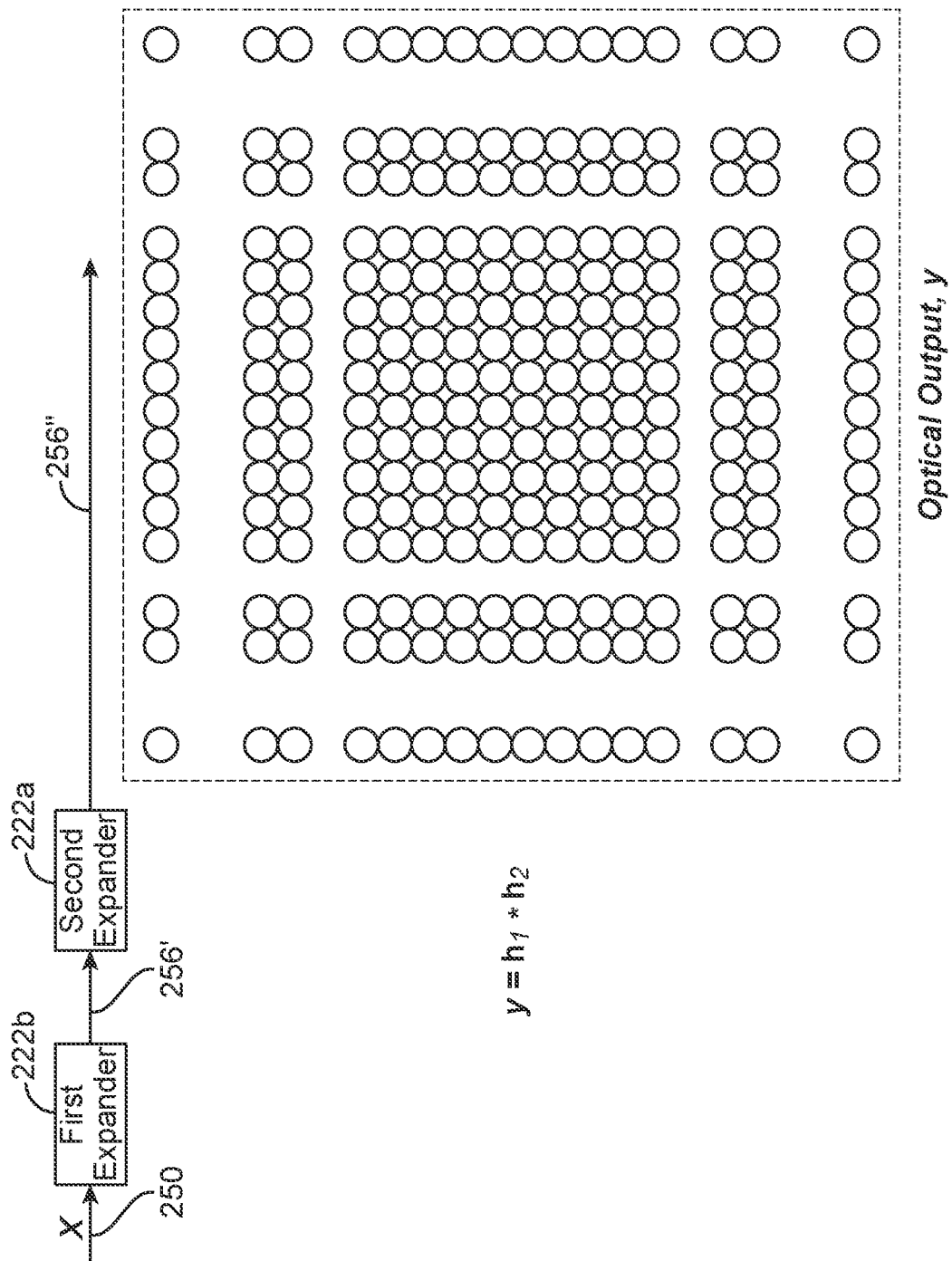
Figure 88:
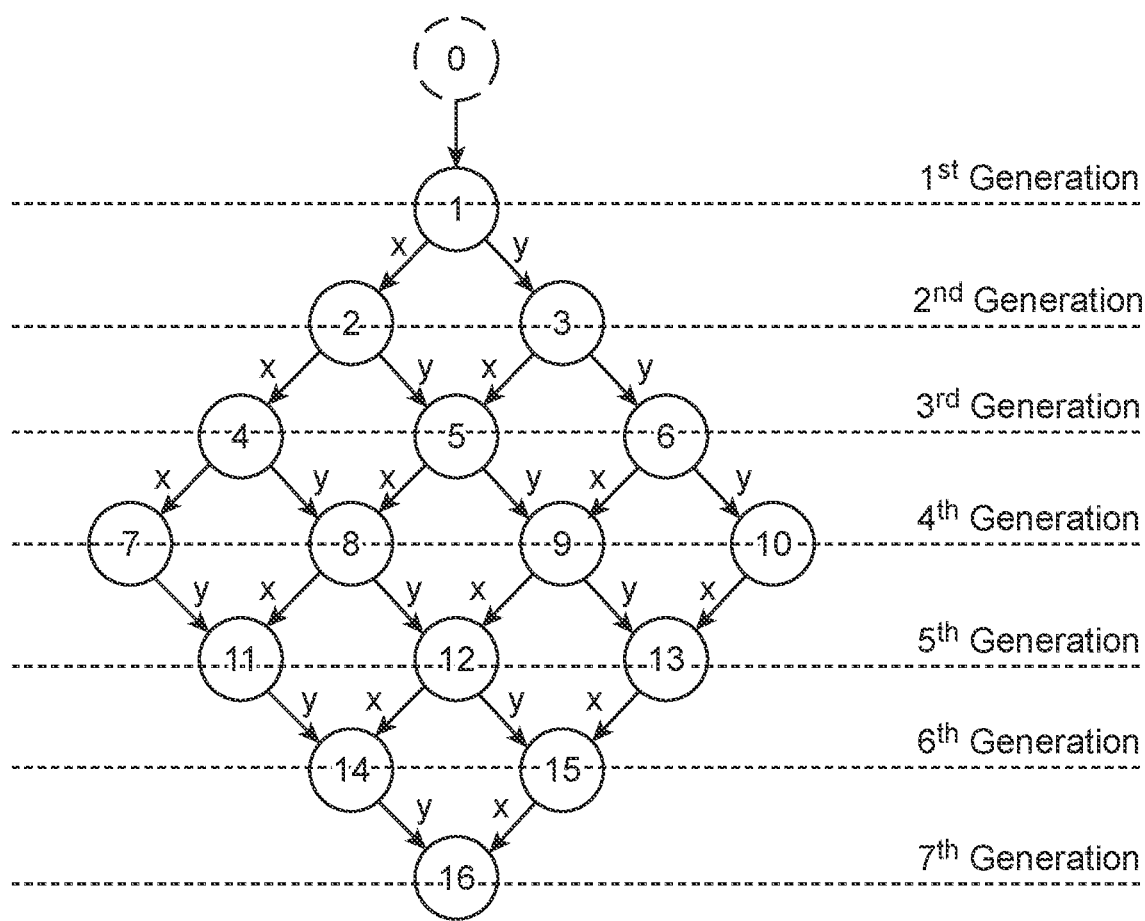
FIG. 88 is one diagram illustrating various generations of beam splitting performed by a top planar waveguide assembly used in the PPE of FIG. 80 to split a two-dimensional array of beamlets into multiple two-dimensional arrays of beamlets that accumulated to define a highly-saturated exit pupil.

For example, as illustrated in FIG. 87A, the bottom waveguide assembly 222b (as the first expander) has a first transfer function h1, such that $y=x*h_1$, where x is the optical input (a light beam of diameter a) into the bottom waveguide assembly 222b, and y is the optical output from the bottom waveguide assembly 222b. In this example, the transfer function $h_1$ results in a 4×4 array of light beamlets of a diameter a, spaced apart from each other by a distance of 3a. Similarly, as illustrated in FIG. 87B, the top waveguide assembly 222a (as the second expander) has a second transfer function h2, such that $y=x*h_2$, where x is the optical input (a light beam of diameter a) into the top waveguide assembly 222a, and y is the optical output from the bottom waveguide assembly 222a. In this example, the transfer function $h_2$ results in a 4×4 array of light beamlets of a diameter a, spaced apart from each other by a distance of 4a. As illustrated in FIG. 87C, the transfer functions h1 and h2 can be convolved, such that $y=h_1*h_2$. Thus, the collimated light beam 250 (as the optical input x) may be input into the bottom waveguide assembly 222b, which applies the transfer function h1 to the collimated light beam 250, thereby generating a two-dimensional array of intermediate out-coupled light beamlets 256' that have the beam pattern illustrated in FIG. 87A. The two-dimensional array of intermediate out-coupled light beamlets 256' output by the bottom waveguide assembly 222b may be input into the top waveguide assembly 222a, which applies the transfer function h2 to the two-dimensional array of intermediate out-coupled light beamlets 256', thereby generating multiple two-dimensional arrays of intermediate out-coupled light beamlets 256", the composite of which creates the light beamlet pattern illustrated in FIG. 87C.

Referring now to FIGS. 88 and 89A-89H, multiple generations of intermediate out-coupled light beamlets 256" proliferate as the two-dimensional array of initial out-coupled light beamlets 256' propagates through the top optical waveguide assembly 222a. As a result, the density of intermediate out-coupled light beamlets 256" progressively increase from left to right and from up to down across the top face 224a of the top planar optical waveguide assembly 222a through several generations of beam splitting until an N×N array of completely filled in out-coupled light beamlets 258' is generated, which in this case, is a 10×10 array of out-coupled light beamlets 258' (shown in FIG. 89H). In the illustrated embodiment, seven generations of beam splitting that generate sixteen two-dimensional arrays (in this case, 4×4 arrays) of intermediate out-coupled light beamlets 256(1)"-256(16)" results in the densely saturated 10×10 array of out-coupled light beamlets 258'. As there shown, the beamlets designated with "0" are those of the two-dimensional array of initial out-coupled light beamlets 256', whereas the beamlets designated with "1"-"16" are respectively those of the sixteen two-dimensional arrays of intermediate out-coupled light beamlets 256(1)"-256(16)". Notably, a lettering scheme is used in FIGS. 89A-89H to make it easier to understand the initial out-coupled light beamlets 256' to which the intermediate out-coupled light beamlets 256" correspond. Under this lettering scheme, each beamlet in the 4×4 array of beamlets 256' that is output by the bottom waveguide assembly 222b (the first expander) illustrated in FIG. 87A, and is input into the top waveguide assembly 222a (the second expander) illustrated in FIG. 87B corresponds to a different alphabetical letter ("A" through "P"). In this manner, each beamlet 256" that is output by top waveguide assembly 222a (the second expander) can be seen as corresponding to both a specific two-dimensional array of intermediate out-coupled light beamlets 256(1)"-256(16)" and a family of related beamlets ("A" through "P").

Figure 89A:
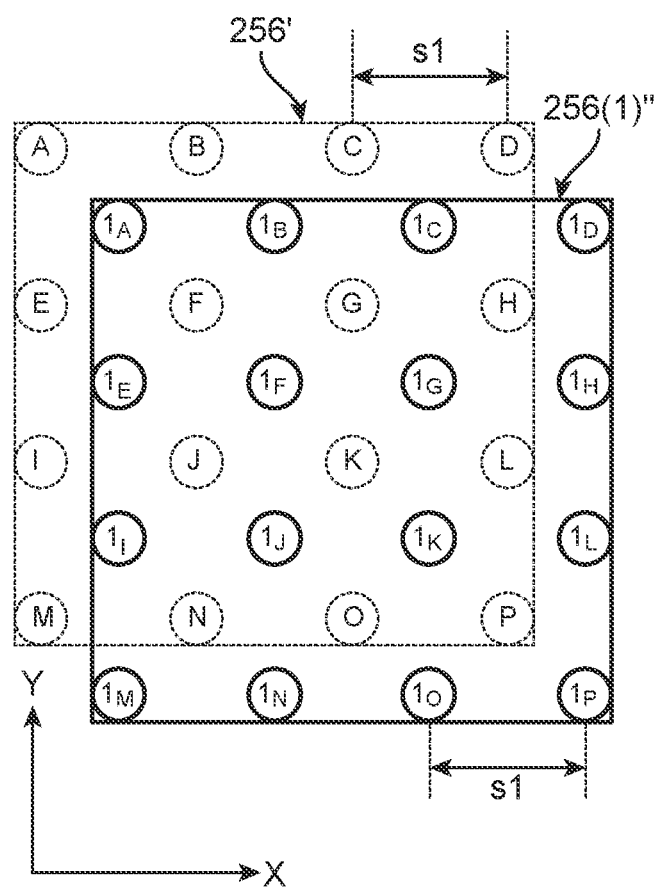
FIGS. 89A-89H are plan views illustrating the generation of the multiple two-dimensional arrays of light beamlets from a single two-dimensional array of light beamlets using the PPE of FIG. 80.
Figure 89B:
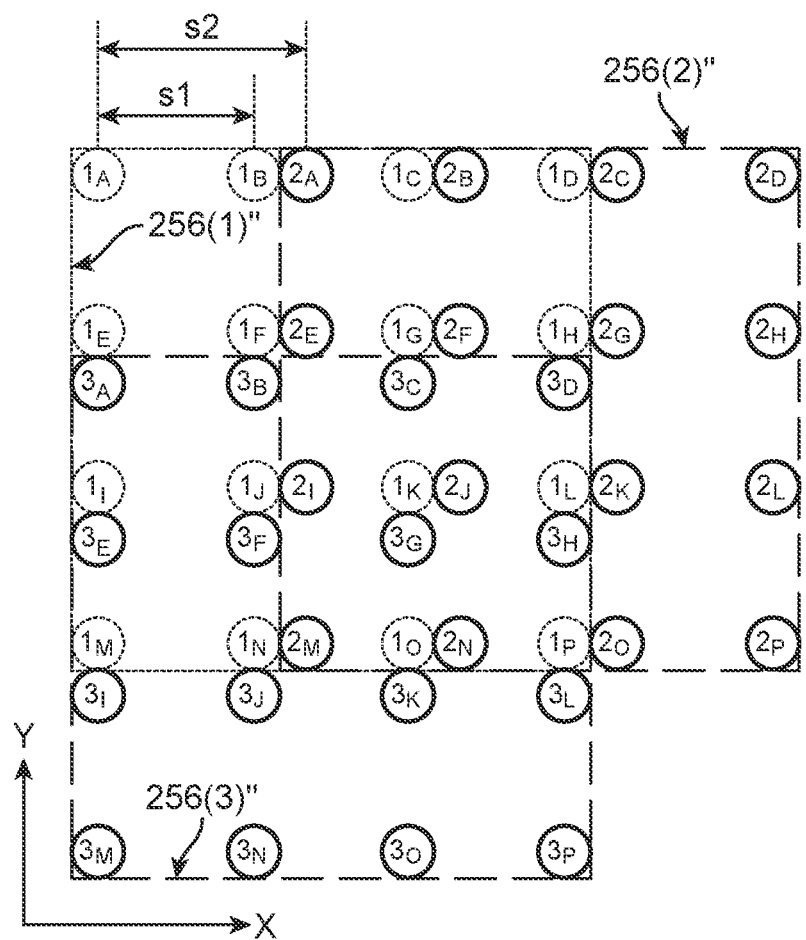

In particular, the two-dimensional array of intermediate out-coupled light beamlets 256(1)" is generated directly from the two-dimensional array of initial out-coupled light beamlets 256' (see FIG. 89A). At the first generation, the two-dimensional array of intermediate out-coupled light beamlets 256(1)" spawns a two-dimensional array of intermediate out-coupled light beamlets 256(2)" and a two-dimensional array of intermediate out-coupled light beamlets 256(3)" respectively along the x-axis and the y-axis (see FIG. 89B).

Figure 89C:
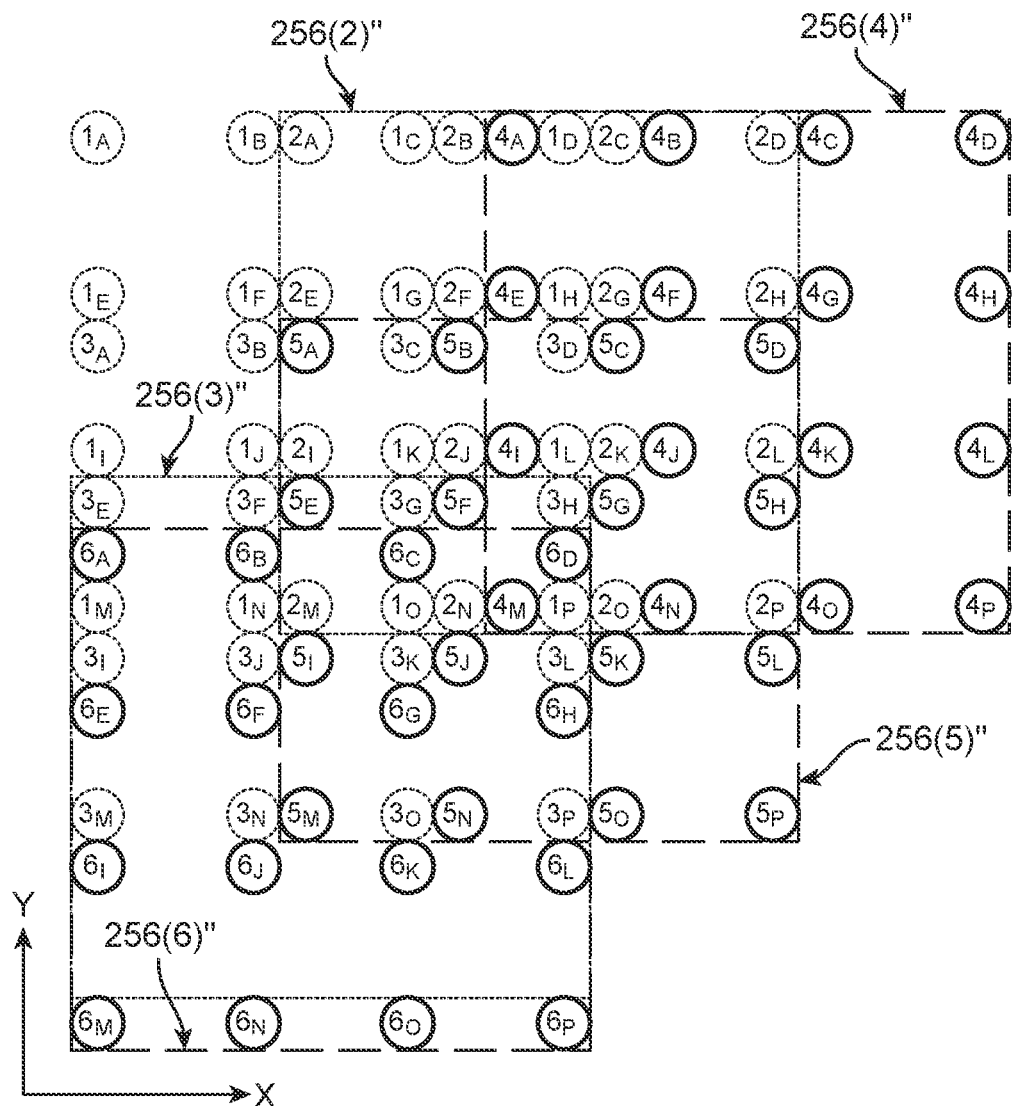

At the second generation, the two-dimensional array of intermediate out-coupled light beamlets 256(2)" spawns a two-dimensional array of intermediate out-coupled light beamlets 256(4)" along the x-axis; both the two-dimensional arrays of intermediate out-coupled light beamlets 256(2)" and 256(3)" combine to spawn the two-dimensional array of intermediate out-coupled light beamlets 256(5)" respectively along the x-axis and the y-axis; and the two-dimensional array of intermediate out-coupled light beamlets 256(3)" spawns a two-dimensional array of intermediate out-coupled light beamlets 256(6)" along the y-axis (see FIG. 89C).

Figure 89D:
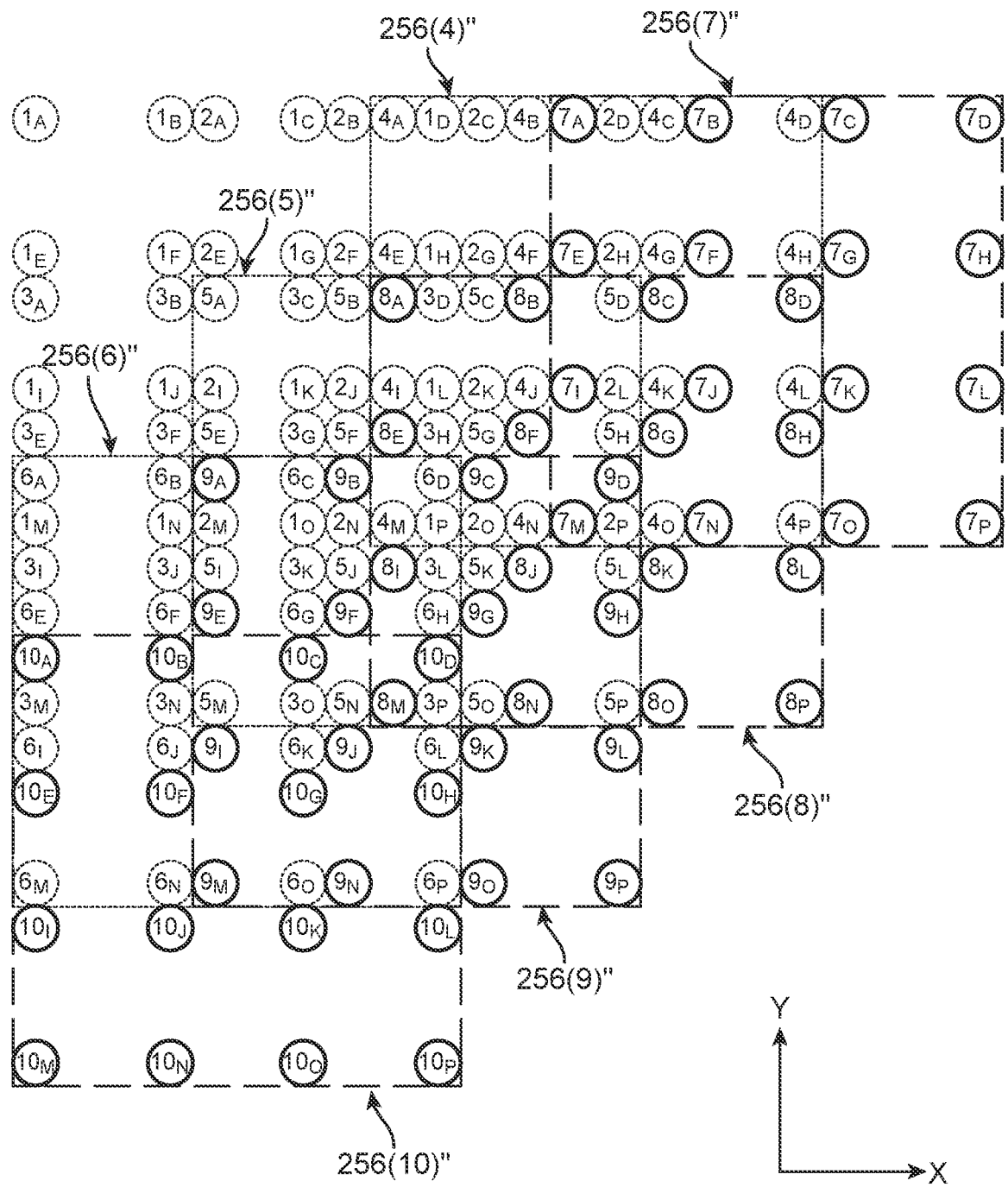

At the third generation, the two-dimensional array of intermediate out-coupled light beamlets 256(4)" spawns a two-dimensional array of intermediate out-coupled light beamlets 256(7)" along the x-axis; both the two-dimensional arrays of intermediate out-coupled light beamlets 256(4)" and 256(5)" combine to spawn the two-dimensional array of intermediate out-coupled light beamlets 256(8)" respectively along the x-axis and the y-axis; both the two-dimensional arrays of intermediate out-coupled light beamlets 256(5)" and 256(6)" combine to spawn the two-dimensional array of intermediate out-coupled light beamlets 256(9)" respectively along the x-axis and the y-axis; and the two-dimensional array of intermediate out-coupled light beamlets 256(6)" spawns a two-dimensional array of intermediate out-coupled light beamlets 256(10)" along the y-axis (see FIG. 89D).

Figure 89E:
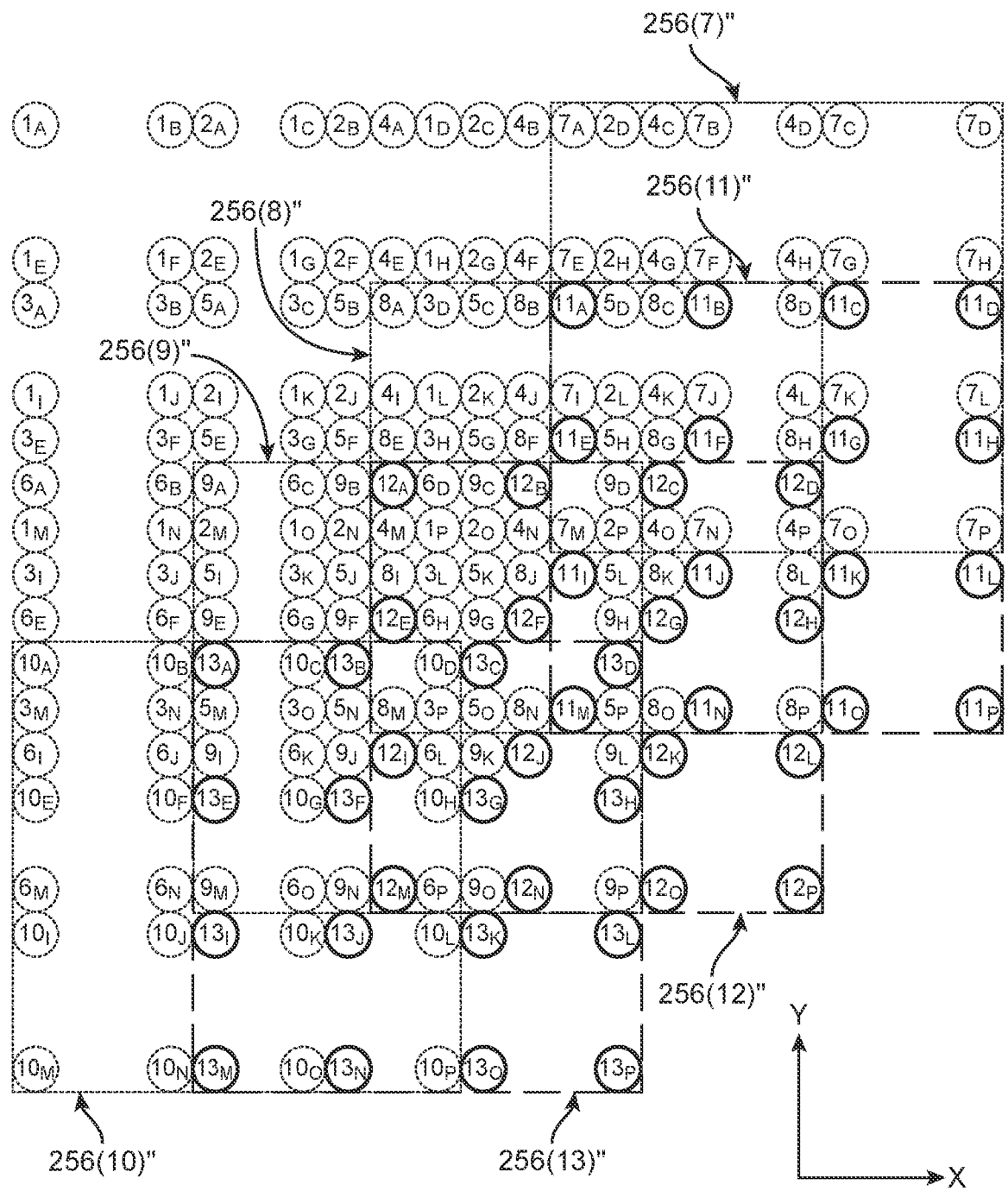

At the fourth generation, both the two-dimensional arrays of intermediate out-coupled light beamlets 256(7)" and 256(8)" combine to spawn a two-dimensional array of intermediate out-coupled light beamlets 256(11)" respectively along the x-axis and the y-axis; both the two-dimensional arrays of intermediate out-coupled light beamlets 256(8)" and 256(8)" combine to spawn a two-dimensional array of intermediate out-coupled light beamlets 256(12)" respectively along the x-axis and the y-axis; and both the two-dimensional arrays of intermediate out-coupled light beamlets 256(9)" and 256(10)" combine to spawn a two-dimensional array of intermediate out-coupled light beamlets 256(13)" respectively along the x-axis and the y-axis (see FIG. 89E).

Figure 89F:
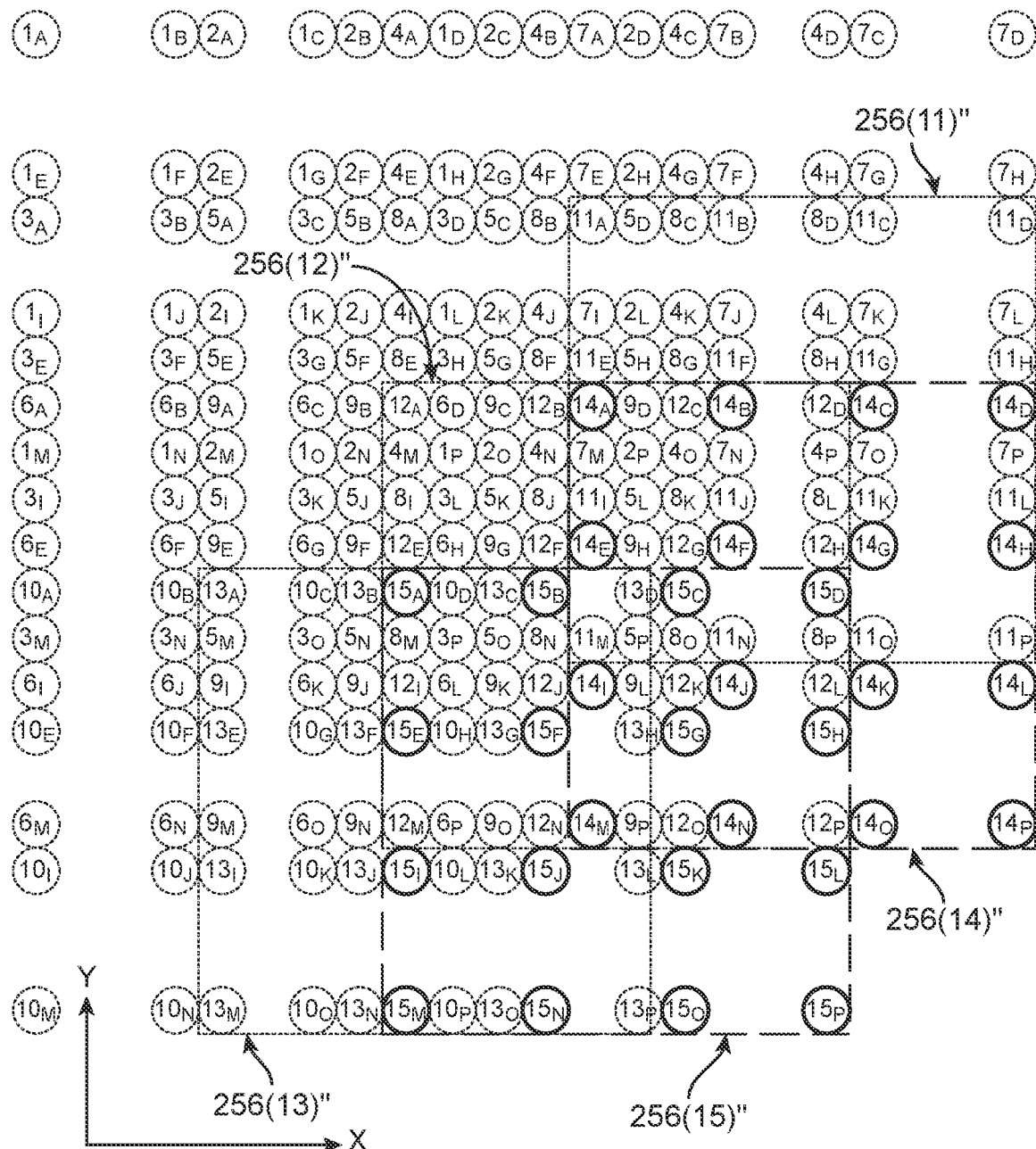

At the fifth generation, both the two-dimensional arrays of intermediate out-coupled light beamlets 256(11)" and 256(12)" combine to spawn a two-dimensional array of intermediate out-coupled light beamlets 256(14)" respectively along the x-axis and the y-axis; and both the two-dimensional arrays of intermediate out-coupled light beamlets 256(12)" and 256(13)" combine to spawn a two-dimensional array of intermediate out-coupled light beamlets 256(15)" respectively along the x-axis and the y-axis (see FIG. 89F).

Figure 89G:
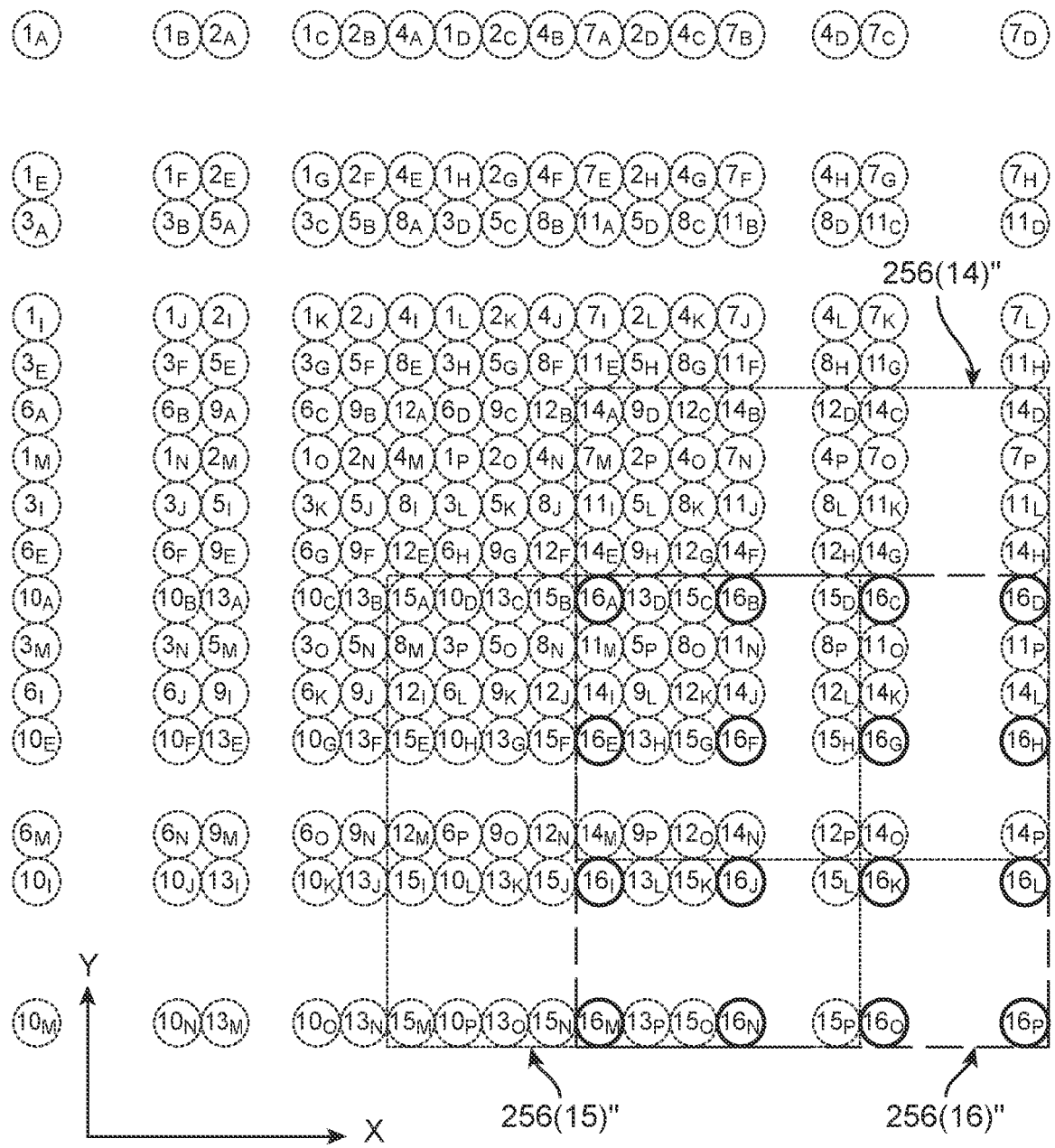

At the sixth generation, the both the two-dimensional arrays of intermediate out-coupled light beamlets 256(14)" and 256(15)" combine to spawn a two-dimensional array of intermediate out-coupled light beamlets 256(16)" respectively along the x-axis and the y-axis (see FIG. 89G).

Figure 89H:
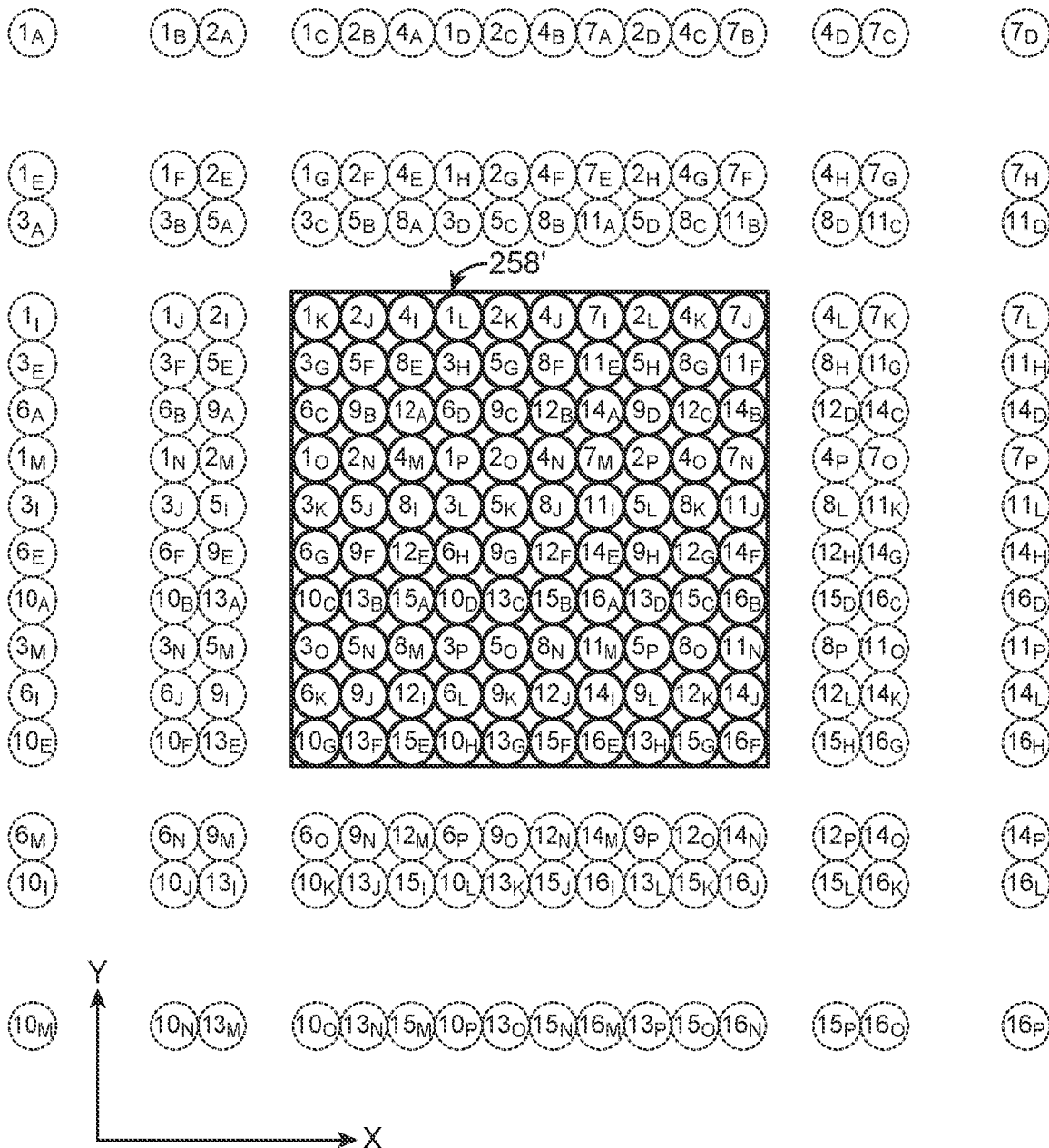
Figure 90A:
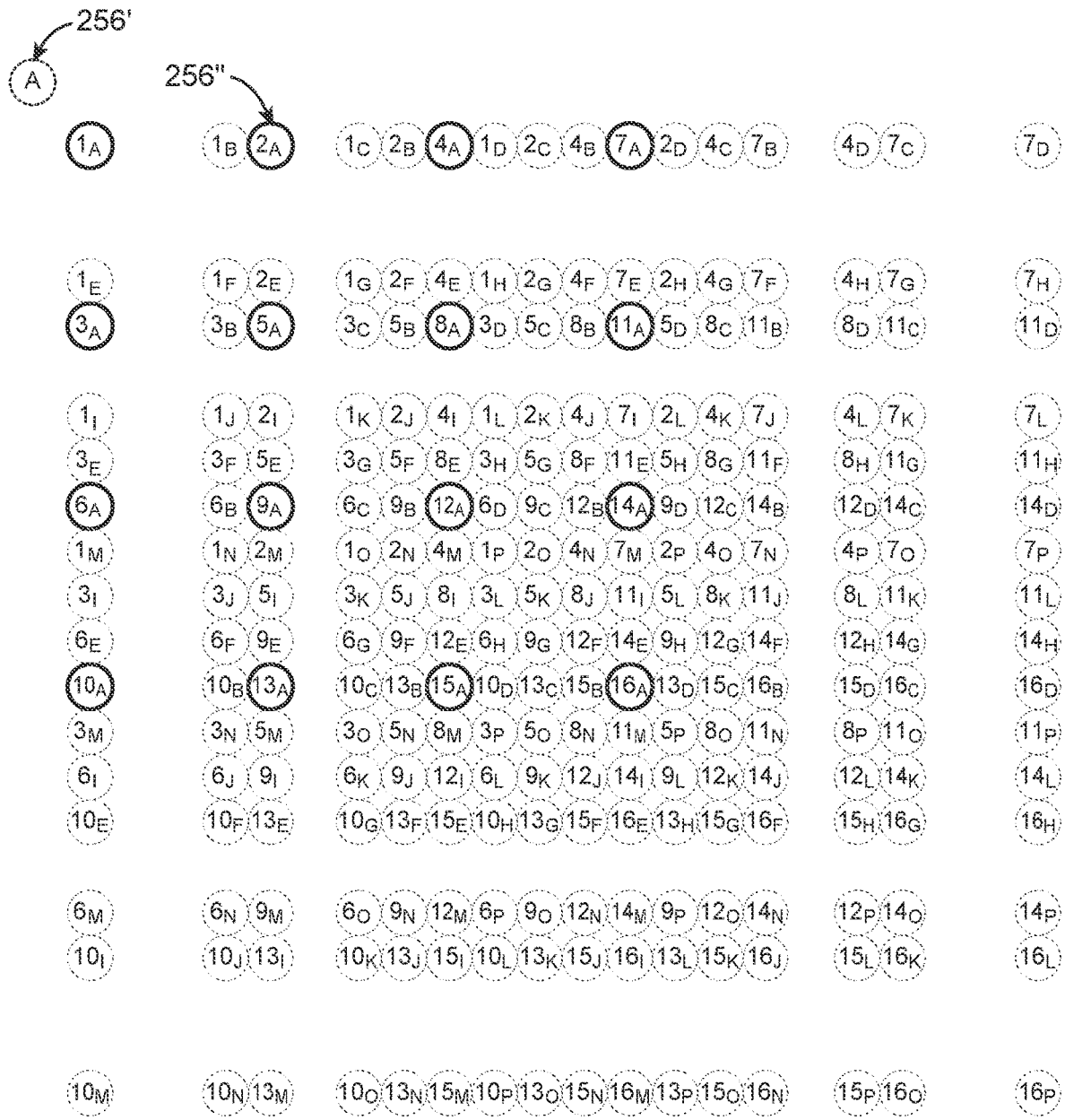
FIGS. 90A-90D are plan views illustrating the correspondence of four different families of beamlets in the beam pattern of FIGS. 89A and 89A to four different initial beamlets in the single two-dimensional array of light beamlets of FIG. 89A.
Figure 90B:
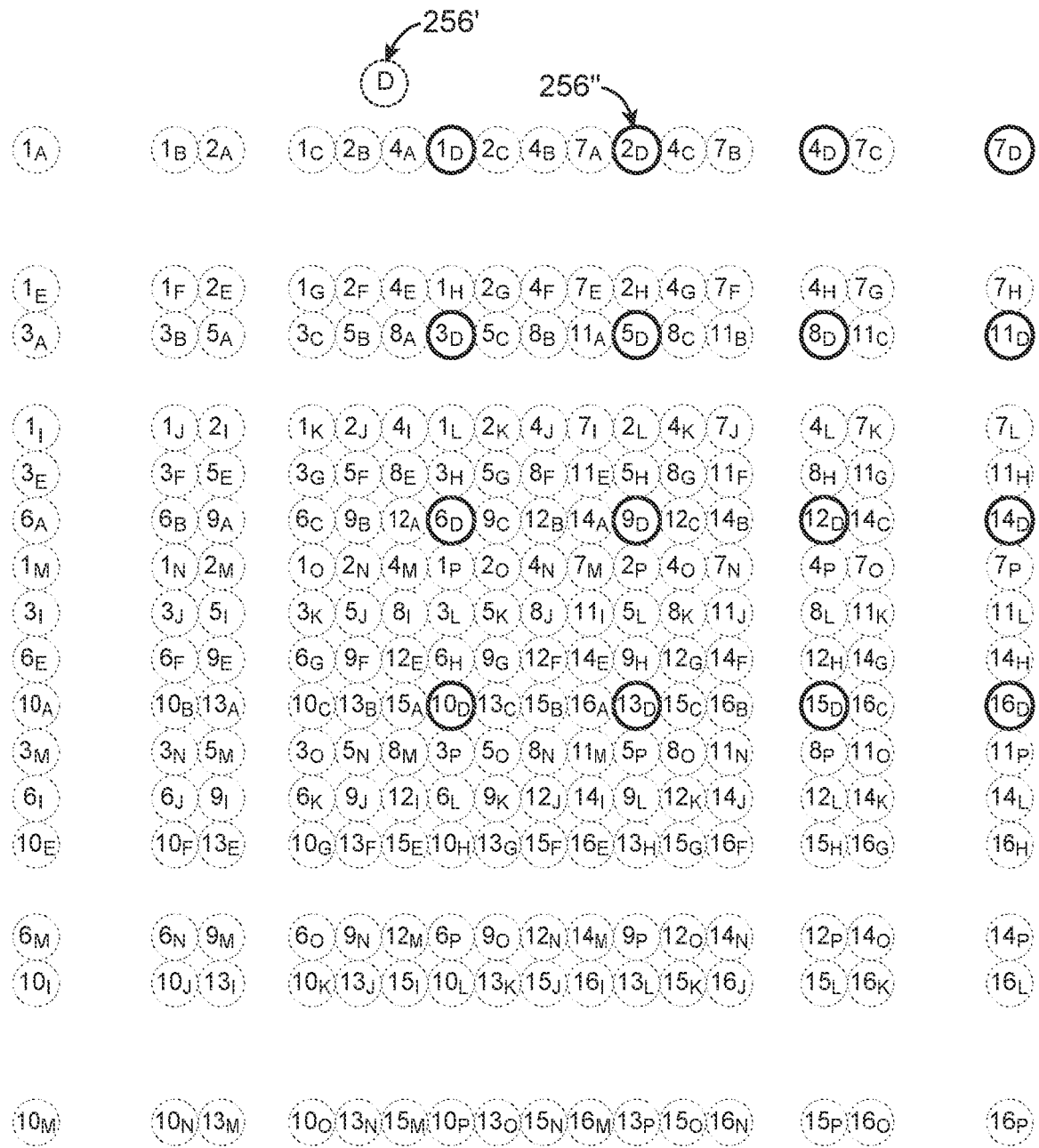
Figure 90C:
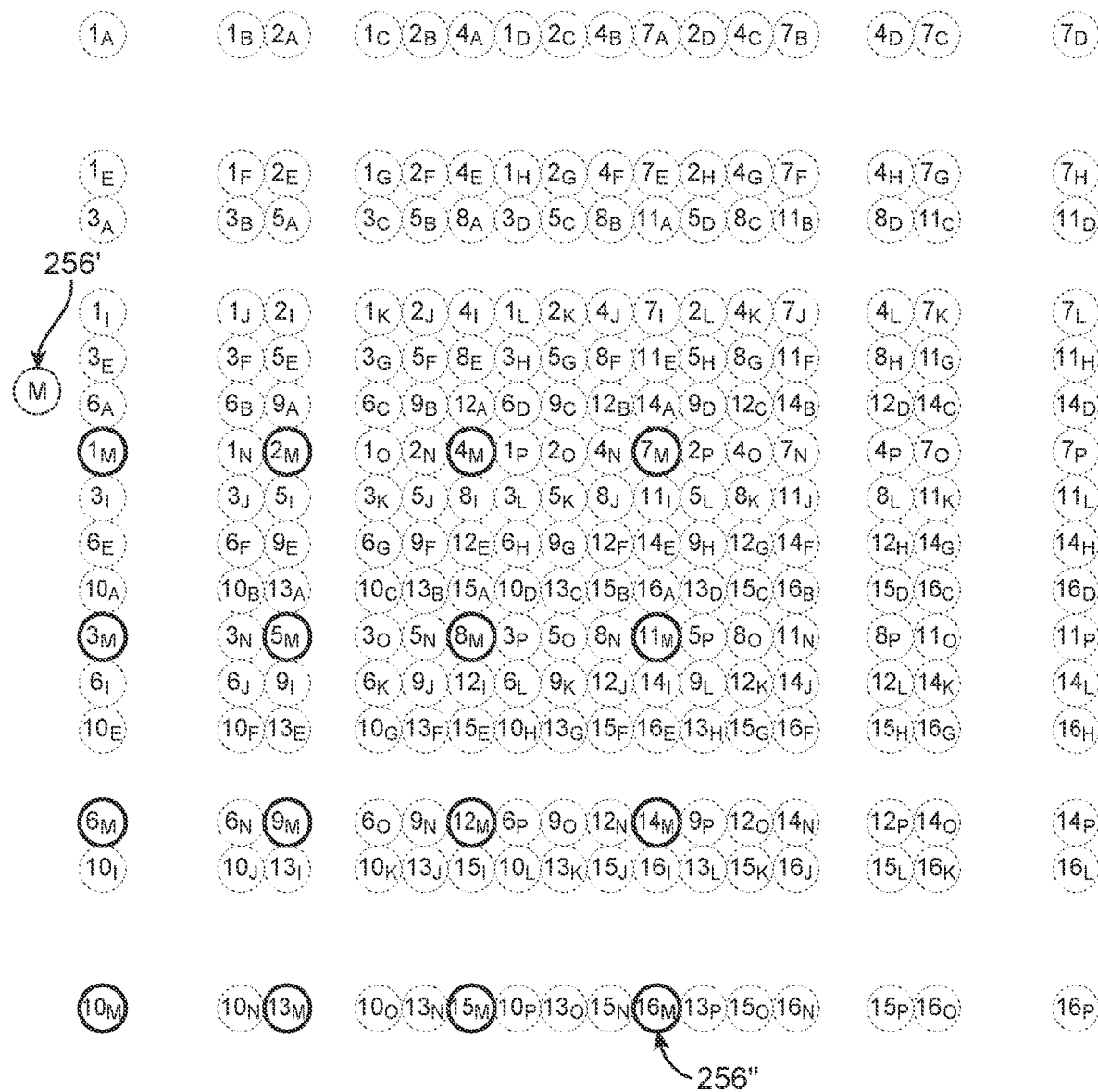
Figure 90D:
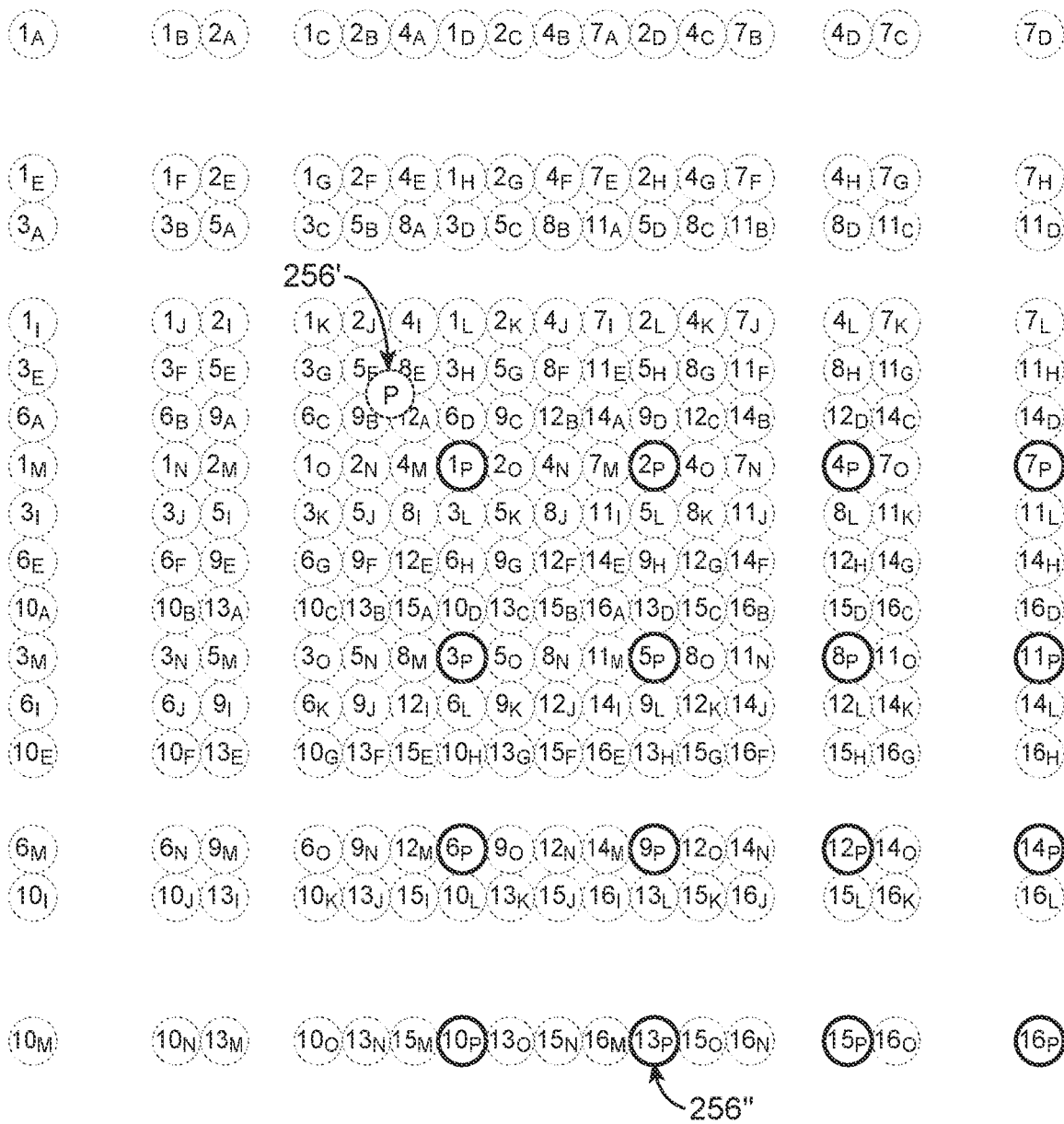

It can be appreciated that all of the intermediate out-coupled light beamlets 256" designated with a specific letter in the light beamlet pattern illustrated in FIG. 89H can be traced back to the corresponding initial out-coupled light beamlet with the same specific letter in the two-dimensional array of initial out-coupled light beamlets 256' illustrated in FIG. 89A. For example, it can be seen in FIG. 90A that a 4×4 array of intermediate out-coupled light beamlets 256" designated with the letter "A" can be derived from the single initial out-coupled light beamlet 256a designed with the letter "A." As another example, it can be seen from FIG. 90B that a 4×4 array of intermediate out-coupled light beamlets 256" designated with the letter "D" can be derived from the single initial out-coupled light beamlet 256a designed with the letter "D." As still another example, it can be seen from FIG. 90C that a 4×4 array of intermediate out-coupled light beamlets 256" designated with the letter "M" can be derived from the single initial out-coupled light beamlet 256a designed with the letter "M." As yet another example, it can be seen from FIG. 90D that a 4×4 array of intermediate out-coupled light beamlets 256" designated with the letter "P" can be derived from the single initial out-coupled light beamlet 256a designed with the letter "P".

Figure 80:
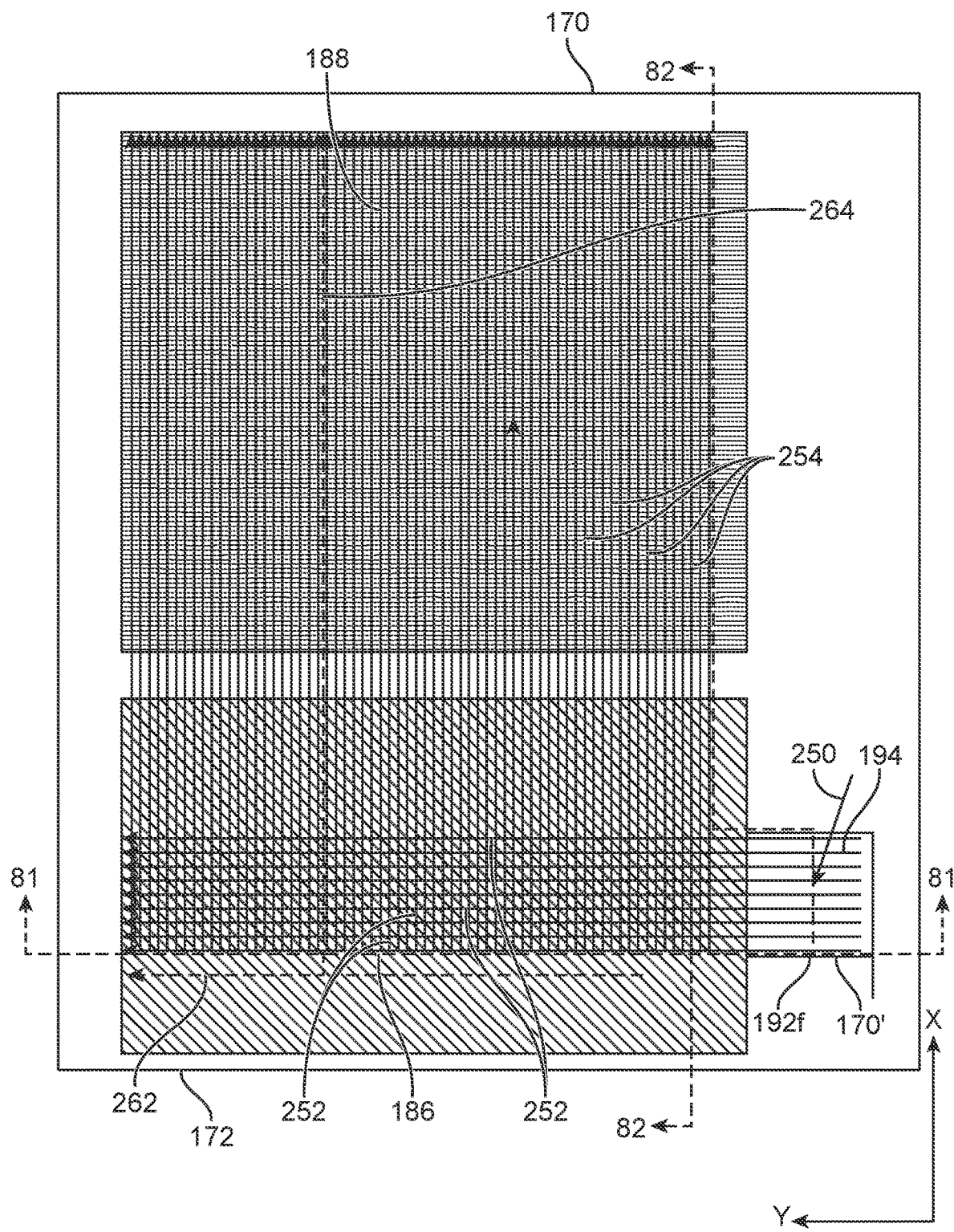
FIG. 80 is a plan view of yet another embodiment of the PPE of FIGS. 59A and 59A used with the primary waveguide apparatus of FIG. 34.
Figure 81:
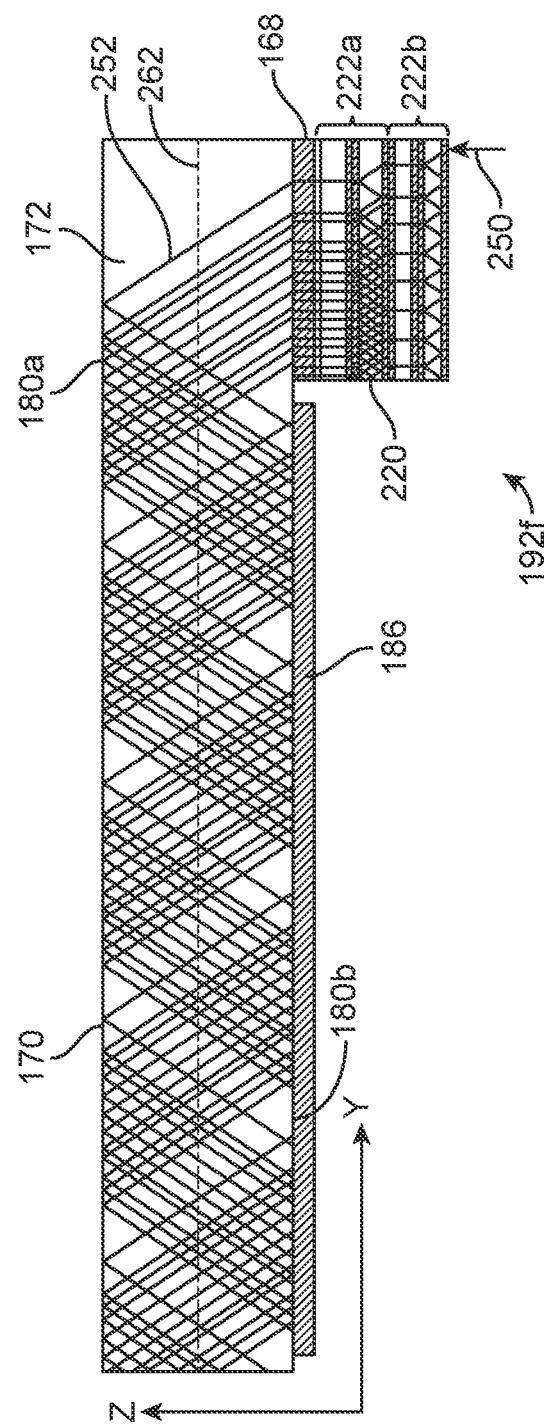
FIG. 81 is a cross-sectional view of the primary waveguide apparatus and PPE of FIG. 80, taken along the line 81-81.
Figure 82:
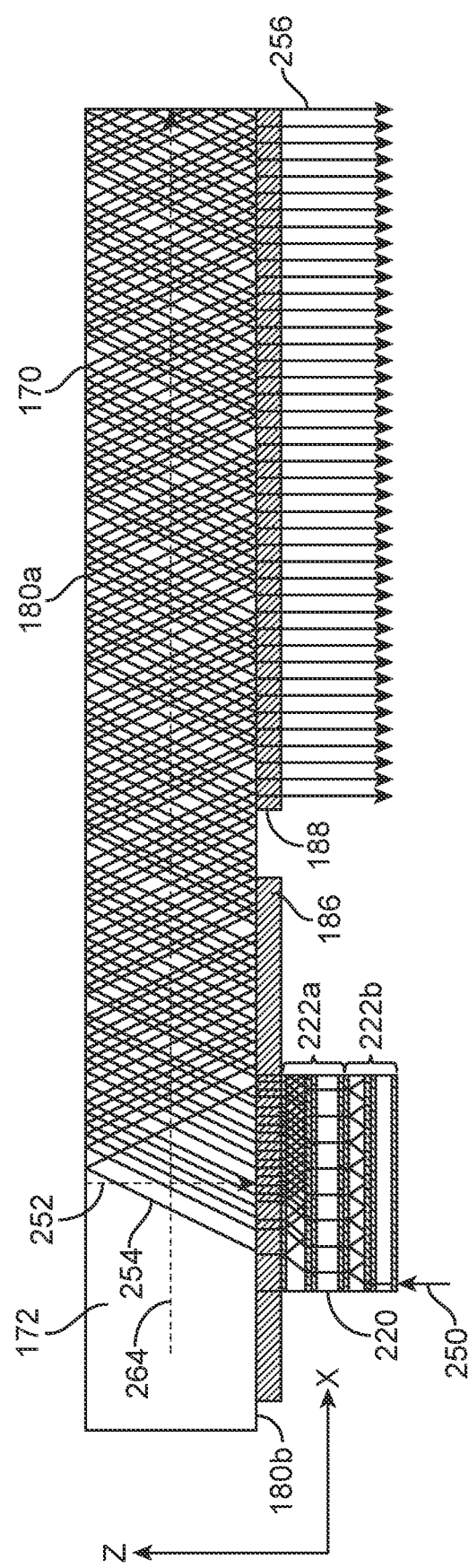
FIG. 82 is a cross-sectional view of the primary waveguide apparatus and PPE of FIG. 80, taken along the line 82-82.

It can be appreciated from the foregoing that the PPE 192f two-dimensionally pre-expands the effective entrance pupil of the collimated light beam 250. In the same manner as described above with respect to FIGS. 34-36, the primary waveguide apparatus 170 further two-dimensionally expands the pupil of the collimated light beam 250. That is, the intermediate out-coupled light beamlets 256" are input into the IC element 168 of the primary waveguide apparatus 170 as in-coupled light beamlets 252, which are in turn, split by the OPE element 186 into orthogonal light beamlets 254, which are further split by the EPE element 188 into final out-coupled light beamlets 256 that exit the face 180b of the waveguide 172 towards the eye(s) 52 of the end user 50, as illustrated in FIGS. 80-82. Notably, although the PPE 192f generates many two-dimensional arrays of out-coupled beamlets 256" that conceivably provides an exit pupil greater than the saturated 10×10 two-dimensional array of out-coupled beamlets 258', the primary waveguide apparatus 170 may be designed to assume that the PPE 192f has an exit pupil consisting of only the 10×10 two-dimensional array of out-coupled beamlets 258'.

It should be noted that, although the multi-layered mini-waveguide apparatus 220 lends itself for use as a PPE 192f, a larger version of the multi-layered waveguide apparatus 220 can be used as the primary waveguide apparatus 170 in order to expand the entrance pupil of a collimated light beam 250 (unexpanded or pre-expanded) in-coupled into the primary waveguide apparatus 170.

While beam multipliers have been described above as OPEs and EPEs, beam multipliers according to the embodiments described herein can be disposed anywhere in an LOE. For instance, beam multipliers described herein can be disposed as a separate multiplication stage/region between various parts of an LOE (e.g., between ICG and OPE). Further, beam multipliers described herein can function as ICGs.

While certain numbers of beams and beamlets are depicted in some of the figures, it should be appreciated that this is for clarity. Each single beam or beamlet depicted in the figures may represent a plurality of beams or beamlets carrying related information and having similar trajectories.

While certain numbers of LOSs and reflective surfaces are depicted in some of the figures, other embodiments may include other combinations of LOSs and reflective surfaces.

The above-described MR systems are provided as examples of various optical systems that can benefit from more selectively reflective optical elements. Accordingly, use of the optical systems described herein is not limited to the disclosed MR systems, but rather applicable to any optical system.

Various exemplary embodiments of the disclosure are described herein. Reference is made to these examples in a non-limiting sense. They are provided to illustrate more broadly applicable aspects of the disclosure. Various changes may be made to the disclosure described and equivalents may be substituted without departing from the true spirit and scope of the disclosure. In addition, many modifications may be made to adapt a particular situation, material, composition of matter, process, process act(s) or step(s) to the objective(s), spirit or scope of the present disclosure. Further, as will be appreciated by those with skill in the art that each of the individual variations described and illustrated herein has discrete components and features which may be readily separated from or combined with the features of any of the other several embodiments without departing from the scope or spirit of the present disclosure. All such modifications are intended to be within the scope of claims associated with this disclosure.

The disclosure includes methods that may be performed using the subject devices. The methods may comprise the act of providing such a suitable device. Such provision may be performed by the end user. In other words, the "providing" act merely requires the end user obtain, access, approach, position, set-up, activate, power-up or otherwise act to provide the requisite device in the subject method. Methods recited herein may be carried out in any order of the recited events which is logically possible, as well as in the recited order of events.

Exemplary aspects of the disclosure, together with details regarding material selection and manufacture have been set forth above. As for other details of the present disclosure, these may be appreciated in connection with the above-referenced patents and publications as well as generally known or appreciated by those with skill in the art. The same may hold true with respect to method-based aspects of the disclosure in terms of additional acts as commonly or logically employed.

In addition, though the disclosure has been described in reference to several examples optionally incorporating various features, the disclosure is not to be limited to that which is described or indicated as contemplated with respect to each variation of the disclosure. Various changes may be made to the disclosure described and equivalents (whether recited herein or not included for the sake of some brevity) may be substituted without departing from the true spirit and scope of the disclosure. In addition, where a range of values is provided, it is understood that every intervening value, between the upper and lower limit of that range and any other stated or intervening value in that stated range, is encompassed within the disclosure.

Also, it is contemplated that any optional feature of the inventive variations described may be set forth and claimed independently, or in combination with any one or more of the features described herein. Reference to a singular item, includes the possibility that there are plural of the same items present. More specifically, as used herein and in claims associated hereto, the singular forms "a," "an," "said," and "the" include plural referents unless the specifically stated otherwise. In other words, use of the articles allow for "at least one" of the subject item in the description above as well as claims associated with this disclosure. It is further noted that such claims may be drafted to exclude any optional element. As such, this statement is intended to serve as antecedent basis for use of such exclusive terminology as "solely," "only" and the like in connection with the recitation of claim elements, or use of a "negative" limitation.

Without the use of such exclusive terminology, the term "comprising" in claims associated with this disclosure shall allow for the inclusion of any additional element—irrespective of whether a given number of elements are enumerated in such claims, or the addition of a feature could be regarded as transforming the nature of an element set forth in such claims. Except as specifically defined herein, all technical and scientific terms used herein are to be given as broad a commonly understood meaning as possible while maintaining claim validity.

The breadth of the present disclosure is not to be limited to the examples provided and/or the subject specification, but rather only by the scope of claim language associated with this disclosure.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative rather than restrictive sense.

What is claimed is:

1. A virtual image generation system, comprising:
   a pre-pupil expansion (PPE) element configured for receiving a collimated light beam from an imaging element and splitting the collimated light beam into a set of initial out-coupled light beamlets;
   a planar optical waveguide; and
   one or more diffractive elements associated with the planar optical waveguide for splitting the set of out-coupled light beamlets into a set of final out-coupled light beamlets that exit a face of the planar optical waveguide,
   wherein the PPE element comprises a prism configured for splitting the collimated light beam into the set of out-coupled light beamlets, and
   wherein the prism comprises
      a semi-reflective prism plane configured for splitting the collimated light beam into the set of out-coupled light beamlets, and
      a plurality of parallel prism planes configured for splitting the collimated light beam into the set of out-coupled light beamlets, the two parallel prism planes comprising the semi-reflective prism plane.

2. The virtual image generation system of claim 1, wherein the collimated light beam defines an entrance pupil, the set of initial out-coupled light beamlets define a pre-expanded pupil larger than the entrance pupil, and the set of final out-coupled light beamlets define an exit pupil larger than the pre-expanded pupil.

3. The virtual image generation system of claim 2, wherein the pre-expanded pupil is at least ten times larger than the entrance pupil, and the exit pupil is at least ten times larger than the pre-expanded pupil.

4. The virtual image generation system of claim 1, wherein the set of initial out-coupled light beamlets is optically coupled into the planar optical waveguide as a two-dimensional light beamlet array, and the set of final out-coupled light beamlets exit the face of the planar optical waveguide as a two-dimensional light beamlet array.

5. The virtual image generation system of claim 1, wherein the set of initial out-coupled light beamlets is optically coupled into the planar optical waveguide as a one-dimensional light beamlet array, and the set of final out-coupled set of light beamlets exit the face of the planar optical waveguide as a two-dimensional light beamlet array.

6. The virtual image generation system of claim 1, wherein the one or more diffractive elements comprises an orthogonal pupil expansion (OPE) element associated with the planar optical waveguide for further splitting the set of out-coupled light beamlets into a set of orthogonal light beamlets, and an exit pupil expansion (EPE) element associated with the planar optical waveguide for splitting the set of orthogonal light beamlets into the set of final out-coupled light beamlets.

7. The virtual image generation system of claim 1, wherein the PPE element comprises:
   a diffractive beam splitter configured for splitting the collimated light beam into an initial set of diverging light beamlets; and
   a lens configured for re-collimating the initial set of diverging light beamlets into the set of initial out-coupled light beamlets.

8. The virtual image generation system of claim 7, wherein the diffractive beam splitter is a 1×N beam splitter.

9. The virtual image generation system of claim 7, wherein the diffractive beam splitter is an M×N beam splitter.

10. The virtual image generation system of claim 7, wherein the lens is a diffractive lens.

11. The virtual image generation system of claim 1, wherein the prism is a solid prism.

12. The virtual image generation system of claim 1, wherein the prism is a cavity prism.

13. The virtual image generation system of claim 1, wherein the plurality of parallel prism planes comprises a completely reflective prism plane, wherein a portion of the collimated light beam is reflected by the at least one semi-reflective prism in a first direction, and a portion of the collimated light beam is transmitted to the completely reflective prism plane for reflection in the first direction.

14. A virtual image generation system, comprising:
a pre-pupil expansion (PPE) element configured for receiving a collimated light beam from an imaging element and splitting the collimated light beam into a set of initial out-coupled light beamlets;
a planar optical waveguide; and
one or more diffractive elements associated with the planar optical waveguide for splitting the set of out-coupled light beamlets into a set of final out-coupled light beamlets that exit a face of the planar optical waveguide,
wherein the one or more diffractive elements comprises an orthogonal pupil expansion (OPE) element associated with the planar optical waveguide for further splitting the set of out-coupled light beamlets into a set of orthogonal light beamlets, and an exit pupil expansion (EPE) element associated with the planar optical waveguide for splitting the set of orthogonal light beamlets into the set of final out-coupled light beamlets, and
wherein the PPE element comprises:
a mini-planar optical waveguide;
a mini-OPE element associated with the mini-planar optical waveguide for splitting the collimated light beam into a set of initial orthogonal light beamlets; and
a mini-EPE element associated with the mini-planar optical waveguide for splitting the set of initial orthogonal light beamlets into the set of initial out-coupled light beamlets that exit a face of the mini-planar optical waveguide.

15. The virtual image generation system of claim 14, wherein the PPE element further comprises a mini-IC element configured for optically coupling the collimated light beam into the planar optical waveguide.

16. A virtual image generation system, comprising:
a pre-pupil expansion (PPE) element configured for receiving a collimated light beam from an imaging element and splitting the collimated light beam into a set of initial out-coupled light beamlets;
a planar optical waveguide; and
one or more diffractive elements associated with the planar optical waveguide for splitting the set of out-coupled light beamlets into a set of final out-coupled light beamlets that exit a face of the planar optical waveguide,
wherein the PPE element comprises a prism configured for splitting the collimated light beam into the set of out-coupled light beamlets, and
wherein the prism comprises a first set of parallel prism planes configured for splitting the collimated light beam into a set of initial orthogonal light beamlets that are reflected in a first direction, and a second set of parallel prism planes configured for splitting the initial orthogonal light beamlets into the set of out-coupled light beamlets that are reflected in a second direction different from the first direction.

17. The virtual image generation system of claim 16, wherein the first and second directions are orthogonal to each other.

18. A virtual image generation system, comprising:
a pre-pupil expansion (PPE) element configured for receiving a collimated light beam from an imaging element and splitting the collimated light beam into a set of initial out-coupled light beamlets;
a planar optical waveguide; and
one or more diffractive elements associated with the planar optical waveguide for splitting the set of out-coupled light beamlets into a set of final out-coupled light beamlets that exit a face of the planar optical waveguide,
wherein the PPE element comprises:
a first planar optical waveguide assembly configured for splitting the collimated light beam into a two-dimensional array of out-coupled light beamlets that exits a face of the first planar optical waveguide assembly, the two-dimensional out-coupled light beamlet array having an inter-beamlet spacing; and
a second planar optical waveguide assembly configured for splitting the two-dimensional out-coupled light beamlet array into multiple two-dimensional arrays of out-out-coupled light beamlets that exit a face of the second planar optical waveguide assembly as the set of out-coupled light beamlets, the multiple two-dimensional out-coupled light beamlet arrays being spatially offset from each other by an inter-array spacing different from the inter-beamlet spacing of the two-dimensional out-coupled light beamlet array.

19. The virtual image generation system of claim 18, wherein the two-dimensional light beam let array is an N×N light beamlet array.

20. The virtual image generation system of claim 18, wherein the inter-array spacing of the multiple two-dimensional out-coupled light beamlet arrays and the inter-beamlet spacing of the two-dimensional out-coupled light beamlet array are non-multiples of each other.

21. The virtual image generation system of claim 18, wherein the inter-array spacing of the multiple two-dimensional out-coupled light beamlet arrays is greater than the inter-beamlet spacing of the two-dimensional out-coupled light beamlet array.

22. The virtual image generation system of claim 18, wherein the first and second planar optical waveguide assemblies respectively have unequal thicknesses.

23. The virtual image generation system of claim 18, wherein the first planar optical waveguide assembly comprises:
a first planar optical waveguide having opposing first and second faces;
a first in-coupling (IC) element configured for optically coupling the collimated light beam for propagation within the first planar optical waveguide via total internal reflection (TIR) along a first optical path;
a first exit pupil expander (EPE) element associated with the first planar optical waveguide for splitting the collimated light beam into a one-dimensional light beamlet array that exit the second face of the first planar optical waveguide;
a second planar optical waveguide having opposing first and second faces;
a second IC element configured for optically coupling the one-dimensional light beam let array for propagation within the second planar optical waveguide via TIR along respective second optical paths that are perpendicular to the first optical path; and a second exit pupil expander (EPE) element associated with the second planar optical waveguide for splitting the one-dimensional light beamlet array into the two-dimensional light beamlet array that exit the second face of the second planar optical waveguide.

24. The virtual image generation system of claim 23, wherein the first face of the second planar optical waveguide is affixed to the second face of the first planar optical waveguide.

25. The virtual image generation system of claim 23, wherein the first and second planar optical waveguides respectively have substantially equal thicknesses.

26. The virtual image generation system of claim 23, wherein the second planar optical waveguide assembly comprises:

a third planar optical waveguide having opposing first and second faces;

a third IC element configured for optically coupling the first two-dimensional light beamlet array for propagation within the third planar optical waveguide via TIR along respective third optical paths;

a third EPE element associated with the third planar optical waveguide for splitting the two-dimensional light beamlet array into a plurality of two-dimensional light beamlet arrays that exit the second face of the third planar optical waveguide;

a fourth planar optical waveguide having opposing first and second faces;

a fourth IC element configured for optically coupling the plurality of two-dimensional light beamlet arrays for propagation within the fourth planar optical waveguide via TIR along respective fourth optical paths that are perpendicular to the third optical paths; and a fourth EPE element associated with the fourth planar optical waveguide for splitting the plurality of two-dimensional light beamlet arrays into the multiple two-dimensional light beamlet arrays that exit the second face of the fourth planar optical waveguide as the input set of light beamlets.

27. The virtual image generation system of claim 26, wherein the first face of the fourth planar optical waveguide is affixed to the second face of the third planar optical waveguide.

28. The virtual image generation system of claim 27, wherein the first face of the third planar optical waveguide is affixed to the second face of the second planar optical waveguide.

29. The virtual image generation system of claim 28, wherein the substantially equal thicknesses of the first and second planar optical waveguides are different from the substantially equal thicknesses of the third and fourth planar optical waveguides.

30. The virtual image generation system of claim 29, wherein the substantially equal thicknesses of the third and fourth planar optical waveguides are greater than the substantially equal thicknesses of the first and second planar optical waveguides.

31. The virtual image generation system of claim 26, wherein the first and second planar optical waveguides respectively have substantially equal thicknesses, and the third and fourth planar optical waveguides respectively have substantially equal thicknesses.

* * * * *